US012209736B2

(12) United States Patent
Young et al.

(10) Patent No.: US 12,209,736 B2
(45) **Date of Patent: *Jan. 28, 2025**

(54) POLYMER HOUSING FOR A LIGHTING SYSTEM AND METHODS FOR USING SAME

(71) Applicant: DMF, Inc., Carson, CA (US)

(72) Inventors: William Wai-Loong Young, La Habra Heights, CA (US); Amir Lotfi, Redondo Beach, CA (US); Vincent Williams, Torrance, CA (US); Nolan Gunsolley, Aliso Viejo, CA (US)

(73) Assignee: DMF, Inc., Carson, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/723,370

(22) Filed: Apr. 18, 2022

(65) Prior Publication Data

US 2023/0064125 A1 Mar. 2, 2023

Related U.S. Application Data

(63) Continuation of application No. 17/379,748, filed on Jul. 19, 2021, now Pat. No. 11,306,903.
(Continued)

(30) Foreign Application Priority Data

Jul. 16, 2021 (CA) ...................................... 3124976

(51) Int. Cl.
*F21V 21/04* (2006.01)
*F21V 23/00* (2015.01)

(52) U.S. Cl.
CPC .......... *F21V 21/049* (2013.01); *F21V 21/044* (2013.01); *F21V 21/048* (2013.01); *F21V 23/001* (2013.01)

(58) Field of Classification Search
CPC .... F21V 21/049; F21V 21/044; F21V 21/048; F21V 23/001
(Continued)

(56) References Cited

U.S. PATENT DOCUMENTS 1,133,535 A 3/1915 Cain et al.
1,454,722 A 5/1923 Leo
(Continued)

FOREIGN PATENT DOCUMENTS

CA 2243934 C 6/2002
CA 2502637 A1 9/2005
(Continued)

OTHER PUBLICATIONS

"12 Pack" reference by Hykolity on Amazon.com, date first available Nov. 7, 2019 [online], available from internet URL: https://www.amazon.com/dp/B081655CDL/ref=cm_sw_em_r_mt_dp_8NAZD4R3MTTP59290SG3?_encoding=UTF8&th=1 (Year: 2019) (6 pages).
(Continued)

*Primary Examiner* — Laura K Tso
(74) *Attorney, Agent, or Firm* — Smith Baluch LLP

(57) ABSTRACT

A housing assembly for a recessed lighting system includes a housing with integrally formed cable routing features, mounting features, and alignment features. The integration of multiple features into the housing is enabled by forming the housing from a polymer using an injection molding process instead of sheet metal. For a new construction installation, the housing includes integrally formed bar hanger holders to support and guide bar hangers for installation onto two or more support structures, nail-in features for installation onto a single support structure, and one or more alignment features to position the housing against the single support structure when the nail-in features are used
(Continued)

for installation. For a remodel installation, the housing includes a flange to abut a bottom surface of a ceiling and one or more spring clips mounted to the housing to abut a top surface of the ceiling.

20 Claims, 118 Drawing Sheets

Related U.S. Application Data

(60) Provisional application No. 63/121,163, filed on Dec. 3, 2020, provisional application No. 63/053,260, filed on Jul. 17, 2020.

(58) Field of Classification Search
USPC .......................................................... 362/148
See application file for complete search history.

(56) References Cited

U.S. PATENT DOCUMENTS

| | | | |
|---|---|---|---|
| 1,471,340 | A | 10/1923 | Knight |
| 1,856,356 | A | 5/1932 | Owen |
| 2,038,784 | A | 4/1936 | Ghadiali |
| 2,179,161 | A | 11/1939 | Rambusch |
| 2,197,737 | A | 4/1940 | Appleton |
| 2,352,913 | A | 7/1944 | Morrill |
| 2,528,989 | A | 11/1950 | Ammells |
| 2,597,595 | A | 5/1952 | Ordas |
| 2,642,246 | A | 6/1953 | Larry |
| 2,670,919 | A | 3/1954 | Vincent |
| 2,697,535 | A | 12/1954 | Olson |
| 2,758,810 | A | 8/1956 | Good |
| D180,844 | S | 8/1957 | Poliakoff |
| 2,802,933 | A | 8/1957 | Broadwin |
| 2,809,002 | A | 10/1957 | Rudolph |
| 2,998,512 | A | 8/1961 | Duchene et al. |
| 3,023,920 | A | 3/1962 | Cook et al. |
| 3,057,993 | A | 10/1962 | Gellert |
| 3,104,087 | A | 9/1963 | Joseph et al. |
| 3,214,126 | A | 10/1965 | Roos |
| 3,422,261 | A | 1/1969 | McGinty |
| 3,460,299 | A | 8/1969 | Wilson |
| 3,650,046 | A | 3/1972 | Skinner |
| 3,675,807 | A | 7/1972 | Lund et al. |
| 3,700,885 | A | 10/1972 | Bobrick |
| 3,711,053 | A | 1/1973 | Drake |
| D227,989 | S | 7/1973 | Geisel |
| 3,773,968 | A | 11/1973 | Copp |
| 3,812,342 | A | 5/1974 | Mcnamara |
| 3,836,766 | A | 9/1974 | Auerbach |
| 3,874,035 | A | 4/1975 | Schuplin |
| 3,913,773 | A | 10/1975 | Copp et al. |
| D245,905 | S | 9/1977 | Taylor |
| 4,050,603 | A | 9/1977 | Harris et al. |
| 4,062,512 | A | 12/1977 | Arnold |
| 4,088,827 | A | 5/1978 | Kohaut |
| 4,154,218 | A | 5/1979 | Hulet |
| 4,154,219 | A | 5/1979 | Gupta et al. |
| 4,176,758 | A | 12/1979 | Glick |
| 4,280,169 | A | 7/1981 | Allen |
| D267,694 | S | 1/1983 | Moriarty et al. |
| D267,695 | S | 1/1983 | Paquette et al. |
| D267,775 | S | 2/1983 | Holcombe |
| 4,399,497 | A | 8/1983 | Druffel |
| 4,450,512 | A | 5/1984 | Kristofek |
| 4,460,948 | A | 7/1984 | Malola |
| 4,520,435 | A | 5/1985 | Baldwin |
| 4,539,629 | A | 9/1985 | Poppenheimer |
| 4,601,145 | A | 7/1986 | Wilcox |
| 4,667,840 | A | 5/1987 | Lindsey |
| 4,723,747 | A | 2/1988 | Karp et al. |
| 4,729,080 | A | 3/1988 | Fremont et al. |
| 4,733,339 | A | 3/1988 | Kelsall |
| 4,754,377 | A | 6/1988 | Wenman |
| 4,770,311 | A | 9/1988 | Wang |
| 4,880,128 | A | 11/1989 | Jorgensen |
| 4,910,651 | A | 3/1990 | Montanez |
| 4,919,292 | A | 4/1990 | Hsu |
| 4,929,187 | A | 5/1990 | Hudson et al. |
| 4,930,054 | A | 5/1990 | Krebs |
| 5,044,582 | A | 9/1991 | Walters |
| D326,537 | S | 5/1992 | Gattari |
| 5,216,203 | A | 6/1993 | Gower |
| 5,222,800 | A | 6/1993 | Chan et al. |
| 5,239,132 | A | 8/1993 | Bartow |
| 5,250,269 | A | 10/1993 | Langer et al. |
| D340,856 | S | 11/1993 | McHugh |
| D341,819 | S | 11/1993 | Carlstrom |
| 5,266,050 | A | 11/1993 | O'Neil et al. |
| 5,291,381 | A | 3/1994 | Price |
| 5,303,894 | A | 4/1994 | Deschamps et al. |
| 5,382,752 | A | 1/1995 | Reyhan et al. |
| 5,420,376 | A | 5/1995 | Rajecki et al. |
| 5,465,199 | A | 11/1995 | Bray et al. |
| D365,165 | S | 12/1995 | Stultz |
| 5,505,419 | A | 4/1996 | Gabrius |
| 5,544,870 | A | 8/1996 | Kelley et al. |
| 5,562,343 | A | 10/1996 | Chan et al. |
| 5,571,993 | A | 11/1996 | Jones et al. |
| 5,580,158 | A | 12/1996 | Aubrey et al. |
| 5,588,737 | A | 12/1996 | Kusmer |
| 5,603,424 | A | 2/1997 | Bordwell et al. |
| 5,609,408 | A | 3/1997 | Targetti |
| 5,613,338 | A | 3/1997 | Esposito |
| D381,111 | S | 7/1997 | Lecluze |
| 5,662,413 | A | 9/1997 | Akiyama et al. |
| D386,277 | S | 11/1997 | Lecluze |
| 5,690,423 | A | 11/1997 | Hentz et al. |
| D387,466 | S | 12/1997 | Lecluze |
| 5,738,436 | A | 4/1998 | Cummings et al. |
| 5,778,625 | A | 7/1998 | Druffel et al. |
| 5,836,678 | A | 11/1998 | Wright et al. |
| 5,942,726 | A | 8/1999 | Reiker |
| 5,944,412 | A | 8/1999 | Janos et al. |
| 5,957,573 | A | 9/1999 | Wedekind et al. |
| 5,975,323 | A | 11/1999 | Turan |
| 6,030,102 | A | 2/2000 | Gromotka |
| 6,033,098 | A | 3/2000 | Hentz et al. |
| 6,076,788 | A | 6/2000 | Akiyama |
| 6,082,878 | A | 7/2000 | Doubek et al. |
| 6,095,669 | A | 8/2000 | Cho |
| 6,098,945 | A | 8/2000 | Korcz |
| 6,105,334 | A | 8/2000 | Monson et al. |
| 6,161,910 | A | 12/2000 | Reisenauer et al. |
| 6,170,685 | B1 | 1/2001 | Currier |
| 6,170,965 | B1 | 1/2001 | Kotovsky |
| 6,174,076 | B1 | 1/2001 | Petrakis et al. |
| 6,176,599 | B1 | 1/2001 | Farzen |
| 6,267,491 | B1 | 7/2001 | Parrigin |
| 6,332,597 | B1 | 12/2001 | Korcz et al. |
| 6,350,043 | B1 | 2/2002 | Gloisten |
| 6,350,046 | B1 | 2/2002 | Lau |
| 6,364,511 | B1 | 4/2002 | Cohen |
| 6,375,338 | B1 | 4/2002 | Cummings et al. |
| 6,402,112 | B1 | 6/2002 | Thomas et al. |
| 6,423,899 | B1 | 7/2002 | Reiker |
| D461,455 | S | 8/2002 | Forbes |
| 6,461,016 | B1 | 10/2002 | Jamison et al. |
| 6,474,846 | B1 | 11/2002 | Kelmelis et al. |
| 6,491,270 | B1 | 12/2002 | Pfaller |
| 6,491,413 | B1 | 12/2002 | Benesohn |
| D468,697 | S | 1/2003 | Straub, Jr. |
| D470,970 | S | 2/2003 | Huang |
| 6,515,313 | B1 | 2/2003 | Ibbetson et al. |
| 6,521,833 | B1 | 2/2003 | DeFreitas |
| D471,657 | S | 3/2003 | Huang |
| 6,583,573 | B2 | 6/2003 | Bierman |
| 6,585,389 | B2 | 7/2003 | Bonazzi |
| 6,600,175 | B1 | 7/2003 | Baretz et al. |
| D478,872 | S | 8/2003 | Heggem |
| 6,632,006 | B1 | 10/2003 | Rippel et al. |
| 6,657,236 | B1 | 12/2003 | Thibeault et al. |
| 6,666,419 | B1 | 12/2003 | Vrame |

(56) References Cited

U.S. PATENT DOCUMENTS

D487,600 S 3/2004 Fickas
D488,583 S 4/2004 Benghozi
6,719,438 B2 4/2004 Sevack et al.
6,758,578 B1 7/2004 Chou
6,777,615 B1 8/2004 Gretz
6,779,908 B1 8/2004 Ng
6,827,229 B2 12/2004 Dinh et al.
6,827,471 B1 12/2004 Benghozi
6,838,618 B2 1/2005 Newbold et al.
6,889,943 B2 5/2005 Dinh et al.
6,906,352 B2 6/2005 Edmond et al.
D509,314 S 9/2005 Rashidi
6,948,829 B2 9/2005 Verdes et al.
6,958,497 B2 10/2005 Emerson et al.
6,964,501 B2 11/2005 Ryan
6,967,284 B1 11/2005 Gretz
D516,235 S 2/2006 Rashidi
7,025,477 B2 4/2006 Blessing
7,064,269 B2 6/2006 Smith
D528,673 S 9/2006 Maxik et al.
7,102,172 B2 9/2006 Lynch
D531,740 S 11/2006 Maxik
D532,532 S 11/2006 Maxik
7,148,420 B1 12/2006 Johnson et al.
7,148,632 B2 12/2006 Berman et al.
7,154,040 B1 12/2006 Tompkins
7,170,015 B1 1/2007 Roesch et al.
D536,349 S 2/2007 Humber et al.
D537,039 S 2/2007 Pincek
D539,229 S 3/2007 Murphey
7,186,008 B2 3/2007 Patti
7,190,126 B1 3/2007 Paton
7,211,833 B2 5/2007 Slater, Jr. et al.
7,213,940 B1 5/2007 Van De Ven et al.
7,234,674 B2 6/2007 Rippel et al.
D547,889 S 7/2007 Huang
D552,969 S 10/2007 Bobrowski et al.
D553,267 S 10/2007 Yuen
D555,106 S 11/2007 Pape et al.
D556,144 S 11/2007 Dinh
7,297,870 B1 11/2007 Sartini
7,312,474 B2 12/2007 Emerson et al.
7,320,536 B2 1/2008 Petrakis et al.
D561,372 S 2/2008 Yan
D561,373 S 2/2008 Yan
7,335,920 B2 2/2008 Denbaars et al.
D563,896 S 3/2008 Greenslate
7,347,580 B2 3/2008 Blackman et al.
D570,012 S 5/2008 Huang
7,374,308 B2 5/2008 Sevack et al.
D570,504 S 6/2008 Maxik et al.
D570,505 S 6/2008 Maxik et al.
7,399,104 B2 7/2008 Rappaport
7,413,156 B1 8/2008 Cho
7,429,025 B1 9/2008 Gretz
D578,677 S 10/2008 Huang
7,431,482 B1 10/2008 Morgan et al.
7,432,440 B2 10/2008 Hull et al.
7,442,883 B2 10/2008 Jolly et al.
7,446,345 B2 11/2008 Emerson et al.
7,470,048 B2 12/2008 Wu
7,473,005 B2 1/2009 O'Brien
7,488,097 B2 2/2009 Reisenauer et al.
7,488,098 B2 2/2009 Dumont
7,494,258 B2 2/2009 McNaught
7,503,145 B2 3/2009 Newbold et al.
7,510,159 B2 3/2009 Rippel
7,524,089 B2 4/2009 Park
D591,894 S 5/2009 Flank
D592,945 S 5/2009 Mahan
7,534,989 B2 5/2009 Suehara et al.
D596,154 S 7/2009 Rivkin
7,566,154 B2 7/2009 Gloisten et al.
D599,040 S 8/2009 Alexander et al.
D600,836 S 9/2009 Hanley et al.
7,588,359 B2 9/2009 Coushaine et al.
7,592,583 B2 9/2009 Page et al.
D606,696 S 12/2009 Chen et al.
7,625,105 B1 12/2009 Johnson
7,628,513 B2 12/2009 Chiu
7,651,238 B2 1/2010 O'Brien
7,654,705 B2 2/2010 Czech et al.
D611,650 S 3/2010 Broekhoff
7,670,021 B2 3/2010 Chou
7,673,841 B2 3/2010 Wronski
7,677,766 B2 3/2010 Boyer
D613,444 S 4/2010 Rashidi
7,692,182 B2 4/2010 Bergmann et al.
7,699,283 B2 4/2010 Vrame
7,704,763 B2 4/2010 Fujii et al.
D616,118 S 5/2010 Thomas et al.
7,712,922 B2 5/2010 Hacker et al.
7,722,208 B1 5/2010 Dupre et al.
7,722,227 B2 5/2010 Zhang et al.
7,735,795 B2 6/2010 Wronski
7,735,798 B2 6/2010 Kojima
7,748,887 B2 7/2010 Zampini, II et al.
7,766,518 B2 8/2010 Piepgras et al.
7,769,192 B2 8/2010 Takagi et al.
7,771,082 B2 8/2010 Peng
7,771,094 B2 8/2010 Goode
7,784,754 B2 8/2010 Nevers et al.
D624,691 S 9/2010 Zhang et al.
D624,692 S 9/2010 Mackin et al.
D625,847 S 10/2010 Maglica
D625,876 S 10/2010 Chen et al.
7,810,775 B2 10/2010 Ponte et al.
D627,507 S 11/2010 Lai et al.
D627,727 S 11/2010 Alexander et al.
7,828,465 B2 11/2010 Roberge et al.
D629,366 S 12/2010 Ericson et al.
7,845,393 B2 12/2010 Kao et al.
7,857,275 B2 12/2010 de la Borbolla
7,871,184 B2 1/2011 Peng
7,874,539 B2 1/2011 Wright et al.
7,874,703 B2 1/2011 Shastry et al.
7,874,709 B1 1/2011 Beadle
D633,224 S 2/2011 Lee
7,909,487 B1 3/2011 Venetucci et al.
D636,117 S 4/2011 Kim et al.
D636,118 S 4/2011 Kim et al.
D636,903 S 4/2011 Torenbeek
D637,339 S 5/2011 Hasan et al.
D637,340 S 5/2011 Hasan et al.
7,950,832 B2 5/2011 Tanaka et al.
D639,499 S 6/2011 Choi et al.
D640,819 S 6/2011 Pan
7,956,546 B2 6/2011 Hasnain
7,959,332 B2 6/2011 Tickner et al.
7,967,480 B2 6/2011 Pickard et al.
D642,317 S 7/2011 Rashidi
7,972,035 B2 7/2011 Boyer
7,972,043 B2 7/2011 Schutte
D642,536 S 8/2011 Robinson
D643,970 S 8/2011 Kim et al.
7,993,037 B1 8/2011 Buse
8,002,425 B2 8/2011 Russo et al.
D646,011 S 9/2011 Rashidi
8,013,243 B2 9/2011 Korcz et al.
8,038,113 B2 10/2011 Fryzek et al.
D648,476 S 11/2011 Choi et al.
D648,477 S 11/2011 Kim et al.
D650,115 S 12/2011 Kim et al.
8,070,328 B1 12/2011 Knoble et al.
8,096,670 B2 1/2012 Trott
D654,205 S 2/2012 Rashidi
D655,436 S 3/2012 Johnson
D656,262 S 3/2012 Yoshinobu et al.
D656,263 S 3/2012 Ogawa et al.
8,142,057 B2 3/2012 Roos et al.
8,152,334 B2 4/2012 Krogman
D658,788 S 5/2012 Dudik et al.
D658,802 S 5/2012 Chen
D659,862 S 5/2012 Tsai

(56) References Cited

U.S. PATENT DOCUMENTS

| | | | |
|---|---|---|---|
| D659,879 | S | 5/2012 | Rashidi |
| D660,814 | S | 5/2012 | Wilson |
| 8,177,176 | B2 | 5/2012 | Nguyen et al. |
| 8,182,116 | B2 | 5/2012 | Zhang et al. |
| 8,201,968 | B2 | 6/2012 | Maxik et al. |
| D663,058 | S | 7/2012 | Pan |
| D663,466 | S | 7/2012 | Rashidi |
| D664,274 | S | 7/2012 | de Visser et al. |
| D664,705 | S | 7/2012 | Kong et al. |
| 8,215,805 | B2 | 7/2012 | Cogliano et al. |
| 8,220,970 | B1 | 7/2012 | Khazi et al. |
| 8,226,270 | B2 | 7/2012 | Yamamoto et al. |
| 8,235,549 | B2 | 8/2012 | Gingrich, III et al. |
| 8,238,050 | B2 | 8/2012 | Minano et al. |
| 8,240,630 | B2 | 8/2012 | Wronski |
| D667,155 | S | 9/2012 | Rashidi |
| 8,262,255 | B1 | 9/2012 | Rashidi |
| D668,372 | S | 10/2012 | Renshaw et al. |
| D668,809 | S | 10/2012 | Rashidi |
| D669,198 | S | 10/2012 | Qiu |
| D669,199 | S | 10/2012 | Chuang |
| D669,620 | S | 10/2012 | Rashidi |
| 8,277,090 | B2 | 10/2012 | Fryzek et al. |
| D671,668 | S | 11/2012 | Rowlette, Jr. et al. |
| 8,308,322 | B2 | 11/2012 | Santiago et al. |
| D672,899 | S | 12/2012 | Van De Ven et al. |
| D673,869 | S | 1/2013 | Yu |
| D676,263 | S | 2/2013 | Birke |
| D676,814 | S | 2/2013 | Paul |
| 8,376,593 | B2 | 2/2013 | Bazydola et al. |
| D677,417 | S | 3/2013 | Rashidi |
| D677,634 | S | 3/2013 | Korcz et al. |
| D679,044 | S | 3/2013 | Jeswani et al. |
| D679,047 | S | 3/2013 | Tickner et al. |
| 8,403,289 | B1 | 3/2013 | Rinderer |
| 8,403,533 | B1 | 3/2013 | Paulsel |
| 8,403,541 | B1 | 3/2013 | Rashidi |
| 8,405,947 | B1 | 3/2013 | Green et al. |
| D681,259 | S | 4/2013 | Kong |
| 8,408,759 | B1 | 4/2013 | Rashidi |
| D682,459 | S | 5/2013 | Gordin et al. |
| D683,063 | S | 5/2013 | Lopez et al. |
| D683,890 | S | 6/2013 | Lopez et al. |
| D684,269 | S | 6/2013 | Wang et al. |
| D684,287 | S | 6/2013 | Rashidi |
| D684,719 | S | 6/2013 | Rashidi |
| D685,118 | S | 6/2013 | Rashidi |
| D685,120 | S | 6/2013 | Rashidi |
| 8,454,204 | B1 | 6/2013 | Chang et al. |
| D685,507 | S | 7/2013 | Sun |
| D687,586 | S | 8/2013 | Rashidi |
| D687,587 | S | 8/2013 | Rashidi |
| D687,588 | S | 8/2013 | Rashidi |
| D687,980 | S | 8/2013 | Gravely et al. |
| D688,405 | S | 8/2013 | Kim et al. |
| 8,506,127 | B2 | 8/2013 | Russello et al. |
| 8,506,134 | B2 | 8/2013 | Wilson et al. |
| D690,049 | S | 9/2013 | Rashidi |
| D690,864 | S | 10/2013 | Rashidi |
| D690,865 | S | 10/2013 | Rashidi |
| D690,866 | S | 10/2013 | Rashidi |
| D691,314 | S | 10/2013 | Rashidi |
| D691,315 | S | 10/2013 | Samson |
| D691,763 | S | 10/2013 | Hand et al. |
| 8,550,669 | B2 | 10/2013 | Macwan et al. |
| D693,043 | S | 11/2013 | Schmalfuss et al. |
| D693,517 | S | 11/2013 | Davis |
| D694,456 | S | 11/2013 | Rowlette, Jr. et al. |
| D695,441 | S | 12/2013 | Lui et al. |
| D695,941 | S | 12/2013 | Rashidi |
| D696,446 | S | 12/2013 | Huh |
| D696,447 | S | 12/2013 | Huh |
| D696,448 | S | 12/2013 | Huh |
| 8,602,601 | B2 | 12/2013 | Khazi et al. |
| D698,067 | S | 1/2014 | Rashidi |
| D698,068 | S | 1/2014 | Rashidi |
| 8,622,361 | B2 | 1/2014 | Wronski |
| 8,632,040 | B2 | 1/2014 | Mass et al. |
| D698,985 | S | 2/2014 | Lopez et al. |
| D699,384 | S | 2/2014 | Rashidi |
| D699,687 | S | 2/2014 | Baldwin et al. |
| D700,387 | S | 2/2014 | Snell |
| 8,641,243 | B1 | 2/2014 | Rashidi |
| 8,659,034 | B2 | 2/2014 | Baretz et al. |
| D700,991 | S | 3/2014 | Johnson et al. |
| D701,175 | S | 3/2014 | Baldwin et al. |
| D701,466 | S | 3/2014 | Clifford et al. |
| 8,672,518 | B2 | 3/2014 | Boomgaarden et al. |
| D702,867 | S | 4/2014 | Kim et al. |
| D703,843 | S | 4/2014 | Cheng |
| 8,684,569 | B2 | 4/2014 | Pickard et al. |
| 8,696,158 | B2 | 4/2014 | Santiago et al. |
| D705,472 | S | 5/2014 | Huh |
| D705,481 | S | 5/2014 | Zhang et al. |
| 8,727,582 | B2 | 5/2014 | Brown et al. |
| D708,381 | S | 7/2014 | Rashidi |
| 8,777,449 | B2 | 7/2014 | Ven et al. |
| D710,529 | S | 8/2014 | Lopez et al. |
| 8,801,217 | B2 | 8/2014 | Oehle et al. |
| 8,820,985 | B1 | 9/2014 | Tam et al. |
| 8,833,013 | B2 | 9/2014 | Harman |
| 8,845,144 | B1 | 9/2014 | Davis et al. |
| D714,989 | S | 10/2014 | Rowlette, Jr. et al. |
| 8,870,426 | B2 | 10/2014 | Biebl et al. |
| 8,888,332 | B2 | 11/2014 | Martis et al. |
| 8,890,414 | B2 | 11/2014 | Rowlette, Jr. et al. |
| D721,845 | S | 1/2015 | Lui et al. |
| 8,926,133 | B2 | 1/2015 | Booth |
| 8,939,418 | B2 | 1/2015 | Green et al. |
| D722,296 | S | 2/2015 | Taylor |
| D722,977 | S | 2/2015 | Hagarty |
| D722,978 | S | 2/2015 | Hagarty |
| 8,950,898 | B2 | 2/2015 | Catalano |
| D723,781 | S | 3/2015 | Miner |
| D723,783 | S | 3/2015 | Miner |
| D725,359 | S | 3/2015 | Miner |
| 8,967,575 | B1 | 3/2015 | Gretz |
| D726,363 | S | 4/2015 | Danesh |
| D726,949 | S | 4/2015 | Redfern |
| D728,129 | S | 4/2015 | Kreuzbichler |
| 9,004,435 | B2 | 4/2015 | Wronski |
| 9,039,254 | B2 | 5/2015 | Danesh |
| D731,689 | S | 6/2015 | Bernard et al. |
| 9,062,866 | B1 | 6/2015 | Christ et al. |
| 9,065,264 | B2 | 6/2015 | Cooper et al. |
| 9,068,719 | B2 | 6/2015 | Van De Ven et al. |
| 9,068,722 | B2 | 6/2015 | Wronski et al. |
| D734,525 | S | 7/2015 | Gordin et al. |
| D735,012 | S | 7/2015 | Cowie |
| D735,142 | S | 7/2015 | Hagarty |
| 9,078,299 | B2 | 7/2015 | Ashdown |
| 9,109,760 | B2 | 8/2015 | Shum et al. |
| 9,109,783 | B1 | 8/2015 | Davis et al. |
| D739,355 | S | 9/2015 | D'Aubeterre |
| D739,590 | S | 9/2015 | Redfern |
| 9,140,441 | B2 | 9/2015 | Goelz et al. |
| D741,538 | S | 10/2015 | Ghasabi |
| 9,151,457 | B2 | 10/2015 | Pickard et al. |
| 9,151,477 | B2 | 10/2015 | Pickard et al. |
| D742,325 | S | 11/2015 | Leung |
| D743,079 | S | 11/2015 | Adair |
| D744,723 | S | 12/2015 | Yoo |
| 9,217,560 | B2 | 12/2015 | Harbers et al. |
| 9,222,661 | B2 | 12/2015 | Kim et al. |
| 9,239,131 | B1 | 1/2016 | Wronski et al. |
| D750,317 | S | 2/2016 | Lui et al. |
| 9,285,103 | B2 | 3/2016 | Van De Ven et al. |
| 9,291,319 | B2 | 3/2016 | Kathawate et al. |
| 9,301,362 | B2 | 3/2016 | Dohn et al. |
| D754,078 | S | 4/2016 | Baldwin et al. |
| D754,079 | S | 4/2016 | Baldwin et al. |
| D754,605 | S | 4/2016 | McMillan |
| 9,303,812 | B2 | 4/2016 | Green et al. |
| 9,310,038 | B2 | 4/2016 | Athalye |

(56) References Cited

U.S. PATENT DOCUMENTS

| | | | |
|---|---|---|---|
| 9,310,052 | B1 | 4/2016 | Shum |
| 9,322,543 | B2 | 4/2016 | Hussell et al. |
| D756,025 | S | 5/2016 | Wronski et al. |
| 9,347,655 | B2 | 5/2016 | Boomgaarden et al. |
| 9,366,418 | B2 | 6/2016 | Gifford |
| 9,371,966 | B2 | 6/2016 | Rowlette, Jr. et al. |
| D762,181 | S | 7/2016 | Lin |
| 9,395,051 | B2 | 7/2016 | Hussell et al. |
| D762,906 | S | 8/2016 | Jeswani et al. |
| D764,079 | S | 8/2016 | Wu |
| 9,404,639 | B2 | 8/2016 | Bailey et al. |
| 9,417,506 | B1 | 8/2016 | Tirosh |
| 9,423,110 | B1 | 8/2016 | Newton et al. |
| D766,185 | S | 9/2016 | Hagarty |
| D767,199 | S | 9/2016 | Wronski et al. |
| 9,447,917 | B1 | 9/2016 | Wronski et al. |
| 9,447,953 | B2 | 9/2016 | Lawlor |
| D768,325 | S | 10/2016 | Xu |
| D768,326 | S | 10/2016 | Guzzini |
| D769,501 | S | 10/2016 | Jeswani et al. |
| D770,065 | S | 10/2016 | Tittle |
| D770,076 | S | 10/2016 | Li et al. |
| 9,476,552 | B2 | 10/2016 | Myers et al. |
| 9,488,324 | B2 | 11/2016 | Shum et al. |
| D774,676 | S | 12/2016 | Ng |
| D776,324 | S | 1/2017 | Gierl et al. |
| D777,967 | S | 1/2017 | Redfern |
| 9,534,751 | B2 | 1/2017 | Maglica et al. |
| D778,241 | S | 2/2017 | Holbrook et al. |
| D778,484 | S | 2/2017 | Guzzini |
| D779,100 | S | 2/2017 | Redfern |
| 9,581,302 | B2 | 2/2017 | Danesh |
| 9,583,926 | B2 | 2/2017 | Ye |
| 9,599,315 | B1 | 3/2017 | Harpenau et al. |
| 9,605,842 | B1 | 3/2017 | Davis |
| 9,605,910 | B2 | 3/2017 | Swedberg et al. |
| D785,228 | S | 4/2017 | Guzzini |
| D786,472 | S | 5/2017 | Redfern |
| D786,473 | S | 5/2017 | Dean |
| D786,474 | S | 5/2017 | Fujisawa |
| D788,330 | S | 5/2017 | Johnson et al. |
| D790,102 | S | 6/2017 | Guzzini |
| 9,673,597 | B2 | 6/2017 | Lee |
| 9,689,541 | B2 | 6/2017 | Wronski |
| D791,709 | S | 7/2017 | Holton |
| D791,711 | S | 7/2017 | Holton |
| D791,712 | S | 7/2017 | Holton |
| 9,696,021 | B2 | 7/2017 | Wronski |
| 9,702,516 | B1 | 7/2017 | Vasquez et al. |
| D795,820 | S | 8/2017 | Wengreen |
| 9,732,904 | B1 | 8/2017 | Wronski |
| 9,732,947 | B1 | 8/2017 | Christ et al. |
| 9,739,464 | B2 | 8/2017 | Wronski |
| D799,105 | S | 10/2017 | Eder et al. |
| D800,957 | S | 10/2017 | Eder et al. |
| 9,791,111 | B1 | 10/2017 | Huang et al. |
| 9,797,562 | B2 | 10/2017 | Dabiet et al. |
| 9,803,839 | B2 | 10/2017 | Visser et al. |
| D805,660 | S | 12/2017 | Creasman et al. |
| D805,881 | S | 12/2017 | Nehls |
| 9,854,642 | B2 | 12/2017 | Kashani |
| D809,176 | S | 1/2018 | Partington |
| 9,860,961 | B2 | 1/2018 | Chemel et al. |
| 9,863,619 | B2 | 1/2018 | Mak |
| D809,465 | S | 2/2018 | Keirstead |
| 9,903,569 | B2 | 2/2018 | O'Brien et al. |
| 9,945,548 | B2 | 4/2018 | Williams et al. |
| 9,964,266 | B2 | 5/2018 | Danesh |
| D819,879 | S | 6/2018 | Oudina et al. |
| D820,494 | S | 6/2018 | Cohen |
| D821,615 | S | 6/2018 | Trice |
| D821,627 | S | 6/2018 | Ko |
| 9,995,441 | B2 | 6/2018 | Power et al. |
| 10,006,613 | B2 | 6/2018 | Oudina et al. |
| D822,505 | S | 7/2018 | Gibson et al. |
| D824,494 | S | 7/2018 | Martins et al. |
| D825,829 | S | 8/2018 | Guo |
| 10,041,638 | B2 | 8/2018 | Vasquez et al. |
| 10,054,274 | B2 | 8/2018 | Athalye et al. |
| D827,903 | S | 9/2018 | Wu |
| 10,072,805 | B2 | 9/2018 | Bailey |
| D832,218 | S | 10/2018 | Wronski et al. |
| D833,977 | S | 11/2018 | Danesh et al. |
| 10,125,959 | B2 | 11/2018 | Cohen |
| 10,139,059 | B2 | 11/2018 | Danesh |
| D834,928 | S | 12/2018 | Lu et al. |
| D836,976 | S | 1/2019 | Reese et al. |
| 10,244,607 | B1 | 3/2019 | Kashani |
| D847,414 | S | 4/2019 | Danesh et al. |
| D847,415 | S | 4/2019 | Danesh et al. |
| 10,247,390 | B1 | 4/2019 | Kopitzke, IV |
| D848,375 | S | 5/2019 | Danesh et al. |
| 10,281,131 | B2 | 5/2019 | Cohen |
| 10,295,163 | B1 | 5/2019 | Cohen |
| D850,695 | S | 6/2019 | Dabiet et al. |
| D851,046 | S | 6/2019 | Peng et al. |
| 10,349,472 | B2 | 7/2019 | Deng |
| 10,408,395 | B2 | 9/2019 | Danesh |
| 10,408,396 | B2 | 9/2019 | Wronski et al. |
| 10,408,436 | B2 | 9/2019 | Wronski et al. |
| D863,661 | S | 10/2019 | Tian et al. |
| D864,467 | S | 10/2019 | Mizobe |
| D864,877 | S | 10/2019 | Danesh |
| D867,653 | S | 11/2019 | Gorman |
| 10,488,000 | B2 | 11/2019 | Danesh et al. |
| 10,541,522 | B2 | 1/2020 | Lalancette |
| 10,551,044 | B2 | 2/2020 | Peng et al. |
| 10,563,850 | B2 | 2/2020 | Danesh |
| D877,957 | S | 3/2020 | Kopitzke, IV |
| 10,591,120 | B2 | 3/2020 | Bailey et al. |
| 10,609,785 | B1 | 3/2020 | Fardadi et al. |
| D880,733 | S | 4/2020 | Lo et al. |
| D883,562 | S | 5/2020 | Hu |
| D885,648 | S | 5/2020 | Zeng |
| D885,649 | S | 5/2020 | McLaughlin, III et al. |
| 10,663,127 | B2 | 5/2020 | Danesh et al. |
| 10,663,153 | B2 | 5/2020 | Nikooyan et al. |
| D888,313 | S | 6/2020 | Xie et al. |
| 10,683,994 | B2 | 6/2020 | Wronski et al. |
| 10,684,003 | B2 | 6/2020 | Wronski et al. |
| D890,410 | S | 7/2020 | Stanford et al. |
| 10,704,745 | B2 | 7/2020 | Sherry et al. |
| D892,069 | S | 8/2020 | Cohen |
| 10,753,558 | B2 | 8/2020 | Danesh |
| 10,808,917 | B2 | 10/2020 | Harris et al. |
| 10,816,148 | B2 | 10/2020 | Danesh |
| D901,398 | S | 11/2020 | Danesh et al. |
| D901,745 | S | 11/2020 | Yang |
| D902,160 | S | 11/2020 | Cohen |
| D902,871 | S | 11/2020 | Danesh et al. |
| D903,605 | S | 12/2020 | Danesh et al. |
| D905,327 | S | 12/2020 | Williams et al. |
| D907,284 | S | 1/2021 | Danesh et al. |
| D910,223 | S | 2/2021 | Cohen |
| 10,975,570 | B2 | 4/2021 | Shen |
| 10,982,829 | B2 | 4/2021 | Danesh |
| 11,015,785 | B1 | 5/2021 | Schubert |
| 11,022,259 | B2 | 6/2021 | Bailey et al. |
| 11,028,982 | B2 | 6/2021 | Danesh |
| 11,047,538 | B2 | 6/2021 | Danesh et al. |
| D924,467 | S | 7/2021 | Danesh et al. |
| D925,109 | S | 7/2021 | Danesh et al. |
| 11,060,705 | B1 | 7/2021 | Danesh et al. |
| 11,067,231 | B2 | 7/2021 | Lotfi et al. |
| D927,430 | S | 8/2021 | Cohen et al. |
| 11,085,597 | B2 | 8/2021 | Danesh |
| 11,118,768 | B2 | 9/2021 | Danesh |
| D934,665 | S | 11/2021 | Cronkhite et al. |
| D939,134 | S | 12/2021 | Danesh et al. |
| D940,545 | S | 1/2022 | Tanner et al. |
| 11,231,154 | B2 | 1/2022 | Kopitzke et al. |
| D944,212 | S | 2/2022 | Peng et al. |
| 11,242,983 | B2 | 2/2022 | Danesh |
| 11,255,497 | B2 | 2/2022 | Danesh |

(56) References Cited

U.S. PATENT DOCUMENTS 11,274,821 B2 3/2022 Danesh
11,306,903 B2 * 4/2022 Young .................... F21V 15/01
11,391,442 B2 7/2022 Danesh
11,435,064 B1 9/2022 Danesh
11,435,066 B2 9/2022 Danesh
11,448,384 B2 9/2022 Nikooyan et al.
D966,877 S 10/2022 Kopitzke et al.
D970,081 S 11/2022 Kopitzke et al.
11,800,617 B2 10/2023 Kumar et al.
2002/0172047 A1 11/2002 Ashley
2003/0006353 A1 1/2003 Dinh et al.
2003/0016532 A1 1/2003 Reed
2003/0021104 A1 1/2003 Tsao
2003/0092323 A1 5/2003 Chou
2003/0161153 A1 8/2003 Patti
2004/0001337 A1 1/2004 Defouw et al.
2004/0120141 A1 6/2004 Beadle
2004/0156199 A1 8/2004 Rivas et al.
2005/0078474 A1 4/2005 Whitfield
2005/0225966 A1 10/2005 Hartmann et al.
2005/0227536 A1 10/2005 Gamache et al.
2005/0231962 A1 10/2005 Koba et al.
2005/0237746 A1 10/2005 Yiu
2006/0005988 A1 1/2006 Jorgensen
2006/0158873 A1 7/2006 Newbold et al.
2006/0198126 A1 9/2006 Jones
2006/0215408 A1 9/2006 Lee
2006/0221620 A1 10/2006 Thomas
2006/0237601 A1 10/2006 Rinderer
2006/0243877 A1 11/2006 Rippel
2006/0250788 A1 11/2006 Hodge et al.
2006/0262536 A1 11/2006 Nevers
2006/0262545 A1 11/2006 Piepgras et al.
2007/0012847 A1 1/2007 Tai
2007/0035951 A1 2/2007 Tseng
2007/0121328 A1 5/2007 Mondloch et al.
2007/0131827 A1 6/2007 Nevers et al.
2007/0185675 A1 8/2007 Papamichael et al.
2007/0200039 A1 8/2007 Petak
2007/0206374 A1 9/2007 Petrakis et al.
2008/0002414 A1 1/2008 Miletich et al.
2008/0019138 A1 1/2008 Otte et al.
2008/0068847 A1 3/2008 Bedard
2008/0112168 A1 5/2008 Pickard et al.
2008/0112170 A1 5/2008 Trott
2008/0112171 A1 5/2008 Patti et al.
2008/0130308 A1 6/2008 Behr et al.
2008/0137347 A1 6/2008 Trott et al.
2008/0165545 A1 7/2008 O'Brien
2008/0170404 A1 7/2008 Steer et al.
2008/0186718 A1 8/2008 Magisano et al.
2008/0224008 A1 9/2008 Dal Ponte et al.
2008/0232116 A1 9/2008 Kim
2008/0247181 A1 10/2008 Dixon
2008/0285271 A1 11/2008 Roberge et al.
2009/0003009 A1 1/2009 Tessnow et al.
2009/0034261 A1 2/2009 Grove
2009/0080189 A1 3/2009 Wegner
2009/0086484 A1 4/2009 Johnson
2009/0097262 A1 4/2009 Zhang et al.
2009/0135613 A1 5/2009 Peng
2009/0141500 A1 6/2009 Peng
2009/0141506 A1 6/2009 Lan et al.
2009/0141508 A1 6/2009 Peng
2009/0147517 A1 6/2009 Li
2009/0161356 A1 6/2009 Negley et al.
2009/0237924 A1 9/2009 Ladewig
2009/0280695 A1 11/2009 Sekela et al.
2009/0283292 A1 11/2009 Lehr
2009/0290343 A1 11/2009 Brown et al.
2010/0014282 A1 1/2010 Danesh
2010/0033095 A1 2/2010 Sadwick
2010/0061108 A1 3/2010 Zhang et al.
2010/0110690 A1 5/2010 Hsu et al.
2010/0110698 A1 5/2010 Harwood et al.
2010/0110699 A1 5/2010 Chou
2010/0148673 A1 6/2010 Stewart et al.
2010/0149822 A1 6/2010 Cogliano et al.
2010/0155497 A1 6/2010 Hagaman
2010/0165643 A1 7/2010 Russo et al.
2010/0244709 A1 9/2010 Steiner et al.
2010/0246172 A1 9/2010 Liu
2010/0259919 A1 10/2010 Khazi et al.
2010/0270903 A1 10/2010 Jao et al.
2010/0277905 A1 11/2010 Janik et al.
2010/0284185 A1 11/2010 Ngai
2010/0302778 A1 12/2010 Dabiet et al.
2010/0328956 A1 12/2010 Zhang
2011/0043040 A1 2/2011 Porter et al.
2011/0063831 A1 3/2011 Cook
2011/0068687 A1 3/2011 Takahasi et al.
2011/0069499 A1 3/2011 Trott et al.
2011/0080750 A1 4/2011 Jones et al.
2011/0116276 A1 5/2011 Okamura et al.
2011/0121756 A1 5/2011 Thomas et al.
2011/0134634 A1 6/2011 Gingrich, III et al.
2011/0134651 A1 6/2011 Berman
2011/0140633 A1 6/2011 Archenhold
2011/0170294 A1 7/2011 Mier-Langner et al.
2011/0194299 A1 8/2011 Crooks et al.
2011/0216534 A1 9/2011 Tickner et al.
2011/0226919 A1 9/2011 Fryzek et al.
2011/0255292 A1 10/2011 Shen
2011/0267828 A1 11/2011 Bazydola et al.
2011/0285314 A1 11/2011 Carney et al.
2012/0020104 A1 1/2012 Biebl et al.
2012/0074852 A1 3/2012 Delnoij
2012/0106176 A1 5/2012 Lopez et al.
2012/0113642 A1 5/2012 Catalano
2012/0140442 A1 6/2012 Woo et al.
2012/0140465 A1 6/2012 Rowlette, Jr. et al.
2012/0162994 A1 6/2012 Wasniewski et al.
2012/0182744 A1 7/2012 Santiago et al.
2012/0188762 A1 7/2012 Joung et al.
2012/0243237 A1 9/2012 Toda et al.
2012/0250321 A1 10/2012 Blincoe et al.
2012/0262921 A1 10/2012 Boomgaarden et al.
2012/0266449 A1 10/2012 Krupa
2012/0268688 A1 10/2012 Sato et al.
2012/0287625 A1 11/2012 Macwan et al.
2012/0305868 A1 12/2012 Callahan et al.
2012/0314429 A1 12/2012 Plunk
2013/0009552 A1 1/2013 Page
2013/0010476 A1 1/2013 Pickard et al.
2013/0016864 A1 1/2013 Ivey et al.
2013/0033872 A1 2/2013 Randolph et al.
2013/0050994 A1 2/2013 Pieper
2013/0051012 A1 2/2013 Oehle et al.
2013/0077307 A1 3/2013 Yamamoto
2013/0083529 A1 4/2013 Gifford
2013/0141913 A1 6/2013 Sachsenweger
2013/0155681 A1 6/2013 Nall et al.
2013/0163254 A1 6/2013 Chang et al.
2013/0170232 A1 7/2013 Park et al.
2013/0170233 A1 7/2013 Nezu et al.
2013/0227908 A1 9/2013 Gulbrandsen et al.
2013/0258677 A1 10/2013 Fryzek et al.
2013/0265750 A1 10/2013 Pickard et al.
2013/0271989 A1 10/2013 Hussell et al.
2013/0294084 A1 11/2013 Kathawate et al.
2013/0301252 A1 11/2013 Hussell et al.
2013/0322084 A1 12/2013 Ebisawa
2013/0335980 A1 12/2013 Nakasuji et al.
2014/0029262 A1 1/2014 Maxik et al.
2014/0036497 A1 2/2014 Hussell et al.
2014/0049957 A1 2/2014 Goelz et al.
2014/0056026 A1 2/2014 Boomgaarden et al.
2014/0063776 A1 3/2014 Clark et al.
2014/0063818 A1 3/2014 Randolph et al.
2014/0071679 A1 3/2014 Booth
2014/0071687 A1 3/2014 Tickner et al.
2014/0140490 A1 5/2014 Roberts et al.
2014/0233246 A1 8/2014 Lafreniere et al.
2014/0254177 A1 9/2014 Danesh

(56) References Cited

U.S. PATENT DOCUMENTS

| | | | |
|---|---|---|---|
| 2014/0268836 | A1 | 9/2014 | Thompson |
| 2014/0268869 | A1 | 9/2014 | Blessitt et al. |
| 2014/0299730 | A1 | 10/2014 | Green et al. |
| 2014/0313775 | A1 | 10/2014 | Myers et al. |
| 2014/0321122 | A1 | 10/2014 | Domagala et al. |
| 2014/0347848 | A1 | 11/2014 | Pisavadia et al. |
| 2015/0029732 | A1 | 1/2015 | Hatch |
| 2015/0078008 | A1 | 3/2015 | He |
| 2015/0085500 | A1 | 3/2015 | Cooper et al. |
| 2015/0092449 | A1 | 4/2015 | Demuynck et al. |
| 2015/0131301 | A1 | 5/2015 | Ho |
| 2015/0138779 | A1 | 5/2015 | Livesay et al. |
| 2015/0153635 | A1 | 6/2015 | Chen et al. |
| 2015/0176823 | A1 | 6/2015 | Leshniak et al. |
| 2015/0184837 | A1 | 7/2015 | Zhang et al. |
| 2015/0198324 | A1 | 7/2015 | O'Brien et al. |
| 2015/0204491 | A1 | 7/2015 | Yuan et al. |
| 2015/0219317 | A1 | 8/2015 | Gatof et al. |
| 2015/0241039 | A1 | 8/2015 | Fryzek |
| 2015/0263497 | A1 | 9/2015 | Korcz et al. |
| 2015/0276185 | A1 | 10/2015 | Bailey et al. |
| 2015/0308662 | A1 | 10/2015 | Vice et al. |
| 2015/0345761 | A1 | 12/2015 | Lawlor |
| 2015/0362159 | A1 | 12/2015 | Ludyjan |
| 2016/0084488 | A1 | 3/2016 | Wu et al. |
| 2016/0209007 | A1 | 7/2016 | Belmonte et al. |
| 2016/0230969 | A1 | 8/2016 | Pelletier et al. |
| 2016/0238225 | A1 | 8/2016 | Rashidi Doust |
| 2016/0308342 | A1 | 10/2016 | Witherbee et al. |
| 2016/0348860 | A1 | 12/2016 | Danesh |
| 2016/0366738 | A1 | 12/2016 | Boulanger et al. |
| 2017/0003007 | A1 | 1/2017 | Wronski |
| 2017/0005460 | A1 | 1/2017 | Lee |
| 2017/0045213 | A1 | 2/2017 | Williams et al. |
| 2017/0059135 | A1 | 3/2017 | Jones |
| 2017/0138581 | A1 | 5/2017 | Doust |
| 2017/0167672 | A1 | 6/2017 | Stauner et al. |
| 2017/0198896 | A1 | 7/2017 | May |
| 2017/0284616 | A1 | 10/2017 | Coakley et al. |
| 2017/0307188 | A1 | 10/2017 | Oudina et al. |
| 2017/0307198 | A1 | 10/2017 | Shah et al. |
| 2018/0112857 | A1 | 4/2018 | Wronski et al. |
| 2018/0119907 | A1 | 5/2018 | O'Brien et al. |
| 2018/0123351 | A1 | 5/2018 | Andrews et al. |
| 2018/0142871 | A1 | 5/2018 | Morales |
| 2018/0216809 | A1 | 8/2018 | Cohen |
| 2018/0224095 | A1 | 8/2018 | Cohen |
| 2018/0283677 | A1 | 10/2018 | Cohen |
| 2019/0032874 | A1 | 1/2019 | Bonnetto et al. |
| 2019/0041050 | A1 | 2/2019 | Cairns et al. |
| 2019/0063724 | A1 | 2/2019 | Vice, Jr. et al. |
| 2019/0093836 | A1* | 3/2019 | Danesh ................. F21V 21/048 |
| 2019/0195475 | A1 | 6/2019 | Jones |
| 2019/0249852 | A1 | 8/2019 | Kim |
| 2019/0301710 | A1 | 10/2019 | Harris |
| 2020/0182420 | A1 | 6/2020 | Cohen et al. |
| 2020/0323073 | A1 | 10/2020 | Cartrette et al. |
| 2020/0355334 | A1 | 11/2020 | Shen et al. |
| 2021/0010647 | A1 | 1/2021 | Danesh et al. |
| 2021/0045221 | A1 | 2/2021 | Dejonge et al. |
| 2021/0080084 | A1 | 3/2021 | Danesh et al. |
| 2021/0364139 | A1 | 11/2021 | Danesh |
| 2022/0018522 | A1 | 1/2022 | Kopitzke et al. |
| 2022/0018523 | A1 | 1/2022 | Vinh et al. |
| 2022/0042664 | A1 | 2/2022 | Lotfi et al. |
| 2022/0082233 | A1 | 3/2022 | Kopitzke et al. |
| 2022/0085610 | A1 | 3/2022 | Dejonge et al. |
| 2023/0125086 | A1 | 4/2023 | Ungaro |

FOREIGN PATENT DOCUMENTS

| | | | |
|---|---|---|---|
| CA | 2691480 | C | 4/2012 |
| CA | 2734369 | A1 | 10/2013 |
| CA | 2561459 | A1 | 11/2013 |
| CA | 2815067 | | 11/2013 |
| CA | 2848289 | A1 | 10/2014 |
| CA | 2998173 | | 7/2018 |
| CN | 2182475 | Y | 11/1994 |
| CN | 1309618 | A | 8/2001 |
| CN | 201059503 | Y | 5/2008 |
| CN | 201259125 | Y | 6/2009 |
| CN | 101608781 | A | 12/2009 |
| CN | 201636626 | U | 11/2010 |
| CN | 102062373 | A | 5/2011 |
| CN | 202014067 | U | 10/2011 |
| CN | 202392473 | U | 8/2012 |
| CN | 202733693 | U | 2/2013 |
| CN | 103307518 | A | 9/2013 |
| CN | 103322476 | A | 9/2013 |
| CN | 203202661 | U | 9/2013 |
| CN | 203215483 | U | 9/2013 |
| CN | 101498411 | B | 11/2013 |
| CN | 203273663 | U | 11/2013 |
| CN | 203297980 | U | 11/2013 |
| CN | 203628464 | U | 6/2014 |
| CN | 203641919 | U | 6/2014 |
| CN | 204300818 | U | 4/2015 |
| CN | 104654142 | A | 5/2015 |
| CN | 204513161 | U | 7/2015 |
| CN | 204611541 | U | 9/2015 |
| CN | 204786225 | U | 11/2015 |
| CN | 204829578 | U | 12/2015 |
| CN | 103712135 | B | 4/2016 |
| CN | 205606362 | U | 9/2016 |
| CN | 201720305884 | | 3/2017 |
| CN | 206130742 | U | 4/2017 |
| CN | 103154606 | B | 5/2017 |
| CN | 206222112 | U | 6/2017 |
| CN | 304220113 | | 7/2017 |
| CN | 107013845 | A | 8/2017 |
| CN | 107084343 | A | 8/2017 |
| CN | 206943980 | U | 1/2018 |
| DE | 9109828 | U1 | 2/1992 |
| DE | 199 47 208 | | 5/2001 |
| EP | 1 589 289 | | 10/2005 |
| EP | 1 672 155 | A1 | 6/2006 |
| EP | 1688663 | A2 | 8/2006 |
| EP | 2 095 938 | A1 | 9/2009 |
| EP | 2 306 072 | A1 | 4/2011 |
| EP | 2 453 169 | A2 | 5/2012 |
| EP | 2 193 309 | B1 | 7/2012 |
| EP | 2 735 787 | A1 | 5/2014 |
| EP | 3 104 024 | A1 | 12/2016 |
| GB | 2325728 | A | 12/1998 |
| GB | 2427020 | A | 12/2006 |
| GB | 2466875 | A | 7/2010 |
| GB | 2471929 | A | 1/2014 |
| GB | 2509772 | A | 7/2014 |
| JP | H02113002 | U | 9/1990 |
| JP | 2007091052 | A | 4/2007 |
| JP | 2007265961 | A | 10/2007 |
| JP | 2011060450 | A2 | 3/2011 |
| JP | 2012064551 | A2 | 3/2012 |
| JP | 2015002027 | A2 | 1/2015 |
| JP | 2015002028 | A2 | 1/2015 |
| JP | 2016219335 | A | 12/2016 |
| JP | 2017107699 | A2 | 6/2017 |
| JP | D1658938 | | 4/2020 |
| KR | 1020110008796 | A | 1/2011 |
| KR | 1020120061625 | A | 6/2012 |
| MX | 2011002947 | A | 9/2011 |
| PH | 3-2018-658-0001 | | 7/2018 |
| TW | 474382 | U | 1/2002 |
| WO | WO D038920-001 | | 1/1997 |
| WO | WO 2013/128896 | A1 | 9/2013 |
| WO | WO 2015/000212 | A1 | 1/2015 |
| WO | WO 2016152166 | A2 | 9/2016 |
| WO | WO 2022/056180 | | 3/2022 |

OTHER PUBLICATIONS

"Halo" reference by Amazon.com, date first available Aug. 4, 2017 [online], site visited Jan. 31, 2022, available from internet URL:

(56) References Cited

OTHER PUBLICATIONS https://www.amazon.com/dp/B074K234DL/ref=cm_sw_em_r_mt_dp_P7H78BZ413RNSQ55NVTR (Year: 2013) (6 pages).
"Juno Lighting" reference by Express Electric on Amazon.com, date first available Feb. 14, 2008 [online], site visited Jan. 31, 2022, available from internet URL: https://www.amazon.com/Juno-Lighting-TC44R-Retrofit-Downlight/dp/BOOOOD I2HT/ref=psdc_6355949011_t2_B078X1D488?th=1 (Year: 2008) (6 pages).
"Sunco Lighting" reference by Sunco Lighting on Amazon.com, date first available Sep. 21, 2018 [online], site visited Jan. 31, 2022, available from internet URL: https://www.amazon.com/Sunco-Lighting-Construction-Downlight-Electrician/dp/B07D92B5DL?th=1 ( Year: 2018) (6 pages).
Canadian Notice of Allowance dated Nov. 23, 2022 from Canadian Application No. 3,102,022, 1 Page.
Canadian Office Action dated Dec. 19, 2022 from Canadian Application No. 3,135,470, 5 pages.
Canadian Office Action dated Dec. 16, 2022 from Canadian Application No. 3,130,524, 6 pages.
Chinese Office Action and English Translation in Chinese Application No. CN 202210354716.6, dated Jul. 29, 2023, 13 pages.
Canadian Office Action in Canadian Application No. CA 3,135,470 , dated Jul. 27, 2023, 4 pages.
Whaling Museum Chooses Imtra LED Lighting for Popular Exhibit, LEDs Magazine Sep. 17, 2010; https://www.ledsmagazine.com/company-newsfeed/article/16690837/whaling-museum-chooses-imtra-led-lighting-for-popular-exhibit, 3 pages.
Imtra supplied its LED lighting to USA. Whaling Museum; LEDinside, Sep. 20, 2010, https://www.ledinside.com/news/2010/9/news_Imtra_LED_20100920, 1 page.
Opinion from the Fed. Ct. of App. in *Amp Plus, Inc.* v. *DMF, Inc.* in case Nos. 2021-1595, 2021-1636 (Appeals from the PTAB in IPR2019-01094) decided on Nov. 10, 2022, 15 pages.
U.S. Appl. No. 14/184,601, filed Feb. 19, 2014, Danesh.
U.S. Appl. No. 14/183,424, filed Feb. 18, 2014, Danesh.
U.S. Appl. No. 14/726,064, filed May 29, 2015, Bailey et al.
U.S. Appl. No. 15/132,875, filed Apr. 19, 2016, Danesh.
U.S. Appl. No. 15/167,682, filed May 27, 2016, Bailey et al.
U.S. Appl. No. 14/942,937, filed Nov. 16, 2015, Peng et al.
U.S. Appl. No. 15/637,742, filed Jun. 29, 2017, Kopitzke, IV.
U.S. Appl. No. 15/688,266, filed Aug. 28, 2017, Lofti et al.
U.S. Appl. No. 15/853,400, filed Dec. 22, 2017, Kashani.
U.S. Appl. No. 15/901,738, filed Feb. 21, 2018, Danesh.
U.S. Appl. No. 15/947,065, filed Apr. 6, 2018, Danesh.
U.S. Appl. No. 16/016,040, filed Jun. 22, 2018, Danesh.
U.S. Appl. No. 16/200,393, filed Nov. 26, 2018, Danesh.
U.S. Appl. No. 29/638,259, filed Feb. 26, 2018, Danesh.
U.S. Appl. No. 29/541,565, filed Oct. 5, 2015, Peng.
U.S. Appl. No. 29/645,941, filed Apr. 30, 2018, Danesh et al.
U.S. Appl. No. 29/653,142, filed Jun. 11, 2018, Danesh et al.
U.S. Appl. No. 29/664,471, filed Sep. 25, 2018, Danesh et al.
U.S. Appl. No. 29/678,478, filed Jan. 29, 2019, Danesh et al.
U.S. Appl. No. 29/678,482, filed Jan. 29, 2019, Danesh et al.
U.S. Appl. No. 29/683,730, filed Mar. 15, 2019, Danesh et al.
U.S. Appl. No. 29/694,475, filed Jun. 11, 2019, Peng et al.
U.S. Appl. No. 16/653,497, filed Oct. 15, 2019, Danesh et al.
U.S. Appl. No. 29/711,198, filed Nov. 29, 2019, Danesh et al.
U.S. Appl. No. 16/690,970, filed Nov. 21, 2019, Nikooyan et al.
U.S. Appl. No. 16/719,361, filed Dec. 18, 2019, Danesh et al.
U.S. Appl. No. 16/522,275, filed Jul. 25, 201, Danesh.
U.S. Appl. No. 16/725,606, filed Dec. 23, 2019, Bailey et al.
U.S. Appl. No. 29/648,046, filed May 17, 2018, Williams.
U.S. Appl. No. 16/779,824, filed Feb. 3, 2020, Danesh.
U.S. Appl. No. 16/779,865, filed Feb. 3, 2020, Danesh et al.
U.S. Appl. No. 29/688,172, filed Apr. 18, 2019, Danesh et al.
U.S. Appl. No. 29/688,143, filed Apr. 18, 2019, Danesh et al.
U.S. Appl. No. 16/883,144, filed May 26, 2020, Nikooyan et al.
U.S. Appl. No. 29/696,830, filed Jul. 1, 2019, Kopitzke.
U.S. Appl. No. 16/182,481, filed Nov. 6, 2018, Kopitzke.
U.S. Appl. No. 29/762,016, filed Dec. 14, 2020, Williams et al.
U.S. Appl. No. 17/118,742, filed Dec. 11, 2020, Danesh et al.
U.S. Appl. No. 29/752,046, filed Sep. 24, 2020, Peng et al.
U.S. Appl. No. 17/229,668, filed Apr. 13, 2021, Shen.
U.S. Appl. No. 17/318,193, filed May 12, 2021, Danesh et al.
U.S. Appl. No. 17/080,080, filed Oct. 26, 2020, Danesh.
U.S. Appl. No. 17/220,779, filed Apr. 1, 2021, Kopitzke et al.
U.S. Appl. No. 17/395,522, filed Aug. 6, 2021, Danesh.
U.S. Appl. No. 17/385,766, filed Jul. 26, 2021, Kopitzke.
U.S. Appl. No. 17/384,564, filed Jul. 23, 2021, Kopitzke et al.
U.S. Appl. No. 17/381,147, filed Jul. 20, 2021, Lotfi et al.
U.S. Appl. No. 17/379,748, filed Jul. 19, 2021, Young et al.
U.S. Appl. No. 17/379,489, filed Jul. 19, 2021, Vinh et al.
U.S. Appl. No. 17/378,214, filed Jul. 16, 2021, Kopitzke et al.
U.S. Appl. No. 17/374,674, filed Jul. 13, 2021, Danesh.
U.S. Appl. No. 17/234,421, filed Apr. 19, 2021, Danesh.
U.S. Appl. No. 29/764,875, filed Jan. 4, 2021, Danesh et al.
U.S. Appl. No. 29/759,492, filed Nov. 23, 2020, Danesh et al.
U.S. Appl. No. 17/099,650, filed Nov. 16, 2020, Danesh et al.
U.S. Appl. No. 29/757,754, filed Nov. 9, 2020, Danesh et al.
U.S. Appl. No. 17/473,934, filed Sep. 13, 2021, Danesh et al.
U.S. Appl. No. 29/467,026, filed Sep. 13, 2013, Danesh et al.
U.S. Appl. No. 14/823,410, filed Aug. 11, 2015, Williams et al.
U.S. Appl. No. 14/791,249, filed Jul. 2, 2015, Lee.
U.S. Appl. No. 15/158,538, filed May 18, 2016, Kashani.
U.S. Appl. No. 15/897,955, filed Feb. 15, 2018, Fardadi et al.
U.S. Appl. No. 29/648,937, filed May 24, 2018, Kopitzke.
U.S. Appl. No. 17/666,441, filed Feb. 7, 2022, Danesh et al.
U.S. Appl. No. 29/663,037, filed Sep. 11, 2018, Danesh et al.
U.S. Appl. No. 29/663,040, filed Sep. 11, 2018, Danesh et al.
U.S. Appl. No. 29/746,262, filed Aug. 12, 2020, Danesh et al.
U.S. Appl. No. 29/820,189, filed Dec. 20, 2021, Danesh et al.
U.S. Appl. No. 17/902,469, filed Sep. 2, 2022, Danesh.
U.S. Appl. No. 16/881,686, filed May 22, 2020, Danesh et al.
U.S. Appl. No. 17/085,636, filed Oct. 30, 2020, Danesh et al.
U.S. Appl. No. 17/867,522, filed Jul. 18, 2022, Danesh et al.
U.S. Appl. No. 17/000,702, filed Aug. 24, 2020, Danesh.
U.S. Appl. No. 17/677,300, filed Feb. 22, 2022, Danesh.
U.S. Appl. No. 17/933,257, filed Sep. 19, 2022, Danesh et al.
U.S. Appl. No. 16/886,365, filed May 28, 2020, Shen.
U.S. Appl. No. 17/694,489, filed Mar. 14, 2022, Danesh et al.
U.S. Appl. No. 13/484,901, filed May 31, 2012, Danesh.
U.S. Appl. No. 17/902,474, filed Sep. 2, 2022, Danesh.
U.S. Appl. No. 29/743,066, filed Jul. 17, 2020, Young et al.
U.S. Appl. No. 16/033,122, filed Jul. 11, 2018, Fardadi et al.
U.S. Appl. No. 29/867,928, filed Nov. 14, 2022, Kopitzke.
U.S. Appl. No. 29/683,638, filed Mar. 14, 2019, Kopitzke et al.
U.S. Appl. No. 29/867,213, filed Oct. 14, 2022, Kopitzke et al.
U.S. Appl. No. 17/582,921, filed Jan. 24, 2022, Kopitzke et al.
U.S. Appl. No. 17/826,847, filed May 27, 2022, Danesh.
U.S. Appl. No. 18/068,639, filed Dec. 20, 2022, Danesh et al.
U.S. Appl. No. 18/171,379, filed Feb. 20, 2023, Kopitzke et al.
U.S. Appl. No. 18/055,070, filed Nov. 14, 2022, Kumar.
2006 International Building Code, Section 712 Penetrations, Jan. 2006, 4 pages.
Acrich COB Zhaga Module, Product Description, Seoul Semiconductor, Nov. 11, 2016, 39 pages.
<https://www.zhagastandard.org/books/book18/>, Mar. 2017, 5 pages. Accessed on May 14, 2018.
Bortz, J. C. et al., "Optimal design of a nonimaging TIR doublet lens for an illumination system using an LED source", Proc. SPIE 5529, Nonimaging Optics and Efficient Illumination Systems, (Sep. 29, 2004); doi: 10.1117/12.562598; https://doi.org/10.1117/12.562598, 10 pages.
BXUV.GuideInfo, Fire Resistance Ratings—ANSI/UL 263, UL Online Certifications Directory, last updated Nov. 3, 2016, 27 pages.
CEYY.GuideInfo, Outlet Boxes and Fittings Certified for Fire Resistance, UL Online Certifications Directory, last updated May 16, 2013, 2 pages.
Canadian Office Action dated Dec. 23, 2013 from Canadian Application No. 2,778,581, 3 pages.
Canadian Office Action dated Mar. 22, 2016 from Canadian Application No. 2,879,629, 4 pages.

(56) References Cited

OTHER PUBLICATIONS

Canadian Office Action dated Dec. 6, 2016 from Canadian Application No. 2,879,629, 3 pages.
Canadian Office Action dated Mar. 9, 2017 from Canadian Application No. 2,931,588, 5 pages.
Canadian Office Action dated Feb. 1, 2016 from Canadian Application No. 2,879,486, 5 pages.
Canadian Office Action dated Jun. 12, 2017 from Canadian Application No. 2,927,601, 4 pages.
Canadian Office Action dated Aug. 11, 2017 from Canadian Application No. 2,941,051, 4 pages.
Carlon® Zip Box® Blue™ Switch and Outlet Boxes, Product Brochure, http://www.carlonsales.com/brochures.php, Jun. 20, 2006, 22 pages.
Cree LED Lamp Family Sales Sheet—Better light is beautiful light , Apr. 24, 2017, 2 pages.
DME Series Installation Instructions, Oct. 18, 2011, 2 pages.
DMF, Inc., "dmfLIGHTING: LED Recessed Lighting Solutions," Info sheets, Mar. 15, 2012, 4 pages.
DMF, Inc., "dmfLIGHTING: LED Recessed Downlighting," DRD2 Product Brochure, Oct. 23, 2014, 50 pages.
DMF, Inc., "dmfLIGHTING: LED Recessed Downlighting," Product Catalog, Aug. 2012, 68 pages.
Dross, O. et al., "Review of SMS design methods and real-world applications", Proc. SPIE 5529, Nonimaging Optics and Efficient Illumination Systems, (Sep. 29, 2004); doi: 10.1117/12.561336; https://doi.org/10.1117/12.561336, 14 pages.
Halo, Halo LED H4 H7 Collection, SustainabLEDesign, Cooper Lighting, (emphasis on p. 18 "H7 Collection LED Modules—Halo LED H7 Module Features,") Mar. 28, 2012, 52 pages.
Halo, H7 LED Downlight Trims 49x Series, 6-inch LED Trims for Use with MI7x LED Modules, Cooper Lighting, ADV110422, rev. Aug. 12, 2011, 15 pages.
Halo, LED Module ML706x, Cooper Lighting, General Installation for All Modules/p. 1; Tether Installation/pp. 2-3; Installation into Halo H750x Series LED-only (Non-Screw Based), Recessed Fixture, p. 4, Oct. 20, 2009, 4 pages.
Medvedev, V. et al., "Uniform LED illuminator for miniature displays," Proc. SPIE 3428, Illumination and Source Engineering, (Oct. 20, 1998); doi: 10.1117/12.327957;https://doi.org/10.1117/12.327957, 13 pages.
"Membrane Penetrations in Fire-Resistance Rated Walls," https://www.ul.com/wp-content/uploads/2014/04/ul_MembranePenetrations.pdf, Issue 1, 2009, published Feb. 26, 2010, 2 pages.
"Metallic Outlet Boxes," UL 514A, Underwriters Laboratories, Inc., Feb. 16, 2004 (Title Page Reprinted Aug. 10, 2007), 106 pages.
"Metallic and Non-metallic Outlet Boxes Used in Fire-rated Assembly," https://iaeimagazine.org/magazine/2000/09/16/metallic-and-non-metallic-outlet-boxes-used-in-fire-rated-assembly/, Sep. 16, 2000, 5 pages.
Notice of Allowance mailed Aug. 23, 2017 from Canadian Application No. 2,879,629, 1 page.
"Outlet Boxes for Use in Fire Rated Assemblies," https://www.ul.com/wp-content/uploads/2014/04/Ul_outletboxes.pdf, Apr. 2007, 2 pages.
"Advanced LED Solutions," Imtra Marine Lighting. Jun. 17, 2011, 40 pages.
"Portland Bi-Color, Warm White/Red," item:ILIM30941.Imtra Marine Products. 2012. 3 pages. Accessed athttp://www.imtra.com:80/0ade25fb-3218-4cae-a926-6abe64ffd93a/lighting-light-fixtures-downlights-3-to-4-inches-detail.htm on Jan. 25, 2013.
"Cree LMH2 LED Modules," Mouser Electronics. Accesssed at www.mouser.com/new/cree/creelmh2 on Sep. 9, 2012. 2 pages.
"Cree LMH2 LED Module with TrueWhite Technology," Cree Product Family Data Sheet. Dec. 21, 2011. 3 pages.
"Cree LMH2 LED Modules Design Guide," Cree Product Design Guide. 2011. 20 pages.
"Undercabinet Pucks, Xyris Mini LED Puck Light," Elco Lighting. Sep. 2018. 1 page.
"LED Undercabinet Pocket Guide," ELCO Lighting. Nov. 2, 2016. 12 pages.
"Versi LED Mini Flush," Lithonia Lghting. Sep. 2013. 6 pages.
OneFrame Recessed LED Downlight. Dmflighting.com. Published Jun. 6, 2018. Retrieved at https://www.dmflighting.com/product/oneframe on Jun. 6, 2018. 11 pages.
International Search Report and Written Opinion in PCT/US2018/048357 mailed Nov. 14, 2018, 13 pages.
International Search Report and Written Opinion in International Patent Application No. PCT/US18/39048 mailed Dec. 14, 2018. 24 pages.
RACO 4 i+A882:C958n. Octagon Welded Concrete Ring, 3½ in. Deep with ½ and ¾ in. Knockouts and ilcludes 890 cover (20-Pack). Model # 280. Accessed at https://www.homedepot.com/p/RACO-4-in-Octagon-Welded-Concrete-Ring-3-1-2-in-Deep-with-1-2-and-3-4-in-Knockouts-and-ilcludes-890-cover-20-Pack-280/203638679 on Jan. 18, 2019. 3 pages.
RACO 4 in. Octagon Welded Concrete Ring, 6 in. Deep with ½ and ¾ in. Knockouts (10-Pack). Model # 276. Accessed at https://www.homedepot.com/p/RACO-4-in-Octagon-Welded-Concrete-Ring-6-in-Deep-with-1-2-and-3-4-in-Knockouts-10-Pack-276/203638675 on Jan. 16, 2019. 4 pages.
International Search Report and Written Opinion in International Patent Application No. PCT/US18/62868 mailed Mar. 14, 2019, 13 pages.
CS&E PCT Collaborative Search and Examination Pilot Upload Peer Contribution in International Patent Application No. PCT/US18/62868 mailed Mar. 14, 2019, 61 pages.
International Search Report and Written Opinion in International Patent Application No. PCT/US18/67614 mailed Apr. 25, 2019, 20 pages.
CS&E PCT Collaborative Search and Examination Pilot Upload Peer Contribution in International Patent Application No. PCT/US18/67614 mailed Apr. 24, 2019, 53 pages.
Specification & Features 4" Octagonal Concrete Box Covers. Orbit Industries, Inc. Accessed at https://www.orbitelectric.com on May 6, 2019. 1 page.
4" Octagon Concrete Boxes and Back Plates. Appleton. Accessed at www.appletonelec.com on May 6, 2019. 1 page.
RACO Commercial, Industrial and Residential Electrical Products. Hubbell. Accessed at www.Hubbell-RTB.com on May 6, 2019. 356 pages.
Imtra Marine Lighting 2008 Catalog. 40 pages.
Imtra Marine Lighting 2009 Catalog. 32 pages.
Imtra Marine Lighting Spring 2007 Catalog. 36 pages.
Cooper Lighting Halo ML56 LED System Product Sheet. Mar. 2, 2015. Accessed at http://www.cooperindustries.com/content/dam/public/lighting/products/documents/halo/spec_sheets/halo-ml56600-80cri-141689-sss.pdf. 8 pages.
Kwikbrace® New Construction Braces for Lighting Fixtures or Ceiling Fans 1½ in. Depth. Hubbel. Accessed at https://hubbellcdn.com/specsheet/926.pdf on Jun. 27, 2019. 1 page.
IC1JB Housing 4" IC-Rated New Construction Junction Box Housing. AcuityBrands. Accessed at https://www.acuitybrands.com/en/products/detail/845886/juno/ic1jb-housing/4-ic-rated-new-construction-junction-box-housing on Jun. 27, 2019, 4 pages.
International Search Report and Written Opinion in International Patent Application No. PCT/US19/32281 mailed Aug. 2, 2019, 18 pages.
Delhi Rehab & Nursing Facility ELM16-70884. Vertex Innovative Solutions Feb. 25, 2016. 89 pages.
SlimSurface surface mount downlighting. Philips Lightolier 2018. 8 pages.
Be seen in the best light. Lightolier by signify. Comprehensive 2019 Lighting Catalog. 114 pages.
Cree® LMR2 LED Module. Product Family Data Sheet Cree 2011. 3 pages.
International Search Report and Written Opinion in International Patent Application No. PCT/US2019/036477 mailed Oct. 17, 2019, 15 pages.

(56) References Cited

OTHER PUBLICATIONS

ML56 LED Lighting System 600 / 900 / 1200 Series Halo. Cooper Lighting Brochure 2015. Accessed at https://images.homedepot-static.com/catalog/pdfImages/06/06d28f93-4bf6-45be-a35a-a0239606f227.pdf. 41 pages.
Switch and Outlet Boxes and Covers Brochure. Appelton 2010. 77 pages.
Maxim Lighting Wafer Trifold Brochure LMXBRO1711 2017. Accessed at https://www.maximlighting.com/Upload/download/brochure/pdf/LMXBRO1711.pdf on Feb. 13, 2020. 2 pages.
Maxim Convert Fixture. LMXCAT1805 Maxim Main Catalog 2018 p. 639.
Maxim Wafer. LMXCAT1805 Maxim Main Catalog 2018 pp. 636-638.
Maxim Lighting Trim Trifold LMXBRO1905 2019. Accessed at https://www.maximlighting.com/Upload/download/brochure/pdf/LMXBRO1905.pdf on Feb. 13, 2020. 2 pages.
International Search Report and Written Opinion in International Patent Application No. PCT/US2019/054220 mailed Feb. 24, 2020, 23 pages.
LED Book Price Guide 2012. DMF Light. Issued Jun. 26, 2013. 3 pages.
DLER411 4" Recessed LED Retrofit Module. DMF Light. Issued Jun. 15, 2011. 1 page.
DLEI411 4" Recessed LED New Construction, IC. DMF Light. Issued Nov. 30, 2011. 1 page.
DLEIR411 4" Recessed LED Remodel, IC. DMF Light. Issued Jun. 15, 2011. 1 page.
3 & 4" DLE Ser ies LED Sample Case Now Available. DMF Light. Issued Jan. 6, 2012. 1 page.
DLEI3 3" Recessed LED New Construction, IC. DMF Light. Issued Nov. 30, 2011. 2 pages.
Ridgway-Barnes, SlimSurface LED Downlight: One of the thinnest LED surface mount downlights in the market. Philips Lighting Blog. Oct. 28, 2014. Accessed at http://applications.nam.lighting.philips.com/blog/index.php/2014/10/28/slimsurface-led-downlight-one-of-the-thinnest-led-surface-mount-downlights-in-the-market/. 3 pages.
SlimSurface LED S5R, S7R & S10R Round 5", 7" and 10" Apertures. Lightolier by Signify. Nov. 2018. 9 pages.
20 cu. in. Blue Polycarbonate Round New Work Ceiling Electrical Box. Carlon. Accessed at https://www.homedepot.com/p/Carlon-20-cu-in-Blue-Polycarbonate-Round-New-Work-Ceiling-Electrical-Box-B520P-UPC/202592617?MERCH=REC-_-pipsem-_-100404124-_-202592617-_-N on May 15, 2020. 14 pages.
Maxim Lighting International, "Wafer LED 7" RD 3000K Wall/Flush Mount", undated. 1 page.
Maxim Lighting International, "Convert LED Flush Mount", undated. 1 page.
Maxim Lighting International, "Views of the Wafer Flush Mount", undated. 1 page.
Maxim Lighting International, "Product/Drawing Specification Sheet" undated. 1 page.
International Search Report and Written Opinion in PCT/US2020/017331 mailed Jun. 22, 2020, 16 pages.
Taiwan Office Action and translation thereof dated Jun. 12, 2020 from Taiwan Application No. 108116564, 8 pages.
Access Lighting Installation Instructions. No. 20870LEDD/20871LEDD/20872LEDD. Dec. 16, 2019. 2 pages.
Model No. 20870LEDD-WH/ACR Infinite Specification Sheet. Access Lighting. Apr. 9, 2020. 1 page.
Dmf DRD2 Recessed LED Downlight General Retrofit Junction Box Dated: Dec. 18, 2015 Downloaded Jul. 28, 2018, from https://www.a Iconlighting.com/specsheets/DMF/DRD2-Junction-Box-Retrofit-Spec-Sheet .pdf, 6 pages.
Dmf DRD2 Recessed LED Downlight General New Construction 4", 5", 6" Aperture Dated Aug. 31, 2016 Downloaded Jul. 28, 2018, from https://www. cansandfans.com/sites/default/files/DRD2-General-New-Construction-Spec-Sheet_7_0 .pdf , 9 pages.
Mar. 5, 2016—The DMF Lighting DRD2 Recessed LED Downlight General Retrofit Junction Box—Wet Location Rated is the ideal solution for Commercial LED recessed lighting retrofit applications. web cache https://ww w.alconlighting.com/dmf-drd2m.html (downloaded Jul. 28, 2018), 6 pages.
LED modules advance in performance, standardization questions persist (Magazine). LEDs Magazine. Oct. 29, 2013. Accessed at https://www.ledsmagazine.com/leds-ssl-design/modular-light-engines/article/16695073/led-modules-advance-in-performance-standardization-questions-persist-magazine. 9 pages.
Octagon Concrete Box Cover with (3) ½ in. & (2) ¾ in. Conduit Knockouts. Garvin. Accessed at https://www.garvinindustries.com/covers-and-device-rings/concrete-slab-box-covers-adaptor-rings/flat-covers-all-styles/cbp?gclid=Cj0KCQjw9b_4BRCMARIsADMUIypJc0K80UHdDTI9C5m4BDzR3U87PRYV1NdQIBFxEWQ2I_3otTCTqEkaAi_DEALw_wcB on Jul. 20, 2020. 1 page.
Canadian Office Action in Application No. 2931588 dated Aug. 13, 2020, 5 pages.
International Search Report and Written Opinion in PCT/US2020/050767 mailed Dec. 9, 2020, 25 pages.
Canadian Office Action in Application No. 2941051 dated Dec. 8, 2020, 5 pages.
"Electrical Boxes" accessed at http://electrical-inspector.blogspot.com/2013/06/electrical-boxes.html Jun. 22, 2013 retrieved from Wayback Machine Archive.org on Jan. 25, 2021. 12 pages.
"Electrical Boxes Volume and Fill Calculations" accessed at http://electrical-inspector.blogspot.com/2013/06/electrical-boxes-Volume-and-Fill-Calculations.html Jun. 22, 2013 retrieved from Wayback Machine Archive.org on Jan. 25, 2021. 8 pages.
U.S. Appl. No. 61/881,162, filed Sep. 23, 2013. Priority application to US Publication No. 2015/0085500 to Cooper et al. 31 pages.
Thiele, Plastic Electrical Boxes Pros and Cons. Dated Jul. 1, 2019. Accessed at found at https://www.thespruce.com/plastic-electrical-boxes-pros-and-cons-1152405. 1 page.
"Electrical Box" reference dated Mar. 23, 2021. Accessed at https://www.zoro.com/cantex-electrical-box-3-12-in-rouond-20-cu-in-ez20cnr-/i/G1823376/. 1 page.
"Juno Lighting" reference by Express Electric on Amazon.com, date first available Feb. 14, 2008 [online], site visited Jan. 31, 2022, available from internet URL: https://www.amazon.com/Juno-Lighting-TC44R-Retrofit-Downlight/dp/BOOOOD 12HT/ref=psdc_6355949011_t2_B078X1D488?th=1 (Year: 2008) (6 pages).
Final Office Action mailed Apr. 27, 2016 from U.S. Appl. No. 14/184,601, 19 pages.
Final Office Action mailed Jul. 26, 2017 from U.S. Appl. No. 14/184,601, 18 pages.
Final Office Action mailed Jan. 29, 2016 from U.S. Appl. No. 14/183,424, 21 pages.
Final Office Action mailed Jun. 23, 2016 from U.S. Appl. No. 13/484,901, 18 pages.
Final Office Action mailed Apr. 2, 2015 from U.S. Appl. No. 13/484,901, 13 pages.
Notice of Allowance mailed Mar. 26, 2018 for U.S. Appl. No. 14/184,601, 10 pages.
Non-Final Office Action mailed Mar. 15, 2010 from U.S. Appl. No. 12/100,148, 8 pages.
Non-Final Office Action mailed Apr. 30, 2010 from U.S. Appl. No. 12/173,232, 13 pages.
Non-Final Office Action mailed Sep. 5, 2014 from U.S. Appl. No. 13/791,087, 8 pages.
Non-Final Office Action mailed Jul. 20, 2015 from U.S. Appl. No. 14/184,601, 16 pages.
Non-Final Office Action mailed Dec. 15, 2016 from U.S. Appl. No. 14/184,601, 18 pages.
Non-Final Office Action mailed Feb. 6, 2018 from U.S. Appl. No. 15/167,682, 9 pages.
Non-Final Office Action mailed Sep. 15, 2015 from U.S. Appl. No. 13/484,901, 16 pages.
Non-Final Office Action mailed Oct. 16, 2014 from U.S. Appl. No. 13/484,901, 11 pages.
Non-Final Office Action mailed Sep. 6, 2017 from U.S. Appl. No. 14/726,064, 8 pages.

(56) References Cited

OTHER PUBLICATIONS

Non-Final Office Action mailed May 17, 2017 from U.S. Appl. No. 14/183,424, 20 pages.
Non-Final Office Action mailed Jun. 2, 2015 from U.S. Appl. No. 14/183,424, 20 pages.
Non-Final Office Action mailed Apr. 12, 2018 for U.S. Appl. No. 29/638,259, 5 pages.
Non-Final Office Action mailed May 16, 2018 for U.S. Appl. No. 15/132,875, 18 pages.
Notice of Allowance mailed Jan. 30, 2015 from U.S. Appl. No. 13/791,087, 9 pages.
Notice of Allowance mailed Jan. 16, 2015 from U.S. Appl. No. 29/467,026, 9 pages.
Notice of Allowance mailed Oct. 21, 2016 from U.S. Appl. No. 13/484,901, 7 pages.
Notice of Allowance mailed Mar. 24, 2016 from U.S. Appl. No. 14/247,149, 8 pages.
Notice of Allowance mailed May 22, 2018 from U.S. Appl. No. 14/183,424, 9 pages.
Notice of Allowance mailed May 10, 2018 from U.S. Appl. No. 14/726,064, 7 pages.
Notice of Allowance mailed Sep. 21, 2018 from U.S. Appl. No. 29/645,941, 5 pages.
Notice of Allowance mailed Oct. 4, 2018 from U.S. Appl. No. 15/947,065 , 9 pages.
Notice of Allowance mailed Sep. 19, 2018 from U.S. Appl. No. 15/167,682 , 7 pages.
Non-Final Office Action mailed Jun. 25, 2018 for U.S. Appl. No. 29/541,565, 10 pages.
Non-Final Office Action mailed Oct. 24, 2018 for U.S. Appl. No. 15/688,266, 14 pages.
Notice of Allowance mailed Oct. 9, 2018 from U.S. Appl. No. 29/653,142, 7 pages.
Notice of Allowance mailed Nov. 27, 2018 from U.S. Appl. No. 15/167,682, 11 pages.
Non-Final Office Action mailed Dec. 5, 2018 from U.S. Appl. No. 14/942,937, 13 pages.
Notice of Allowance mailed Jan. 2, 2019 from U.S. Appl. No. 29/541,565, 6 pages.
Notice of Allowance mailed Feb. 8, 2019 from U.S. Appl. No. 29/541,565, 5 pages.
Non-Final Office Action mailed Feb. 7, 2019 from U.S. Appl. No. 16/200,393, 32 pages.
Notice of Allowance mailed Jan. 28, 2019 from U.S. Appl. No. 29/664,471, 8 pages.
Non-Final Office Action mailed Jul. 24, 2018 from U.S. Appl. No. 29/638,259, 5 pages.
Final Office Action mailed Mar. 15, 2019 from U.S. Appl. No. 15/132,875, 15 pages.
Notice of Allowance mailed Apr. 1, 2019 from U.S. Appl. No. 15/167,682, 7 pages.
Non-Final Office Action mailed Apr. 4, 2019 from U.S. Appl. No. 29/678,482, 8 pages.
Notice of Allowance mailed Apr. 8, 2019 from U.S. Appl. No. 29/653,142, 8 pages.
Notice of Allowance mailed Apr. 17, 2019 from U.S. Appl. No. 29/678,478, 7 pages.
Final Office Action mailed Jun. 6, 2019 from U.S. Appl. No. 15/688,266, 7 pages.
Non-Final Office Action mailed Jun. 11, 2019 from U.S. Appl. No. 15/901,738, 6 pages.
Notice of Allowance mailed Jun. 12, 2019 from U.S. Appl. No. 16/016,040, 8 pages.
Ex-Parte Quayle Action mailed Jun. 27, 2019 from U.S. Appl. No. 29/683,730, 5 pages.
Notice of Allowance mailed Jul. 31, 2019 from U.S. Appl. No. 15/167,682 , 7 pages.
Supplemental Notice of Allowance mailed Aug. 5, 2019 from U.S. Appl. No. 15/947,065, 2 pages.
Notice of Allowance mailed Sep. 11, 2019 from U.S. Appl. No. 29/653,142, 6 pages.
Notice of Allowance mailed Sep. 19, 2019 from U.S. Appl. No. 16/016,040, 7 pages.
Corrected Notice of Allowance mailed Sep. 27, 2019 from U.S. Appl. No. 15/167,682 , 2 pages.
Final Office Action mailed Sep. 27, 2019 from U.S. Appl. No. 16/200,393, 34 pages.
Notice of Allowance mailed Feb. 15, 2019 from U.S. Appl. No. 15/947,065, 9 pages.
Notice of Allowance mailed Oct. 1, 2019 from U.S. Appl. No. 14/942,937, 7 pages.
Final Office Action mailed Oct. 3, 2019 from U.S. Appl. No. 29/678,482, 6 pages.
Corrected Notice of Allowance mailed Oct. 10, 2019 from U.S. Appl. No. 16/016,040, 2 pages.
Notice of Allowance mailed Oct. 16, 2019 from U.S. Appl. No. 15/132,875, 12 pages.
Non-Final Office Action mailed Dec. 30, 2019 from U.S. Appl. No. 16/653,497, 8 pages.
Notice of Allowance mailed Feb. 5, 2020 from U.S. Appl. No. 15/901,738, 8 pages.
Notice of Allowance mailed Feb. 5, 2020 from U.S. Appl. No. 29/678,482, 13 pages.
Final Office Action mailed Mar. 17, 2020 for U.S. Appl. No. 29/653,142, 13 pages.
Non-Final Office Action mailed Apr. 2, 2020 for U.S. Appl. No. 16/522,275, 21 pages.
Notice of Allowance mailed May 18, 2020 from U.S. Appl. No. 15/901,738, 7 pages.
Non-Final Office Action mailed May 20, 2020 for U.S. Appl. No. 15/688,266, 6 pages.
Non-Final Office Action mailed May 26, 2020 for U.S. Appl. No. 16/719,361, 10 pages.
Notice of Allowance mailed Apr. 9, 2020 from U.S. Appl. No. 16/653,497, 7 pages.
Notice of Allowance mailed Jul. 10, 2020 from U.S. Appl. No. 29/694,475, 6 pages.
Corrected Notice of Allowability mailed Oct. 25, 2018 from U.S. Appl. No. 14/183,424, 3 pages.
Ex Parte Quayle Office Action mailed Oct. 16, 2018 for U.S. Appl. No. 29/663,037, 7 pages.
Notice of Allowance mailed Nov. 19, 2018 from U.S. Appl. No. 29/663,037, 5 pages.
Notice of Allowance mailed Nov. 15, 2018 from U.S. Appl. No. 29/663,040, 5 pages.
Notice of Allowance mailed Jul. 20, 2020 from U.S. Appl. No. 29/648,046, 5 pages.
Notice of Allowance mailed Jul. 28, 2020 from U.S. Appl. No. 16/719,361, 8 pages.
Notice of Allowance mailed Jul. 29, 2020 from U.S. Appl. No. 16/522,275, 8 pages.
Non-Final Office Action mailed Aug. 19, 2020 for U.S. Appl. No. 16/886,365, 16 pages.
Notice of Allowance mailed Sep. 8, 2020 from U.S. Appl. No. 29/678,482, 5 pages.
Corrected Notice of Allowance mailed Sep. 11, 2020 from U.S. Appl. No. 16/719,361, 2 pages.
Corrected Notice of Allowance mailed Sep. 14, 2020 from U.S. Appl. No. 16/522,275, 2 pages.
Notice of Allowance mailed Sep. 22, 2020 from U.S. Appl. No. 29/683,730, 6 pages.
Notice of Allowance mailed Sep. 22, 2020 from U.S. Appl. No. 29/653,142, 6 pages.
Notice of Allowance mailed Oct. 27, 2020 from U.S. Appl. No. 29/648,046, 5 pages.
Notice of Allowance mailed Oct. 27, 2020 from U.S. Appl. No. 29/694,475, 5 pages.
Notice of Allowance mailed Nov. 10, 2020 from U.S. Appl. No. 29/688,143, 6 pages.
Notice of Allowance mailed Nov. 10, 2020 from U.S. Appl. No. 29/688,172, 6 pages.

(56) References Cited

OTHER PUBLICATIONS

Non-Final Office Action mailed Nov. 30, 2020 from U.S. Appl. No. 17/000,702, 7 pages.
Notice of Allowance mailed Dec. 2, 2020 from U.S. Appl. No. 29/746,262, 6 pages.
Non-Final Office Action mailed Dec. 16, 2020 from U.S. Appl. No. 17/080,080, 28 pages.
Final Office Action mailed Jan. 11, 2021 from U.S. Appl. No. 15/688,266, 7 pages.
Non-Final Office Action mailed Jan. 11, 2021 from U.S. Appl. No. 16/725,606, 7 pages.
Non-Final Office Action mailed Jan. 13, 2021 from U.S. Appl. No. 17/085,636, 14 pages.
Notice of Allowance mailed Jan. 15, 2021 from U.S. Appl. No. 17/000,702, 7 pages.
Notice of Allowance mailed Jan. 22, 2021 from U.S. Appl. No. 17/080,080, 14 pages.
Notice of Allowance mailed Jan. 22, 2021 from U.S. Appl. No. 16/886,365, 7 pages.
Final Office Action mailed Feb. 5, 2021 from U.S. Appl. No. 16/200,393, 7 pages.
Non-Final Office Action mailed Jan. 19, 2021 from U.S. Appl. No. 17/099,650, 15 pages.
Supplemental Notice of Allowance mailed Mar. 10, 2021 from U.S. Appl. No. 16/886,365, 2 pages.
Notice of Allowance mailed Apr. 6, 2021 from U.S. Appl. No. 16/200,393, 11 pages.
Non-Final Office Action mailed Apr. 12, 2021 from U.S. Appl. No. 29/694,475, 11 pages.
Notice of Allowance mailed Apr. 13, 2021 from U.S. Appl. No. 16/725,606, 7 pages.
Notice of Allowance mailed Apr. 26, 2021 from U.S. Appl. No. 17/080,080, 11 pages.
Corrected Notice of Allowance mailed Apr. 28, 2021 from U.S. Appl. No. 16/725,606, 2 pages.
Notice of Allowance mailed May 5, 2021 from U.S. Appl. No. 17/085,636, 8 pages.
Notice of Allowance mailed May 14, 2021 from U.S. Appl. No. 16/881,686, 8 pages.
Notice of Allowance mailed May 17, 2021 from U.S. Appl. No. 15/688,266, 9 pages.
Notice of Allowance mailed May 24, 2021 from U.S. Appl. No. 29/688,143, 6 pages.
Notice of Allowance mailed May 24, 2021 from U.S. Appl. No. 29/688,172, 6 pages.
Notice of Allowance mailed May 27, 2021 from U.S. Appl. No. 16/779,865, 9 pages.
Notice of Allowance mailed May 28, 2021 from U.S. Appl. No. 16/779,824, 11 pages.
Notice of Allowance mailed Jun. 1, 2021 from U.S. Appl. No. 16/719,361,7 pages.
Corrected Notice of Allowance mailed Jun. 21, 2021 from U.S. Appl. No. 16/779,865, 3 pages.
Non-Final Office Action mailed Jul. 14, 2021 from U.S. Appl. No. 17/118,742, 11 pages.
Notice of Allowance mailed Jul. 21, 2021 from U.S. Appl. No. 17/318,13 pages.
Supplemental Notice of Allowance mailed Aug. 13, 2021 1 from U.S. Appl. No. 16/779,824, 3 pages.
Supplemental Notice of Allowance mailed Aug. 19, 2021 1 from U.S. Appl. No. 17/318,193, 4 pages.
Notice of Allowance mailed Aug. 20, 2021 1 from U.S. Appl. No. 29/764,875, 5 pages.
Notice of Allowance mailed Sep. 16, 2021 from U.S. Appl. No. 16/779,865, 9 pages.
Non-Final Office Action mailed Oct. 18, 2021 from U.S. Appl. No. 29/696,830, 8 pages.
Notice of Allowance mailed Nov. 3, 2021 from U.S. Appl. No. 17/220,779, 7 pages.
Notice of Allowance mailed Nov. 5, 2021 1 from U.S. Appl. No. 17/318,193, 11 pages.
Non-Final Office Action mailed Nov. 5, 2021 from U.S. Appl. No. 17/379,748, 8 pages.
Notice of Allowance mailed Nov. 8, 2021 1 from U.S. Appl. No. 29/764,875, 5 pages.
Non-Final Office Action mailed Nov. 15, 2021 from U.S. Appl. No. 17/374,674, 7 pages.
Final Office Action mailed Nov. 16, 2021 from U.S. Appl. No. 17/099,650, 14 pages.
Notice of Allowance mailed Nov. 22, 2021 from U.S. Appl. No. 29/694,475, 7 pages.
Notice of Allowance mailed Nov. 24, 2021 from U.S. Appl. No. 17/234,421, 9 pages.
Non-Final Office Action mailed Nov. 30, 2021 from U.S. Appl. No. 17/395,522, 28 pages.
Non-Final Office Action mailed Dec. 1, 2021 from U.S. Appl. No. 16/883,144, 23 pages.
Corrected Notice of Allowance mailed Dec. 10, 2021 from U.S. Appl. No. 17/234,421, 2 pages.
Non-Final Office Action mailed Dec. 13, 2021 from U.S. Appl. No. 29/711,198, 8 pages.
Corrected Notice of Allowance mailed Jan. 11, 2022 from U.S. Appl. No. 29/694,475, 2 pages.
Corrected Notice of Allowance mailed Jan. 12, 2022 from U.S. Appl. No. 16/779,865, 9 pages.
Non-Final Office Action mailed Jan. 21, 2022 from U.S. Appl. No. 17/229,668, 5 pages.
Notice of Allowance from U.S. Appl. No. 17/379,748 mailed Feb. 16, 2022, 5 pages.
Non-Final Office Action mailed Feb. 16, 2022 from U.S. Appl. No. 29/743,066, 6 pages.
Notice of Allowance mailed Feb. 14, 2022 from U.S. Appl. No. 17/473,934, 9 pages.
Non-Final Office Action mailed Feb. 25, 2022 from U.S. Appl. No. 17/384,564 28 pages.
Notice of Allowance mailed Mar. 11, 2022 from U.S. Appl. No. 17/118,742 13 pages.
Notice of Allowance Mailed Apr. 27, 2022 from U.S. Appl. No. 16/883,144, 11 pages.
Notice of Allowance Mailed Apr. 27, 2022 from U.S. Appl. No. 17/374,674, 7 pages.
Notice of Allowance Mailed Apr. 27, 2022 from U.S. Appl. No. 17/473,934, 9 pages.
Notice of Allowance Mailed Jun. 7, 2022 from U.S. Appl. No. 29/683,638, 7 pages.
Non-Final Office Action mailed Jun. 20, 2022 from U.S. Appl. No. 17/381,147, 4 Pages.
Non-Final Office Action mailed Jun. 22, 2022 from U.S. Appl. No. 29/759,492, 6 Pages.
Notice of Allowance mailed Jul. 11, 2022 from U.S. Appl. No. 29/696,830, 5 Pages.
Final Office Action received Jul. 11, 2022 from U.S. Appl. No. 29/711,198 , 7 Pages.
Non-Final Office Action dated Oct. 25, 2022 from U.S. Appl. No. 17/099,650, 10 Pages.
Final Office Action dated Dec. 15, 2022 from U.S. Appl. No. 29/743,066, 16 pages.
Supplemental Notice of Allowance mailed Jan. 17, 2023 from U.S. Appl. No. 17/384,564 2 pages.
Office Action dated Jan. 24, 2023 from U.S. Appl. No. 17/677,300, 5 pages.
Notice of Allowance mailed Mar. 1, 2023 from U.S. Appl. No. 29/711,198, 7 pages.
Non-Final Office Action mailed Mar. 23, 2023 from U.S. Appl. No. 17/694,489, 9 pages.
Notice of Allowance mailed Mar. 29, 2023 from U.S. Appl. No. 17/666,441, 9 pages.
Notice of Allowance mailed Apr. 10, 2023 from U.S. Appl. No. 29/743,066, 7 pages.
Final Office Action mailed Apr. 12, 2023 from U.S. Appl. No. 29/759,492, 8 Pages.

(56) References Cited

OTHER PUBLICATIONS

Non-Final Office Action dated May 8, 2023 from U.S. Appl. No. 17/677,300 , 7 Pages.
Non-Final Office Action dated Jul. 7, 2023 from U.S. Appl. No. 17/826,847, 8 Pages.
Non-Final Office Action dated Aug. 31, 2023 from U.S. Appl. No. 17/379,489, 11 Pages.
Petition for Inter Partes Review of U.S. Pat. No. 9,964,266 Pursuant to 37 C.F.R. § 42.100 et seq. *AMP Plus Inc. dbd Elco Lighting* v. *DMF, Inc*, IPR2019-01094 filed May 17, 2019. 108 pages.
IPR2019-01094 Exhibit 1001. U.S. Pat. No. 9,964,266 ("the '266 Patent"). 14 pages.
IPR2019-01094 Exhibit 1002. Declaration of Eric Bretschneider, Ph.D. ("Bretschneider"). 107 pages.
IPR2019-01094 Exhibit 1003. Curriculum Vitae of Dr. Bretschneider. 11 pages.
IPR2019-01094 Exhibit 1004. Excerpts from the File History of U.S. Pat. No. 9,964,266. 105 pages.
IPR2019-01094 Exhibit 1005. Imtra 2011 Marine Lighting Catalog—Advanced LED Solutions ("Imtra 2011"). 40 pages.
IPR2019-01094 Exhibit 1006. Imtra 2007 Marine Lighting Catalog ("Imtra 2007"). 36 pages.
IPR2019-01094 Exhibit 1007. U.S. Pat. No. 9,366,418 ("Gifford"). 9 pages.
IPR2019-01094 Exhibit 1008. Declaration of Colby Chevalier ("Chevalier"). 89 pages.
IPR2019-01094 Exhibit 1009. U.S. Pat. No. 7,102,172 ("Lynch"). 41 pages.
IPR2019-01094 Exhibit 1010. Illuminating Engineering Society, ANSI RP-16-10, Nomenclature and Definitions for Illuminating Engineering (approved as an American National Standard Jul. 15, 2005, approved by the IES Board of Directors Oct. 15, 2005). 4 pages.
IPR2019-01094 Exhibit 1011. Underwriters Laboratories Inc. Standard for Safety, Standard UL-8750, entitled Light Emitting Diode (LED) Equipment for Use in Lighting (1st ed. 2009). 5 pages.
IPR2019-01094 Exhibit 1012. Celanese CoolPoly® D5502 Thermally Conductive Liquid Crystalline Polymer Specification ("CoolPoly"). 1 page.
IPR2019-01094 Exhibit 1013. Illuminating Engineering Society of North America, IES Lighting Handbook (John E. Kaufman and Howard Haynes eds., Application vol. 1981) ("Lighting Handbook"). 5 pages.
IPR2019-01094 Exhibit 1014. California Energy Commission, Pier Lighting Research Program: Project 2.3 Low-profile LED Luminaires Final Report (Prepared by Lighting Research Center, Jan. 2005) ("Pier LRP"). 70 pages.
IPR2019-01094 Exhibit 1015. Jim Sinopoli, Using DC Power to Save Energy and End the War on Currents, GreenBiz (Nov. 15, 2012), https://www.greenbiz.com/news/2012/11/15/using-dc-power-save-energy-end-war-currents ("Sinopoli"). 6 pages.
IPR2019-01094 Exhibit 1016. Robert W. Johnson, "Thought Leadership White Paper: AC Versus DC Power Distribution" (Nov. 2012) ("Johnson"). 10 pages.
IPR2019-01094 Exhibit 1017. Lumileds, Luxeon Rebel General Purpose Product Datasheet, Specification DS64 (2016) ("Luxeon Rebel"). 26 pages.
IPR2019-01094 Exhibit 1018. U.S. Pat. No. 8,454,204 ("Chang"). 11 pages.
IPR2019-01094 Exhibit 1019. U.S. Department of Energy, CALiPER Benchmark Report: Performance of Incandescent A-Type and Decorative Lamps and LED Replacements (prepared by Pacific National Laboratory, Nov. 2008) ("CALiPER 2008"). 25 pages.
IPR2019-01094 Exhibit 1020. U.S. Pat. No. 3,836,766 ("Auerbach"). 13 pages.
IPR2019-01094 Exhibit 1021. U.S. Department of Energy, CALiPER Application Summary Report 16: LED BR30 and R30 Lamps (prepared by Pacific Northwest National Laboratory, Jul. 2012) ("CALiPER 2012"). 26 pages.
IPR2019-01094 Exhibit 1022. Sandia National Laboratories, Sandia Report: "The Case for a National Research Program on Semiconductor Lighting" (Jul. 2000) ("Haitz"). 24 pages.
IPR2019-01094 Exhibit 1023. Sylvania, Post Top Street Light LED Retrofit Kit Specification, LED40POST (2009) ("Sylvania"). 4 pages.
IPR2019-01094 Exhibit 1024. Webster's New Collegiate Dictionary (1973) ("Webster's"). 2 pages.
IPR2019-01094 Exhibit 1025. 3M Wire Connectors and Tools Catalog 2013 ("3M Catalog"). 22 pages.
IPR2019-01094 Exhibit 1026. Wakefield Semiconductor Heat Sinks and Thermal Products 1974 Catalog ("Wakefield"). 3 pages.
IPR2019-01094 Exhibit 1027. U.S. Department of Energy, Solid-State Lighting Research and Development Portfolio: Multi-Year Program Plan FY'07-FY'12 (prepared by Navigant Consulting, Inc., Mar. 2006) ("DOE 2006"). 129 pages.
IPR2019-01094 Exhibit 1028. U.S. Department of Energy, Solid-State Lighting ResearA1023:C1043elopment: Multi-Year Program Plan (Apr. 2013) ("DOE 2013"). 89 pages.
Declaration of Colby Chevalier from Central District of California Civil Docket for Case #: 2:18-cv-07090-CAS-GJS filed Jun. 3, 2019, signed Jun. 3, 2019. 2 pages.
Docket Listing in Inter Partes Review of U.S. Pat. No. 9,964,266. Docket Navigator *AMP Plus, Inc. d/b/a Elco Lighting et al* v. *DMF, Inc.* PTAB-IPR2019-01094. Downloaded Mar. 25, 2020. 4 pages.
Petition for Inter Partes Review of U.S. Pat. No. 9,964,266 Pursuant to 37 C.F.R. § 42.100 et seq. *AMP Plus Inc. dbd Elco Lighting* v. *DMF, Inc*, PTAB-IPR2019-01500 filed Aug. 14, 2019. 99 pages.
Docket Listing in Inter Partes Review of U.S. Pat. No. 9,964,266 . *AMP Plus, Inc. d/b/a Elco Lighting et al* v. *DMF, Inc.* PTAB-IPR2019-01500. Downloaded Mar. 25, 2020. 3 pages.
Civil Action No. 2:18-cv-07090. Complaint for Infringement and Unfair Competition. *DMF, Inc.* v. *AMP Plus, Inc. d/b/a Elco Lighting*. 52 pages. Dated Aug. 15, 2018.
Docket Listing in Civil Action No. 2:18-cv-07090. *DMF, Inc.* v. *AMP Plus, Inc. d/b/a Elco Lighting et al* CDCA-2-18-cv-07090. Downloaded on Mar. 25, 2020. 39 pages.
Civil Action No. 2:19-cv-4519.Complaint for Patent Infringement. *DMF, Inc.* v. *AMP Plus, Inc. d/b/a Elco Lighting*. 23 pages dated May 22, 2019.
Docket Listing in Civil Action No. 2:19-cv-4519. *DMF Inc* v. *AMP Plus, Inc. d/b/a Elco Lighting et al* CDCA-2-19-cv-04519. Downloaded on Mar. 25, 2020. 3 pages.
Decision Denying Institution of Inter Partes Review of U.S. Pat. No. 9,964,266 in IPR2019-01500 dated Mar. 17, 2020. 21 pages.
Defendants' Notice of Prior Art Pursuant to 35 U.S.C. § 282 in Civil Action No. 2:18-cv-07090-CAS-GJS dated Feb. 28, 2020. 7 pages.
Defendant AMP Plus, Inc.'s Opposition to DMF's Motion for Summary Judgement in Civil Action No. 2:18-cv-07090-CAS-GJS filed Feb. 10, 2020. 32 pages.
Declaration of Eric Bretschneider, Ph.D in Support of Amp Plus, Inc.'s Opposition to Dmf, Inc.'s Motion for Partial Summary Judgment in Civil Action No. 2:18-cv-07090-CAS-GJS filed Feb. 10, 2020. 210 pages.
Plaintiff DMF's Reply in Support of Motion for Partial Summary Judgment in Civil Action No. 2:18-cv-07090-CAS-GJS filed Feb. 18, 2020. 33 pages.
Declaration of James R. Benya in Support of Plaintiff DMF's Motion for Summary Judgment in Civil Action No. 2:18-cv-07090-CAS-GJS filed Feb. 3, 2020. 193 pages.
Underwriters Laboratories Inc. Standard for Safely. UL 1598. Luminaires Feb. 11, 2020. 12 pages.
Exceptional LED Lighting Technology Product Portfolio. LightingScience 2012. 11 pages.
"Cree LMH2 LED Modules," Mouser Electronics. Sep. 9, 2012. 4 pages.
Slim Line Disc. Eye LEDs Specification Sheet 2012. 2 pages.
HiBay LED Heat Sink. Wakefield-vette. Dec. 11, 2017. 1 pages.
Thermal Management of Cree® XLamp® LEDs. Cree Application Note. 2004. 19 pages.
Imtra Marine Lighting Fall 2007 Catalog. 32 pages.
Cree LMH2 LED Modules Product Family Data Sheet. Cree 2011-2014, 18 pages.

(56) References Cited

OTHER PUBLICATIONS

Cree LMH2 LED Modules Design Guide. Cree 2011-2015, 23 pages.
Brochure of Elco EL49A, EL49ICA, EL49RA modules. Elco Lighting Nov. 25, 2009. 1 page.
Image of Elco E347/247 module identified by Elco in response to DMF's Request for Production in Civil Action No. 2:18-cv-07090-CAS-GJS on Aug. 28, 2019. 1 page.
Screenshots from the Deposition of Brandon Cohen in Civil Action No. 2:18-cv-07090-CAS-GJS. Conducted Sep. 2, 2020. 8 pages.
Defendant AMP Plus, Inc.'s Initial Disclosure and Designation of Expert Witnesses in Civil Action No. 2:19-CV-4519-CAS dated Sep. 15, 2020, 37 pages.
Defendant AMP Plus, Inc. D/B/A Elco Lighting's Supplemental Responses to Plaintiff DMF, Inc.'s First Set of Interrogatories (Nos. 1-16) in C.A. No. 2:19-CV-4519-CAS, Redacted, dated Jul. 29, 2020. 13 pages.
Final Written Decision in IPR2019-01094 dated Nov. 19, 2020, 58 pages.
International Search Report and Written Opinion in PCT/US 23/65292 dated Nov. 6, 2023, 31 pages.
Non-Final Office Action dated Oct. 5, 2023 from U.S. Appl. No. 17/328,214, 12 Pages.
Non-Final Office Action dated Oct. 16, 2023 from U.S. Appl. No. 17/694,489, 17 Pages.
Non-Final Office Action dated Oct. 23, 2023 from U.S. Appl. No. 17/381,147, 4 Pages.
Notice of Allowance dated Feb. 5, 2024 from U.S. Appl. No. 17/826,848, 8 Pages.

* cited by examiner

POLYMER HOUSING FOR A LIGHTING SYSTEM AND METHODS FOR USING SAME

CROSS-REFERENCE TO RELATED APPLICATION(S)

The present application is a continuation of, and claims priority to, U.S. Non-Provisional application Ser. No. 17/379,748, filed Jul. 19, 2021, entitled "POLYMER HOUSING FOR A LIGHTING SYSTEM AND METHODS FOR USING SAME," which claims priority to U.S. Provisional Application No. 63/121,163, filed Dec. 3, 2020, entitled "HOUSING WITH INTEGRATED BAR HANGER HOLDERS FORA LIGHTING SYSTEM," and U.S. Provisional Application No. 63/053,260, filed Jul. 17, 2020, entitled "HOUSING WITH INTEGRATED BAR HANGER HOLDERS FOR A LIGHTING SYSTEM." The present application also claims priority to Canadian Application No. 3124976, filed Jul. 16, 2021, entitled "POLYMER HOUSING FOR A LIGHTING SYSTEM AND METHODS FOR USING SAME." Each of the aforementioned applications is incorporated by reference herein in its entirety.

BACKGROUND

A conventional lighting system (also referred to herein as a "lighting fixture") typically includes a housing (also referred to as an "enclosure") to contain a lighting module, which includes a light source, a driver, and/or one or more wires. The housing is typically supported by various components (e.g., a pan frame, bar hanger holders, bar hangers) to form a housing assembly. The supporting components include mounting features to facilitate installation of the housing assembly onto one or more support structures in the environment. The mounting features often vary depending on the type of installation (e.g., a remodel lighting fixture, a new construction lighting fixture) and the type of support structure disposed in the environment to support the housing assembly.

For example, a conventional housing assembly for a recessed lighting system typically includes a can housing to contain a light source and a junction box to receive and contain wires from an electrical power supply of a building and wire splices to electrically couple the wires to the light source.

In a new construction installation, the can housing and the junction box are generally supported by a pan frame and one or more adjustable bar hanger assemblies coupled to the pan frame to mount the housing assembly to various support structures located within the ceiling (e.g., a wood joist or stud, a metal joist or stud, a T-bar). Each bar hanger assembly generally includes (1) a pair of telescopically adjustable bar hangers slidably coupled to the pan frame and (2) a bar hanger head on each bar hanger with one or more mounting features to couple to various support structures. Once the housing assembly is mounted to the support structures, a piece of drywall (or a wood panel) is then installed to cover the ceiling and an opening is then cut to expose the housing. A lighting module may then be inserted into the housing with a trim to cover the opening formed in the ceiling.

In a remodel installation, the can housing and the junction box are supported by a frame and the housing assembly is inserted directly through an opening formed in the drywall already installed in the ceiling. Said in another way, a remodel installation does not require access to support structures disposed within the ceiling for installation. The can housing typically includes multiple spring clips to directly mount the housing assembly to the drywall. Once the housing assembly is mounted to the drywall, the lighting module and the trim may be installed in the same manner as in the new construction installation.

SUMMARY

The Inventors, via previous innovative designs of lighting systems, have recognized and appreciated recessed lighting systems offer several benefits for ambient and task lighting including, but not limited to, making the environment appear larger (e.g., low ceiling environments), greater flexibility in tailoring lighting conditions (e.g., wall wash, directional, accent, general lighting), and fewer limitations on the installation location (e.g., a sloped ceiling, a vaulted ceiling, a wall). However, the Inventors have also recognized several limitations in the design and use of conventional housing assemblies for recessed lighting systems.

First, a conventional housing assembly typically includes a housing and other supporting components formed from sheet metal. Conventional sheet metal forming processes, however, are generally unsuitable for the production of complex-shaped components, such as a part with a variable wall thickness or a part with a rounded, enclosed wall with protruding structural features or flat sections. The formation of more complex structural features often entails additional processing steps, which can result in appreciably higher manufacturing costs. Furthermore, structural features that protrude from the surface of a part formed from sheet metal (e.g., a rib to structurally reinforce the part) can also be difficult to include, often entailing additional processing steps that add manufacturing time and cost or requiring the fabrication of separate parts that are subsequently attached together. In some instances, sheet metal components are formed from thicker sheet metal to achieve the desired structural rigidity at the expense of higher material costs.

As a result, conventional housings for recessed lighting systems formed from sheet metal are often constructed from an assembly of parts with a limited set of structural features to keep manufacturing costs down. For example, a typical housing assembly includes a housing to contain a lighting module (e.g., a can housing, a junction box). The housing is often formed from multiple pieces of sheet metal that are welded or riveted together. The walls of the housing may include one or more knockouts to receive and support electrical wiring. The housing assembly may further include separate mounting components to facilitate installation of the housing onto one or more support structures. For example, conventional housing assemblies often include a pan frame or bar hanger holders that are manufactured separately from the housing.

Second, conventional housing assemblies are often limited to one mode of installation. For example, a housing assembly typically includes two bar hanger assemblies that each couple the housing to two support structures in the environment for a total of four attachment points. The length of each bar hanger assembly may be adjusted in order to traverse gaps of varying size between the two support structures and each respective bar hanger head in the bar hanger assembly typically may include different mounting features to couple the bar hanger assembly to the support structures. However, the bar hanger assemblies are not suitable for installation if only a single support structure is available for installation. Furthermore, the bar hangers have a finite length, which may prevent installation of the housing assembly in more confined spaces. For example, neighboring support structures may be separated by a gap that is smaller than the length of one bar hanger.

Third, a recessed lighting system may be designed and installed to meet specific safety standards in order to operate in certain environments. For example, a recessed lighting system installed into multifamily residential buildings may be required to meet various fire-rating standards set forth, for example, by the National Electric Code (NEC) or the Underwriter's Laboratory (UL), which may entail adding a fire-rated enclosure (e.g., a firebox) to enclose the recessed lighting system. The addition of the fire-rated enclosure may further complicate the installation as well as increase the overall size of the lighting system, thus limiting installation in more confined spaces.

In view of the foregoing limitations of conventional housings and housing assemblies, the present disclosure is thus directed to various inventive implementations of a housing assembly for a recessed lighting system that includes a housing with integrally formed cable routing features (e.g., knockouts, Romex feedthroughs), mounting features supporting multiple modes of installation, and alignment features to aid the installation of the housing assembly. In one aspect, the housing may be formed from a polymer instead of sheet metal and fabricated using, for example, an injection molding process. Individual parts formed by injection molding can more readily include complex structural features compared to conventional sheet metal forming processes. In some implementations, the polymer housings described herein may also satisfy the various safety standards (e.g., a fire-rating standards), thus obviating the need for a separate fire-rated enclosure. Although the housing assemblies described herein may form part of a lighting system, it should be appreciated that, in some applications, the housing assemblies may also be used to contain only electrical components (e.g., electrical wiring) similar in function as a junction box.

In one aspect, the housings described herein may combine the functions of a conventional can housing and a junction box by containing both a lighting module and receiving electrical wiring from an external power supply system of a building (e.g., the building mains). The housing may include a sidewall and a cover that define a cavity to contain a light source and/or a driver of the lighting module. The housing may also contain electrical wires and/or cables that supply electrical power to the driver (e.g., electrical wires from an external power supply system) and one or more wire splices.

Generally, the housing may be shaped and/or dimensioned to support recessed lighting installations corresponding to different trade sizes (e.g., a 2-inch trade size lighting installation, a 3-inch trade size lighting installation, a 4-inch trade size lighting installation, a 5-inch trade size lighting installation, a 6-inch trade size lighting installation, a 7-inch trade size lighting installation, an 8-inch trade size lighting installation). For example, the housing may have an interior width (e.g., the interior width of the sidewall at the open end of the housing, the maximum interior width of the sidewall) that ranges between about 3 inches to about 6 inches. The housing may also have an exterior depth (e.g., the distance from the open end of the housing to the cover) that ranges between about 4 inches to about 5 inches.

The housing may also have various cross-sectional shapes including, but not limited to, a circle, an ellipse, a square hexagon, a regular polygon (e.g., a polygon where the sides are equal in length), an irregular polygon (e.g., a polygon where the sides are not equal in length), or any combinations of the foregoing. In some implementations, the sidewall may also be shaped to facilitate stacking of multiple housings onto one another to increase the packing density during shipment. For example, the sidewall maybe tapered such that the characteristic width of the sidewall near the cover is smaller than the characteristic width of the sidewall at the open end. The width of the sidewall may further increase monotonically from the cover to the open end. In some implementations, the sidewall may also have a stepped profile or geometry where the sidewall is divided into at least three sidewall sections. For example, the sidewall may include a first sidewall section disposed near the cover, a second sidewall section joined to the first sidewall section, and a third sidewall section joined to the second sidewall section and including the open end. The first sidewall section may be dimensioned to have an exterior width that is smaller than an interior width of the third sidewall section. In this manner, the first sidewall section of one housing may fit within the portion of the cavity defined by the third sidewall section of another housing. The second sidewall section may further form a step upon which the bottom end of one housing may rest on the second sidewall section of another housing.

The housing may further include one or more removable knockouts and/or bendable Romex feedthrough tabs to receive a non-metallic sheathed cable (e.g., a Romex cable) or a metallic sheathed cable (e.g., a metal conduit) from the external power supply system, another lighting system in a daisy-chain configuration, or a separate junction box. In some implementations, the knockouts and/or the Romex feedthroughs may support electrical wiring that supplies electrical power to another lighting system in a daisy-chain configuration. The cables and/or wires may provide alternating current (AC) or direct current (DC) at standard voltages of at least about 120V. In some implementations, the housing may be dimensioned to have a cavity with sufficient volume to contain one or more wire splices for wires of varying gauge. For example, the housing may be dimensioned to comply with the requirements set forth in Article 314 of the 2020 NEC and, in particular, Section 314.16 entitled, "Number of Conductors in Outlet, Device, and Junction Boxes, and Conduit Bodies."

In some implementations, the housing may be designed for a new construction installation where the housing assembly is installed into a ceiling space prior to be enclosed by a drywall panel. Specifically, the housing may include one or more bar hanger holders integrally formed along the sidewall where each bar hanger holder supports and guides a respective pair of bar hangers to facilitate installation onto two support structures (e.g., a wood/metal joist or stud, a T-bar). The housing may also include an integrally formed fastener opening for each bar hanger holder to receive a locking fastener to lock the housing and the bar hangers in place. The housing may also include one or more notches formed along an open end of the housing to align the housing to other structures in the environment (e.g., another housing assembly). The housing assembly may thus include corresponding pairs of bar hangers supported by the bar hanger holders of the housing that each have a bar hanger head to mount the housing assembly onto the support structure via, for example, one or more fasteners.

The housing may also include one or more nail-in features joined to the sidewall to enable installation of the housing onto a single support structure. Specifically, the nail-in features may define a through hole to support and guide a fastener (e.g., a nail, a screw, a scrail) to directly attach the housing to the support structure. In some implementations, the fastener may be a wood screw specifically tailored to engage and fasten to a wood joist. The housing may further include one or more alignment features to align the housing to the support structure during installation. For example, the housing may include a mounting platform, a lip, one or more ribs, and/or one or more tabs protruding from the sidewall to physically contact one or more sides and/or corners of the support structure. In this manner, the housing may support several modes of installation (e.g., using an individual or multiple support structures).

In some implementations, the housing may include two nail-in features that are oriented at acute angles such that the two fasteners, when inserted through the corresponding through holes of the nail-in features and attached to the support structure, more stably support the housing. In some implementations, the nail-in features may be further angled upwards or downwards (when installing the housing into a ceiling space) to provide additional clearance for a tool (e.g., a hammer) to contact the fasteners.

In some implementations, the housing may be designed for a remodel installation where the housing assembly is inserted through an opening in a drywall panel and directly mounted to the drywall panel without requiring removal of the drywall panel. The housing may include a flange integrally formed on the open end of the housing to physically contact a bottom surface of the drywall panel (e.g., the surface facing an interior environment illuminated by the recessed lighting system). The housing assembly may include one or more spring clips mounted directly to the housing to physically contact a top surface of the drywall panel (e.g., the surface facing the ceiling space) when actuated. In this manner, the flange and the spring clips may securely couple the housing to the drywall panel. In some implementations, the housing may include openings formed along the sidewall to receive a portion of a corresponding spring clip to enable actuation of the spring clip from within the cavity of the housing and, by extension, through the open end of the housing once the housing is inserted through the opening of the drywall panel.

As noted above, the housings described herein are formed from a polymer, which provides greater flexibility in terms of manufacturability compared to conventional housings formed from sheet metal. For example, the housing may be fabricated using injection molding processes, which allows the housing to have more complex-shaped features (e.g., a circularly shaped sidewall and cavity, the bar hanger holders, the nail-in features, the knockouts and/or feedthrough tabs). The housing may be formed from various thermoplastic and thermosetting polymers including, but not limited to, polyvinyl chloride (PVC), acrylonitrile butadiene styrene (ABS), polycarbonate (PC), polyurethane (PU), polyethylene, polyethylene terephthalate, polypropylene, and polystyrene.

Polymer housings, when compared to conventional metal housings, are generally lighter weight, which can improve ease of handling during installation, and lower cost. Polymer housings may also more readily meet various safety standards. For example, polymer materials are generally more thermally insulating than metals and thus provide a more effective heat barrier to reduce the transfer of heat generated by the light source and/or the driver to other materials in the ceiling space (e.g., building thermal insulation materials). In some implementations, the housing may satisfy various fire-rating safety standards set forth by various organizations including, but not limited to, the NEC, the UL, the American Society for Testing and Materials (ASTM), and the National Fire Protection Association (NFPA).

Although the exemplary remodel and new construction installations of the housings and housing assemblies described herein are for a ceiling installation, it should be appreciated the same or similar housings and housing assemblies may be installed on a wall or a floor. Furthermore, the housings and housing assemblies are not limited for use with a drywall panel, but may also be used with a wood panel, and flooring materials.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 24I shows an exploded top, right, front perspective view of the housing assembly of FIG. 24A.

DETAILED DESCRIPTION

Figure 1A:
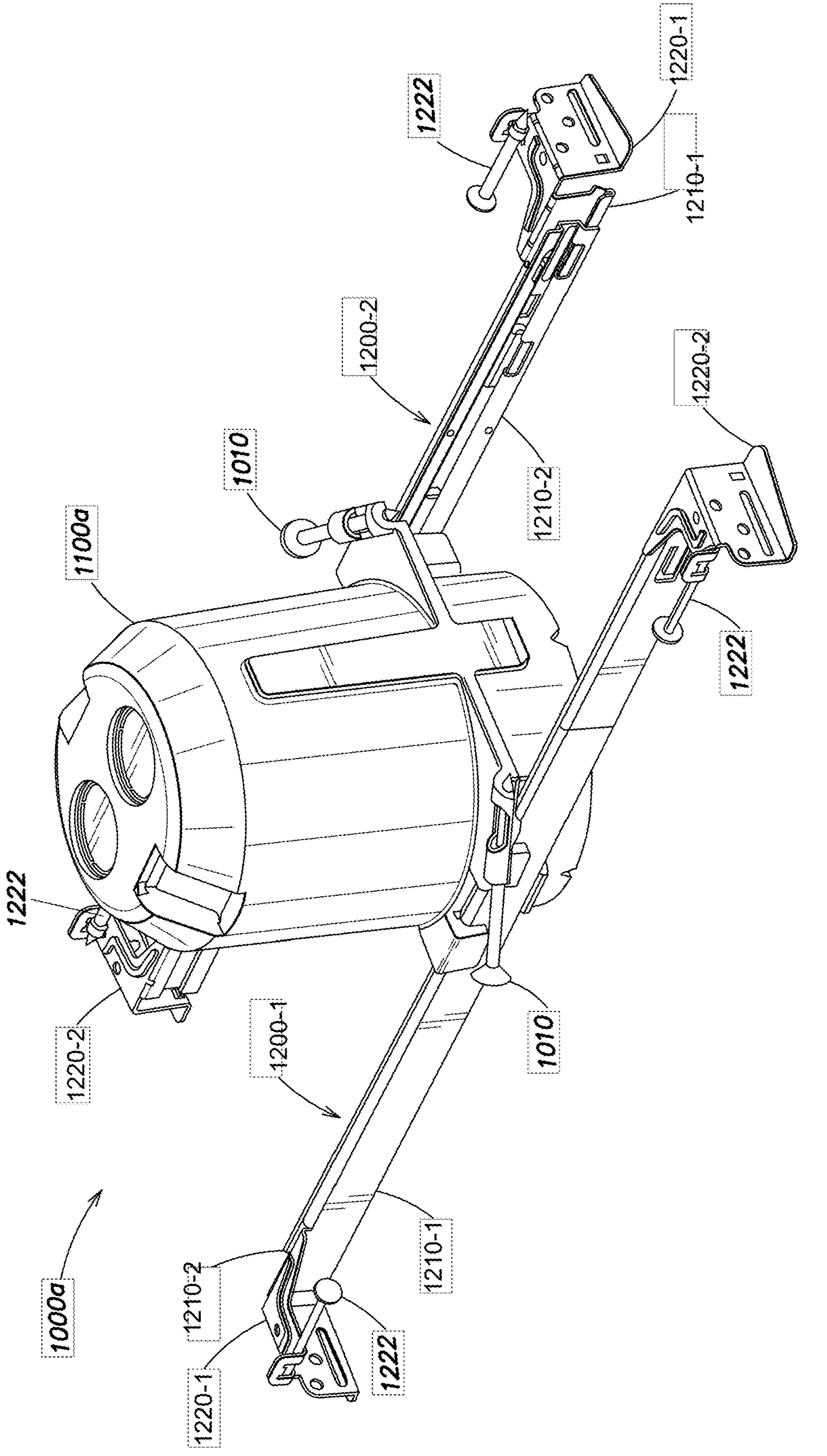
FIG. 1A shows a top, left, rear perspective view of an exemplary housing assembly for a new construction installation of a 3-inch trade size lighting system.
Figure 1B:
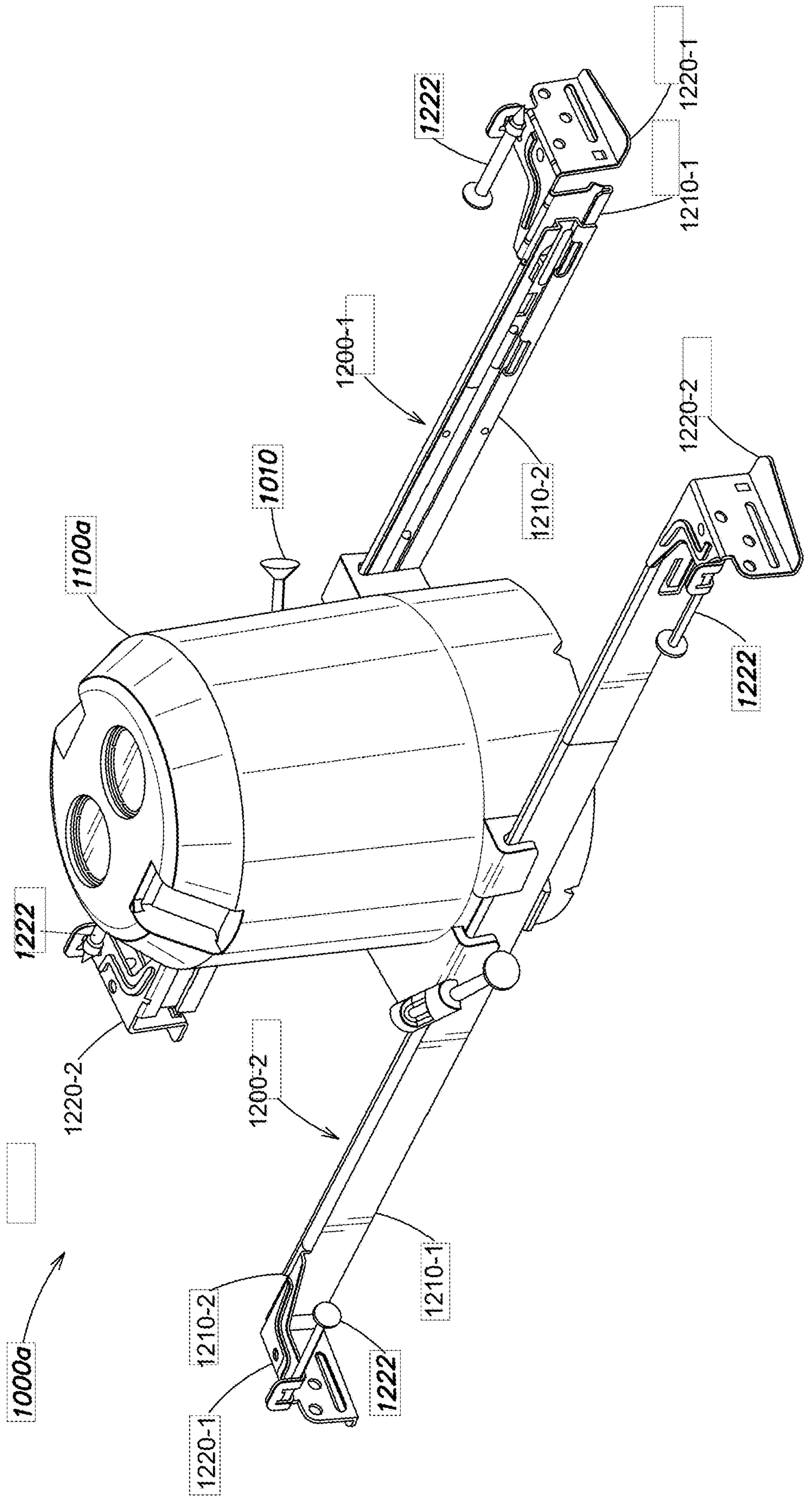
FIG. 1B shows a top, right, front perspective view of the housing assembly of FIG. 1A.
Figure 1C:
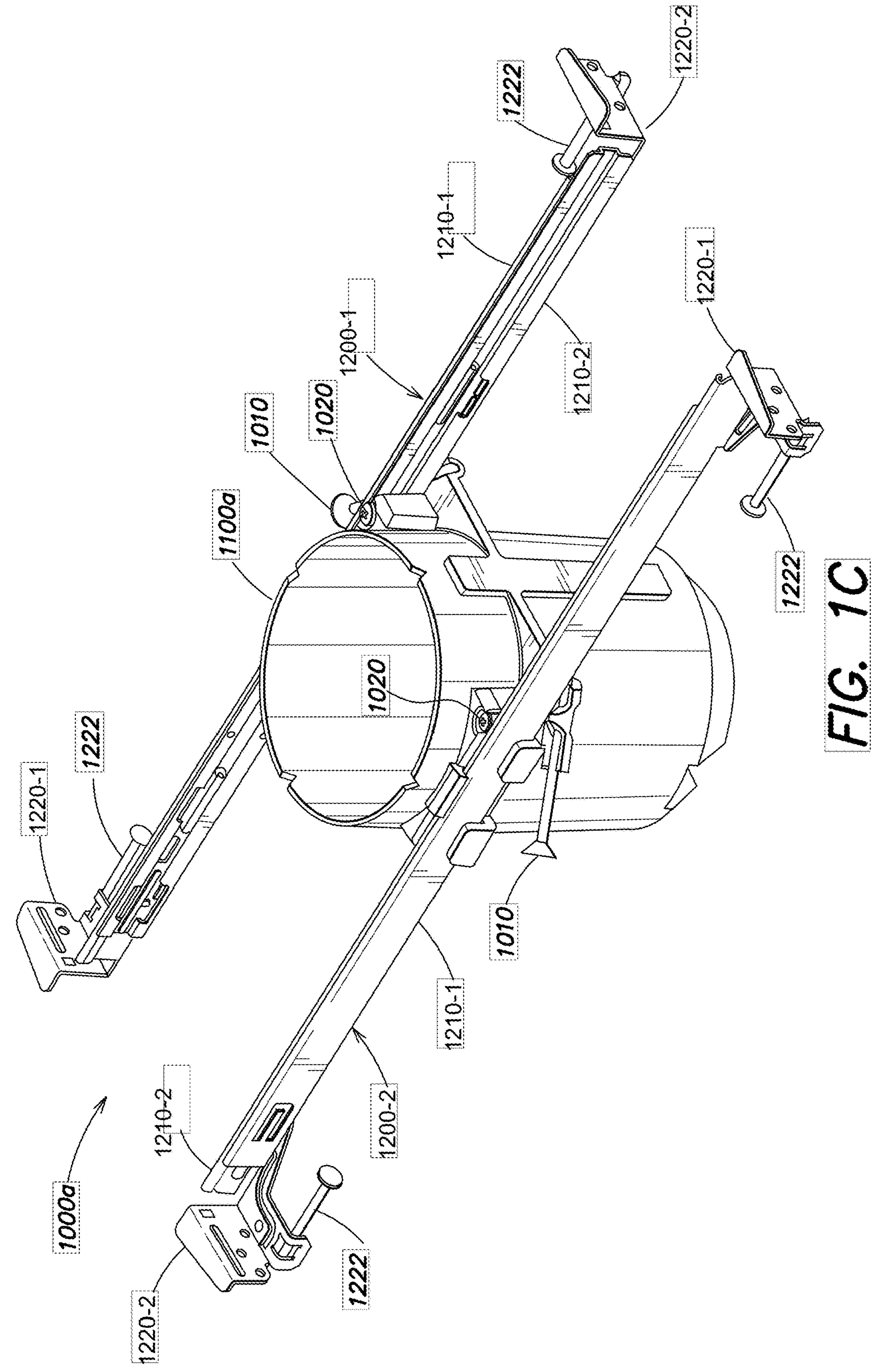
FIG. 1C shows a bottom, left, rear perspective view of the housing assembly of FIG. 1A.
Figure 1D:
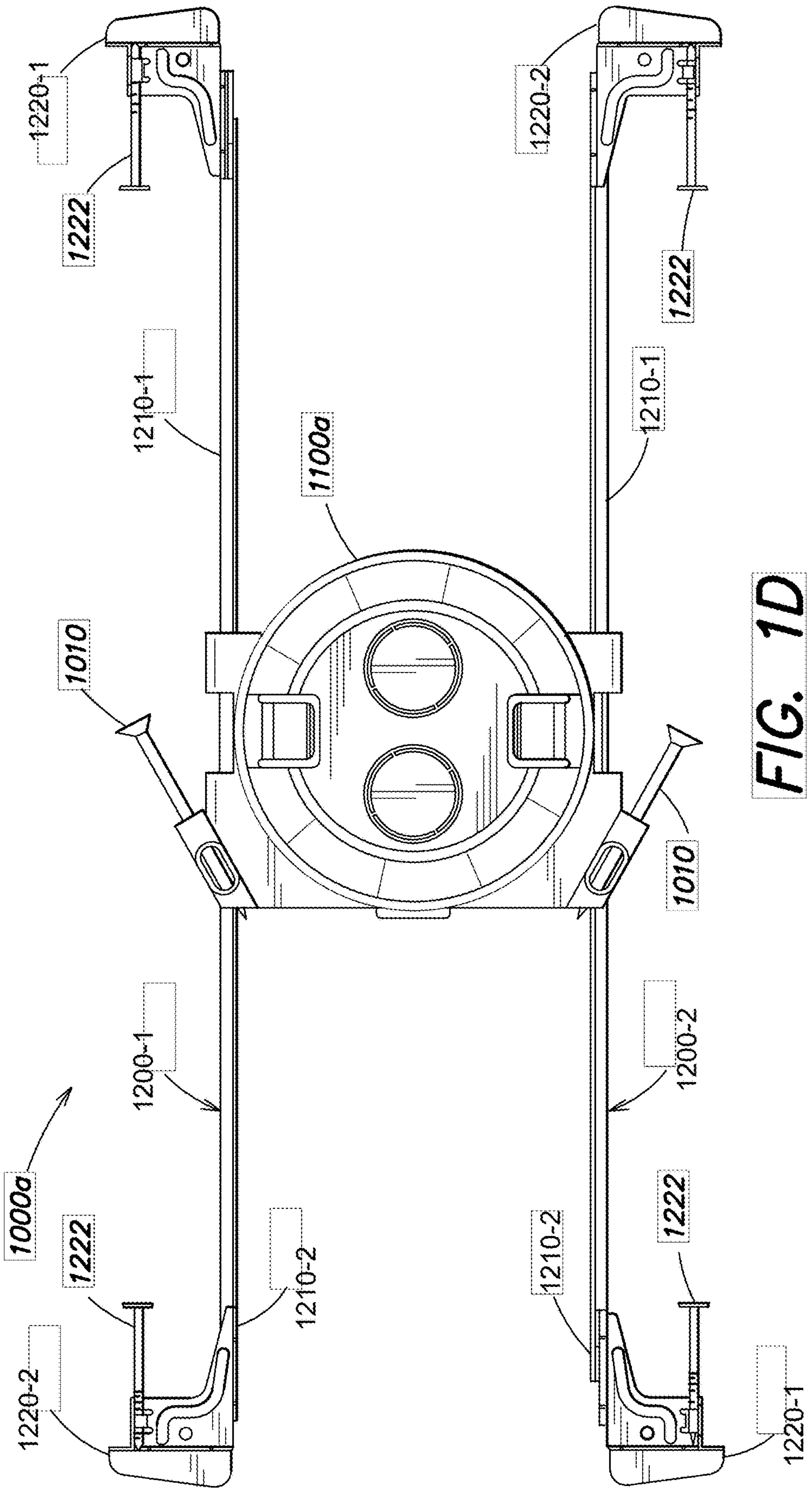
FIG. 1D shows a top view of the housing assembly of FIG. 1A.
Figure 1E:
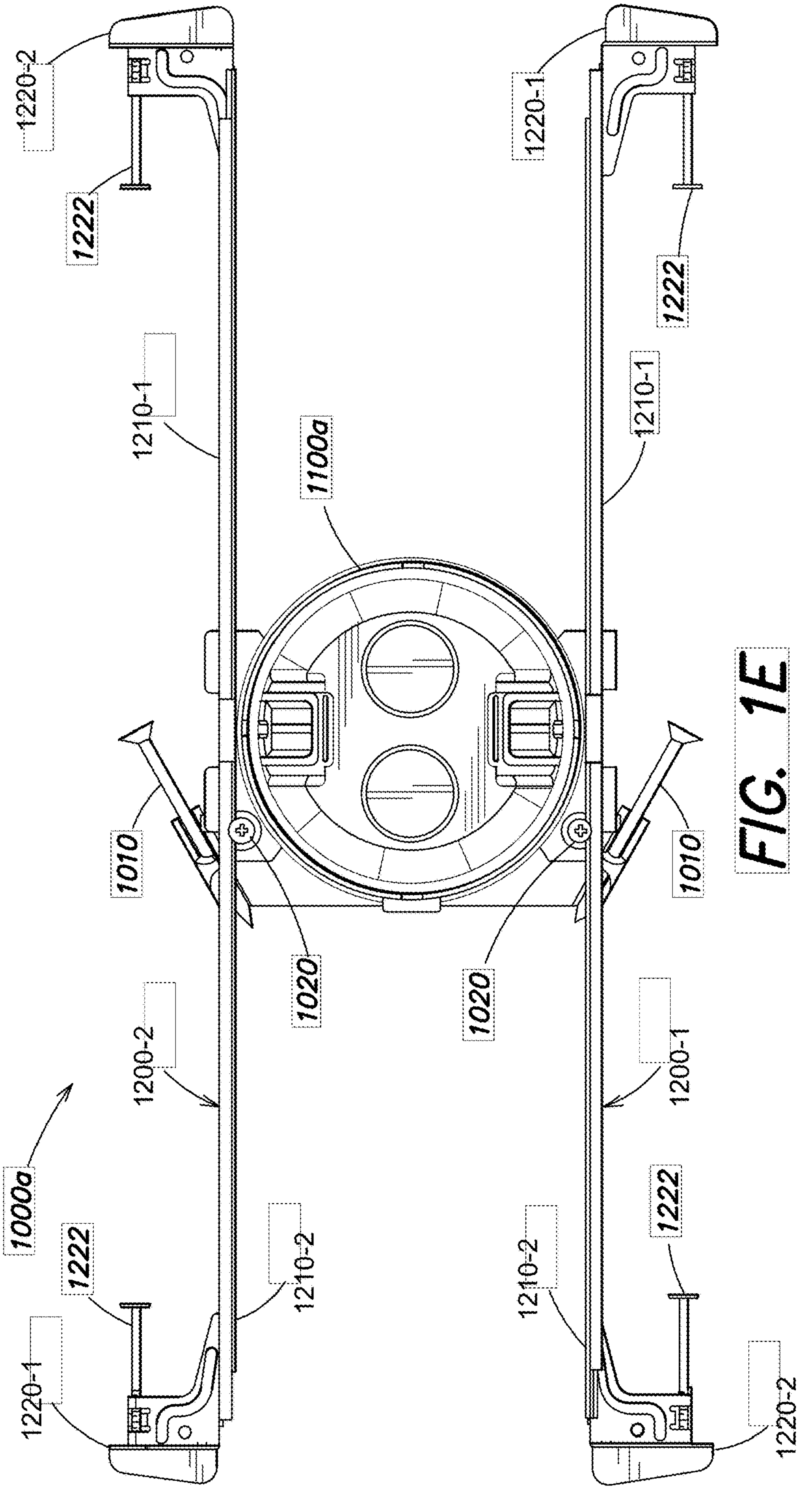
FIG. 1E shows a bottom view of the housing assembly of FIG. 1A.

Following below are more detailed descriptions of various concepts related to, and implementations of, a housing for a recessed lighting system with integrally formed cable routing features, mounting features, and alignment features, such as an integrated bar hanger holder, an integrated nail-in feature, a flange, and/or knockouts and Romex feedthroughs. It should be appreciated that various concepts introduced above and discussed in greater detail below may be implemented in multiple ways. Examples of specific implementations and applications are provided primarily for illustrative purposes so as to enable those skilled in the art to practice the implementations and alternatives apparent to those skilled in the art.

The figures and example implementations described below are not meant to limit the scope of the present implementations to a single embodiment. Other implementations are possible by way of interchange of some or all of the described or illustrated elements. Moreover, where certain elements of the disclosed example implementations may be partially or fully implemented using known components, in some instances only those portions of such known components that are necessary for an understanding of the present implementations are described, and detailed descriptions of other portions of such known components are omitted so as not to obscure the present implementations.

In the discussion below, various examples of inventive housing assemblies are provided, wherein a given example or set of examples showcases one or more particular features of a housing assembly that includes a polymer housing with a bar hanger holder, a nail-in feature, a flange, a knockout, a feedthrough tab, ribs for alignment during installation, tabs for alignment during installation as well as spring clips. It should be appreciated that one or more features discussed in connection with a given example of a housing assembly may be employed in other examples of housing assemblies according to the present disclosure, such that the various features disclosed herein may be readily combined in a given housing assembly according to the present disclosure (provided that respective features are not mutually inconsistent).

Certain dimensions and features of the housing assembly, the housing, the bar hangers, and/or the spring clips are described herein using the terms "approximately," "about," "substantially," and/or "similar." As used herein, the terms "approximately," "about," "substantially," and/or "similar" indicates that each of the described dimensions or features is not a strict boundary or parameter and does not exclude functionally similar variations therefrom. Unless context or the description indicates otherwise, the use of the terms "approximately," "about," "substantially," and/or "similar" in connection with a numerical parameter indicates that the numerical parameter includes variations that, using mathematical and industrial principles accepted in the art (e.g., rounding, measurement or other systematic errors, manufacturing tolerances, etc.), would not vary the least significant digit.

A Housing Assembly for a New Construction Installation

FIGS. 1A-1M show several views of an exemplary housing assembly 1000*a* with a housing 1100*a* for a new construction installation of a 3-inch trade size lighting system. In a typical new construction installation, the housing assembly 1000*a* is installed before the construction of the environment is complete. For example, a ceiling space may have exposed support structures (e.g., a wood/metal joist or stud, a T-bar, a hat channel) before a drywall panel is installed to enclose the ceiling space. The housing assembly 1000*a* may be first mounted to one or more of the support structures. Once the housing assembly 1000*a* is installed, various electrical wiring and/or cabling may be routed into the housing and the drywall panel may then be installed to enclose the ceiling space and the support structures. An opening may then be cut to reveal the housing 1100*a* and a light source (not shown) and associated electronics, such as a driver (not shown), may then be inserted into the housing 1100*a* and electrically coupled to an external electrical power supply system (e.g., building mains, another lighting system).

In some implementations, the housing may be tailored in shape and/or dimensions to accommodate a particular trade size. For example, the housing 1100*a* may be a 3-inch housing (i.e., the housing 1100*a* has a 3-inch trade size) that may be used as part of a 3-inch lighting installation where the housing 1100*a* may fit into an opening formed in a ceiling having, for example, a diameter ranging between about 3 inches to about 3.5 inches. It should be appreciated the housing 1100*a* may be used in installations with a different trade size (e.g., a 2-inch trade size lighting installation, a 3-inch trade size lighting installation, a 4-inch trade size lighting installation, a 5-inch trade size lighting installation, a 6-inch trade size lighting installation, a 7-inch trade size lighting installation, an 8-inch trade size lighting installation) where the diameter of the opening in the ceiling is scaled according to the trade size. It should also be appreciated that the housing 1100*a* may be scaled in size such that the housing has a trade size that ranges between 2 inches to 8 inches.

As shown, the housing 1100*a* defines a cavity 1104 and has an opening 1102 providing access into the cavity 1104. During installation of the lighting system, the lighting components (e.g., the light source, the driver) are inserted into the cavity through the opening 1102. During operation of the lighting system, the light source emits light through the opening 1102 and into the environment being illuminated. In some implementations, the lighting components may be packaged as a lighting module to improve ease of handling and installation. For example, the lighting module may include a separate module housing (also referred to herein as a "secondary housing") that supports and substantially contains the light source and/or the driver. In this manner, the module housing, together with the light source and/or the driver, may be inserted through the opening 1102 and into the cavity 1104 during assembly and/or subsequent replacement.

The housing 1100*a* may also contain, in part, a trim (not shown) to cover the opening 1102 and the opening formed in the ceiling through which the housing 1100*a* is disposed. In some implementations, the lighting module may not be directly coupled to the housing 1100*a* (e.g., the lighting module does not physically contact the housing 1100*a*). Instead, the lighting module may be coupled to the housing 1100*a* via the trim. For example, the lighting module may be coupled to the trim via a first coupling mechanism (e.g., a twist and lock mechanism, a snap-fit connector) and the trim, in turn, may include a second coupling mechanism (e.g., a friction clip, a spring clip, a sharp clip (e.g., a mechanism that bites into the housing 1100*a*), a snap-fit connection, and a screw fastener) to couple the trim to the sidewall 1110*a* of the housing 1100*a*. During installation, the lighting module and the trim may be inserted into the cavity 1104 together through the opening 1102 of the housing 1100*a*. In some implementations, the lighting module may include an integrated trim (e.g., the trim is formed as part of the module housing) to reduce the number of parts for assembly of the lighting system. As before, the lighting module with the integrated trim may be inserted into the housing 1100*a* as a single unit.

The housing 1100*a* may further include one or more knockouts 1122 and/or Romex feedthrough tabs 1132 to route electrical cables and wires into the cavity 1104 to supply electrical power to the light source. In some implementations, the electrical cables and wires may transmit electrical power to another lighting system in a daisy-chain configuration.

To mount the housing 1100*a* to one or more support structures, the housing 1100*a* may include integrally formed bar hanger holders 1160*a*-1 and 1160*a*-2 (collectively referred to herein as a "bar hanger holder 1160*a*") to support and guide corresponding bar hanger assemblies 1200-1 and 1200-2, respectively. The bar hanger assemblies 1200-1 and 1200-2 (collectively referred to herein as "a bar hanger assembly 1200") may each include a pair of bar hangers 1210-1 and 1210-2 with bar hanger heads 1220-1 and 1220-2, respectively, to couple the housing 1100*a* to two (or more) support structures using, for example, corresponding fasteners 1222.

The bar hangers 1210-1 and 1210-2 may be slidably coupled to the bar hanger holder 1160*a* and telescopically slidable with respect to each other. In this manner, the length of the bar hanger assemblies 1200-1 and 1200-2 may be adjusted to traverse a gap between two support structures in the environment. The position of the housing 1100*a* along the bar hanger assemblies 1200-1 and 1200-2 may also be adjusted to place the housing 1100*a* at a desired location in the environment. The housing 1100*a* may further include integrally formed fastener openings 1170 for each bar hanger holder 1160*a* to receive corresponding locking fasteners 1020 to lock the position of the housing 1100*a* along the bar hanger assemblies 1200-1 and 1200-2. Said in another way, the fastener 1020 prevents the housing 1100*a* from sliding along the bar hangers 1210-1 and 1210-2 when sufficiently tightened.

The housing 1100*a* may also include integrally formed nail-in features 1150*a*-1 and 1150*a*-2 (collectively referred to herein as a "nail-in feature 1150") to directly mount the housing 1100*a* to a single support structure. Each nail-in feature 1150 may include a cylindrical wall 1153 that defines a through hole 1152 to receive a fastener 1010. During installation, the fasteners 1010 may be inserted into corresponding through holes 1152 and into the support structure (e.g., a joist) to securely couple the housing 1100*a* to the support structure. In this manner, the placement and orientation of the nail-in features 1150*a*-1 and 1150*a*-1 may provide multiple attachment points to couple the housing 1100*a* to a single support structure.

It should be appreciated that some of the components of the housing assembly 1000*a* may be excluded during installation or when sold as a product depending, in part, on the desired mode of installation. For example, the housing assembly 1000*a* may not include the fasteners 1010 if the bar hanger assemblies 1200*a* and 1200*b* are used for installation. Similarly, the housing assembly 1000*a* may not include the bar hanger assemblies 1200-1 and 1200-2 and the fasteners 1020 and 1222 if the nail-in features 1150*a* are used for installation.

Figure 2A:
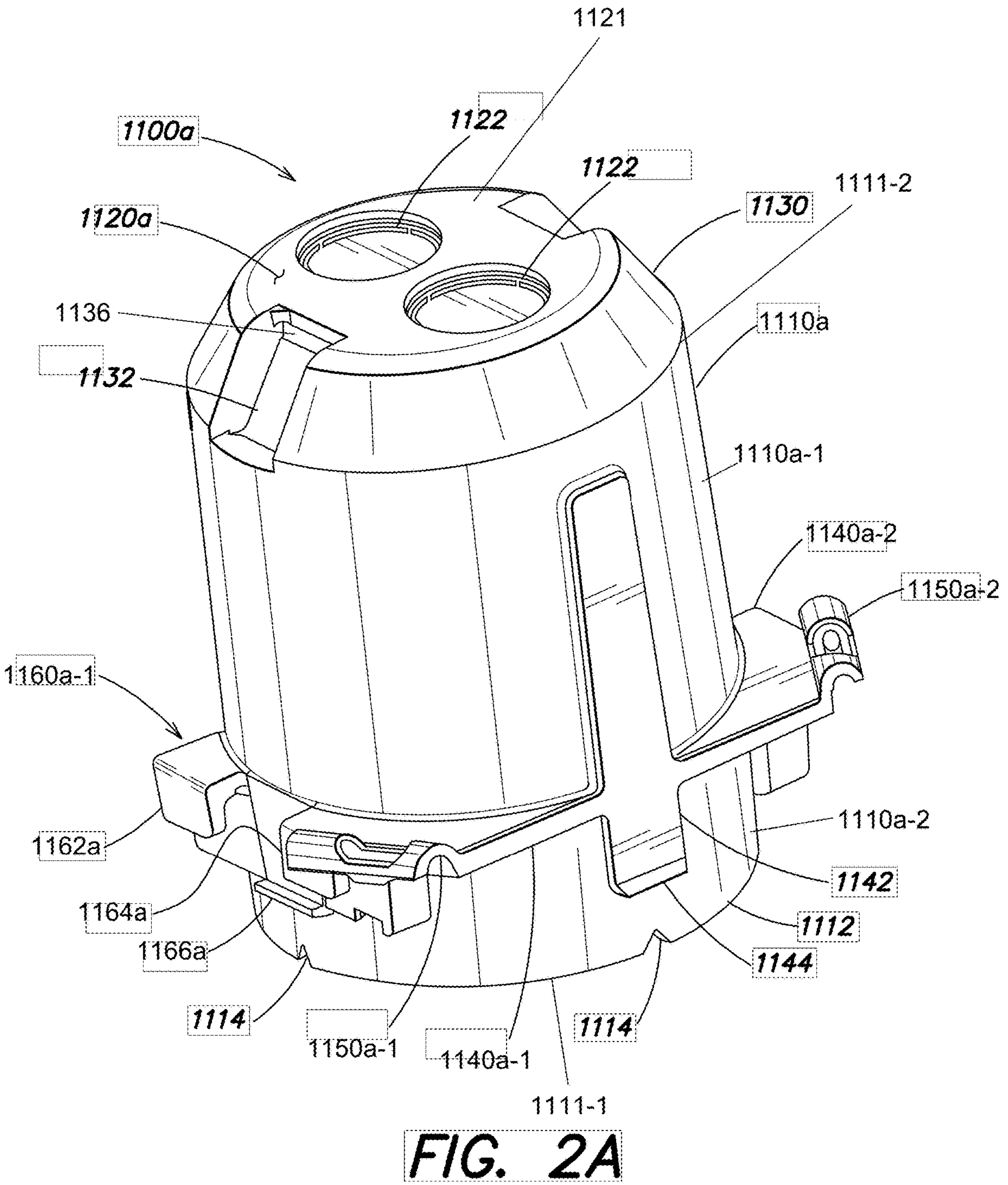
FIG. 2A shows a top, left, rear perspective view of the housing in the housing assembly of FIG. 1A.
Figure 2B:
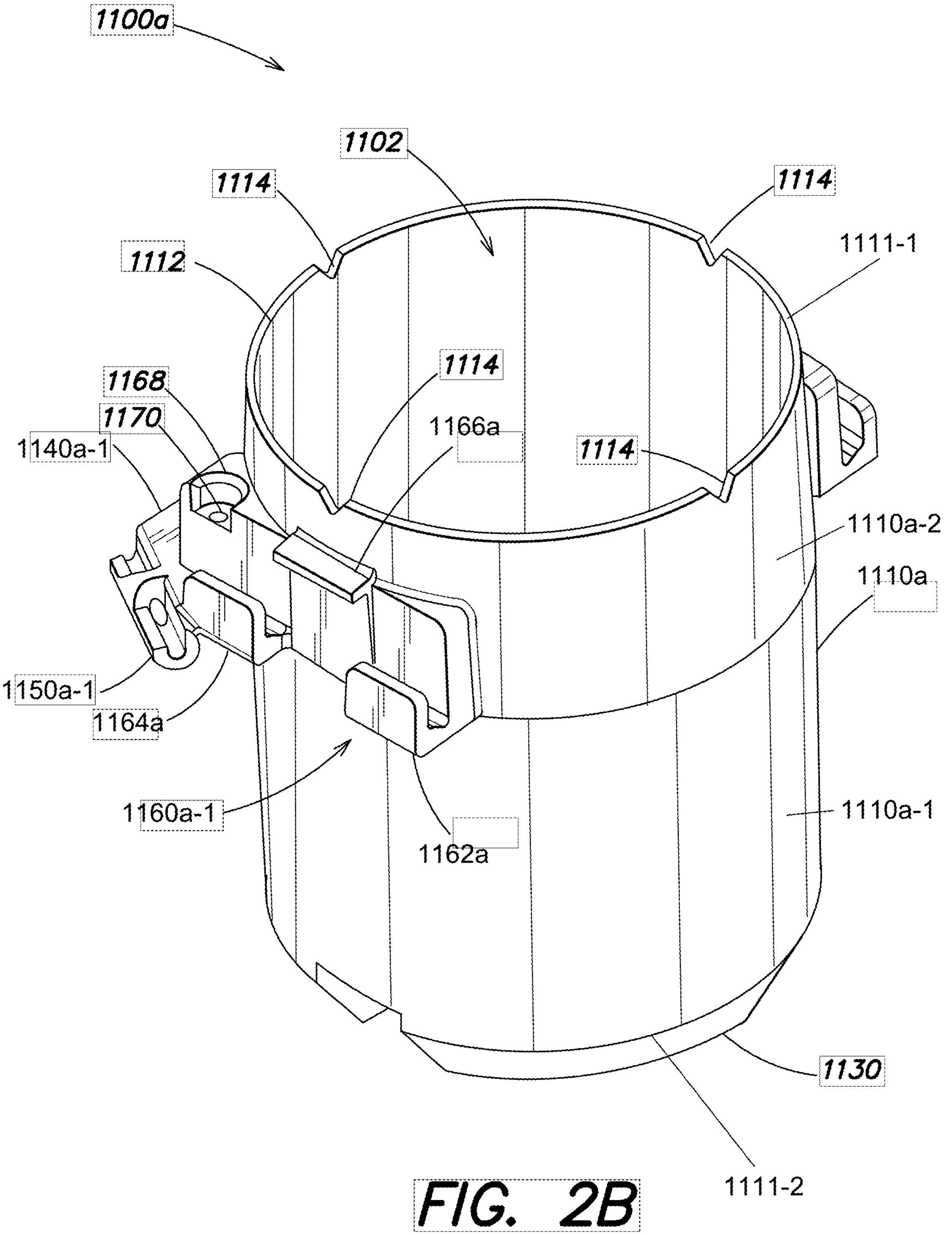
FIG. 2B shows a bottom, right, rear perspective view of the housing of FIG. 2A.

FIGS. 2A-2J show several views of the housing 1100*a*. As shown, the housing 1100*a* may include a sidewall 1110*a* and a cover 1120*a* (also referred to herein as a "cover section 1120*a*") that together define the cavity 1104 and the opening 1102. Specifically, the sidewall 1110*a* may have a first end 1111-1 that includes an interior edge 1112 defining the opening 1102. The sidewall 1110*a* may also include a second end 1111-2 joined to the cover 1120*a*. In some implementations, the cover 1120*a* may include a base end 1121 and a tapered wall 1130 that joins the base end 1121 to the sidewall 1110*a* as shown in FIG. 2A.

The cover 1120*a* may generally conform in shape with the sidewall 1110*a*. For example, the housing 1100*a* may be substantially cylindrical in shape (e.g., the sidewall 1110*a* may have a substantially circular or circular cross-sectional shape). The base end 1121 and the tapered wall 1130 may similarly have a circular shape. It should be appreciated, however, that the housing 1100*a* may have other shapes. Generally, the sidewall 1110*a* may have a cross-section that has various shapes including, but not limited to, a circle, an ellipse, a square hexagon, a regular polygon (e.g., a polygon where the sides are equal in length), an irregular polygon (e.g., a polygon where the sides are not equal in length), or any combinations of the foregoing. In some implementations, the at least a portion of the sidewall 1110*a* may have a cross-section shaped as an annulus (i.e., concentric circles) corresponding to the interior and exterior sides of the sidewall 1110*a*.

In some implementations, the sidewall 1110*a* may also have a tapered profile. For example, FIGS. 2E and 2F show the sidewall 1110*a* may include a first sidewall section 1110*a*-1 joined to the cover 1120*a* and a second sidewall section 1110*a*-2 joined to the first sidewall section 1110*a*-1 and the first end 1111-1. As shown, the first sidewall section 1110*a*-1 may be tapered (i.e., have a draft angle) such that the exterior width increases monotonically from the cover 1120*a* to the second sidewall section 1110*a*-2. The second sidewall section 1110*a*-2 may be tapered such that the exterior width increases monotonically from the first end 1111-1 to the first sidewall section 1110*a*-1. In other words, the largest exterior width of the sidewall 1100*a* may occur where the first and second sidewall sections 1110*a*-1 and the 1110*a*-2 meet. FIGS. 2H and 2I further show the sidewall 1110*a* may have an interior width that monotonically increases from the second end 1111-2 to the first end 1111-1. In other words, the thickness of the sidewall 1110*a* may vary due to the tapered profile along its exterior surface.

The tapered profile may help to improve manufacturability of the housing 1100*a*. For example, the housing 1100*a* may be formed of injection molded plastic using a first mold covering the first sidewall section 1110*a*-1 and a second mold covering the second sidewall section 1110*a*-2. The tapered profile may aid the removal of the respective molds after the housing 1100*a* is formed.

In some implementations, tapered profile may also facilitate stacking of multiple housings 1100*a* onto to one another to increase the packing density during shipment. For example, the exterior width of the first sidewall section 1110*a*-1 near the cover 1120*a* may be smaller than the interior width of the second sidewall section 1110*a*-2 near the first end 1111-1 such that the top portion of the housing 1100*a* encompassing the cover 1120*a* and at least a portion of the first sidewall section 1110*a*-1 may fit within the bottom portion of the cavity 1104 of another housing 1100*a*. Additional examples of a sidewall profile to facilitate stacking of housings will be discussed in further detail below (see, for example, the housing 1100*e*).

As described above, the housing 1100*a* may also be shaped and/or dimensioned to provide a sufficiently large cavity 1104 to contain the various lighting components (e.g., the lighting module), at least a portion of the trim (not shown), and/or one or more wire splices and corresponding wires. In some implementations, the housing 1100*a* may contain a lighting module that has an exterior width of about 3 inches. In order to provide sufficient clearance for the lighting module and the trim, the cavity 1104 may have an interior width ($D_{int}$) that is about 3.25 inches. It should be appreciated the housing 1100*a* may be scaled in size to accommodate different-sized lighting modules. For example, the lighting modules may generally have an exterior width that ranges between about 3 inches and about 4 inches. The interior width ($D_{int}$) of the cavity 1104 may generally range between about 3 inches to about 6 inches. In some implementations, the interior width ($D_{int}$) of the cavity 1104 ranges between about 3 inches and about 4.5 inches.

The housing 1100*a* may also have an exterior depth ($H_{ext}$) chosen in part, to accommodate smaller, more confined spaces in the ceiling while providing a sufficiently deep cavity 1104 for the desired trade size of the installation. For example, the exterior depth may be chosen such that the lighting module is positioned at a sufficient distance from the opening 1102 to reduce glare. The housing 1100*a* may have an exterior depth ($H_{ext}$) of about 4.5 inches to accommodate the 3-inch trade size lighting installation. More generally, the exterior depth ($H_{ext}$) of the housing 1100*a* may range between about 4 inches and about 5 inches, or between about 3 inches and about 6 inches.

The term "about," when used to describe the various dimensions of the housing 1100*a*, is intended to cover manufacturing tolerances. For example, "about 3 inches" may correspond to the following dimensional ranges: 2.97 to 3.03 inches (+/−1% tolerance), 2.976 to 3.024 inches (+/−0.8% tolerance), 2.982 to 3.018 inches (+/−0.6% tolerance), 2.988 to 3.012 inches (+/−0.4% tolerance), 2.994 to 3.006 inches (+/−0.2% tolerance).

In some implementations, the dimensions of the housing 1100*a* and, by extension, the volume of the cavity 1104 may be chosen based on the number and/or the size of the cables, wires, and/or conductors that are routed into the housing 1100*a* and disposed within the remaining, unoccupied portion of the cavity 1104 after a lighting module and/or a portion of the trim are inserted into the cavity 1104 of the housing 1100*a*. Said in another way, the housing 1100*a* may be dimensioned to provide a desired volume allowance (i.e., the available free space within the cavity 1104) for each cable, wire, and/or conductor disposed within the housing 1100*a*.

For example, the dimensions of the housing 1100*a* may be chosen to comply with the requirements set forth in Article 314 of the 2020 NEC and, in particular, Section 314.16 entitled, "Number of Conductors in Outlet, Device, and Junction Boxes, and Conduit Bodies." For instance, the housing 1100*a* may be dimensioned such that, after a lighting module and/or at least a portion of the trim are inserted into the housing 1100*a*, the remaining portion of the cavity 1104 provides a volume allowance of 1.5 cubic inches for each 18 AWG conductor disposed within the cavity 1104 and/or a volume allowance of 5.0 cubic inches for each 6 AWG conductor disposed within the cavity 1104. Said in another way, the housing 1100*a* may be dimensioned such that the remaining space within the cavity 1104 after the lighting module and the trim are installed is sufficient to contain (1) three 12 AWG wires, cables, and/or conductors (e.g., a load wire, a neutral wire, a ground wire) that are routed into the housing 1100*e* and (2) three 12 AWG wires, cables, and/or conductors that are routed out of the housing 1100*e* for connection with another lighting system or an electrical switch. It should be appreciated that wires, cables, and/or conductors of different size (e.g., 14 AWG, 22 AWG) may also be routed into or out of the housing 1100*a* as well.

The housing 1100*a* may include one or more knockouts 1122, which may be removed to provide an opening for a cable or a wire (e.g., a metal conduit cable) to be inserted from the environment (e.g., a ceiling space) into the cavity 1104. As shown in FIGS. 2A, 2I, and 2J, the knockouts 1122 may have a thickness smaller than the base end 1121 to facilitate removal. The periphery of the knockouts 1122 may further include one or more recesses, which further reduces the thickness of the knockout 1122 to facilitate removal of the knockout 1122 along its periphery. The dimensions and, in particular, the thickness of the knockout 1122 may be chosen, in part, to facilitate removal by hand (e.g., the user presses onto the knockout until snaps off) or with a tool (e.g., the user uses a hammer or a screwdriver to facilitate removal). The knockouts 1122 may also be positioned so as to not protrude outwards from the interior side and the exterior side of the base end 1121.

Figure 2C:
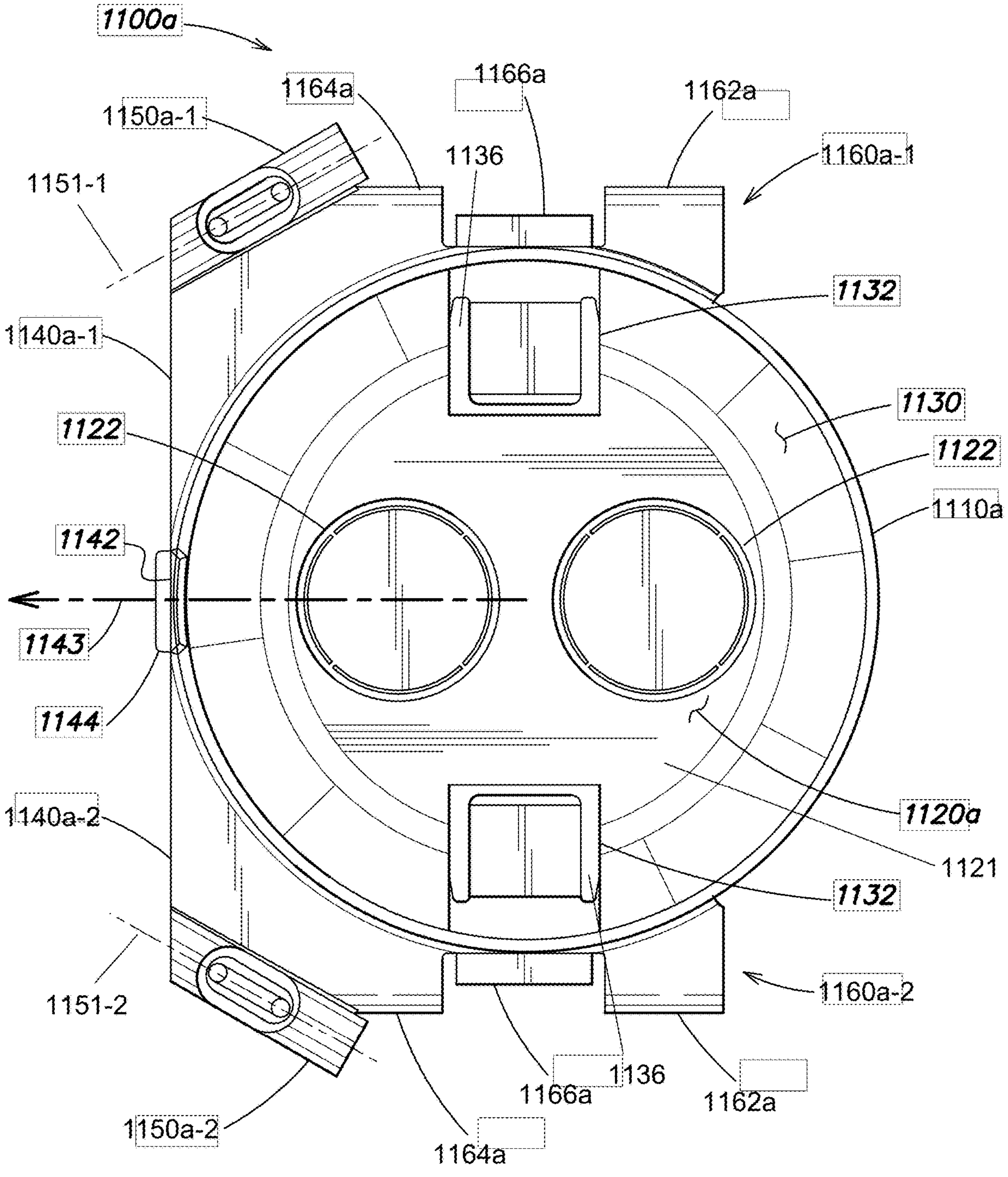
FIG. 2C shows a top view of the housing of FIG. 2A.

FIGS. 2A and 2C also show the knockouts 1122 may be identical. However, it should be appreciated the housing 1100*a* in other implementations may include different-sized knockouts 1122 to accommodate, for example, different wire gauges, different jacket sizes of the wire, and/or a different number of wires routed through a single knockout. Different sized wires may be used depending on the electrical requirements of the lighting system (e.g., the mains voltage, the current rating). Furthermore, the housing 1100*a* may include multiple knockouts 1122 so that multiple cables and/or wires can pass through the housing assembly 1000*a*. For example, the housing assembly 1000*a* may receive wiring from a building power supply or another lighting system through one knockout 1122 and provide wiring through another knockout 1122 to supply electrical power to another lighting system in a daisy-chain configuration.

In some implementations, the housing 1100*a* may only include one pair of knockouts 1122 disposed on the base end 1121. Additionally, the pair of knockouts 1122 may be arranged such that the housing 1100*a* has a symmetry plane that bisects each of the knockouts 1122 (e.g., a vertical plane parallel to a front/rear plane of the housing 1100*a*).

The housing 1100*a* may also include one or more feedthrough tabs 1132 disposed within corresponding feedthrough openings 1136 formed, in part, on the tapered wall 1130. In some implementations, the feedthrough openings 1136 may extend to include a portion of the sidewall 1110*a* and the base end 1121. In some implementations, the housing 1100*a* may include multiple feedthrough openings 1136 arranged around the tapered wall 1130. For example, FIG. 2C shows the housing 1100*a* may include two feedthrough openings 1136 with feedthrough tabs 1132 disposed diametrically opposite of one another. It should be appreciated, however, the feedthrough tabs 1132 may generally be rotationally offset at any angle with respect to one another along the tapered wall 1130.

The feedthrough tab 1132 may be sufficiently compliant such that it can be bent into the cavity 1104 through the feedthrough opening 1136 such that a cable or a wire (e.g., a non-metallic sheathed cable or a Romex cable) may be inserted from the environment into the cavity 1104 through the feedthrough opening 1136. As shown in FIG. 2E, the feedthrough tabs 1132 may be joined to a portion of the sidewall 1110*a* located near the tapered wall 1130. Thus, the feedthrough tabs 1132 may bend inwards into the cavity 1104 about an axis intersecting the portion of the sidewall 1110*a* supporting the feedthrough tabs 1132. Unlike the knockout 1122, the feedthrough tab 1132 is not intended to be removable from the housing 1100*a*.

In some implementations, the feedthrough tab 1132 may be sufficiently elastic or pre-stressed such that when an external force (e.g., a user's hand, the insertion of a cable or wire) is applied to bend the feedthrough tab 1132 into the cavity 1104, an internal restoring force arises that opposes the external force. When a cable or wire is inserted into the cavity 1104 of the housing 1100*a*, the restoring force may cause the feedthrough tab 1132 to contact and press the cable or wire against the base end 1121 of the cover 1120*a*. In this manner, the combination of the feedthrough tab 1132 and the base end 1121 may function as a clamp to hold the cable or wire in place. In some implementations, the feedthrough tab 1132 and the base end 1121 may also function as a strain relief feature by restraining the cable or wire to the housing 1100*a* once inserted into the cavity 1104. When a cable or wire is removed and/or is not present, the restoring force may return the feedthrough tab 1132 to its original position.

In some implementations, the interior side of the base end 1121 may also include corresponding catches 1135 disposed proximate to each feedthrough opening 1136. The catch 1135 may be formed as a rib protruding from the base end 1121 that physically contacts the cable or wire when inserted into the cavity 1104 and clamped by the feedthrough tab 1132. FIG. 2H shows the catch 1135 may have a tapered profile that narrows at its tip, which may aid the restraint of the cable or the wire by increasing the pressure applied to the cable or the wire as a result of the restoring force of feedthrough tab 1132. In other words, the reactionary force applied by the catch 1135 in response to the restoring force of the feedthrough tab 1132 exerted onto the cable or the wire is distributed over a smaller area of the cable or the wire.

Figure 2D:
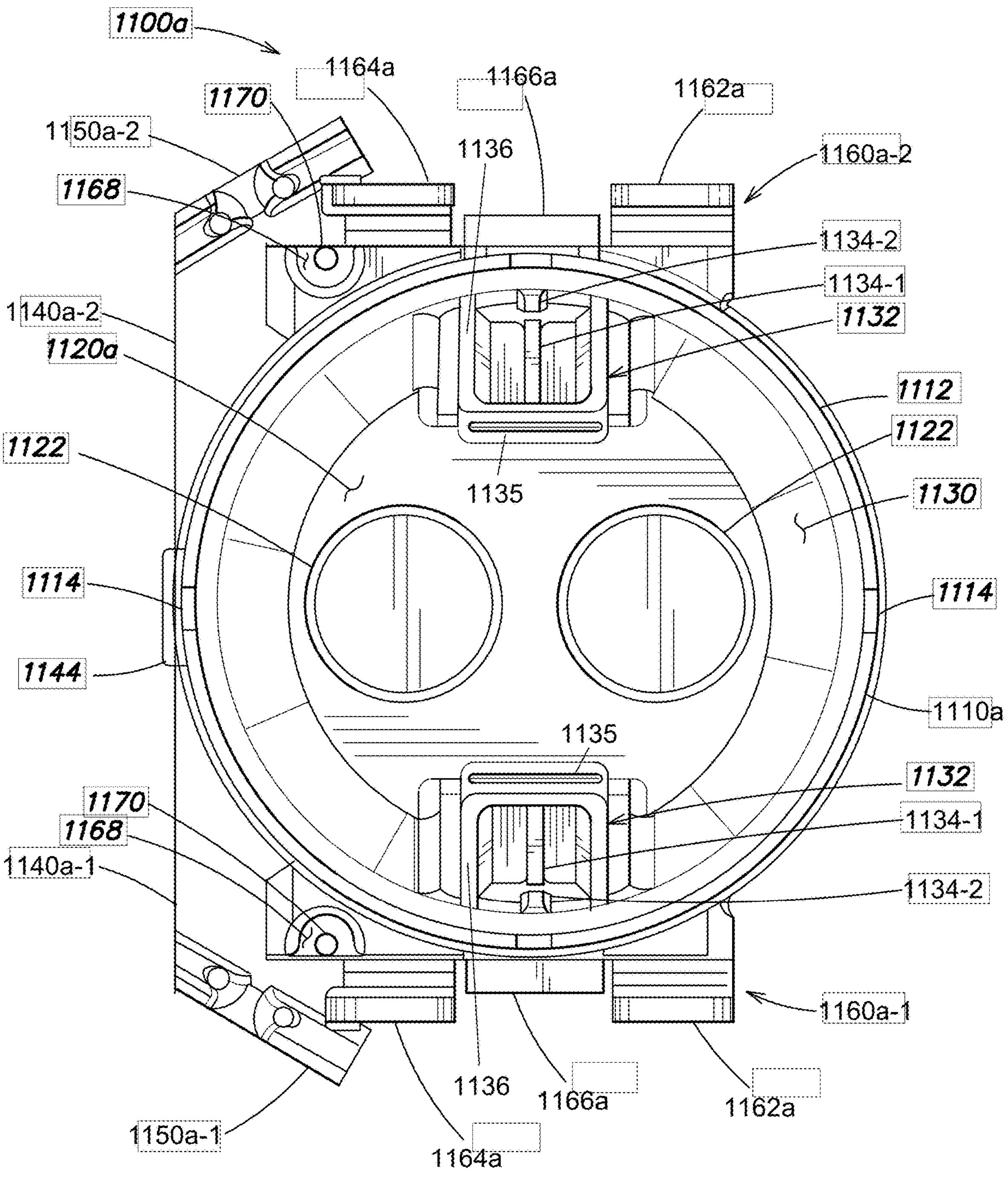
FIG. 2D shows a bottom view of the housing of FIG. 2A.
Figure 2E:
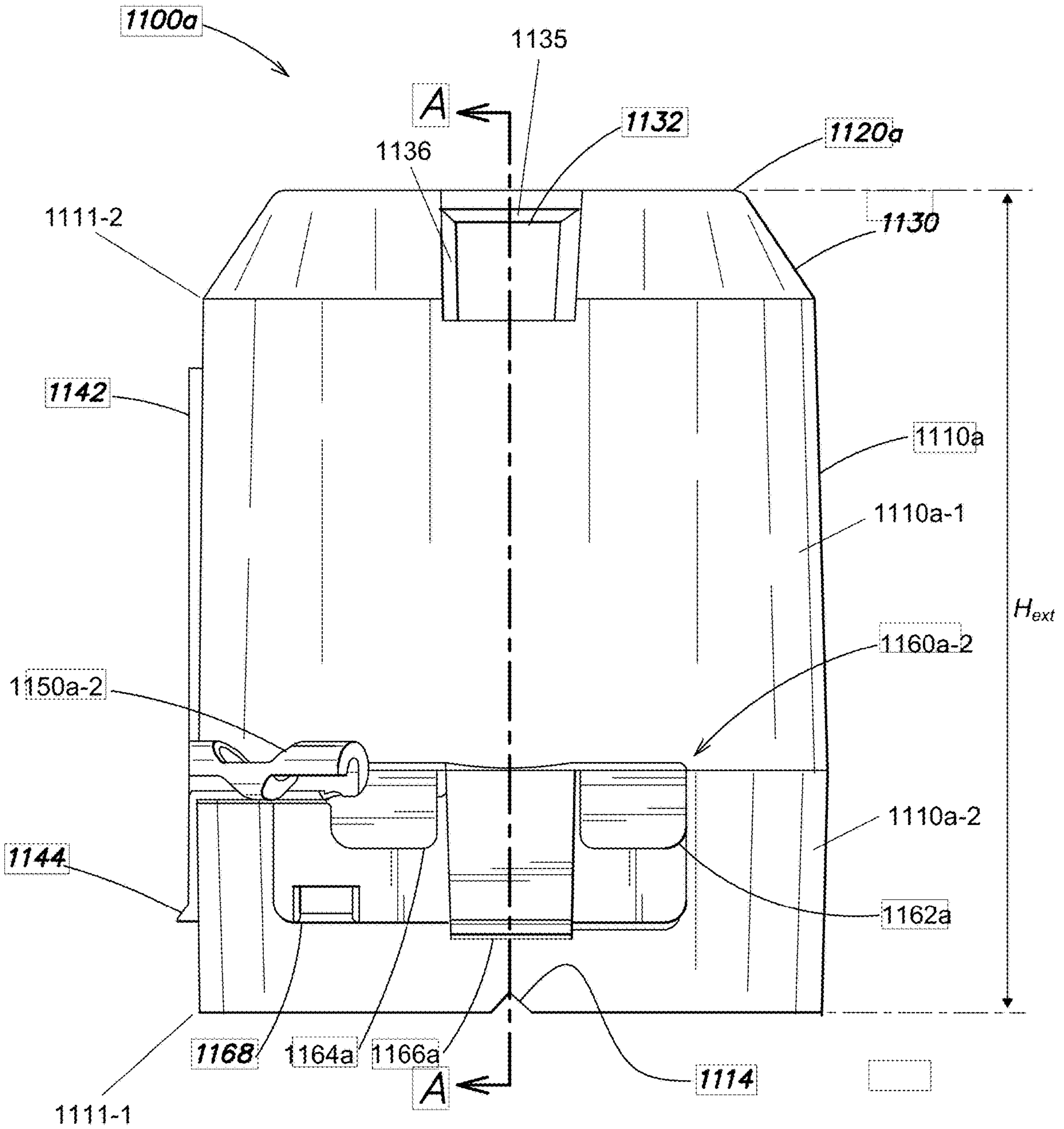
FIG. 2E shows a front view of the housing of FIG. 2A.
Figure 2F:
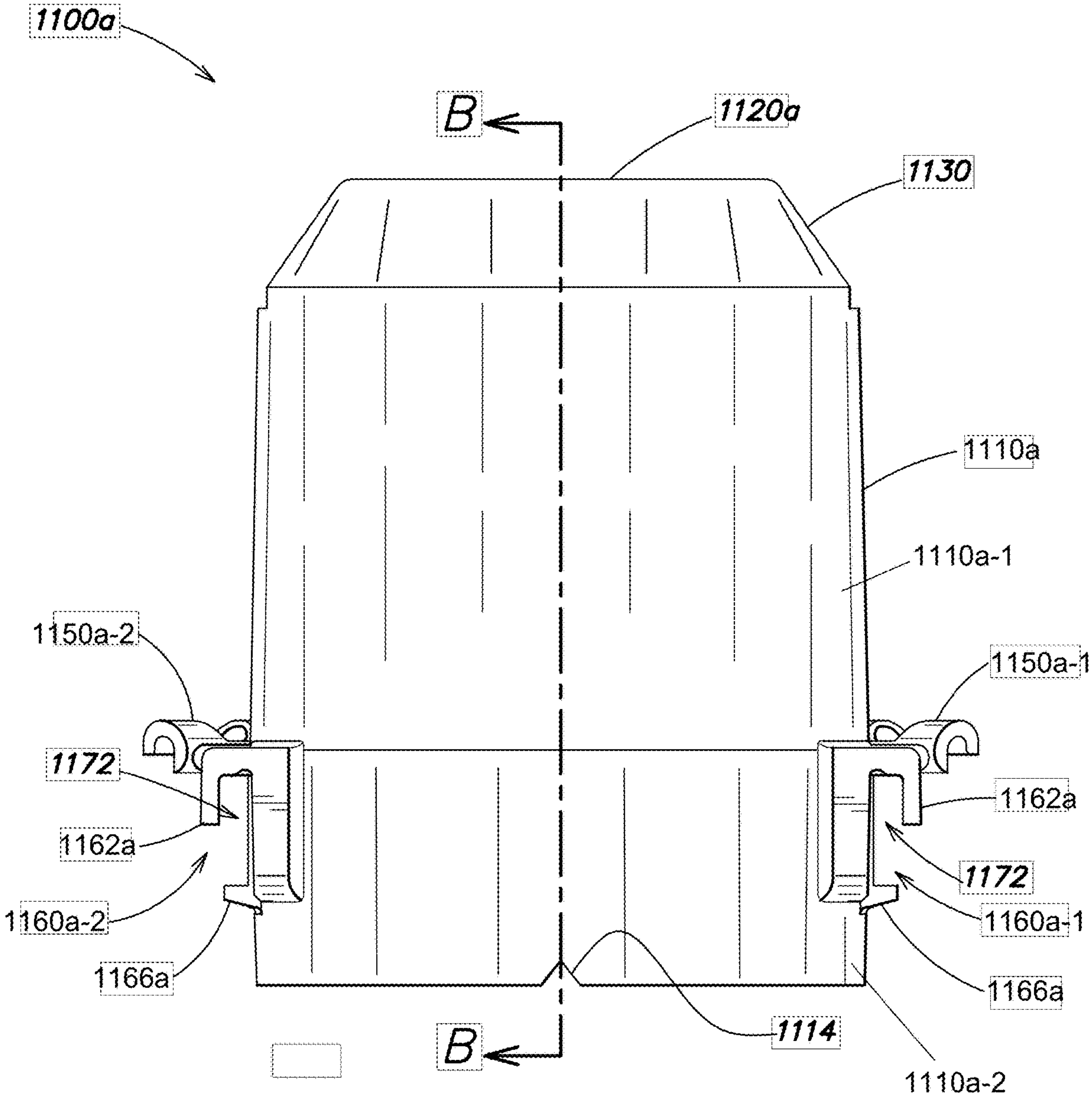
FIG. 2F shows a right-side view of the housing of FIG. 2A.
Figure 2G:
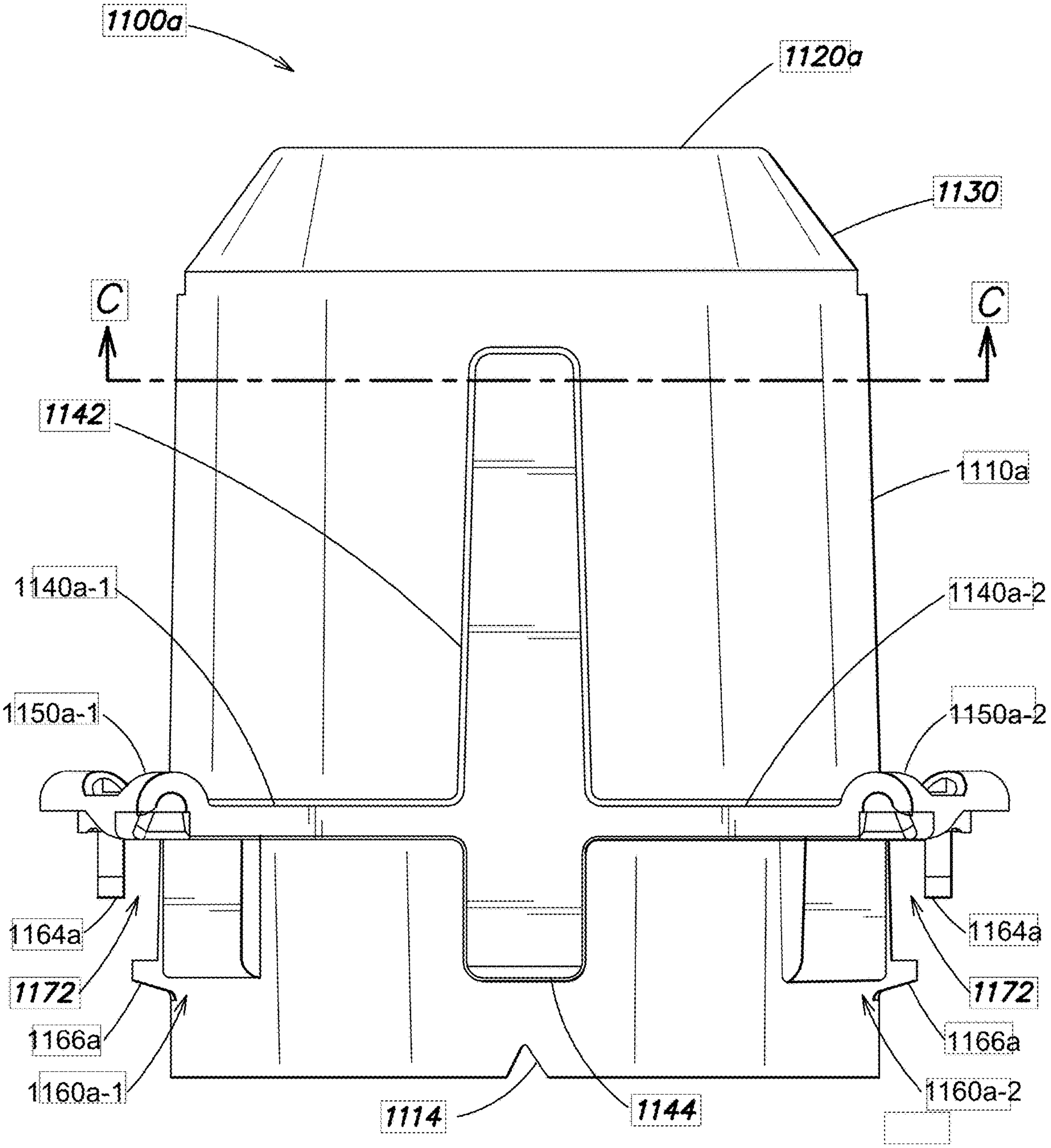
FIG. 2G shows a left-side view of the housing of FIG. 2A.
Figure 2H:
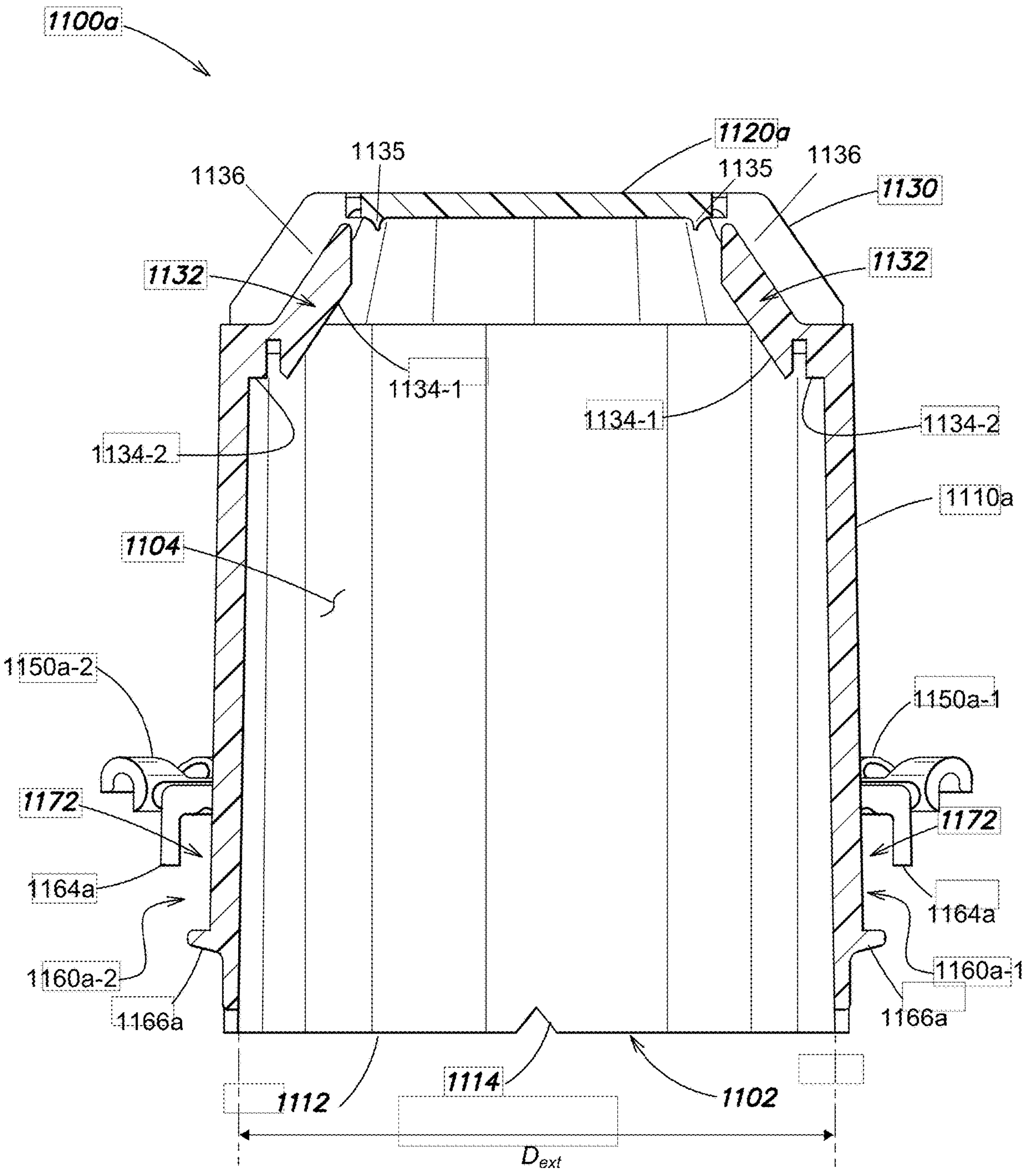
FIG. 2H shows a cross-sectional right-side view of the housing corresponding to the plane A-A of FIG. 2E.
Figure 2I:
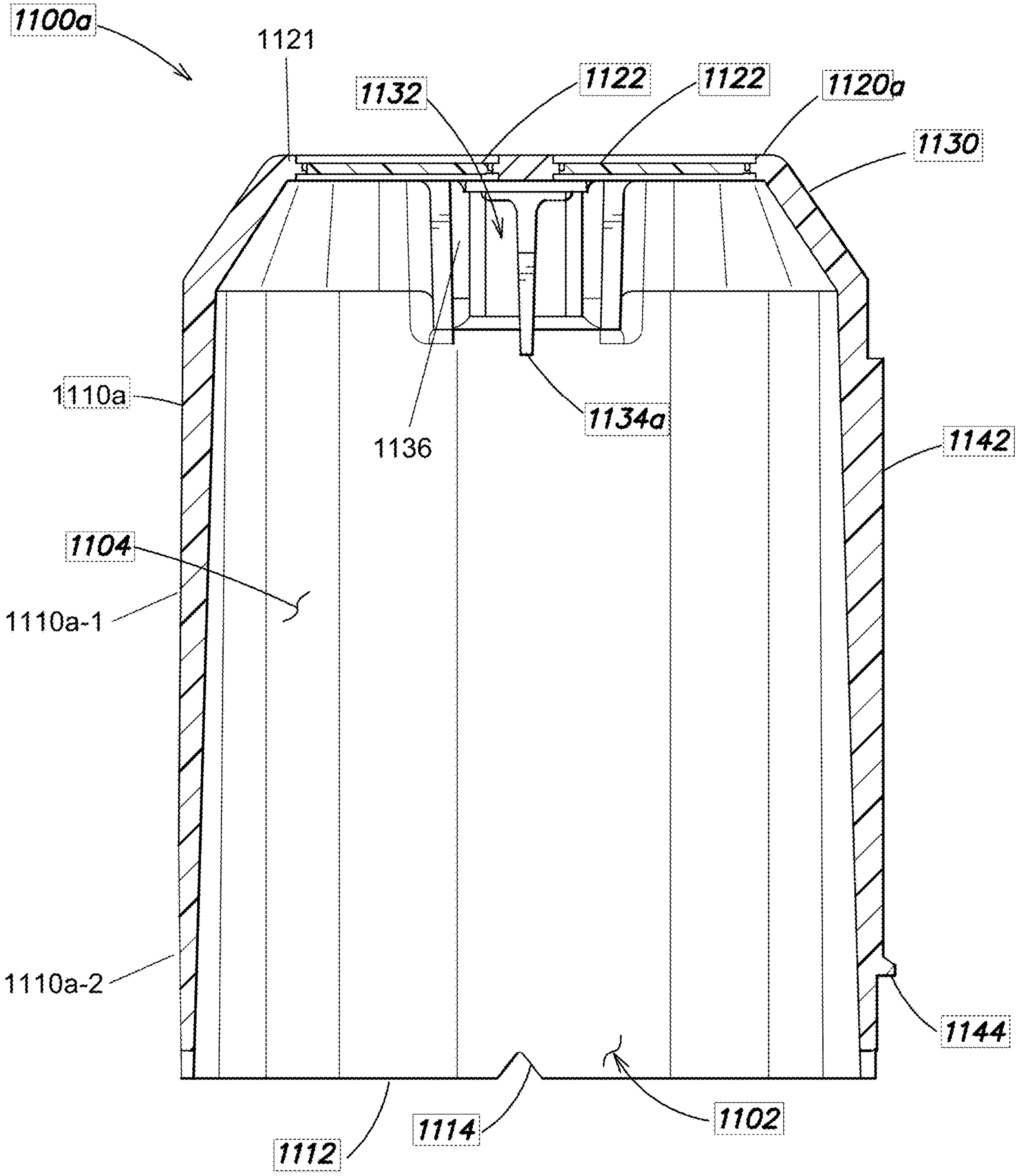
FIG. 2I shows a cross-sectional rear view of the housing corresponding to the plane B-B of FIG. 2F.
Figure 2J:
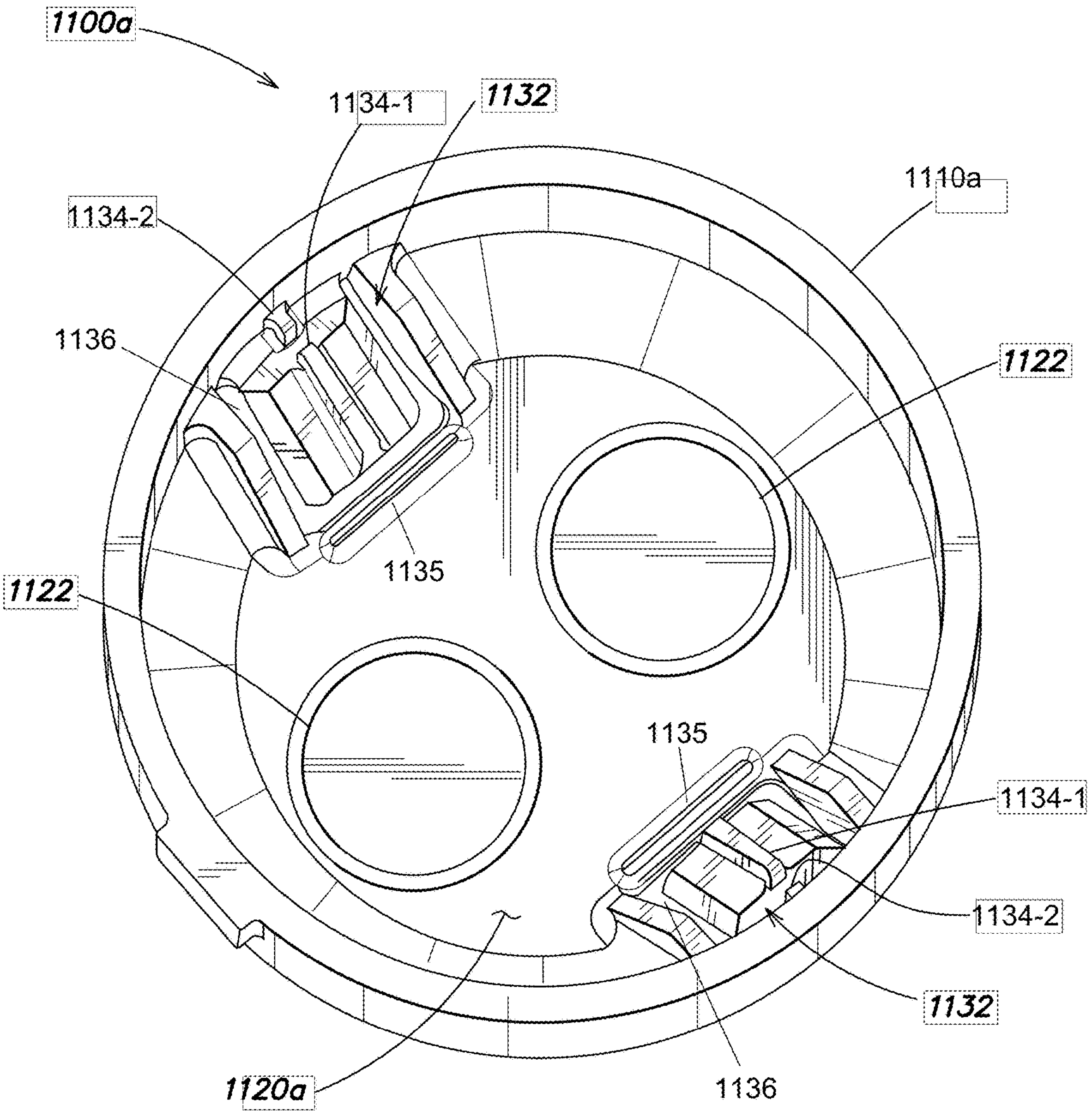
FIG. 2J shows a cross-sectional bottom perspective view of the housing corresponding to the plane C-C of FIG. 2G.

In some implementations, the feedthrough tab 1132 may also include a mechanical stop 1134-1 that contacts a corresponding mechanical stop 1134-2 disposed on the sidewall 1110*a*. The mechanical stops 1134-1 and 1134-2 may be arranged and positioned to limit the extent the feedthrough tab 1132 can be bent into the cavity 1104 when an external force is applied. As shown in FIGS. 2D, 2H, and 2J, the mechanical stops 1134-1 and 1134-2 may be formed as ribs that protrude from the interior sides of the feedthrough tab 1132 and the sidewall 1110*a*, respectively. The mechanical stops 1134-1 and 1134-2 may contact one another when the feedthrough tab 1132 is bent sufficiently far into the cavity 1104. Once the mechanical stops 1134-1 and 1134-2 make contact, the feedthrough tab 1132 is prevented from being bent further into the cavity 1104.

FIGS. 2A and 2C show the knockouts 1122 and the feedthrough tabs 1132 may generally be disposed on or near the cover 1120*a*, respectively. The placement of the knockouts 1122 and the feedthrough tabs 1132 ensures any cables and/or wires inserted into the cavity 1104 are located near the cover 1120*a*. This location coincides with a portion of the cavity 1104 where electrical wires may be spliced and/or connected to the driver of the lighting module. In some implementations, the knockouts 1122 may only be disposed on the base end 1121 of the cover section 1120*a*. Additionally, the feedthrough tabs 1132 may only be formed primarily on the tapered wall 1130. This arrangement may improve the ease of manufacture of the housing 1100*a* by eliminating undercuts and facilitating removal of the housing 1100*a* from one or more molds similar to the sidewall 1110*a*.

In some applications, the opening 1102 may provide access to splice and/or connect the electrical wires fed through the knockouts 1122 and/or the feedthrough tabs 1132 before a lighting module is inserted into the housing 1110*a*. The cables and/or wires inserted through the knockouts 1122 and/or the feedthrough tabs 1132 may generally carry alternating current (AC) or direct current (DC) at standard voltages of at least about 120 V.

In some implementations, the housing 1100*a* may also include one or more notches 1114 disposed on the first end 1111-1 of the sidewall 1110*a*. In some implementations, the notches 1114 may be triangular in shape. The notches 1114 may be arranged in pairs that are disposed diametrically opposite from one another along the first end 1111-1 of the housing 1110*a*. For example, FIG. 2D shows two pairs of notches 1114 that divide the edge 1112 into substantially equal or equal quadrants.

The notches 1114 may be arranged in this manner to facilitate alignment of the housings 1100*a* to the various support structures and/or other housing assemblies in the environment during installation. For example, multiple housing assemblies 1000*a* may be installed in an environment and arranged in a row. In order to align the housings 1100*a*, a laser guide may be used to provide a laser beam that defines an alignment axis. The alignment axis may be based on the desired location of the housings 1100*a* in the environment or may be used to locate an axis of one housing 1100*a* that is already installed in the environment. When installing the housing assemblies 1000*a*, the position of each housing 1100*a* may be adjusted such that the laser beam passes through a respective pair of notches 1114. In this manner, the housings 1100*a* may be aligned along a common axis within the environment.

FIGS. 3A-3E show additional views of the bar hanger holders 1160*a* on the housing 1100*a*. As shown, each bar hanger holder 1160*a* generally includes structural features that define a passageway 1172 that allows the bar hangers 1210-1 and 1210-2 to slidably move along a longitudinal direction of the bar hanger assembly 1200 with respect to the housing 1100*a*. In some implementations, the bar hanger older 1160*a* may also limit or, in some instances, mitigate (1) unwanted lateral motion (i.e., lateral play) of the bar hangers 1210-1 and 1210-2 with respect to the housing 1100*a* and (2) unwanted lateral motion between the bar hangers 1210-1 and 1210-2.

Figure 3A:
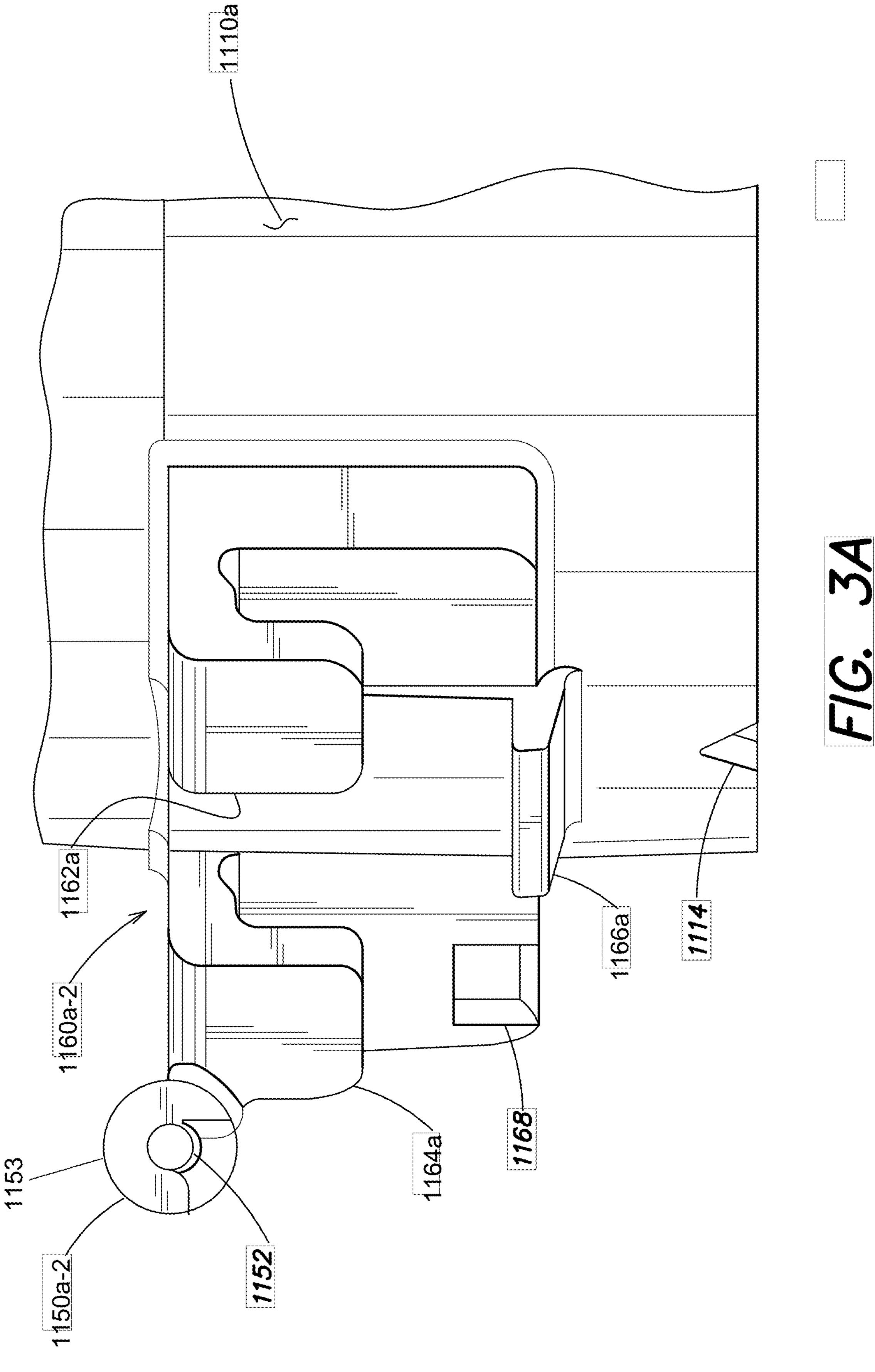
FIG. 3A shows a magnified front, right perspective view of the bar hanger holder and the nail-in feature of FIG. 2A.

For example, FIG. 3A shows the bar hanger holder 1160*a* may include a first tab 1162*a*, a second tab 1164*a*, and a third tab 1166*a* that together define the passageway 1172 through which the bar hangers 1210-1 and 1210-2 move longitudinally. In some implementations, the passageway 1172 defined by the bar hanger older 1160*a* may have a length (e.g., the distance between the left side of the second tab 1164*a* and the right side of the first tab 1162*a* of the bar hanger older 1160*a*-2) of about 2 inches. More generally, the length of the passageway 1172 may range between about 2 inches and about 3 inches.

Figure 3B:
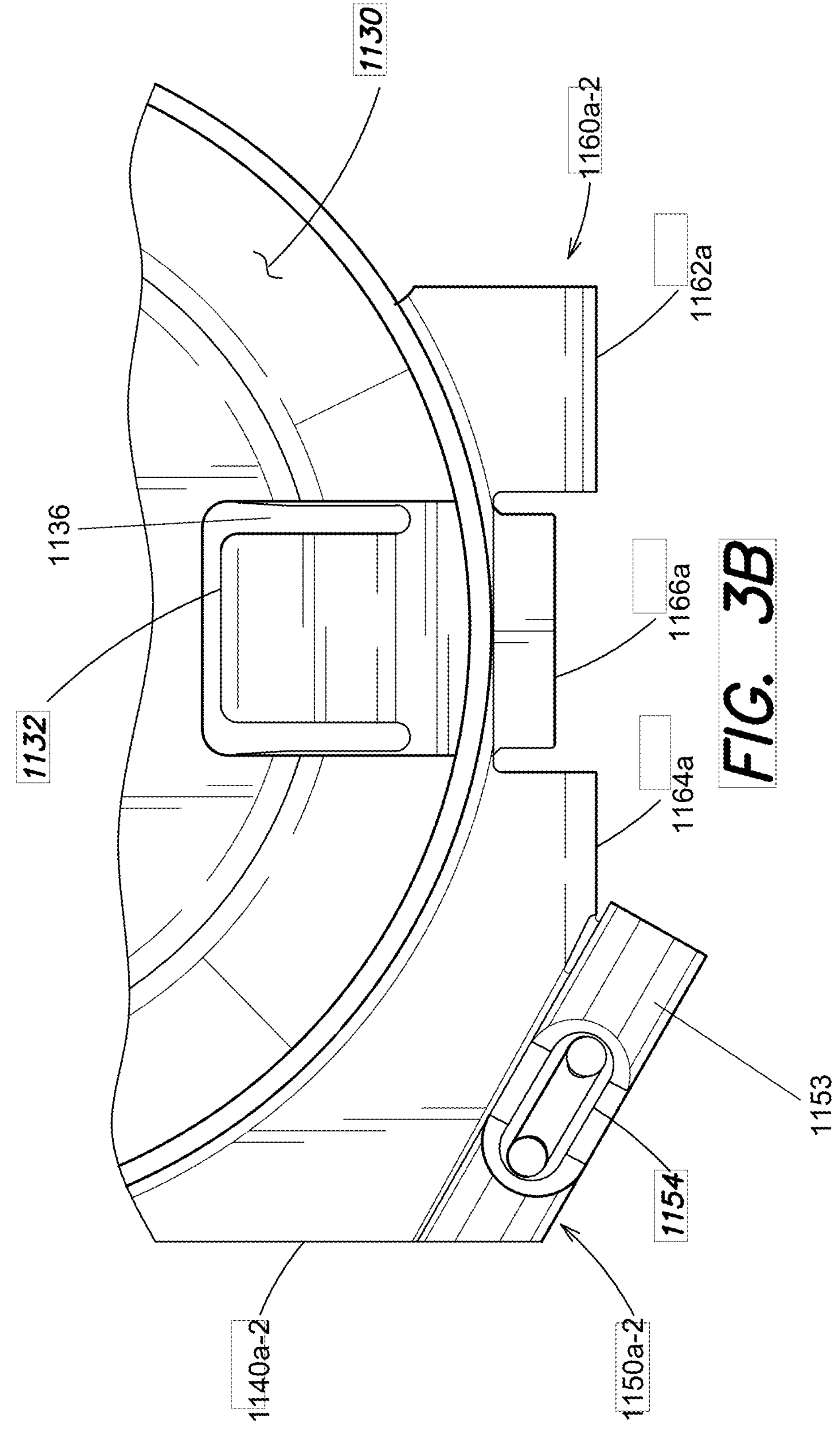
FIG. 3B shows a magnified top view of the bar hanger holder and the nail-in feature of FIG. 3A.
Figure 3C:
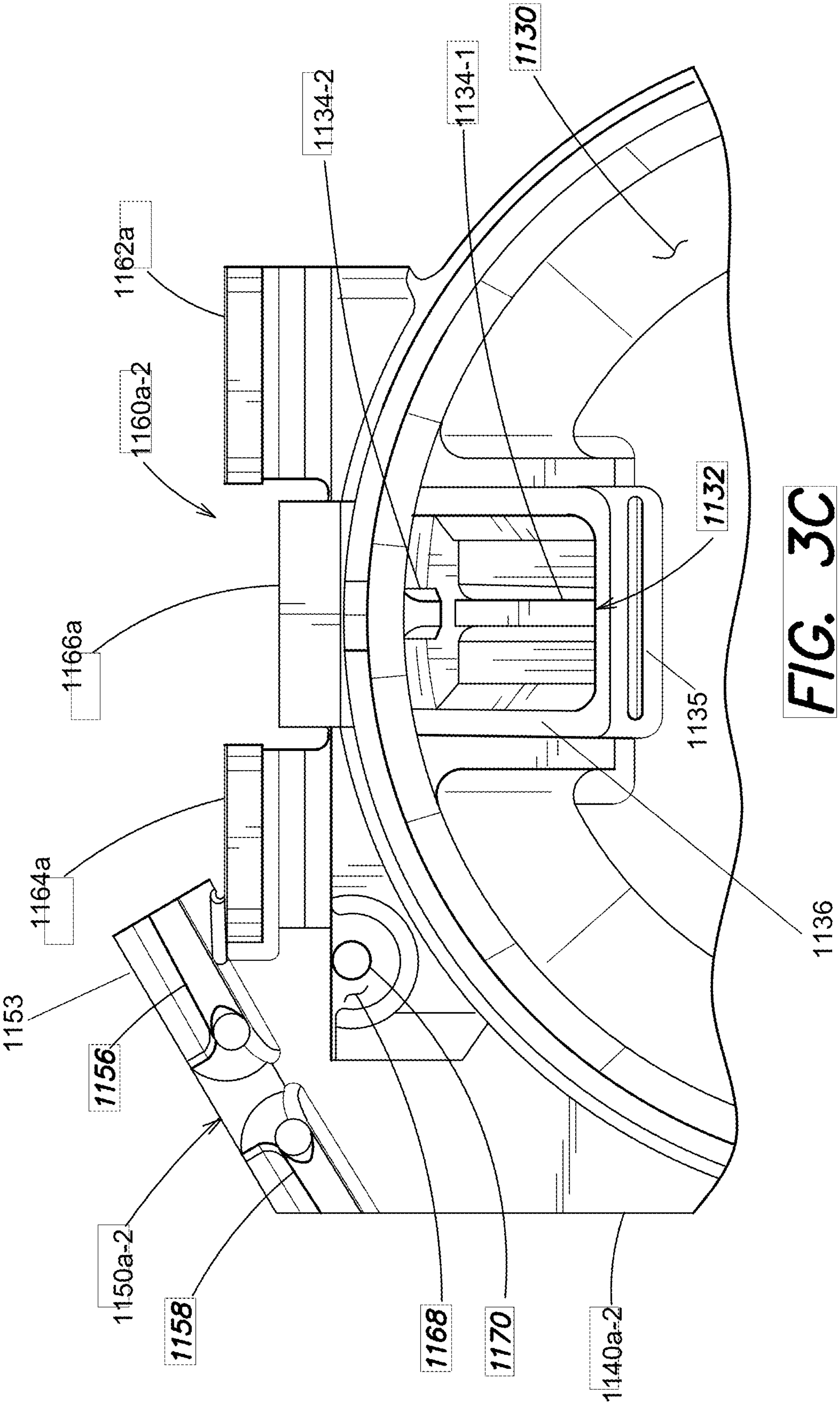
FIG. 3C shows a magnified bottom view of the bar hanger holder and the nail-in feature of FIG. 3A.
Figure 3D:
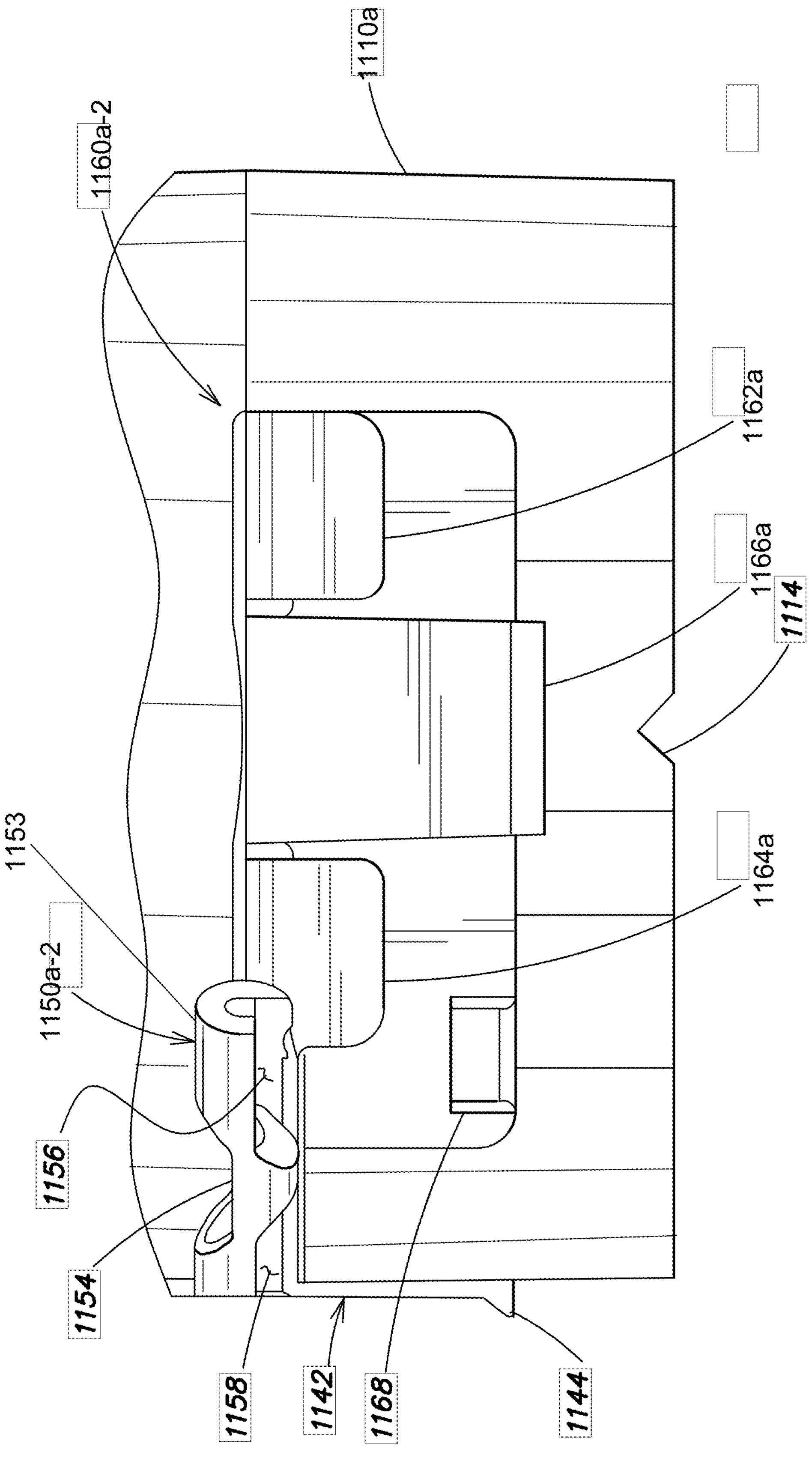
FIG. 3D shows a magnified front view of the bar hanger holder and the nail-in feature of FIG. 3A.
Figure 3E:
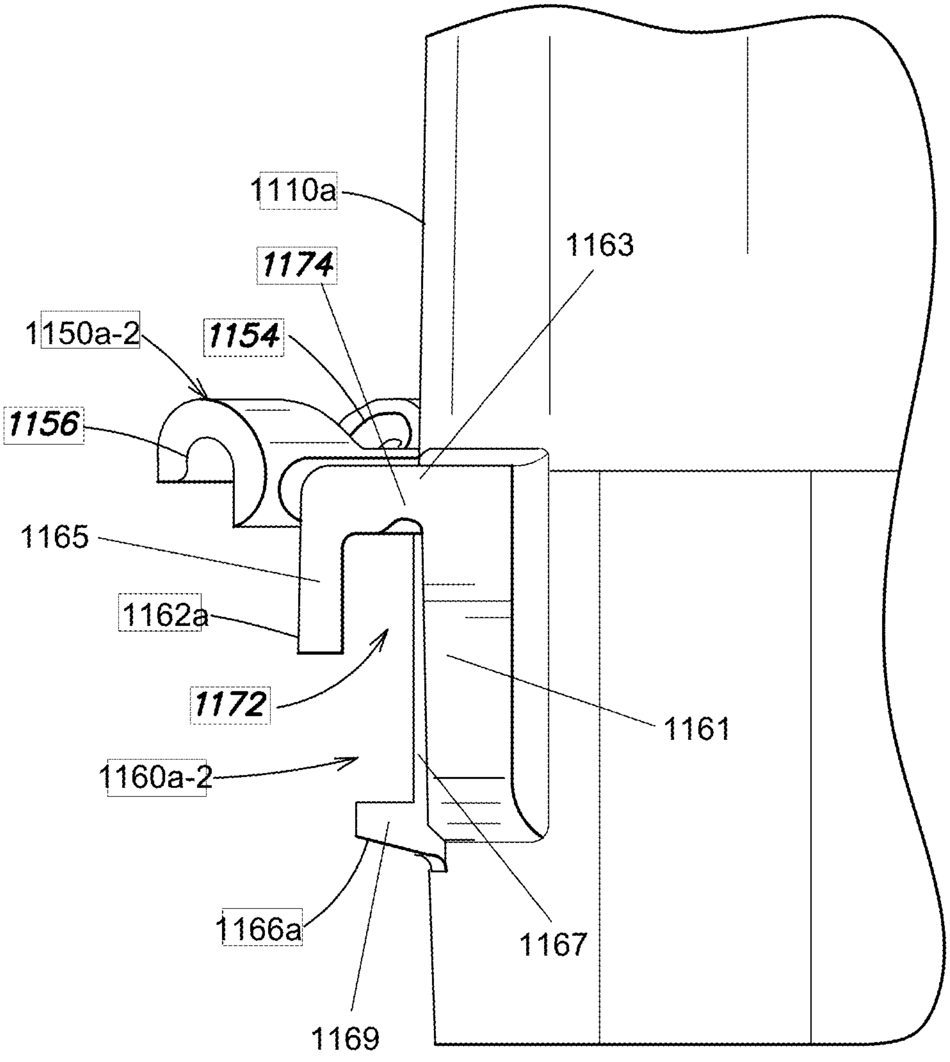
FIG. 3E shows a magnified right-side view of the bar hanger holder and the nail-in feature of FIG. 3A.

As shown in FIG. 3E, the first and second tabs 1162*a* and 1164*a* may form a U-shaped structure that extends from the sidewall 1110*a* to support and constrain the top, front, and rear sides of the bar hangers 1210-1 and 1210-2. As shown, the U-shaped structure may include a first section 1161 joined to the sidewall 1110*a*, a second section 1163 joined to the first section 1161 and protruding outwards away from the sidewall 1110*a*, and a third section 1165 joined to the second section 1163. The first and third sections 1161 and 1165 may physically contact the front and rear sides of the bar hangers 1210-1 and 1210-2 while the second section 1163 may physically contact the top side of the bar hangers 1210-1 and 1210-2. The third tab 1166*a* may similarly extend from the sidewall 1110*a* and form a L-shaped structure that supports and constrains the bottom side and one of the front or rear sides (e.g., the side nearest the sidewall 1110*a*) of the bar hangers 1210-1 and 1210-2. Specifically, the L-shaped structure may include a first section 1167 joined to the sidewall 1110*a* and a second section 1169 that protrudes out and away from the sidewall 1110*a*. In this manner, the combination of the first, second, and third tabs 1162*a*, 1164*a*, and 1166*a* may substantially constrain the bar hangers 1210-1 and 1210-2 laterally with respect the longitudinal axis of the banger assembly 1200. In other words, the first, second, and third tabs 1162*a*, 1164*a*, and 1166*a* may only allow the bar hangers 1210-1 and 1210-2 to move along the left or right directions.

Figure 1F:
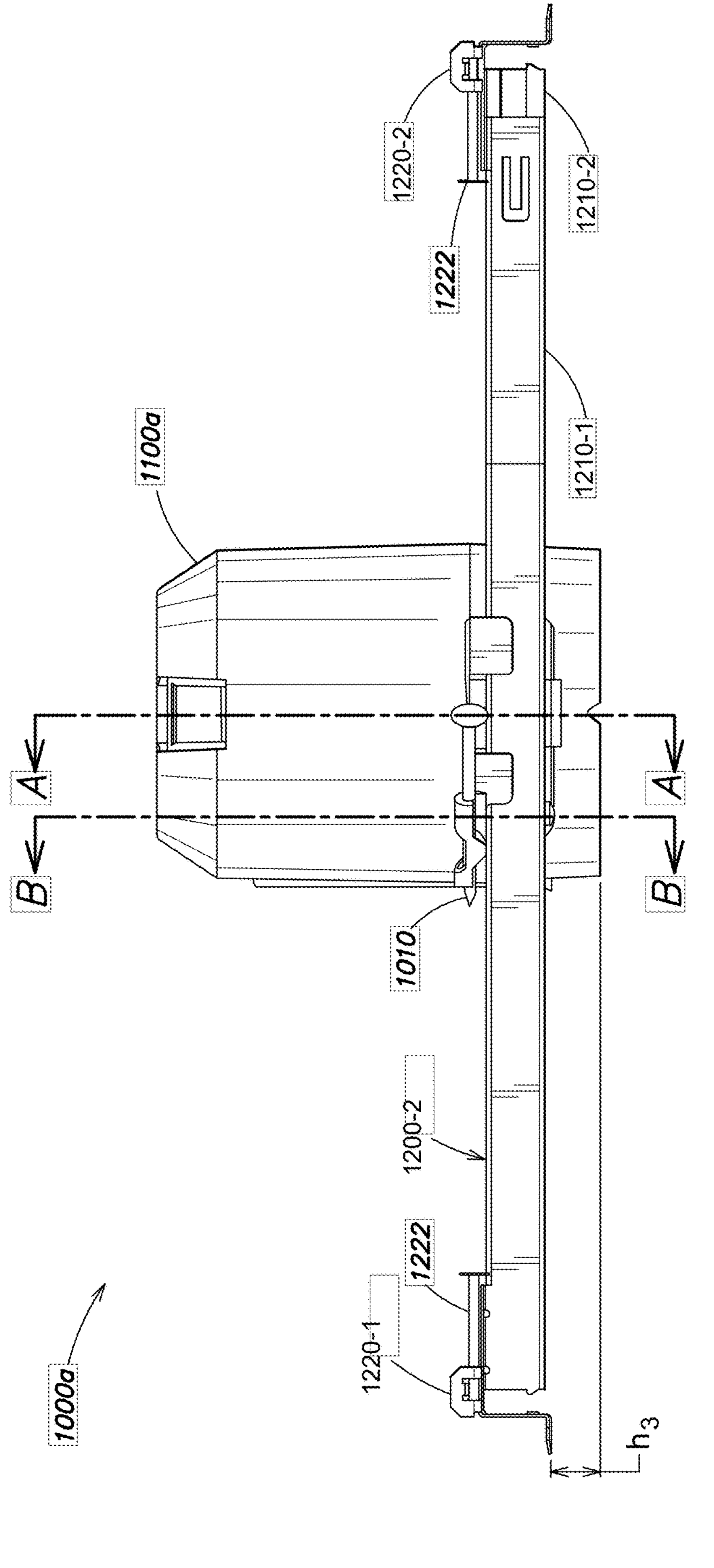
FIG. 1F shows a front view of the housing assembly of FIG. 1A.
Figure 1G:
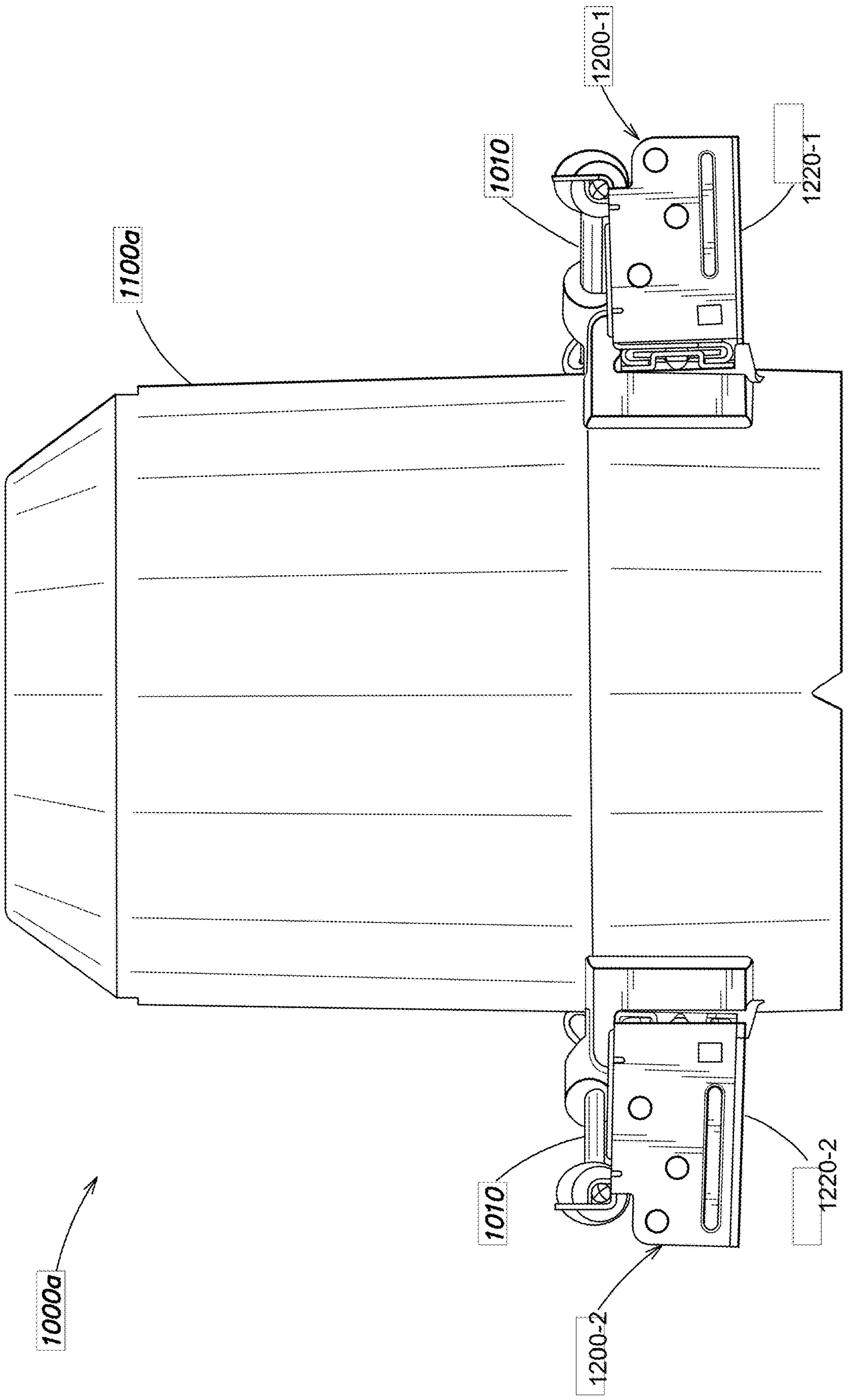
FIG. 1G shows a right-side view of the housing assembly of FIG. 1A.
Figure 1H:
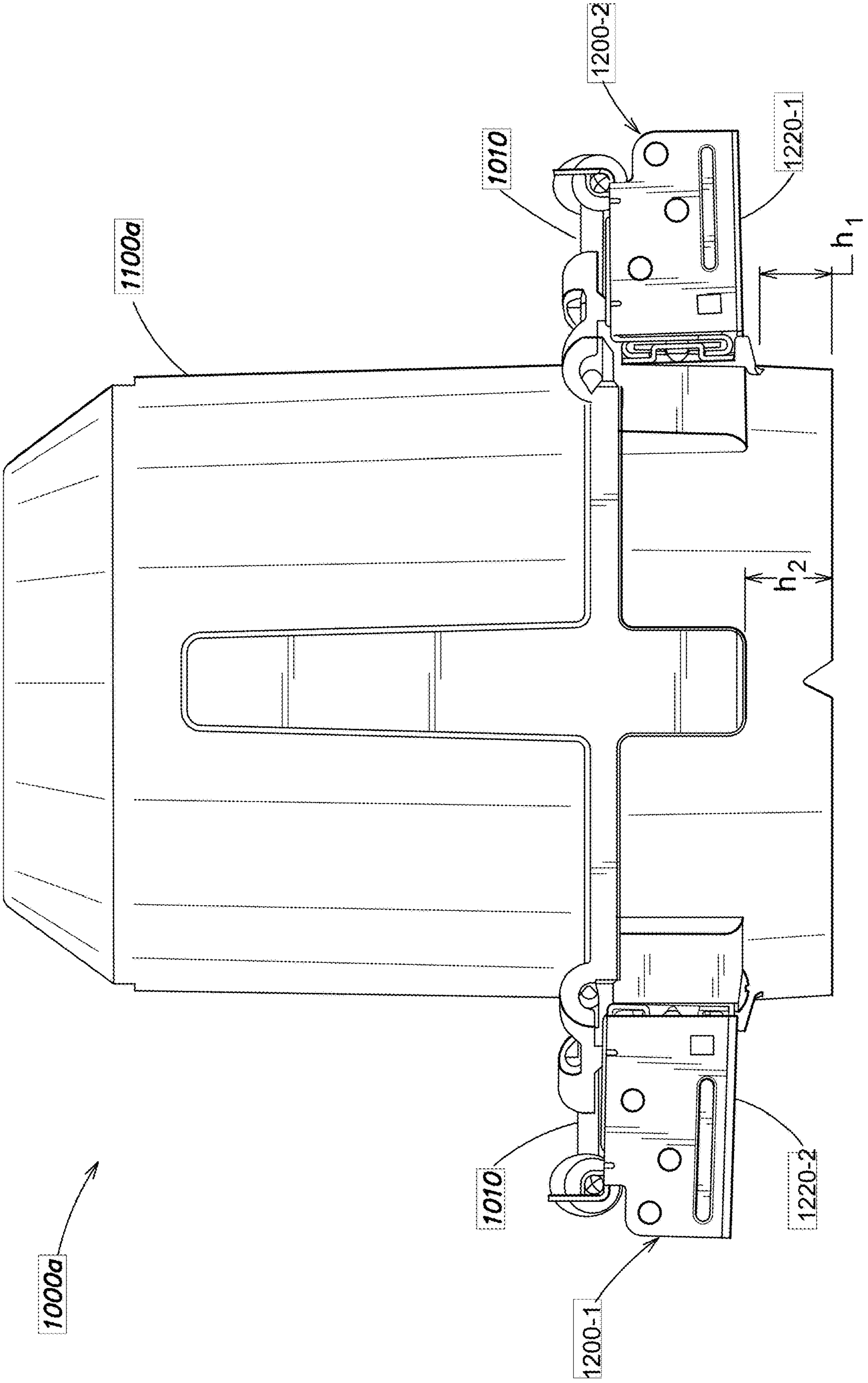
FIG. 1H shows a left-side view of the housing assembly of FIG. 1A.
Figure 1I:
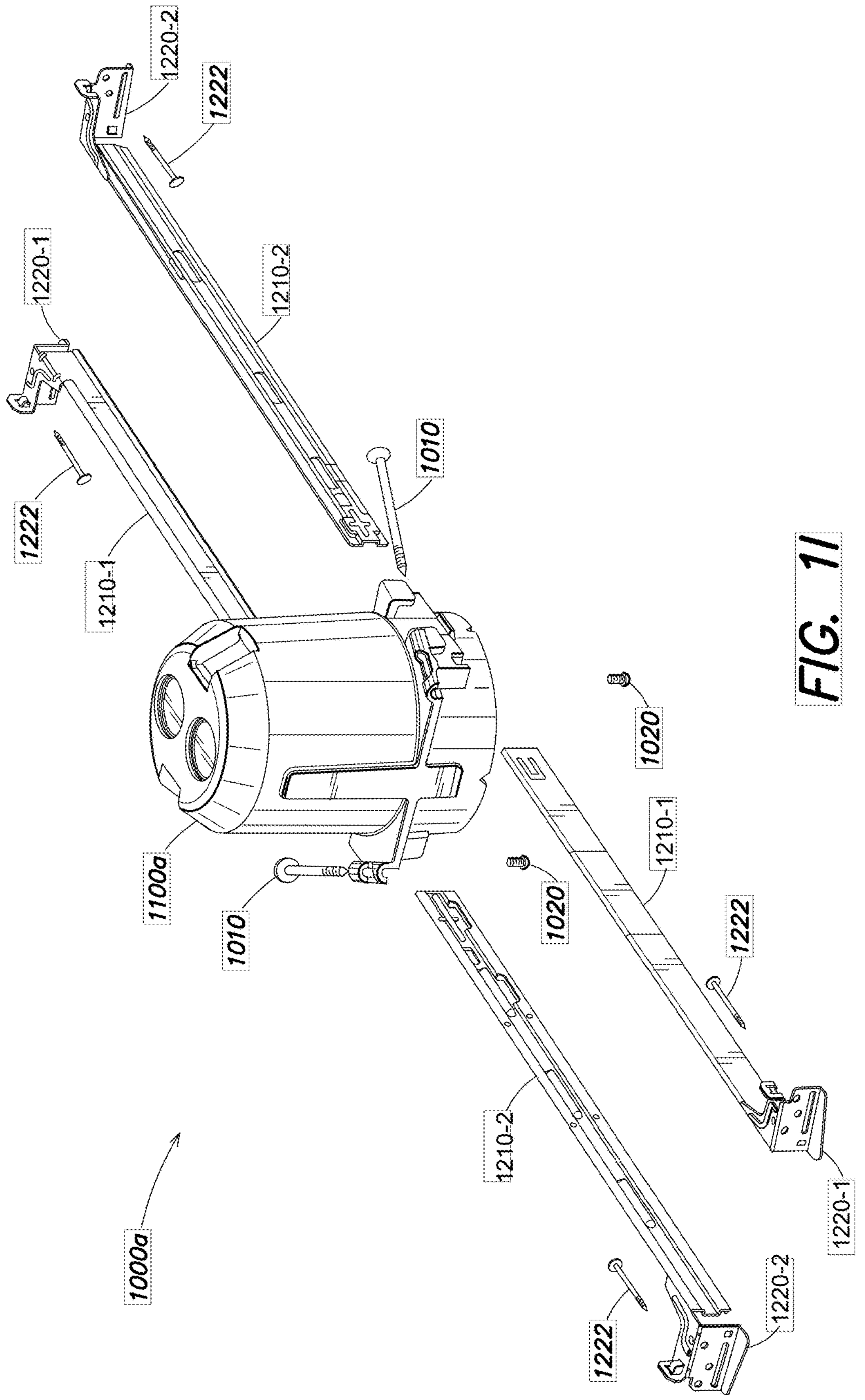
FIG. 1I shows an exploded top, left, front perspective view of the housing assembly of FIG. 1A.
Figure 1J:
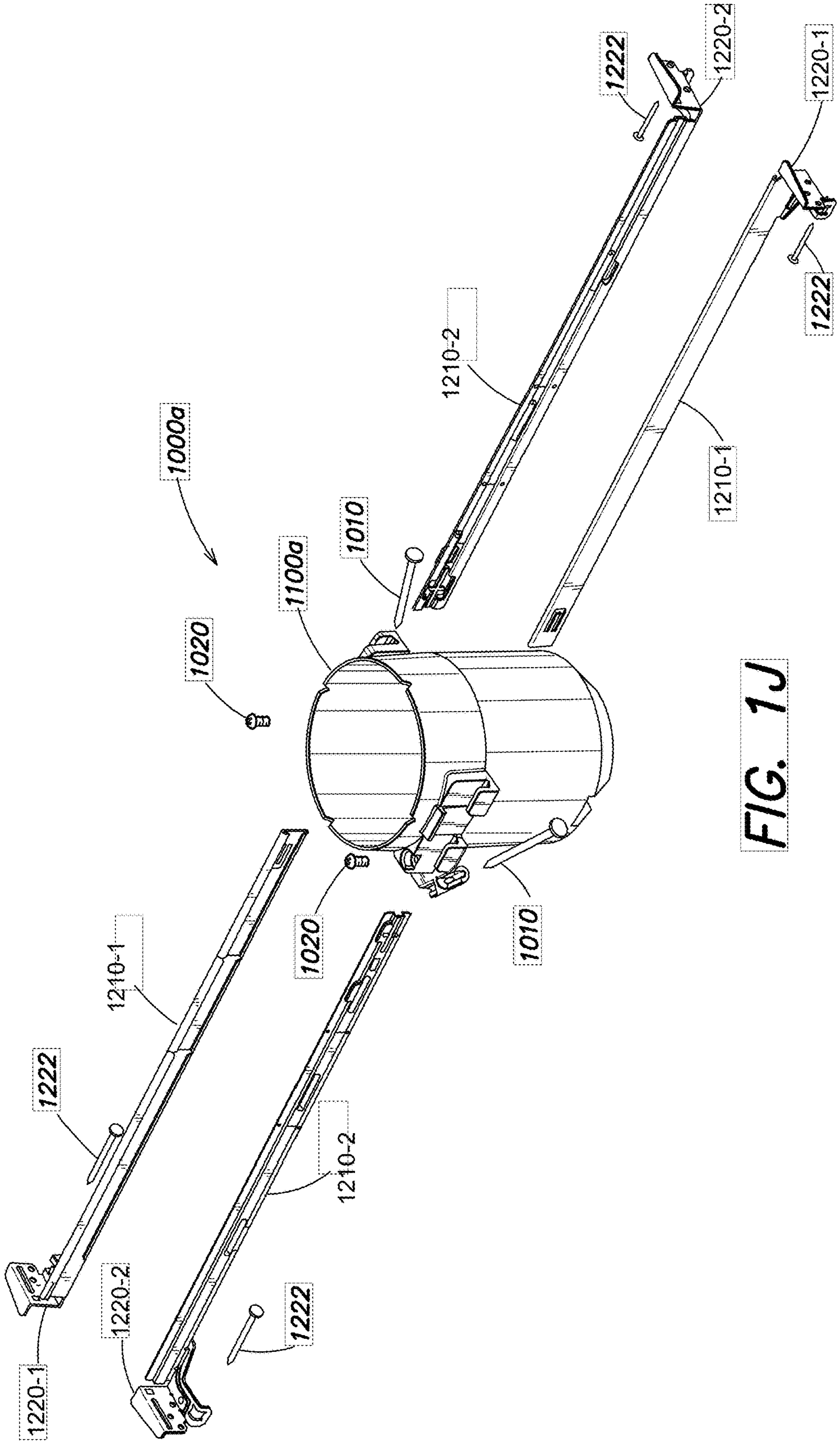
FIG. 1J shows an exploded bottom, right, rear perspective view of the housing assembly of FIG. 1A.
Figure 1K:
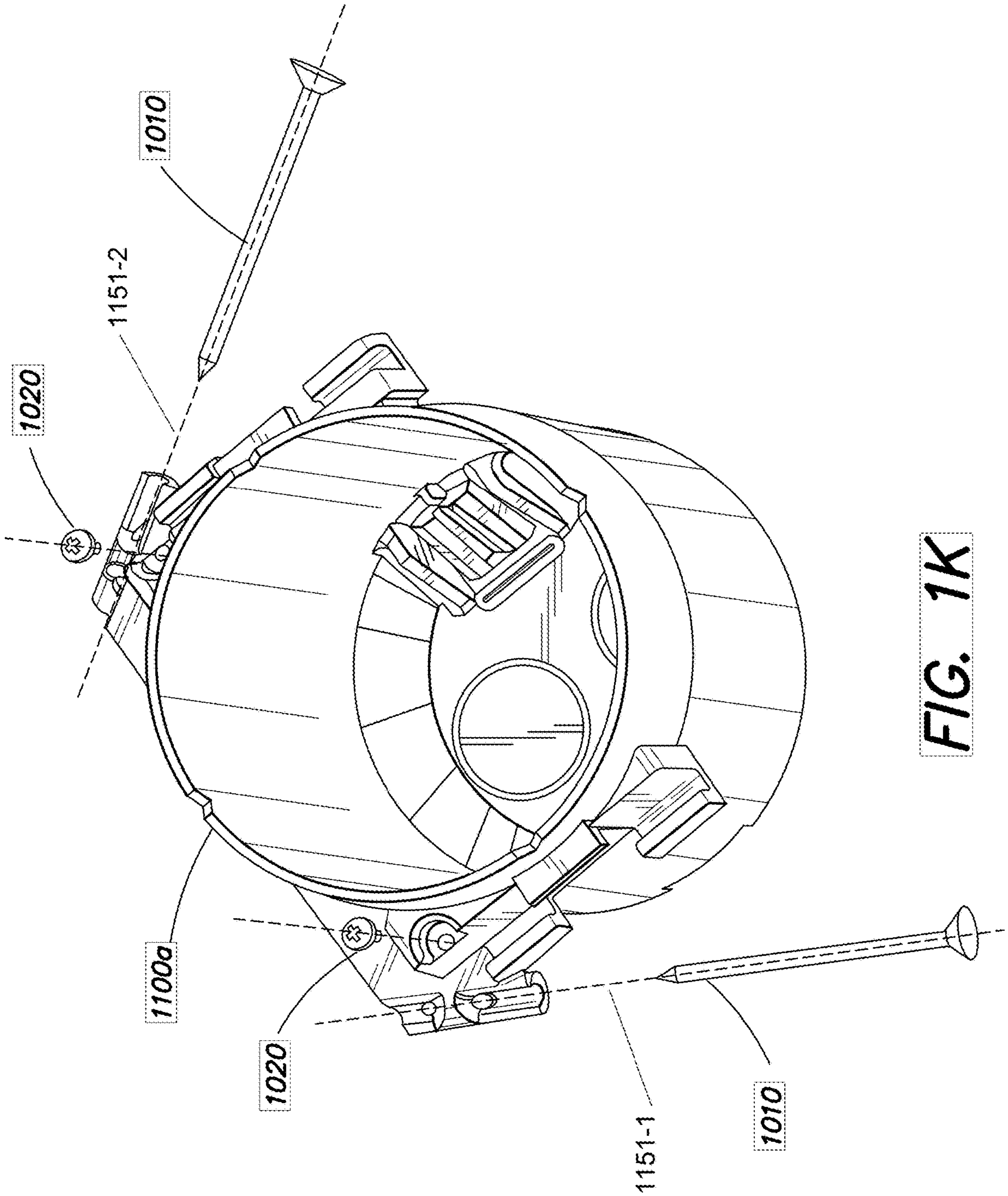
FIG. 1K shows a magnified exploded bottom, right, rear perspective view of the housing assembly of FIG. 1A without the bar hanger assemblies.
Figure 1L:
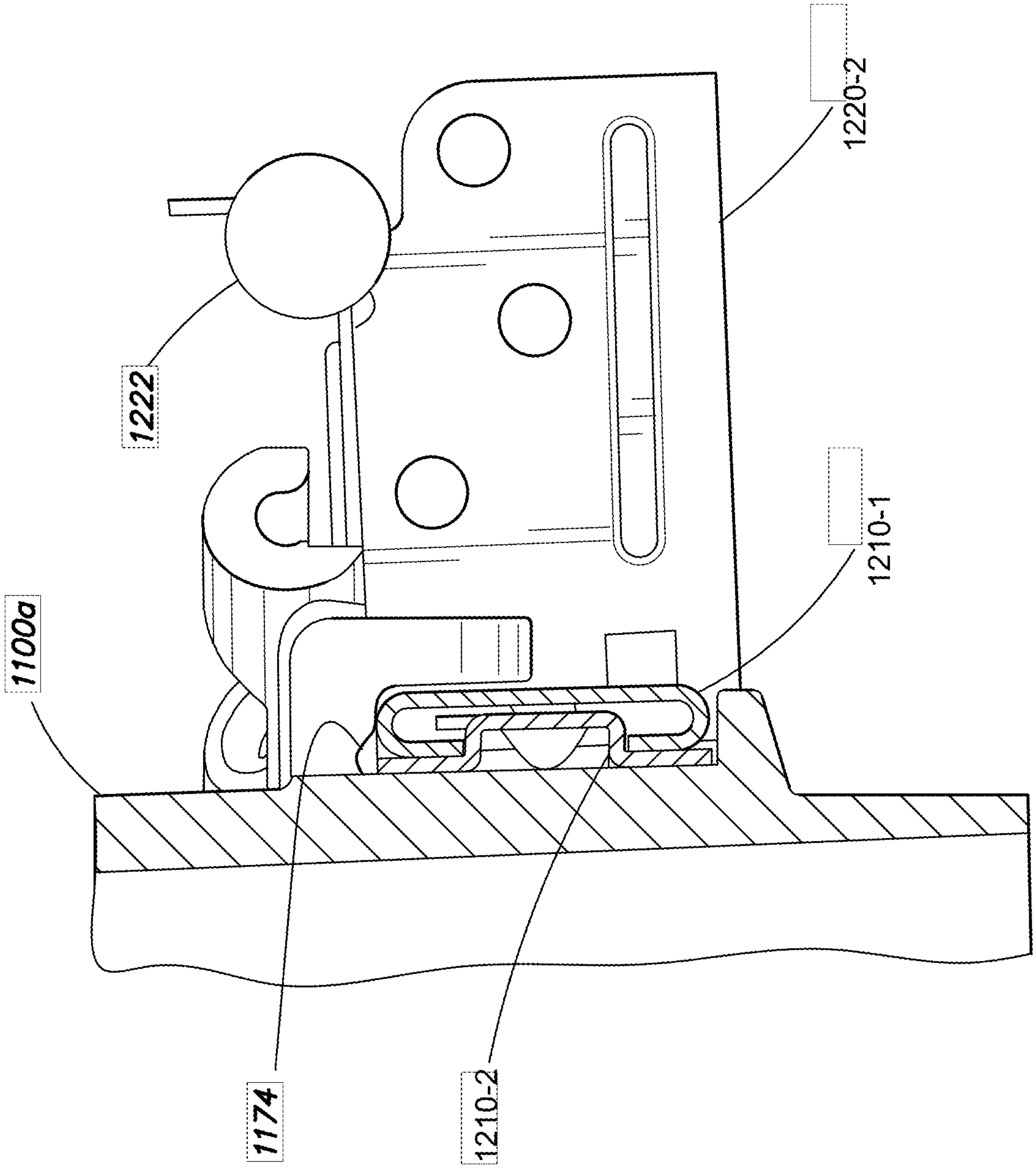
FIG. 1L shows a cross-sectional view of the housing assembly corresponding to the plane A-A of FIG. 1F.

The geometry of the first, second, and third tabs 1162*a*, 1164*a*, and 1166*a* and, in turn, the geometry of the passageway 1172 may generally depend, in part, on the geometry of the bar hangers 1210-1 and 1210-2. For example, FIG. 1L shows the passageway 1172 may be shaped to substantially conform with the cross-sectional shape of the bar hangers 1210-1 and 1210-2 as assembled in order to constrain the bar hangers 1210-1 and 1210-2 laterally.

In some implementations, the bar hanger assemblies 1200 may be assembled before being mounted to the housing 1100*a*. For example, the bar hangers 1210-1 and 1210-2 may be telescopically coupled such that one bar hanger cannot be removed from the other. The bar hangers 1210-1 and 1210-2 may also each have bar hanger heads 1220-1 and 1220-2, respectively. As a result, it may not be possible for the bar hanger assemblies 1200 to be inserted through the passageway 1172 as assembled. To accommodate a pre-assembled bar hanger assembly 1200, the tabs 1162*a*, 1164*a*, and 1166*a* may be arranged to allow insertion of the bar hanger assembly 1200 laterally from the front side or rear side of the housing 1100*a* depending on the particular bar hanger holder 1160*a*-1 or 1160*a*-2. In some implementations, the bar hanger holder 1160*a* may further include a groove 1174 formed along one or more of the tabs 1162*a*, 1164*a*, and/or 1166*a* to provide additional clearance for the bar hangers 1210*a* and/or 1210*b* to be inserted at an angle into the passageway 1174. For example, the groove 1174 may be formed along the respective second sections 1163 of the first and second tabs 1162*a* and 1164*a*. In some implementations, the tabs 1162*a*, 1164*a*, and/or 1166*a* may be shaped to form a snap-fit connection with the bar hangers 1210-1 and 1210-2 (see, for example, the housing 1100*e* in FIGS. 11A-11I).

It should be appreciated that, in other implementations, the bar hanger assembly 1200 may only be partially assembled before being mounted to the housing 1100*a*. For example, each bar hanger 1210-1 and 1210-2 may have a corresponding bar hanger head 1220-1 and 1220-2, but may not be telescopically coupled to one another. This may allow the bar hangers 1210-1 and 1210-2 to be inserted longitudinally through the passageway 1172 and telescopically coupled to one another at the same time. Although the first, second, and third tabs 1162*a*, 1164*a*, and 1166*a* may be tailored based on particular geometry of the bar hangers 1210-1 and 1210-2 used in the housing assembly 1100*a*, it should be appreciated that the bar hanger holder 1160*a* may support other designs and/or types of bar hangers 1210-1 and 1210-2 with a similar physical envelope (e.g., the bar hangers fit through the passageway 1172). This may include commercial-off-the-shelf bar hangers or bar hangers tailored for the housing assembly 1100*a* as will be discussed in more detail below.

Figure 1M:
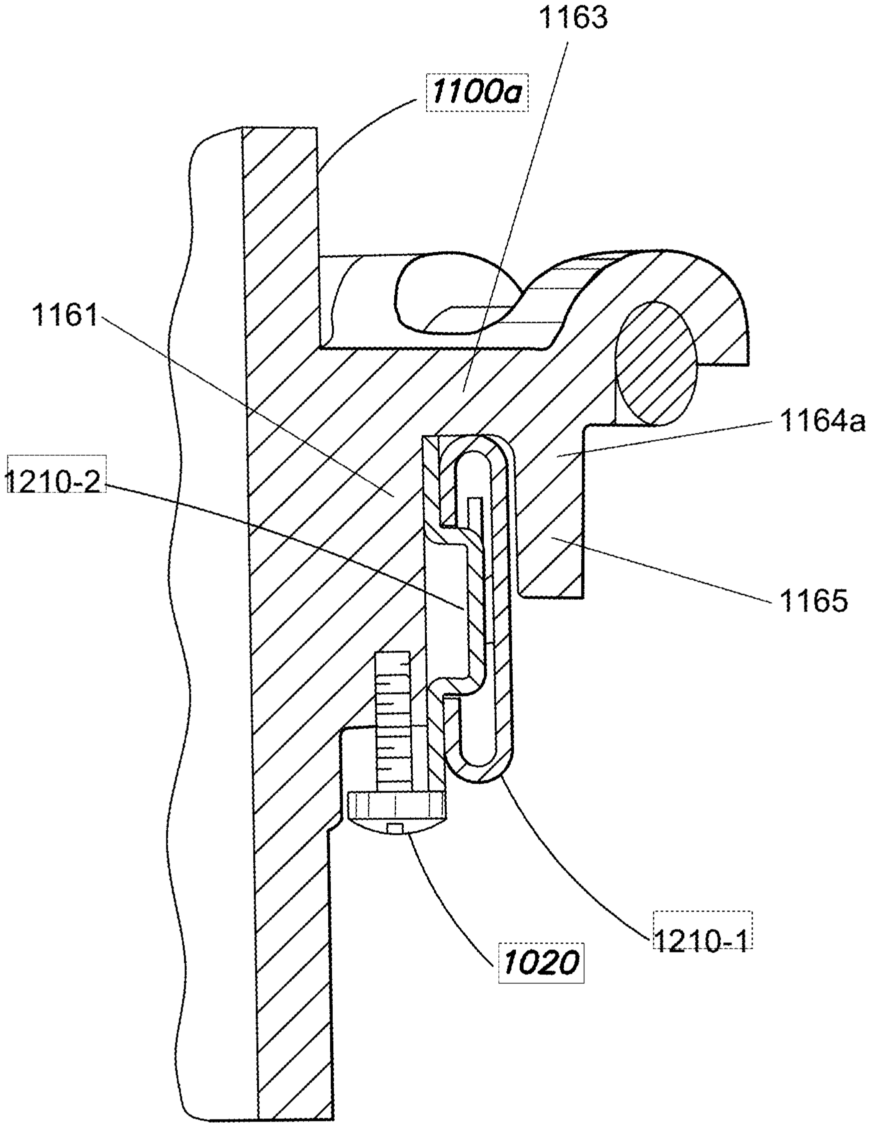
FIG. 1M shows a cross-sectional view of the housing assembly corresponding to the plane B-B of FIG. 1F.

The bar hanger holder 1160*a* may also include structural features to receive the locking fastener 1020, which, as described above, is used to lock the position of the housing 1100*a* to the bar hangers 1210-1 and 1210-2. For instance, FIGS. 3A, 3C and 3D show the bar hanger holder 1160*a* may include a fastener opening 1170 formed on a bottom portion of the second tab 1164*a*. The fastener opening 1170 may be disposed within a recess 1168 shaped such that the fastener 1020 may be partially nested within the recess 1168 (i.e., the fastener 1020 does not protrude appreciably below the portion of the second tab 1164*a*. As shown in FIG. 1M, the head of the fastener 1020 may physically contact and press the bar hanger 1210-2 against the second section 1163 of the second tab 1164*a* when the fastener 1020 is tightened, thus imparting a frictional force that prevents the bar hangers 1210-1 and 1210-1 from moving along the passageway 1172 of the housing 1100*a*. In some implementations, a washer may be disposed between the head of the fastener 1020 and the bar hangers 1210-1 and 1210-2 to provide, in part, a larger contact area with the bar hangers 1210-1 and 1210-2.

It should be appreciated in other implementations, the opening 1170 may be located along the front side or rear side of one of the first or second tabs 1162*a* and 1164*a* depending on the bar hanger holder 1160*a*-1 and 1160*a*-2. When the fastener 1020 is inserted through the opening 1170 and subsequently tightened, the fastener 1020 may press the bar hangers 1210-1 and 1210-2 against the sidewall 1110*a*, again producing a frictional force to restrict movement of the bar hangers 1210-1 and 1210-2 relative to the housing 1100*a*.

During installation, the housing 1100*a* may be positioned such that a portion of the housing 1100*a* is disposed within the opening formed in the ceiling of the illuminated environment. In some implementations, the first end 1111-1 of the housing 1100*a* may be flush with the bottom surface of the ceiling (i.e., the first end 1111-1 and the bottom surface of the ceiling lie on the same horizontal plane) or partially recessed within the opening so that no portion of the housing 1100*a* protrudes into the illuminated environment. In order to accommodate the placement of the housing 1100*a* and the thickness of the ceiling, the various features protruding outwards from the sidewall 1110*a* of the housing 1100*a* may be sufficiently offset from the first end 1111-1 to ensure the housing assembly 1000*a* does not interfere or collide with the ceiling.

For instance, the bar hanger holder 1160*a* may be offset from the first end 1111-1 by an offset distance, $h_1$. As shown in FIG. 1H, the offset distance $h_1$ may be defined as the distance between the bottom-most portion of the third tab 1166*a* and the first end 1111-1.

In some implementations, the housing 1100*a* may be fixed vertically in a ceiling with respect to the support structures. A drywall panel may also be directly mounted to the support structures. Thus, the location of the bottom plane of the drywall panel corresponding to the bottom surface of the drywall panel may vary depending on the thickness of the drywall panel. The offset distance $h_1$ may thus be chosen based on the thickness of the ceiling. For example, a drywall panel has a typical thickness of ⅝ inch, but may be as thin as ½ inch. To ensure the housing 1100*a* does not protrude through the opening formed in the ceiling, the offset distance $h_1$ may be chosen based on the thinnest drywall commonly used (e.g., ½ inch thick drywall). Therefore, the offset distance $h_1$ may be about ½ inch. In some implementations, the offset distance $h_1$ may also be chosen based on the position and extent of the bar hanger head 1210 relative to the drywall as will be discussed in more detail below.

In some implementations, the offset distance $h_1$ may be as small as 0 inches. In other words, the bottom portion of the bar hanger holder 1160*a* may be flush with the first end 1111-1 (i.e., the bottom surface of the third tab 1166*a* of the bar hanger holder 1160*a* and the first end 1111-1 may lie on the same horizontal plane). Thus, the housing 1100*a* may not be disposed within an opening in the ceiling or even be in physical contact with the drywall, but rather positioned deeper within the ceiling space. A lighting module, a trim, or a lighting/module trim combination may still be attached to the housing 1100*a* in this configuration so long as the mounting features (e.g., spring clips, friction clips) are able to extend sufficiently far into the cavity 1104.

Although the housing 1100*a* described herein includes integrally formed bar hanger holders 1160*a*, it should be appreciated that, in some implementations, the bar hanger holder may be a separate component that provides additional modes of adjustment to position and orient the housing in the environment. The housing may still include one or more integrated nail-in features 1150*a*. For example, the housing may include a slot (e.g., a vertical slot) and the bar hanger holder may be coupled to the slot using, for example, a bolt fastener and a butterfly screw/nut. The slot may be oriented along an axis that is not parallel with the longitudinal axis of the bar hangers 1210-1 and 1210-2. For instance, the slot may define an axis orthogonal to the longitudinal axis of the bar hangers 1210-1 and 1210-2. In this manner, the position of the housing relative to the bar hanger assembly 1200 may be adjusted horizontally and vertically when installed into, for example, a ceiling. The separate bar hanger holder may incorporate several of the same features as the bar hanger holder 1160*a*. For example, the bar hanger holder may include one or more tabs to support the bar hangers 1210-1 and 1210-2 and/or a locking mechanism to lock the respective positions of the bar hangers 1210-1 and 1210-2 to the bar hanger holder.

In some implementations, the bar hanger holder may be manufactured together with the housing and separated post fabrication. For example, the bar hanger holder and the housing may be both formed from injection-molded plastic. A single mold may be used to fabricate the bar hanger holder and the housing at the same time. The mold may include one or more sprues, gates, and/or runners to direct molten plastic to the desired sections of the mold defining the housing and/or the bar hanger holder. After the injection molding process, the bar hanger holder may be coupled to the housing via one or more sections of plastic that are shaped based on the one or more sprues, gates, and/or runners. The bar hanger holder and the housing may be separated from these residual plastic components (e.g., by snapping the desired component off from a gate). For assembly, the bar hanger holder may be coupled to the housing using various mechanisms including, but not limited to a screw fastener, a bolt fastener, a snap-fit connector, and an adhesive. In this manner, the manufacturing and material costs may still be reduced compared to previous housing assemblies where the bar hanger holder is formed from metal. It should be appreciated, however, that in some implementations, the bar hanger holder may be manufactured separately from the housing. It should also be appreciated that, in some implementations, a separate bar hanger holder made of metal may also be coupled to the housings described herein.

FIGS. 3A-3E also show magnified views of the nail-in feature **1150*a* on the housing 1100*a*. As shown, the housing 1100*a* may include mounting platforms 1140*a*-1 and 1140*a*-2 (collectively referred to herein as a "mounting platform 1140*a*" or a "support platform 1140*a*") that extend outwards from the sidewall 1110*a* to support the nail-in features 1150*a*-1 and 1150*a*-2, respectively. In some implementations, the support platform 1140*a* may be merged together with the second section 1163 of the second tab 1164*a*. The nail-in feature 1150*a* may include a cylindrically shaped wall 1153 that defines the through hole 1152 to support and guide the fastener 1010**.

The nail-in feature **1150*a* may also include several notches or openings formed along the top and bottom sides of the wall 1153 to improve manufacturability by eliminating undercuts. As shown in FIGS. 3B-3E, the nail-in feature 1150*a* may include a first notch 1154 located on the top and center of the nail-in feature 1150*a* and second and third openings 1156 and 1158 located on the bottom and respective ends of the nail-in feature 1150*a*. As shown in FIGS. 3B and 3C, the first opening 1154 may overlap with the second and third openings 1156 and 1158 when viewing the housing 1100*a* from the top or bottom. The notches 1154, 1156, and 1158 may also be tapered to improve ease of manufacture by eliminating undercuts and facilitating removal of the housing 1100*a* from one or more molds similar to the sidewall 1110*a***.

The nail-in feature **1150*a* may generally be shaped to receive one or more types and/or sizes of fasteners 1010. For example, the fastener 1010 may be any type of fastener including, but not limited to, a nail, a screw fastener, and a scrail (i.e., a nail with screw threads). In some implementations, the fastener 1010 may be a wood screw tailored specifically for attachment with a wood joist or, more generally, a support structure formed of wood. In implementations where the fastener 1010 has screw threads, the interior surfaces of the wall 1153 may also have threads to engage the screw threads of the fastener 1010. In some implementations, the housing 1100*a* may be formed of a sufficiently soft material such that the screw forms threads onto the interior surfaces of the nail-in feature 1150 as the fastener 1010 is screwed through the nail-in feature 1150*a*. The diameter of the through hole 1152 may also be chosen to accommodate fasteners 1010 of varying size. For example, the diameter of the through hole 1152 in the nail-in features 1150*a* may be about 0.1 inches. More generally, the diameter of the through hole 1152** may range between about 0.1 inches and about 0.2 inches.

As shown in FIGS. 2C and 2D, the housing **1100*a* may include two nail-in features 1150*a*-1 and 1150*a*-2 disposed on opposite sides of the housing 1100*a*. The housing 1100*a* may further include a mounting platform 1142 disposed along the sidewall 1110*a* between the mounting platforms 1140*a*-1 and 1140*a*-2 and spanning a vertical portion of the sidewall 1110*a*. As shown in FIG. 2A, the mounting platforms 1140*a*-1, 1140*a*-2, and 1142 may collectively function as alignment features for the housing 1100*a* providing a substantially flat or flat surface to abut a surface of the support structure (e.g., the flat side of a wood joist). The mounting platforms 1140*a*-1 and 1140*a*-2 may generally provide a surface that extends horizontally along the support structure while the mounting platform 1142 provides a surface that extends vertically along the support structure. In this manner, the housing 1100*a* may accommodate different-sized support structures (e.g., different-sized joists). As shown in FIG. 2A, the walls 1153 of the nail-in features 1150*a*-1 and 1150*a*-2 may also be shaped to have a substantially flat end that aligns with the mounting platforms 1140*a*-1, 1140*a*-2, and 1142 to ensure the housing 1100*a*** can be placed flat against the support structure.

The housing **1100*a* may also include a lip 1144 disposed at one end of the mounting platform 1142 that protrudes outward from the sidewall 1110*a*. The lip 1144 may be shaped to contact an edge or a corner of the support structure to align the housing 1100*a* to the support structure horizontally and vertically. In some implementations, the lip 1144** may be shaped to conform with standard support structures, such as standard-sized wood joists.

In some implementations, the nail-in features **1150*a*-1 and 1150*a*-2 may be oriented such that the fasteners 1010 are inserted at an acute angle relative to the surface of the mounting platforms 1140*a*-1, 1140*a*-2, and 1142 abutting the support structure or, more generally, an acute angle relative to each other. For example, FIG. 2C shows the nail-in features 1150*a*-1 and 1150*a*-2 are oriented along axes 1151-1 and 1151-2, respectively. The axes 1151-1 and 1151-2, in turn, are at equal, but opposite angles relative to a normal axis 1143 of the mounting platform 1142. With this arrangement, the fasteners 1010 may be inserted into the support structure at different angles, which allows for a more stable and secure attachment by utilizing the frictional force and reactionary transverse forces generated between the surface of the fastener 1010 and the support structure. In some implementations, the nail-in features 1150*a*-1 and 1150*a*-2 may be oriented at an angle relative to the axis 1143** ranging between about 30 to about 45 degrees.

In some implementations, the nail-in features **1150*a*-1 and 1150*a*-2 may be further oriented at a second angle with respect to a plane that is not parallel with the mounting platform 1142 (e.g., a vertical plane orthogonal to the mounting platform 1142). For example, the nail-in features 1150*a*-1 and 1150*a*-2 may be rotated such that the heads of the fasteners 1010 are oriented towards the environment being illuminated by the lighting system (i.e., towards a ceiling panel) or away from the illuminated environment. Orienting the nail-in features 1150*a*-1 and 1150*a*-2 in this manner may provide more clearance for a tool (e.g., a hammer) to contact the fasteners 1010 during installation. For instance, the housing 1100*a* may be installed in close proximity to one or more obstacles in a ceiling space (e.g., a joist, a duct), which may prevent a hammer from contacting the fasteners 1010** unless rotated about a vertical plane.

As described above, the various features extending outwards from the sidewall 1110 may be offset form the front end 1111-1 to provide sufficient clearance for the ceiling. Similar to the bar hanger holder 1160*a*, the mounting platform 1142 and, in particular, the lip 1144 may be offset form the first end 1111-1 of the sidewall 1110*a* by an offset distance, $h_2$. The offset distance $h_2$ may be defined as the distance between the first end 1111-1 and the bottom-most portion of the lip 1144. Similar to the offset distance $h_1$, the offset distance $h_2$ may be at least about ½ inch.

As described above, in a typical recessed lighting installation, the housing 1100*a* may be partially disposed through an opening formed in a ceiling to allow, for example, light from a lighting module to illuminate an environment. The creation of the opening in the ceiling, however, may compromise the insulating properties of the ceiling (e.g., thermal resistance, sound attenuation, air tightness, water resistance). The housing 1100*a*, however, may be designed to compensate or at least offset some of these losses.

For example, the housing assembly 1000*a* and the housing 1100*a* may withstand a fire for at least 1 hour and, more preferably, 2 hours, during which the housing 1100*a* may function as a barrier to prevent the spread of flames and/or smoke from one environment to another environment (e.g., from one floor to another floor of a building). This may be accomplished, in part, by forming the housing 1100*a* from a non-combustible material, providing a housing 1100*a* with a sufficient thickness or gauge, and/or limiting and/or obstructing any openings that may be formed in the housing 1100*a*. For instance, one knockout 1122 may be removed to allow wiring into the housing 1100*a*, but the opening may be blocked by the presence of a lighting module, a trim, or a combination of the foregoing in the housing 1100*a*.

In another example, the installation of conventional housing assemblies often leads to gaps formed between the housing and the opening in the ceiling resulting in unwanted air leakage. For example, the user may accidentally cut an opening in the ceiling that is larger than required to accommodate the housing 1100*a*. If not compensated properly, air leakage may lead to higher energy consumption and/or costs for cooling and/or heating of the environment. Air leakage may also leave the ceiling space susceptible to moisture accumulation and mold growth. To mitigate air leakage, the housing 1100*a* may form an air-tight seal with the ceiling. For instance, the housing assembly 1000*a* may include a gasket that substantially seals the gap(s) formed between the housing 1100*a* and the opening in the ceiling. It should be appreciated the housing 1100*a* is not limited only to gaskets, but other sealing components may be used to provide an air-tight seal including, but not limited to an O-ring and flexible tape.

In yet another example, the gaps formed between the housing and the opening in the ceiling in conventional housing assemblies may also compromise the soundproofing of the ceiling, which may lead to unwanted noise in the environment especially in a multi-family residential structures and/or an office. Similar to the mitigation of air leakage, an air-tight housing assembly 1000*a* may also reduce unwanted sound transfer. Additionally, the housing 1100*a* may be formed from a material and/or have a sufficient thickness to attenuate unwanted acoustic noise.

In some implementations, the various properties of the housing assembly 1000*a* may satisfy one or more safety standards related to fire resistance, sound attenuation, air tightness, concrete tightness, structural rigidity, and water resistance. For example, the housing 1100*a* may be qualified as a luminaire fixture based on the specifications set forth by the National Electric Code (NEC) and/or the Underwriter's Laboratory (UL). For instance, the housing 1100*a* may be qualified as a luminaire fixture if the housing 1100*a* satisfies UL1598 corresponding to the UL standard for luminaires. In another example, the housing 1100*a* may be qualified as a junction box if the housing 1100*a* satisfies UL514C, which is the UL standard for nonmetallic outlet boxes, flush-device boxes, and covers. In yet another example, the housing 1100*a* may be classified with a "poke-through fire-rating" (e.g., UL263), which allows products to be installed in a fire-rated ceiling without the use of a secondary fire-stop material.

The housing 1100*a* may also be classified as being fire-rated 1100*a* if the housing 1100*a* satisfies UL263, which corresponds to the UL standard for fire tests of building construction and materials, or the standards set forth by the American Society for Testing and Materials (ASTM) and/or the National Fire Protection Association (NFPA). For example, the housing 1100*a* may have an hourly rating (e.g., 1 hour, 2 hour) and a location rating (e.g., ceiling) based on the location of the housing assembly 1000*a* in the environment.

The housing 1100*a* may also satisfy structural rigidity specifications set forth by the NEC and/or the UL (e.g., UL 1598, UL 514C) for a luminaire fixture or an electrical junction box. The housing 1100*a* may also be insulation contact (IC) rated, allowing insulation in a ceiling to physically contact the housing 1100*a* during operation. An IC rated housing 1100*a* may enable the housing assembly 1000*a* to be installed without use of a separate enclosure (e.g., a firebox). The housing 1100*a* may also meet air tightness standards (e.g., ASTM E283 certification). The housing 1100*a* may also meet sound ratings according to the specifications set forth by the Sound Transmission Class (STC) and/or the Impact Insulation Class (IIC).

It should be appreciated the safety standards cited herein are exemplary. The housing assembly 1000*a* may generally satisfy similar and/or equivalent safety standards from other organizations and/or associations, which may vary by municipality, county, state, province, or country. Furthermore, the housing assembly 1100*a* may satisfy the specifications set forth by safety standards as they are modified and/or updated over time.

As described above, the housing(s) in conventional recessed lighting systems are typically formed from sheet metal, which limits the geometry and structural features on the housing due to the limitations and added costs of conventional sheet metal forming processes. In contrast, the housing 1100*a* may be formed from a polymer, which is intrinsically lighter and lower cost than sheet metal. Polymer housings may also more easily meet the various safety standards described above. For example, polymers typically have a lower thermal conductivity than metals. Thus, a polymer housing may provide a more effective heat barrier compared to a sheet metal housing. Alternatively, a polymer housing may use less material (e.g., a smaller thickness) while providing similar thermal insulating properties as conventional sheet metal housings. Furthermore, a polymer housing may be formed using manufacturing techniques that are more readily able to form complex, non-uniform structural features unlike conventional sheet metal forming processes, such as injection molding. For example, the various features of the housing 1100*a* described above may be integrally formed into one single polymer component.

It should be appreciated that, in some implementations, the housings described herein may be assembled from two or more components that are separately manufactured. This may further improve the ease of manufacture of the various features of the housing 1100*a*. In one example, the housing 1100*a* may be assembled from (1) a top component that includes the cover 1120*a* and the portion of the sidewall 1110*a* extending down from the cover 1120*a* to the top of the bar hanger holders 1160*a* and (2) a bottom component that includes the bar hanger holders 1160*a* and nail-in features 1150*a* and extends down to the first end 1111-1. The top and bottom components may be joined together, for example, by a snap-fit connection.

Generally, the housing 1100*a* may be formed from various thermoplastic and thermosetting polymers including, but not limited to, polyvinyl chloride (PVC), acrylonitrile butadiene styrene (ABS), polycarbonate (PC), polyurethane (PU), polyethylene, polyethylene terephthalate, polypropylene, and polystyrene. The housing 1100*a* may be fabricated using various manufacturing techniques and processes including, but not limited to, injection molding, 3D printing, and blow molding.

Figure 4A:
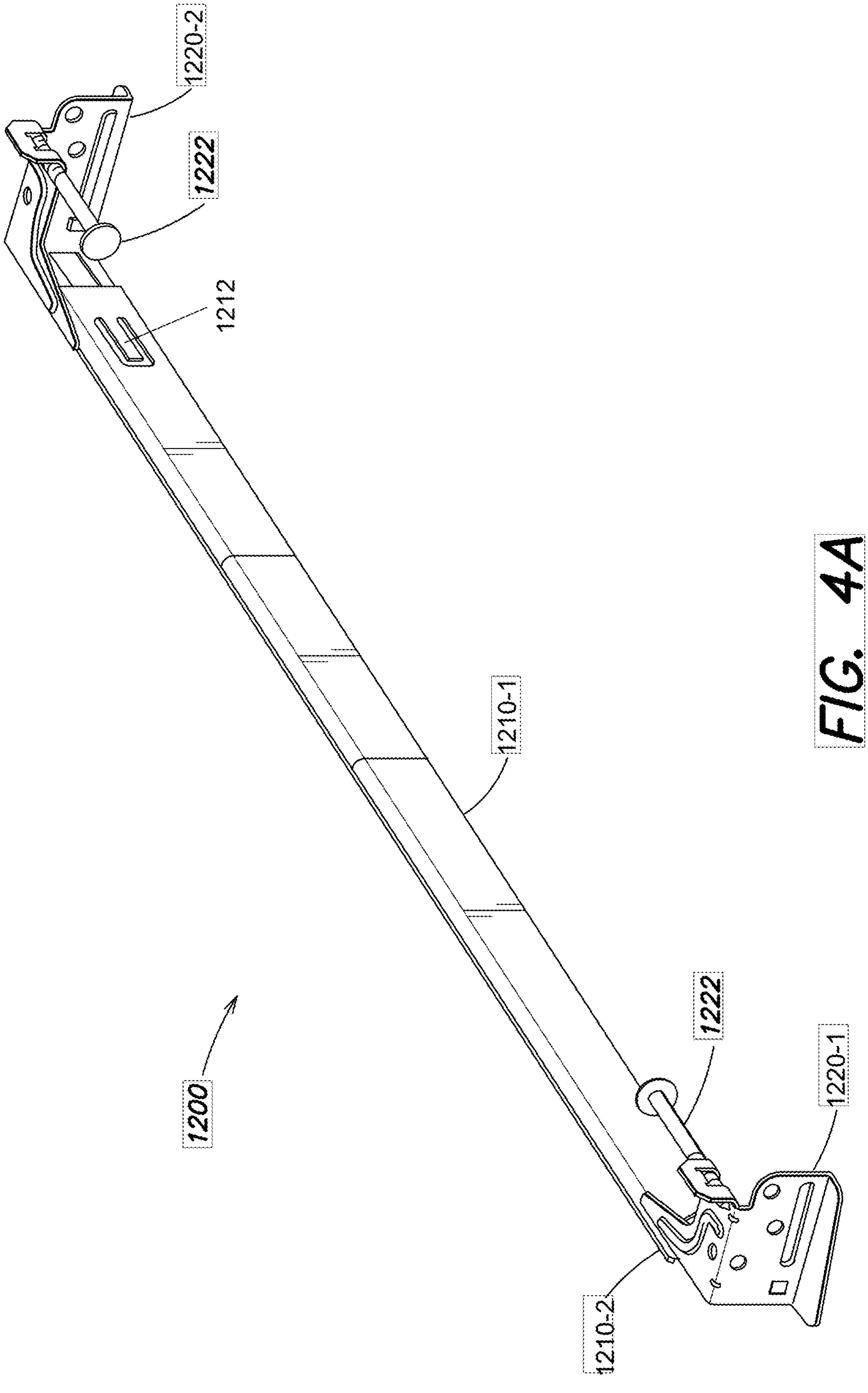
FIG. 4A shows a top, left, front perspective view of a bar hanger assembly in the housing assembly of FIG. 1A.
Figure 4B:
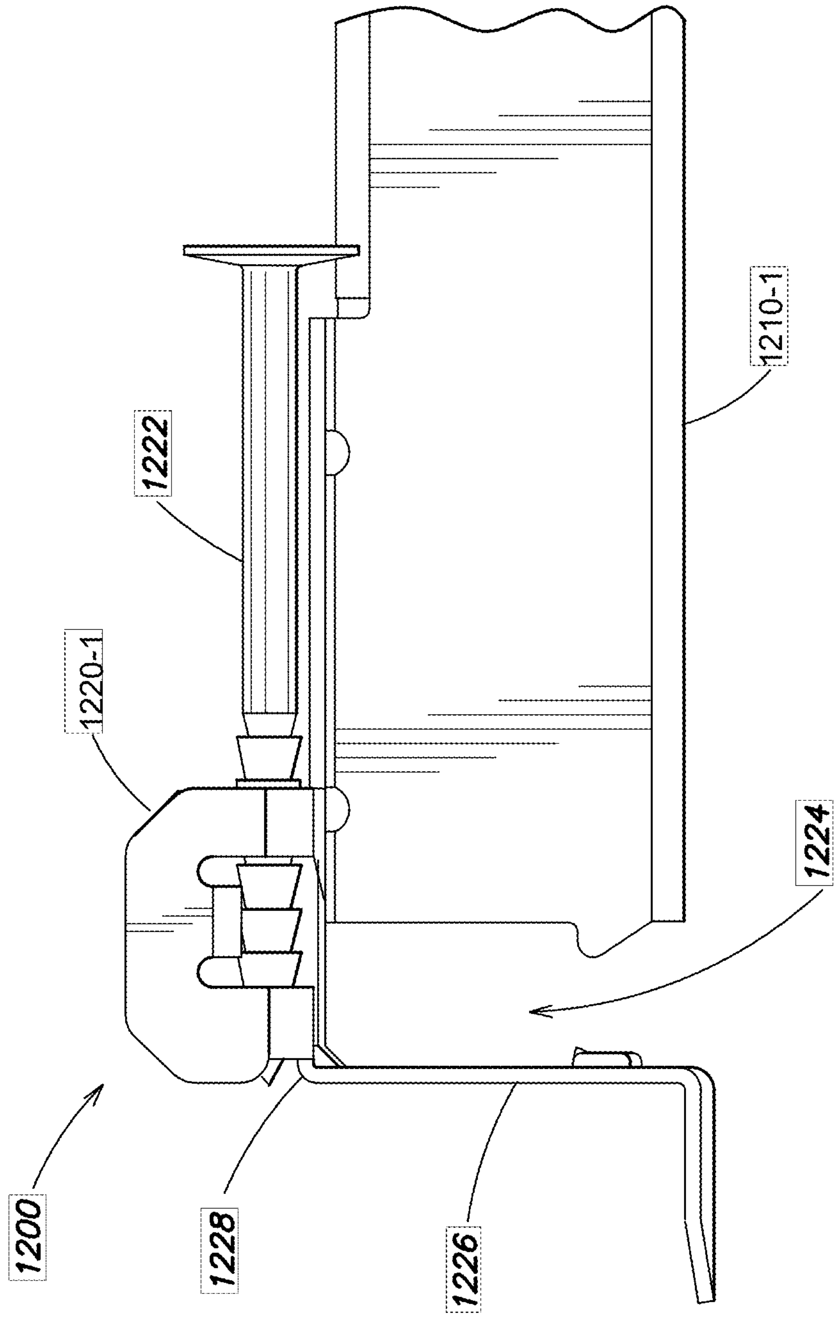
FIG. 4B shows a magnified front view of a bar hanger head in the bar hanger assembly of FIG. 4A.
Figure 4C:
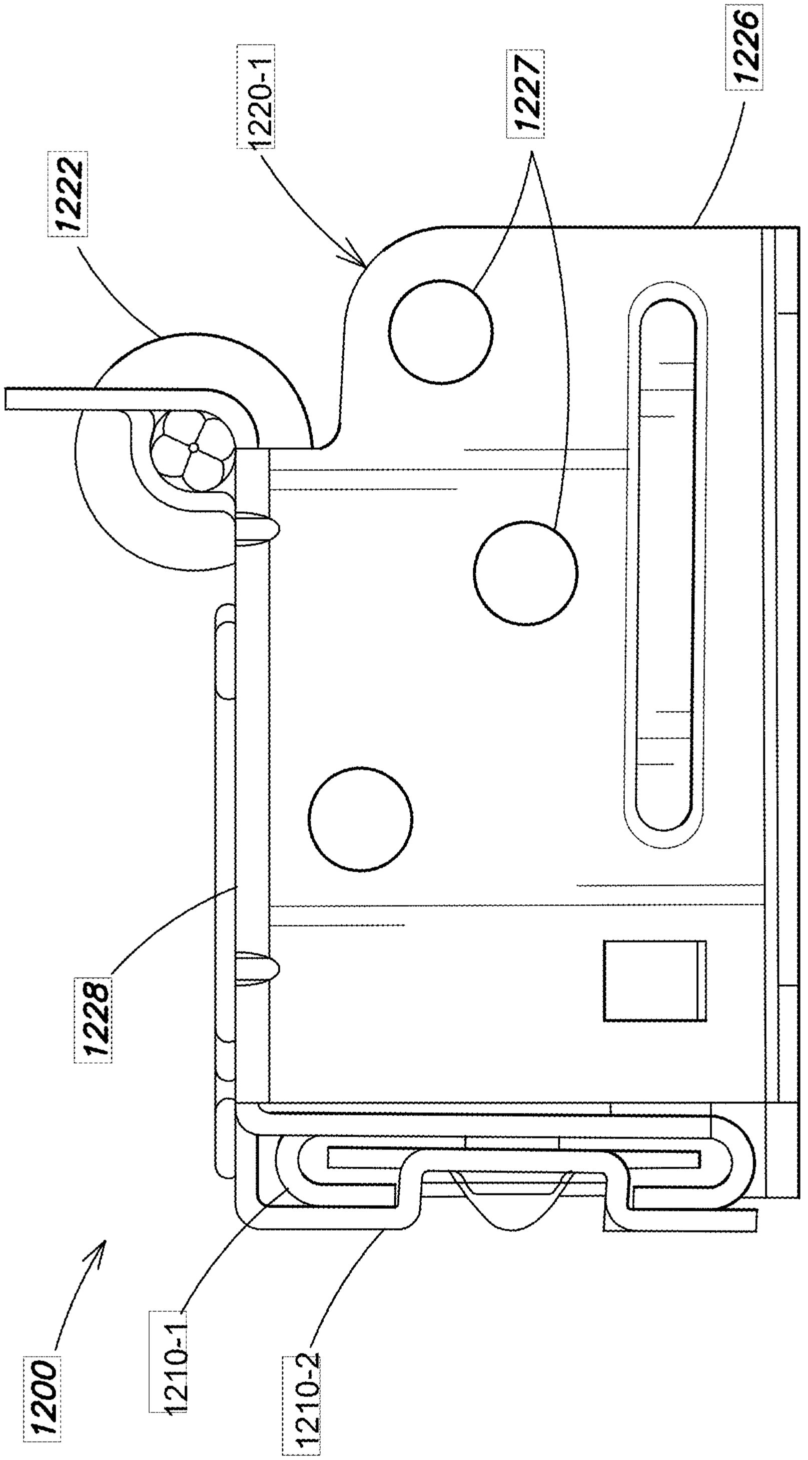
FIG. 4C shows a magnified right-side view of the bar hanger head in the bar hanger assembly of FIG. 4A.

FIGS. 4A-4C show several additional views of the bar hanger assembly 1200 in the housing assembly 1000*a*. As described above, the bar hanger assembly 1200 may be an optional component depending on whether the nail-in features 1150*a* are used for installation. Furthermore, the bar hanger assembly 1200 shown in FIGS. 1A-1M may include off-the-shelf components to reduce manufacturing and material costs. As described above, however, the bar hanger assembly 1200 is not limited to commercially available components, but, in other implementations, may also include bar hangers that are custom-tailored specifically for the housing assembly 1000*a*. The housing 1100*a* may thus be compatible with a wide variety of different bar hanger assemblies 1200.

The bar hanger assembly 1200 may generally provide several features to facilitate the adjustment and/or attachment of the housing 1100*a* to a support structure. The following includes references to features in the bar hanger assembly 1200 shown in FIGS. 4A-4C. However, it should be appreciated the particular implementation of the features in the bar hanger assembly 1200 are exemplary. Similar and/or identical features may be incorporated in other off-the-shelf and/or custom-made bar hanger assemblies in similar or different arrangements.

The bar hanger assembly 1200 may include bar hangers 1210-1 and 1210-2 with respective bar hanger heads 1220-1 and 1220-2, which are supported by the integrated bar hanger holder 1160*a* of the housing 1100*a*. Generally, the bar hangers 1210-1 and 1210-2 may slide telescopically with respect to one another and slide with respect to the housing 1100*a* along the passageway 1172 defined by the bar hanger holder 1160*a*. In this manner, the overall length of the bar hanger assembly 1200 may be adjusted in order to traverse gaps of varying size between adjacent support structures in various environments. Each of the bar hangers 1210-1 and 1210-2 may include a locking tab 1212 and a tab opening (not shown). When the bar hangers 1210-1 and 1210-2 are telescopically coupled to one another, the locking tab 1212 of the bar hanger 1210-1 may engage the tab opening of the bar hanger 1210-2 when the bar hangers 1210-1 and 1210-2 are fully extended, thus preventing separation of the bar hangers 1210-1 and 1210-2.

The bar hangers 1210*a* and 1210*b* and/or the bar hanger heads 1220*a* and 1220*b* may have various dimensions and/or shapes. In some implementations the bar hanger assembly 1200 may be replaced by a pipe, such as an electric metallic tube (EMT), to support the housing 1100*a*. The bar hanger holder 1160*a* (also referred to herein as a "pipe holder"), in turn, may be shaped and/or dimensioned to accommodate the particular geometry of the bar hanger assembly 1200.

The bar hanger heads 1220-1 and 1220-2 provide one or more mounting features to couple the bar hanger assembly 1200 and, hence, the housing assembly 1000*a* to a support structure. In general, the mounting features may be tailored for attachment to various types of support structures including, but not limited to, a wood joist or stud, a metal joist or stud, a T-bar, and a hat channel. For example, FIGS. 4B and 4C show the bar hanger heads 1220-1 and 1220-2 may each include a base 1228 that joins the bar hanger heads 1220-1 and 1220-2 to the respective bar hangers 1210-1 and 1210-2 and a flange 1226 that extends from the base 1228 to abut a wood or metal joist. As shown, the flange 1226 may have an L-shaped structure to abut two sides of a wood/metal joist or stud. The base 1228 may be shaped to receive the fastener 1222, which is used to fasten the bar hanger heads 1220-1 and 1220-2 to the wood/metal joist or stud.

FIG. 4B further shows the base 1228 of the bar hanger 1210*a* may have a slot 1224 between the bar hanger 1210-1 and the flange 1226. The bar hanger 1210-2 may similarly provide a slot or a channel 1224 with the bar hanger 1210-2. The channel 1224 may be shaped to receive a portion of a T-bar. In some implementations, the flange 1226 may further include openings 1227 for other fasteners (not shown) to couple the bar hanger heads 1220-1 and 1220-2 to the T-bar or another support structure.

In some implementations, the bar hangers 1210-1 and 1210-2 and the bar hanger heads 1220-1 and 1220-2 may have substantially identical shapes and/or dimensions. In other implementations, the bar hangers 1210-1 and 1210-2 and the bar hanger heads 1220-1 and 1220-2 may have different shapes and/or dimensions. The shape and dimensions of the bar hanger assembly 1200 may depend, in part, on the shape of the bar hanger holder 1160*a* and, in particular, the passageway 1172. Specifically, the bar hangers 1210-1 and 1210-2 should preferably fit through the passageway 1172 such that the gaps between the bar hangers 1210-1 and 1210-2 and the first, second, and third tabs 1162*a*, 1164*a*, and 1166*a* are kept small in order to reduce unwanted lateral play.

In some implementations, the bar hanger assembly 1200 may also be shaped and dimensioned to provide sufficient clearance for the ceiling. For example, FIG. 1F shows the bottom-most portion of the bar hanger assembly 1000*a* coincides with the bottom portion of the flange 1226. As before, an offset distance, $h_3$, may be defined between the edge 1112 and the bottom portion of the flange 1226. The offset distance $h_3$ may be at least about ½ inch. Alternatively, the shape, dimensions, and location of the bar hanger holder 1160*a* along the sidewall 1110*a* of the housing 1100*a* may instead be tailored to accommodate the bar hanger assembly 1200. For example, the flange 1226 of the bar hanger heads 1220-1 and 1220-2 may extend appreciably downwards from the base 1228 in some implementations. To accommodate the bar hanger assembly 1200, the offset distance $h_2$ of the bar hanger holder 1160 may be increased such that the offset distance $h_3$ of the bar hanger assembly 1200 is maintained at about ½ inch.

In some implementations, the bar hanger holder 1160*a* may be compatible with multiple types and/or sized bar hanger assemblies 1200. For example, the bar hanger assembly 1200 may include commercial-off-the-shelf bar hangers and/or bar hanger heads. In another example, the bar hanger assembly 1200 may include bar hangers and/or bar hanger heads that are tailored for the housing 1100*a* and/or provide additional features, such as greater lateral constraints to reduce unwanted play, greater ease of manufacture (e.g., identical bar hangers), and/or particular mounting features for other support structures, such as a hat channel. Examples of bar hangers and bar hanger heads and/or bar hanger heads that provide these desired features may be found in U.S. application Ser. No. 16/886,365, filed on May 28, 2020, entitled, "ADJUSTABLE HANGER BAR ASSEMBLY" and International Application No. PCT/US2019/054220, filed on Oct. 2, 2019, entitled, "A BAR HANGER ASSEMBLY WITH MATING TELESCOPING BARS." The contents of each of the aforementioned applications is incorporated by reference herein in its entirety.

Installation of the Housing Assembly

As described above, the housing 1100*a* in the housing assembly 1000*a* may provide multiple integrated features (e.g., the bar hanger holder 1160*a*, the nail-in feature 1150*a*) supporting multiple modes of installation. Furthermore, unlike previous housings in conventional recessed lighting systems, the housing 1100*a* may integrate these features together in a single component. The following provides several examples that illustrate the different support structures and/or modes of installation provided by the housing assembly 1000*a* described herein.

Figure 5A:
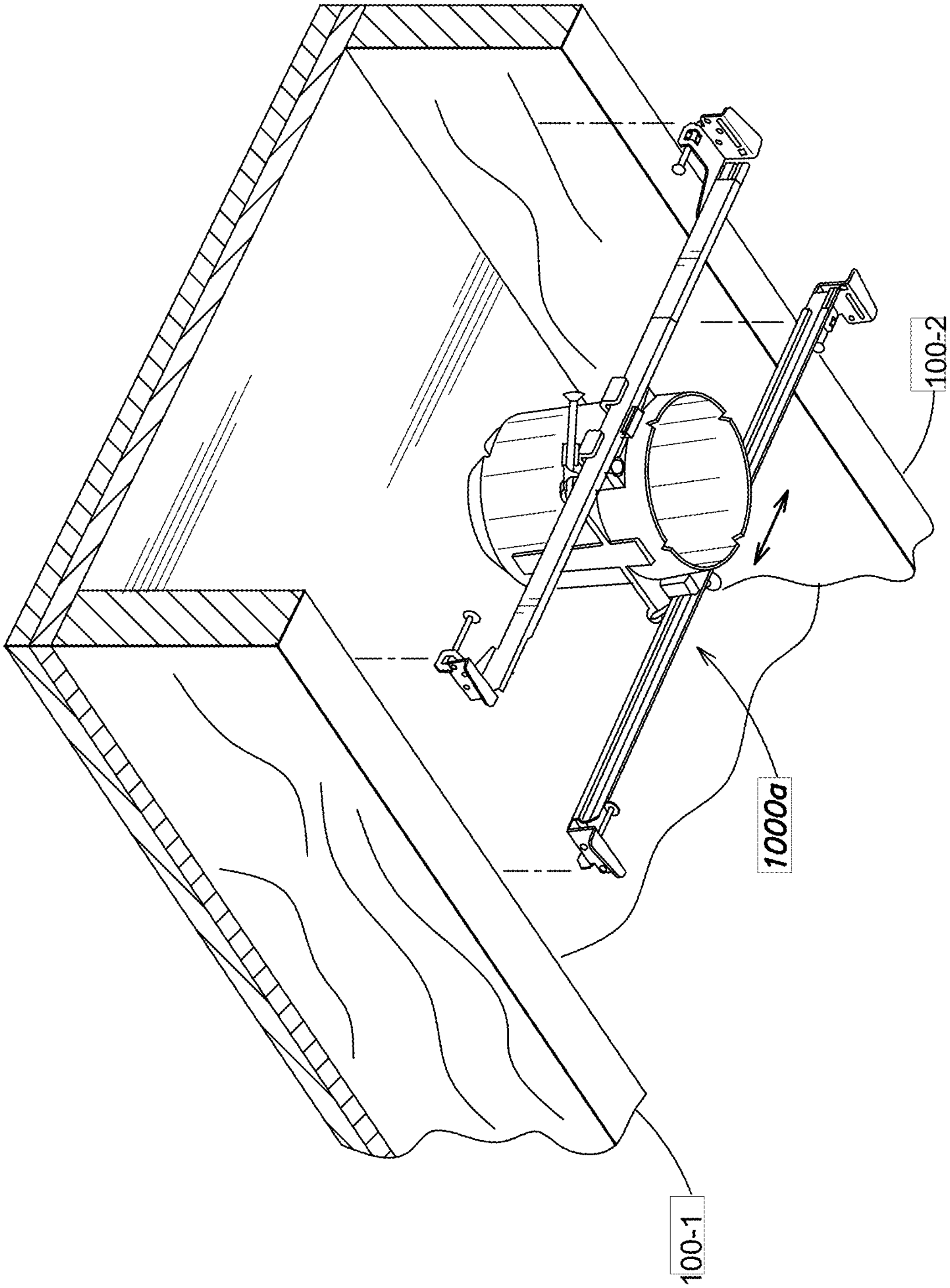
FIG. 5A shows a perspective view of the housing assembly of FIG. 1A aligned to a pair of wood joists prior to being installed onto the wood joists.
Figure 5B:
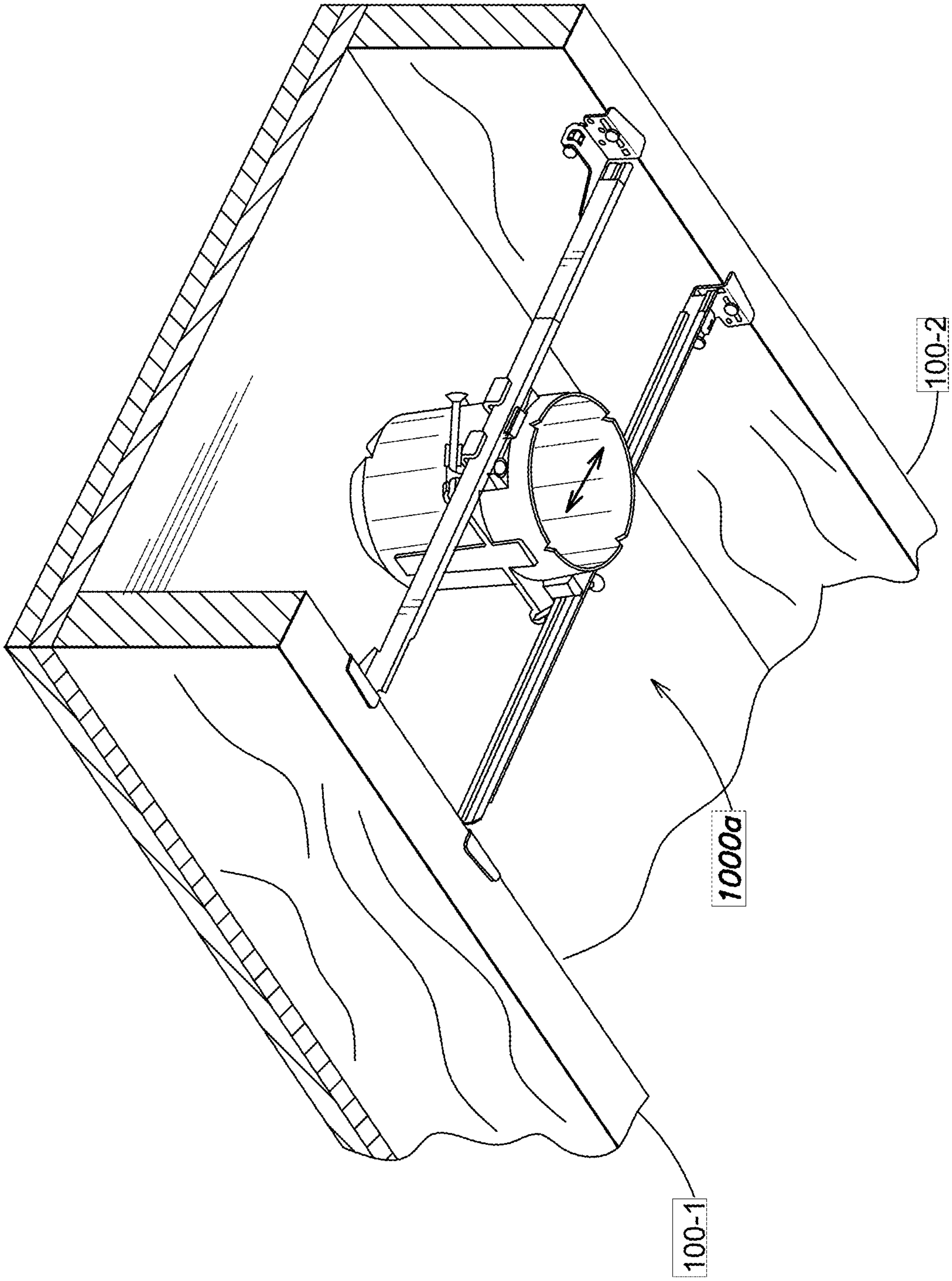
FIG. 5B shows a perspective view of the housing assembly of FIG. 5A coupled to the wood joists via the bar hanger assemblies.
Figure 5C:
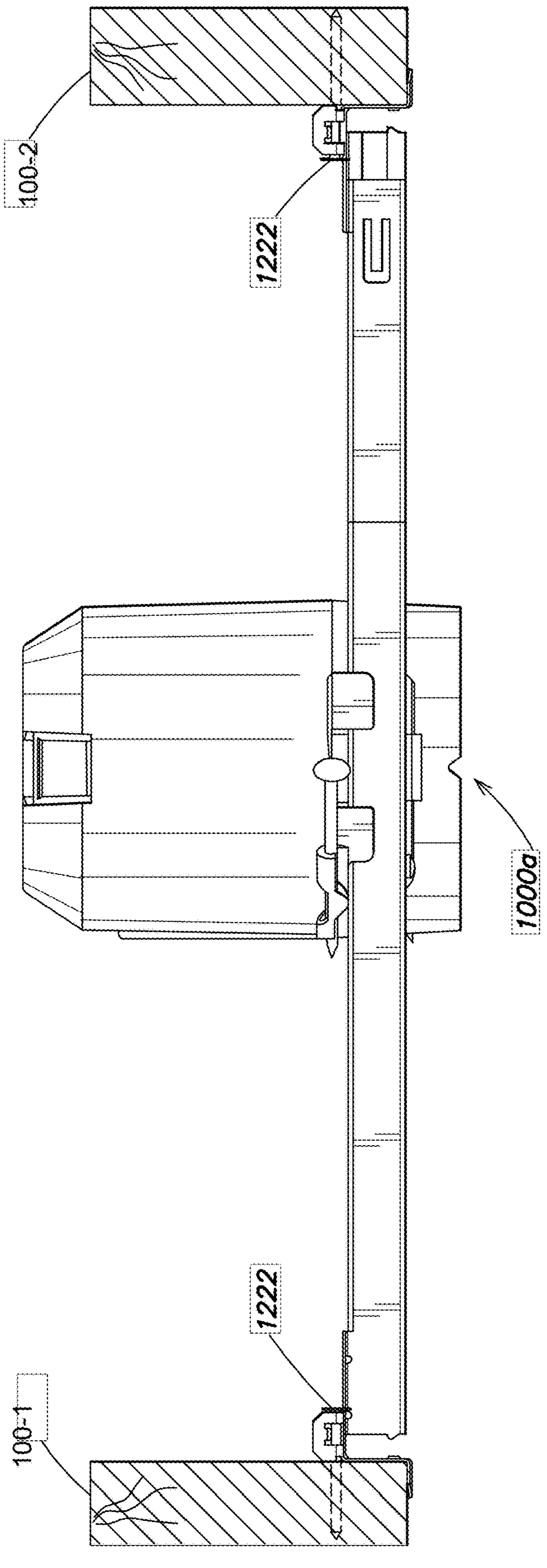
FIG. 5C shows a front view of the housing assembly of FIG. 5B.

FIGS. 5A-5C show several views of the housing assembly 1000*a* installed onto two wood joists 100-1 and 100-2 via the bar hanger assemblies 1200-1 and 1200-2. In particular, the housing assembly 1000*a* in FIG. 5A is placed below the wood joists 100-1 and 100-2 to show the alignment of the respective bar hanger heads 1220-1 and 1220-2 of the bar hanger assemblies 1200-1 and 1200-2 to the wood joists 100-1 and 100-2. FIG. 5B shows the housing assembly 1000*a* coupled to the wood joists 100-1 and 100-2. FIG. 5C shows the respective flanges 1226 of each bar hanger head 1220-1 and 1220-2 may abut two sides of the wood joists 100-1 and 100-2. The fasteners 1222 may then be used to attach the housing assembly 1000*a* to the wood joists 100-1 and 100-2.

Figure 6A:
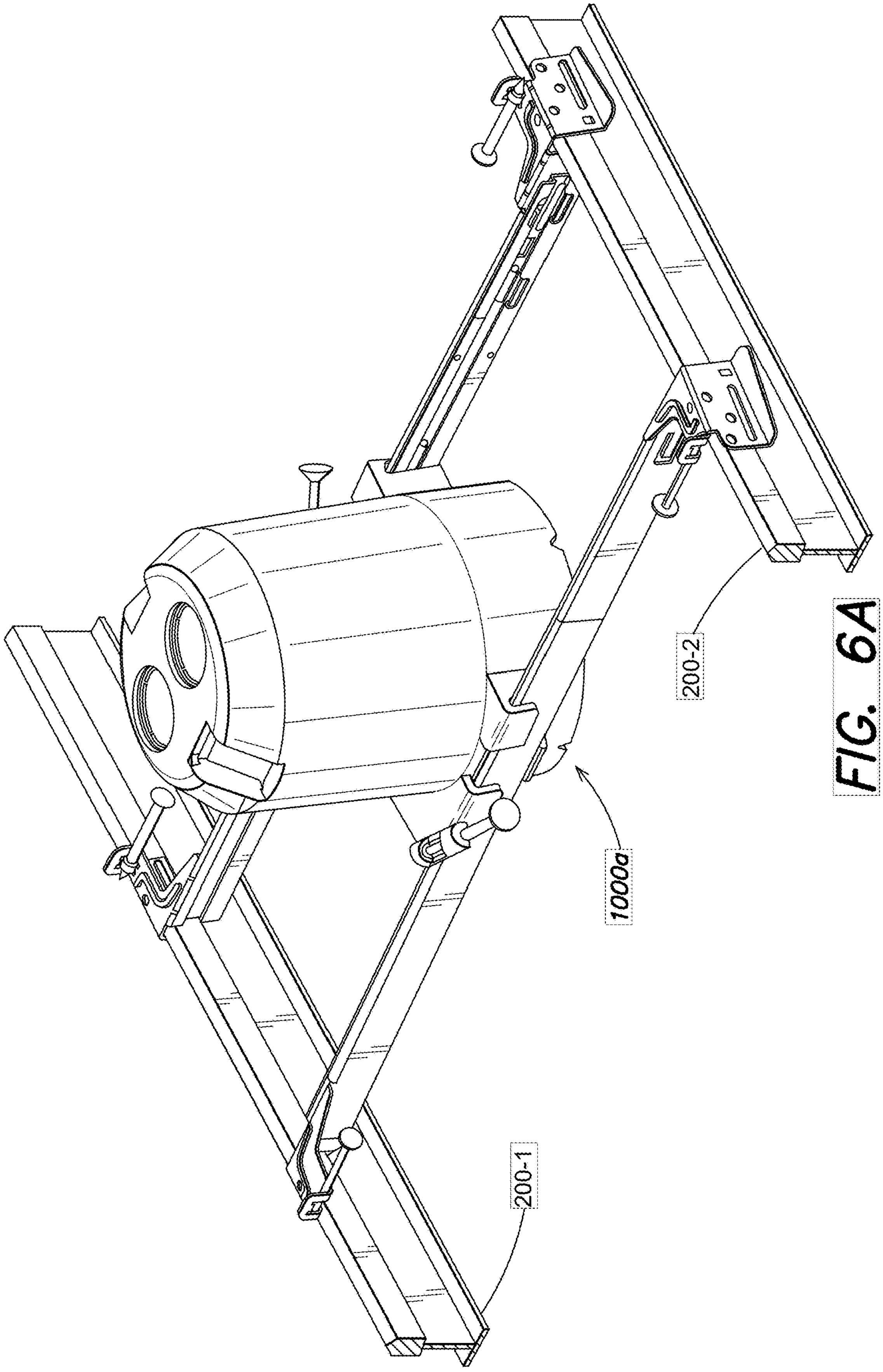
FIG. 6A shows a perspective view of the housing assembly of FIG. 1A coupled to a pair of T-bars via the bar hanger assemblies.
Figure 6B:
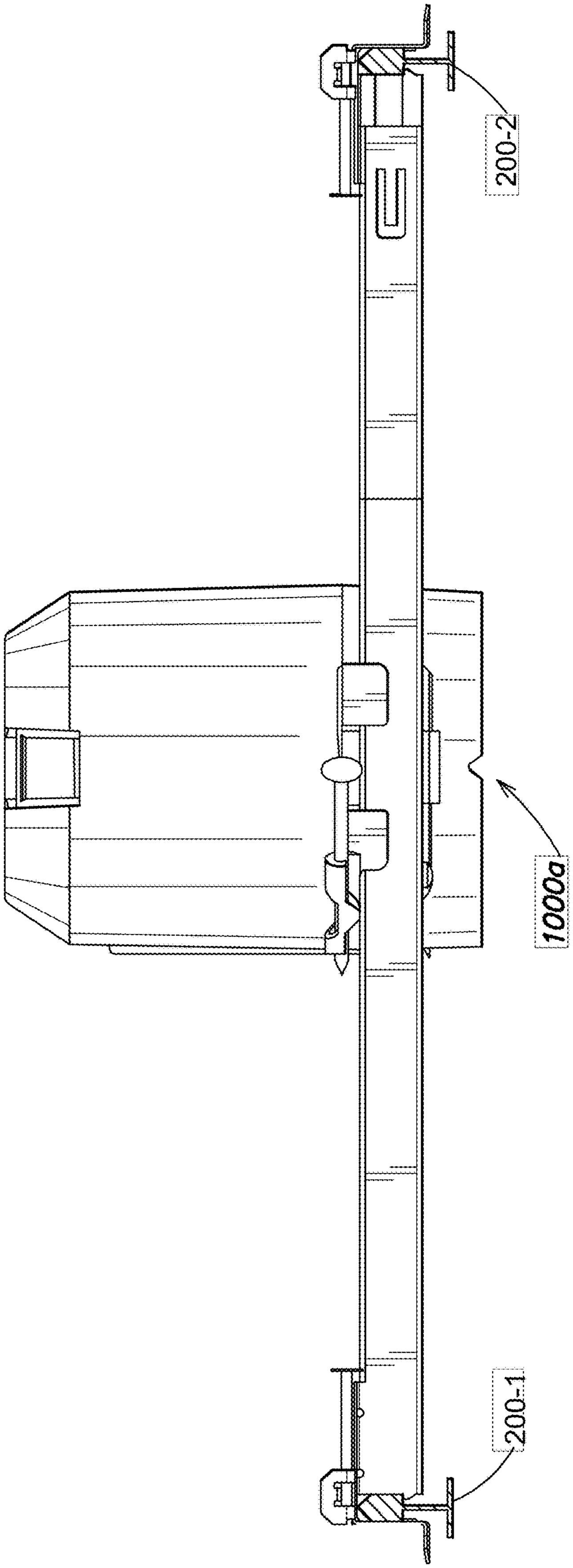
FIG. 6B shows a front view of the housing assembly of FIG. 6A.

FIGS. 6A and 6B show several views of the housing assembly 1000*a* installed onto two T-bars 200-1 and 200-2 via the bar hanger assemblies 1200-1 and 1200-2. As shown, the T-bars 200-1 and 200-2 may fit into the respective channels 1224 of each bar hanger head 1220-1 and 1220-2 such that the housing assembly 1000*a* fits onto the T-bars 200-1 and 200-2. Fasteners (not shown) may be inserted through the openings 1227 of each bar hanger head 1220-1 and 1220-2 to secure the housing assembly 1000*a* to the T-bars 200-1 and 200-2.

Figure 7A:
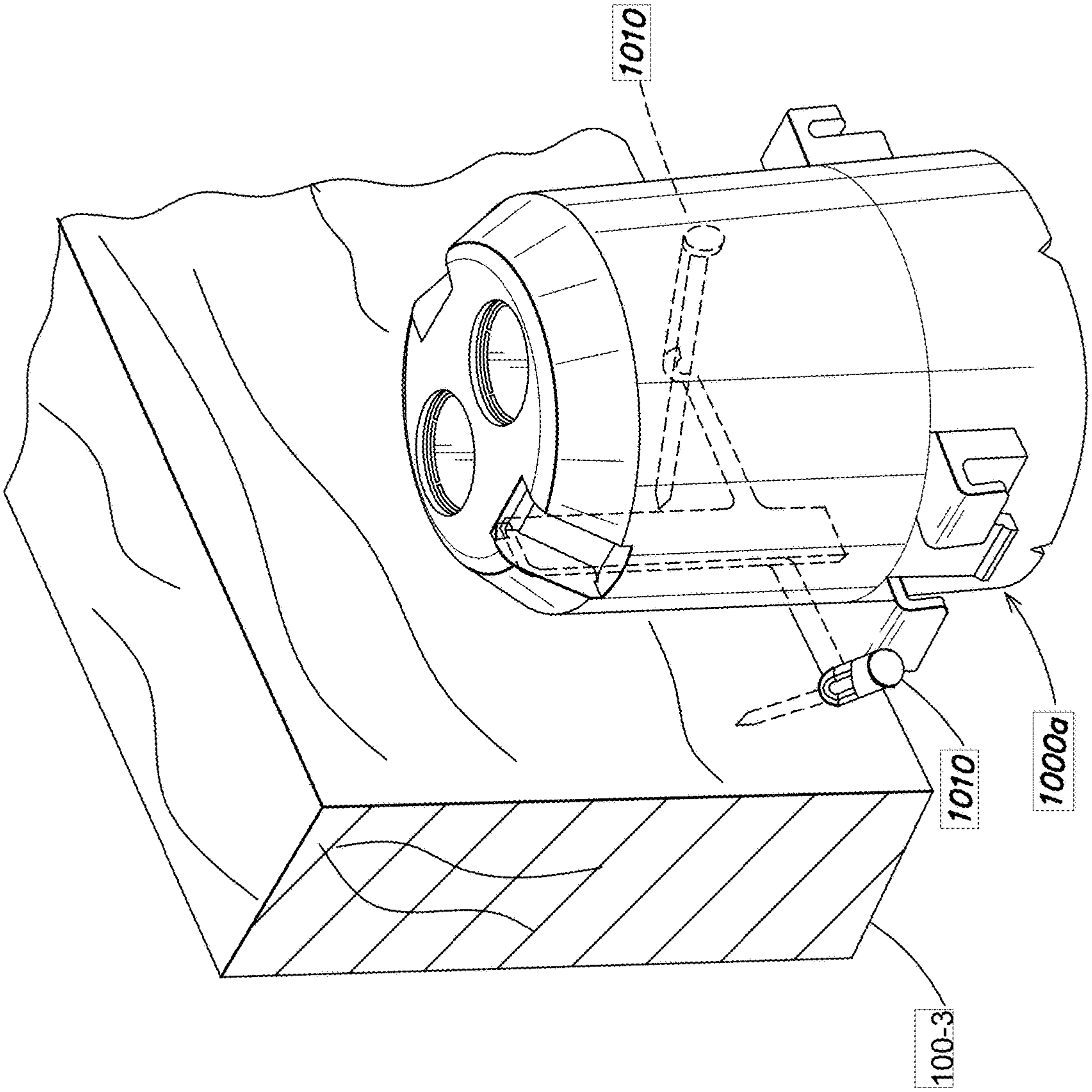
FIG. 7A shows a perspective view of the housing assembly of FIG. 1A directly coupled to a wood joist using the nail-in features. The bar hanger assemblies are removed.
Figure 7B:
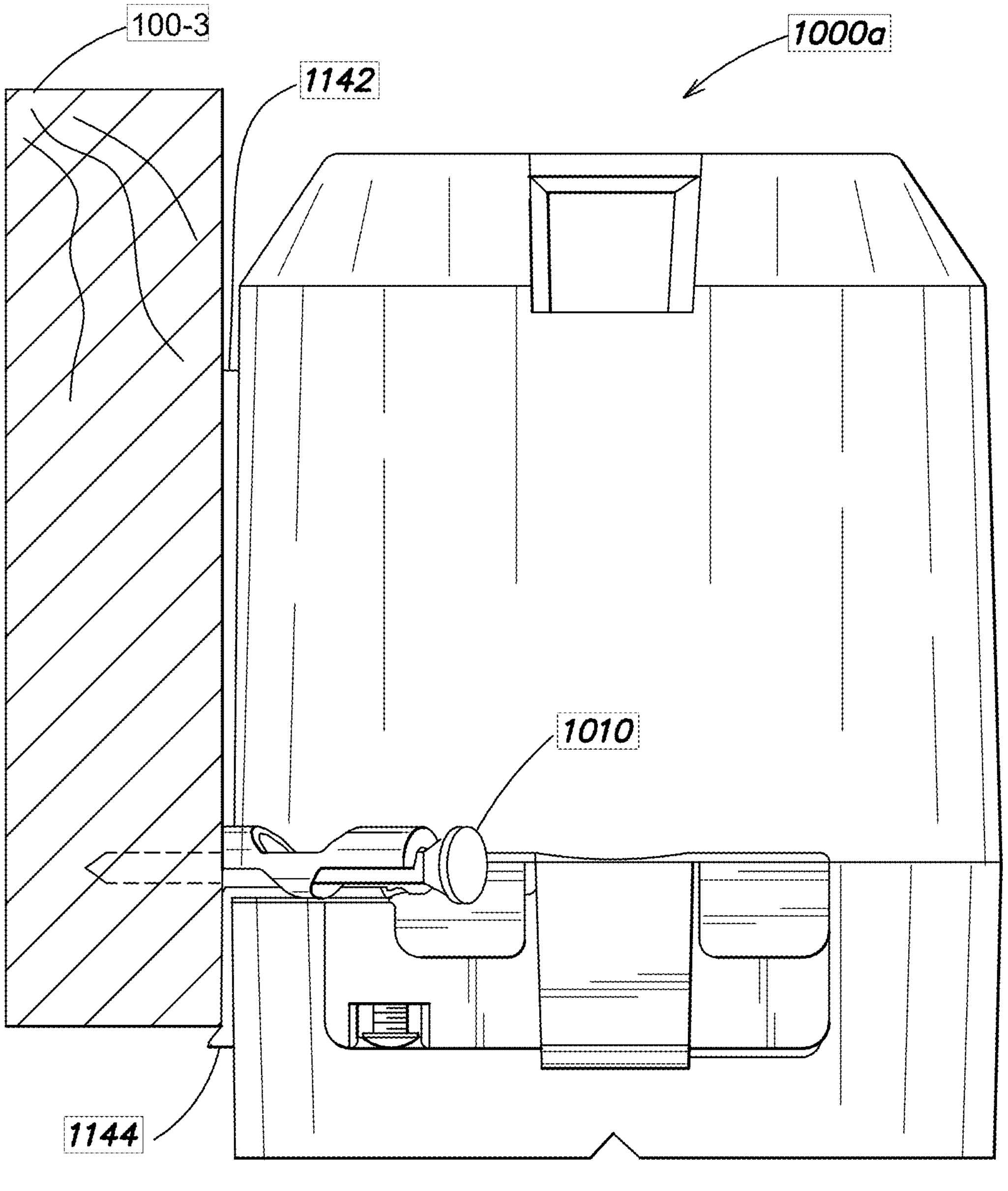
FIG. 7B shows a front view of the housing assembly of FIG. 7A.
Figure 7C:
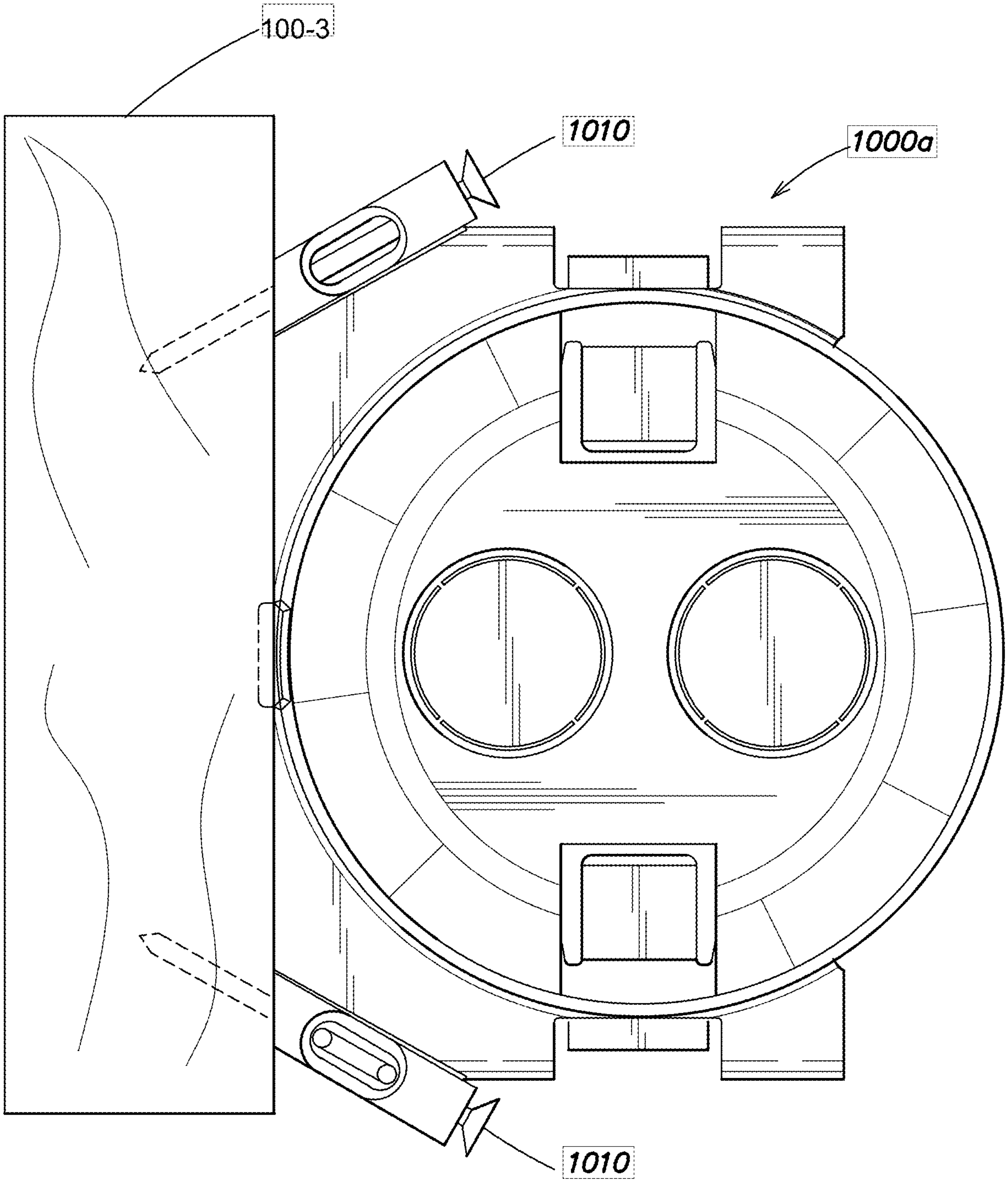
FIG. 7C shows a top view of the housing assembly of FIG. 7A.

FIGS. 7A-7C show several views of the housing assembly 1000*a* installed onto a single wood joist 100-3 via the nail-in features 1150*a*-1 and 1150*a*-2. For this example, the housing assembly 1000*a* does not include the bar hanger assemblies 1200-1 and 1200-2. The portion of the fasteners 1010 disposed within the wood joist 100-3 are depicted in dash lines for the purposes of showing the placement and orientation of the fasteners 1010 in the wood joist 100-3 after installation.

As shown, the mounting platform 1142 may abut one side of the wood joist 100-3 and the lip 1144 may contact a corner and/or edge of the wood joist 100-3. Thus, the mounting platform 1142 and the lip 1144 may align the housing 1100*a* to the wood joist 100-3. FIG. 7C shows respective fasteners 1010 may be inserted through the nail-in features 1150*a*-1 and 1150*a*-2 for attachment to the wood joist 100-3. As shown, the fasteners 1010 are inserted at acute angles in order to support the housing assembly 1000*a* via the frictional forces as well as the reactionary transverse forces generated between the wood joist 100-3 and the surfaces of the fastener 1010 based on the orientation of the two fasteners 1010.

A Housing Assembly with a Sealing Component

In some implementations, the housing assembly may also include features to facilitate an air-tight seal with a ceiling. As described above, an air-tight seal may beneficial in reducing air leakage particularly in environments that are susceptible to appreciable temperature variations and/or moisture infiltration. In some implementations, this may be accomplished by incorporating a sealing component, such as a gasket, into the housing assembly that physically contacts the ceiling, thus forming a seal to substantially reduce or, in some instances, mitigate air leakage. The sealing component may be integrated into the housing assembly in several ways.

Figure 8A:
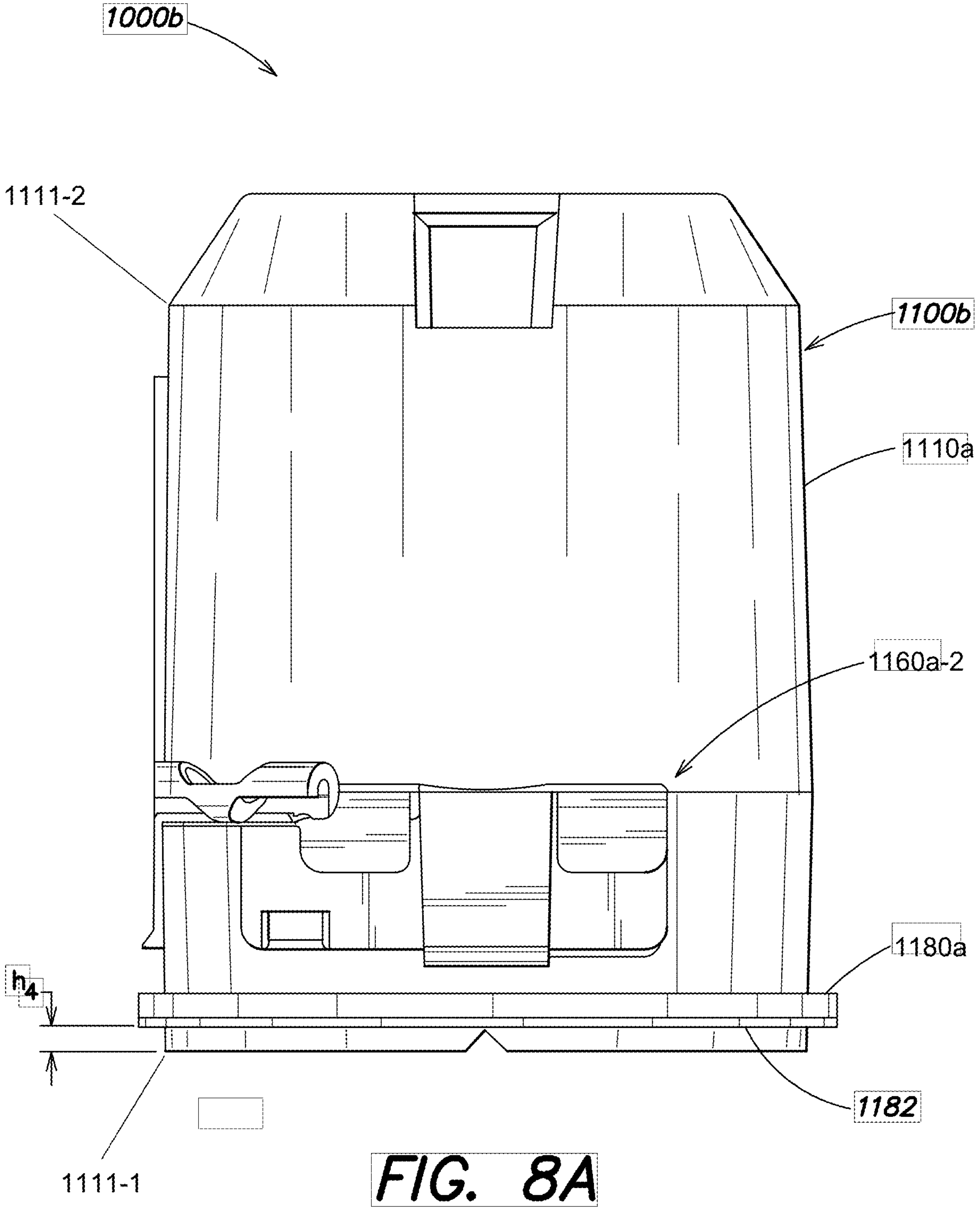
FIG. 8A shows a front view of another exemplary housing assembly with a gasket disposed on the sidewall of the housing. The bar hanger assemblies are not shown for clarity.
Figure 8B:
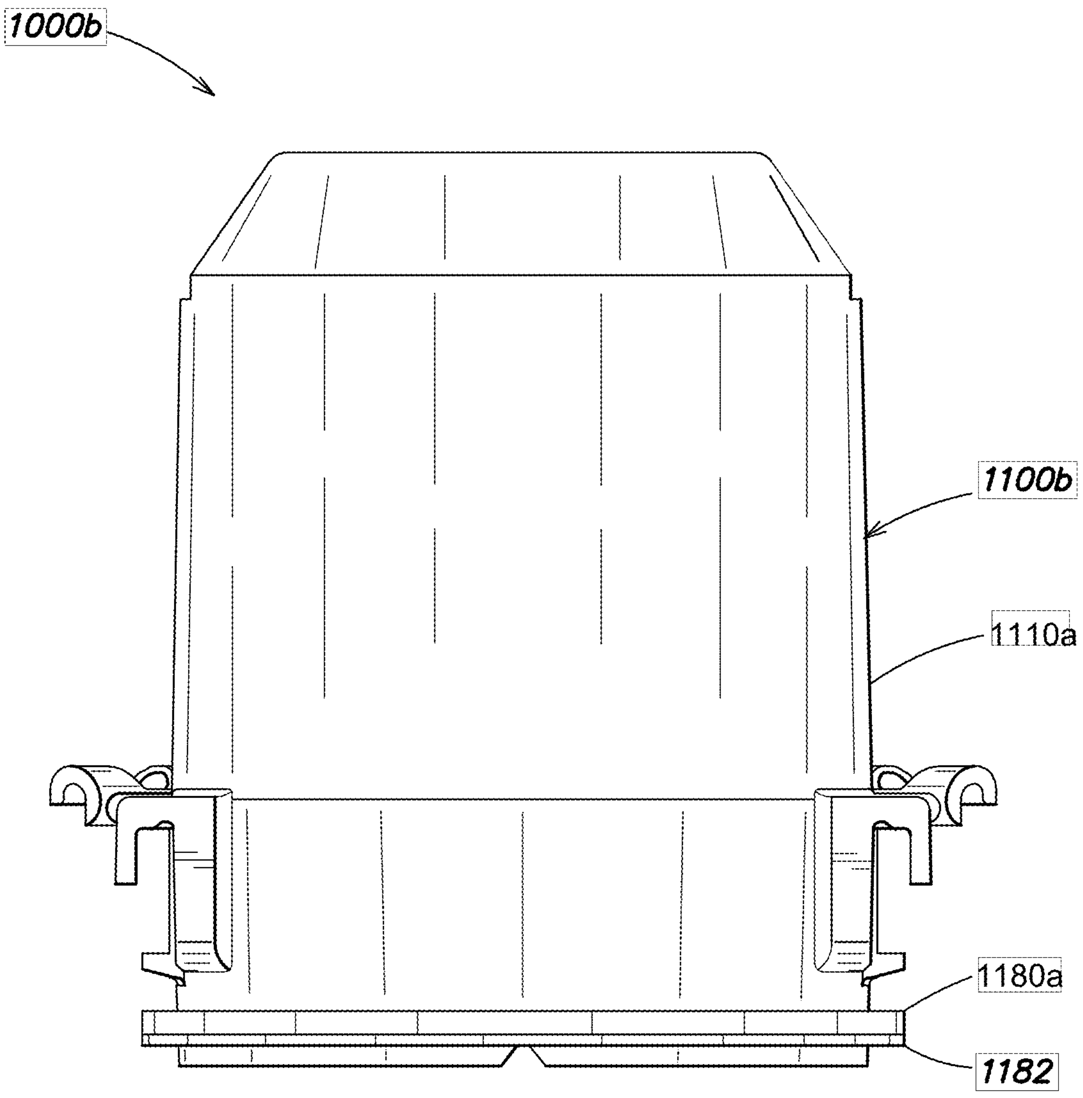
FIG. 8B shows a right-side view of the housing assembly of FIG. 8A.
Figure 8C:
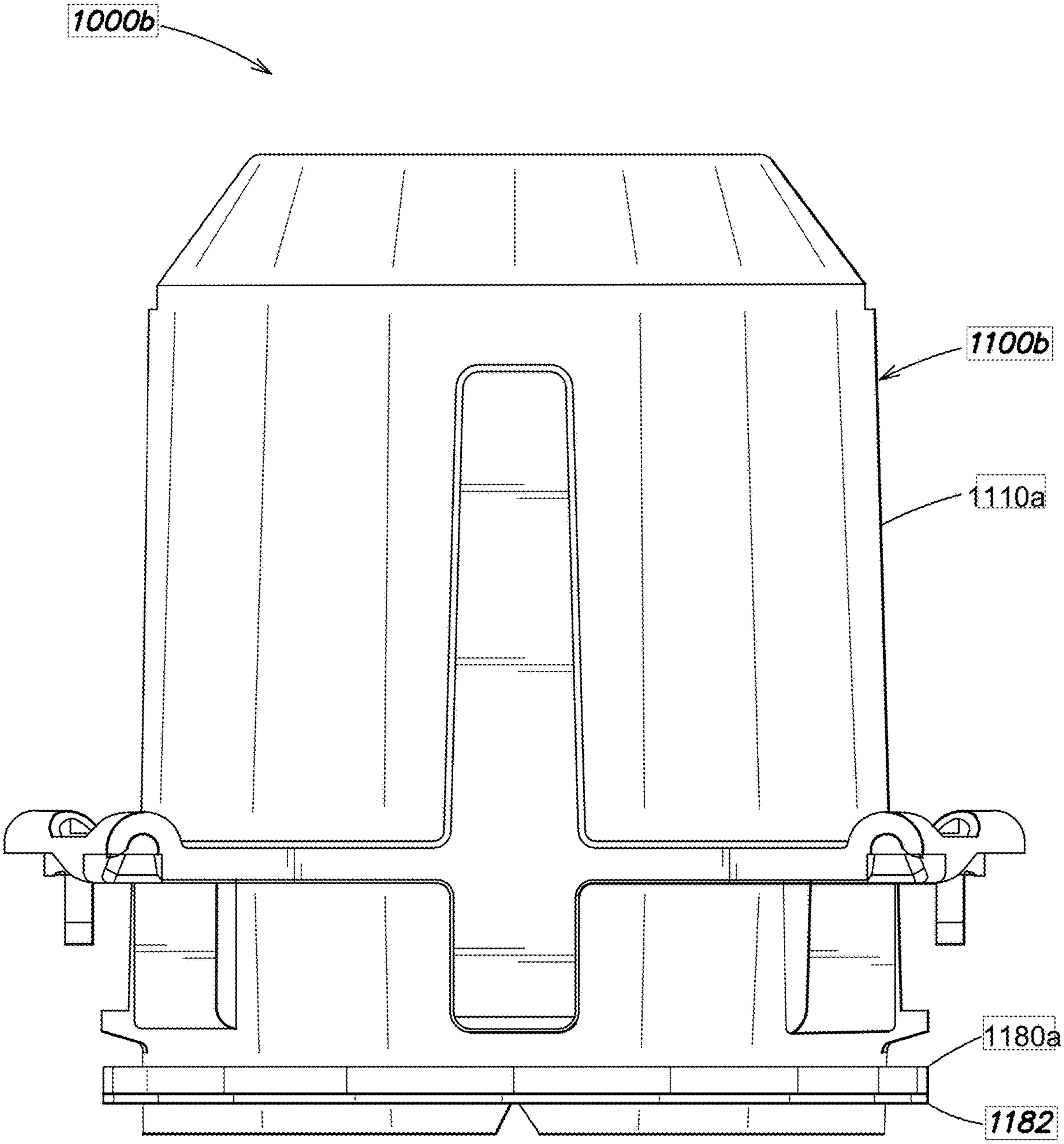
FIG. 8C shows a left-side view of the housing assembly of FIG. 8A.

For example, FIGS. 8A-8C show an exemplary housing assembly 1000*b* with a gasket support 1180*a* mounted to a housing 1100*b* and supporting a gasket 1182. As shown, the gasket 1182 may be disposed along the sidewall 1110*a* and located between the bar hanger holder 1160*a* and the front end 1111-1 of the housing 1100*b*. The gasket support 1180*a* may be a structural feature disposed along the exterior of the sidewall 1110*a* to support the gasket 1182. During installation, the housing 1100*b* may be inserted through an opening formed in the ceiling such that the gasket 1182 contacts the interior surface (i.e., the surface facing the ceiling space), thus forming the seal.

Thus, the gasket support 1180*a* and the gasket 1182 may limit how far the housing 1100*b* is inserted into the opening. Generally, the gasket 1182 may be offset from the front end 1111-1 by a distance ($h_4$). The distance, $h_4$, may range from 0 inches (i.e., coincident with the front end 1111-1) to the offset distances $h_1$ or $h_2$ corresponding to the bar hanger holder 1160*a* and the mounting platform 1142, respectively.

In some implementations, a force may be imparted to press the gasket 1182 against the interior surface. For example, the vertical location of the housing assembly 1000*b* may be adjusted such that the gasket 1182 is positioned slighting below a plane where a top surface of the ceiling panel is located. Thus, the ceiling panel is pressed against the gasket 1182 when installing the ceiling panel onto the ceiling. The resultant compression force applied to the gasket 1182 may thus form a higher quality seal. In some implementations, the quality of the seal by the gasket 1182 may evaluated according to well-established standards. For example, the gasket 1182 may form a seal that satisfies the Title 24 requirement corresponding to the building energy efficiency standards established by the California Energy Commission.

As shown, the gasket support 1180*a* may be a lip that extends around the periphery of the housing 1100*b*. The gasket support 1180*a* may provide a substantially flat surface onto which the gasket 1182 may be mounted. The shape of the gasket support 1180*a* may further conform with the desired shape of the gasket 1182. The gasket 1182 may have various shapes including, but not limited to, a circle, an ellipse, a polygon, and any combination of the foregoing. The gasket 1180*a* may be coupled to the gasket support 1180*a* using a variety of coupling mechanisms including, but not limited to, an adhesive, a snap-fit connection, a clamp, and a fastener.

The gasket support 1180*a* may be integrally formed with the sidewall 1110*a*. Thus, the gasket support 1180*a* may be formed from the same material as the housing 1100*b*. The gasket 1182 may be formed from various types of polymers including, but not limited to, polyethylene foam, silicone rubber, and neoprene rubber.

It should be appreciated other types of sealing components may be used instead of the gasket 1182. For example, the sealing component may be an O-ring or flexible tape. In the example of an O-ring, the O-ring may have a toroidal shape (e.g., a donut shape). The supporting structure on the housing 1100*b*, in turn, may include a channel to receive a portion of the O-ring.

Figure 9A:
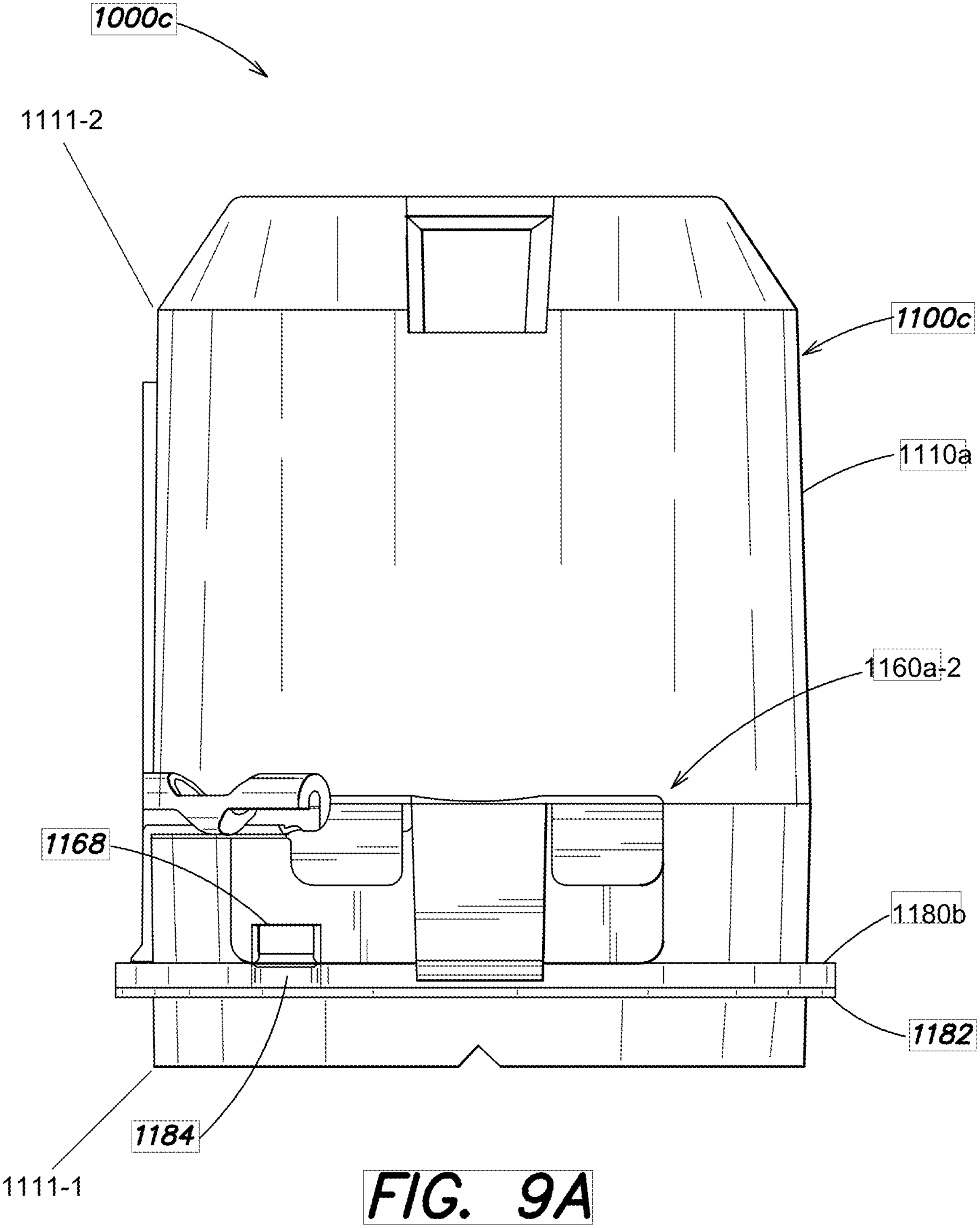
FIG. 9A shows a front view of another exemplary housing assembly with a gasket disposed on the sidewall and abutting the mounting platform and the bar hanger holders. The bar hanger assemblies are not shown for clarity.
Figure 9B:
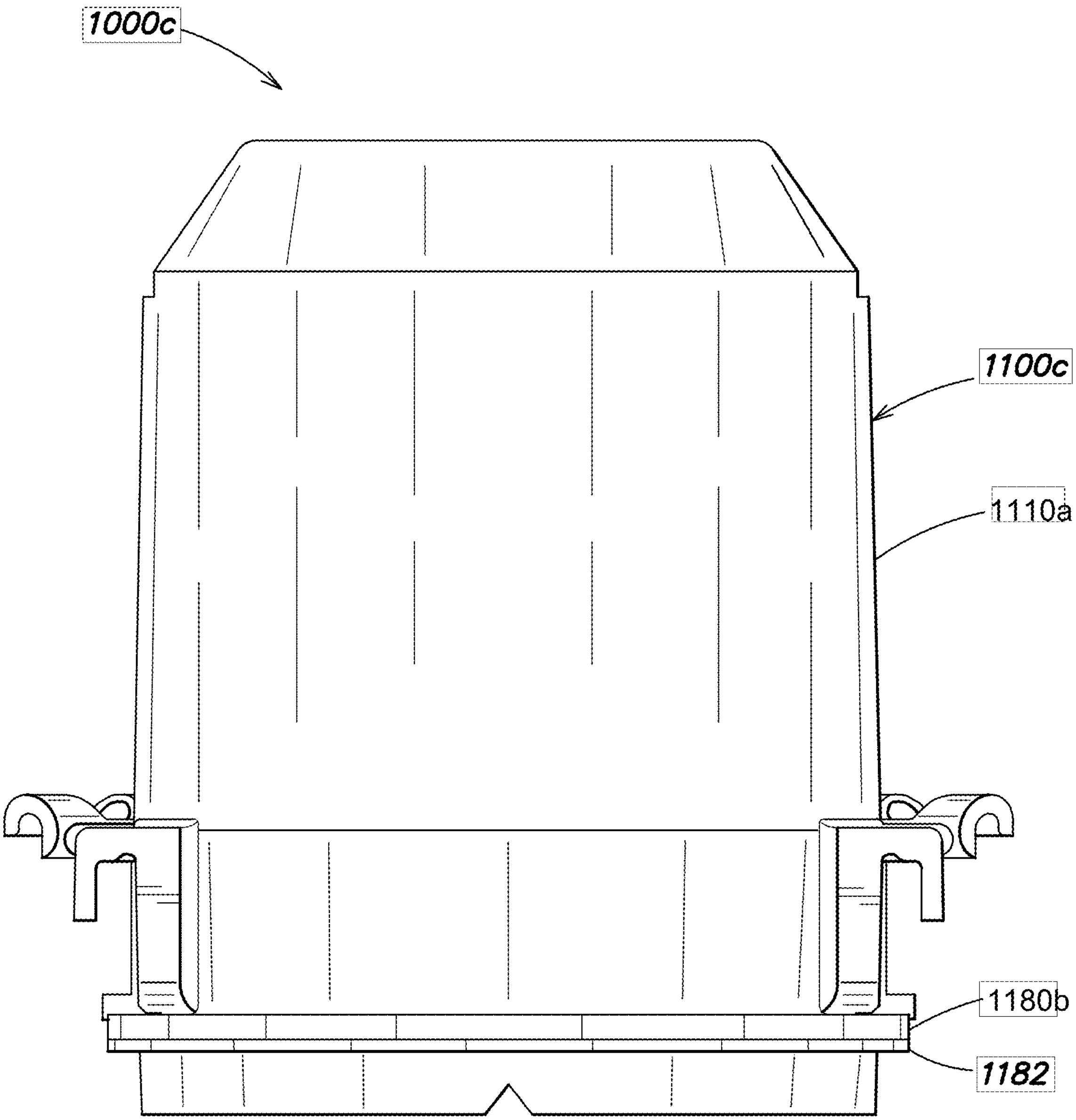
FIG. 9B shows a right-side view of the housing assembly of FIG. 9A.
Figure 9C:
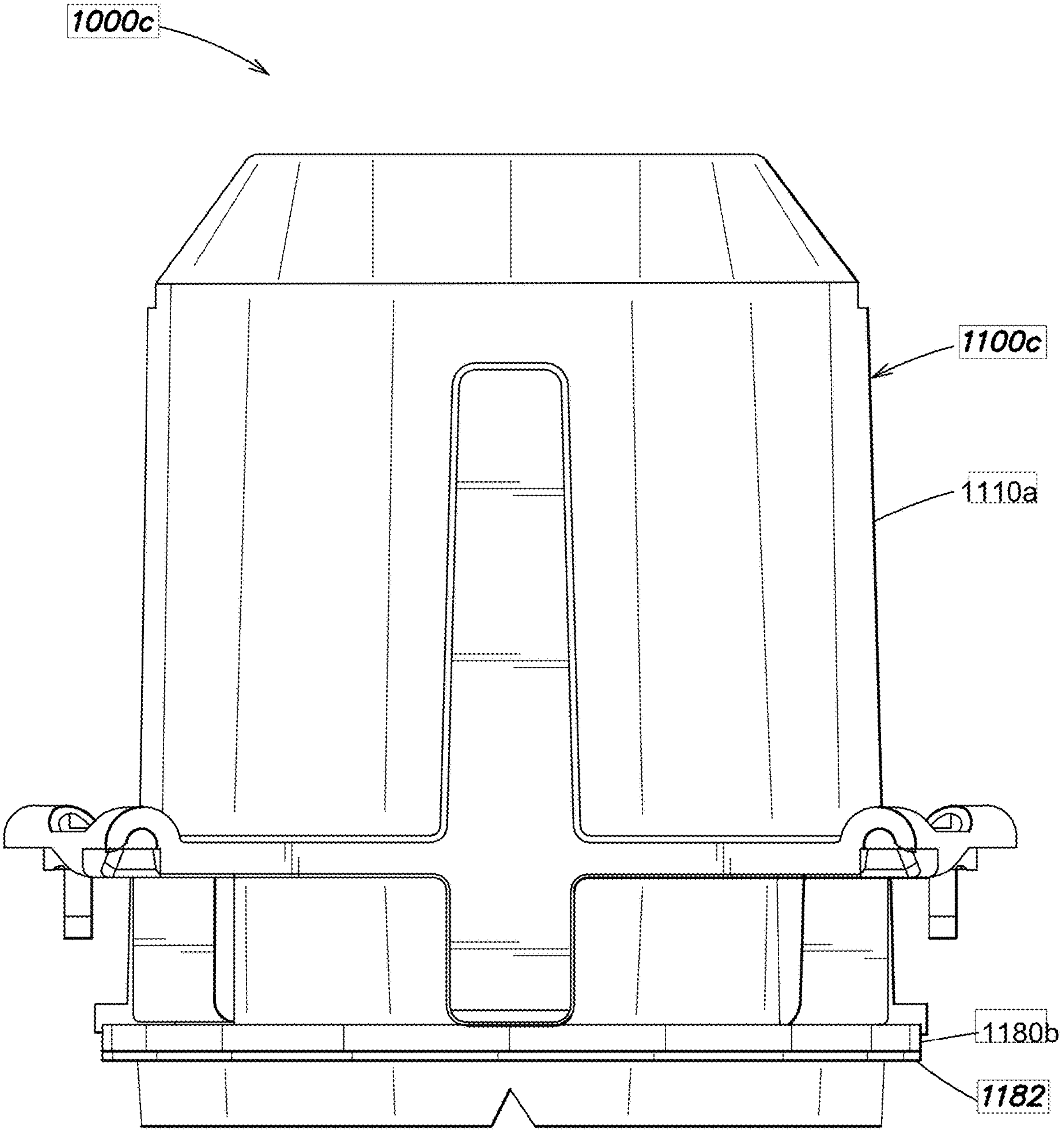
FIG. 9C shows a left-side view of the housing assembly of FIG. 9A.

FIGS. 9A-9C show another exemplary housing assembly 1000*c* with a housing 1100*c* and a gasket support 1180*b* that abuts the bar hanger holder 1160*a* and the mounting platform 1142. The gasket 1182 may once again be supported by the gasket support 1180*b*. As shown, the gasket support 1180*b* may span a portion of the sidewall 1110*a*. For example, FIG. 9A shows the gasket support 1180*b* may form a gap 1184 to provide access to the recess 1168 where the opening 1170 is located to secure the bar hanger assembly (not shown) to the bar hanger holder 1160. Once the housing 1100*c* is secured to the bar hanger assembly, the gasket 1182 may be installed onto the gasket support 1180*b*. In some implementations, the gap 1184 may be filled with a sealant once the locking fastener 1020 is tightened.

A Housing Assembly with an EMT

As described above, the housing assembly may incorporate a variety of bar hanger assemblies, some of which may include off-the-shelf components and/or components tailor-made for the housing assembly. In some implementations, the housing assembly may also include other types of components to support the housing.

Figure 10A:
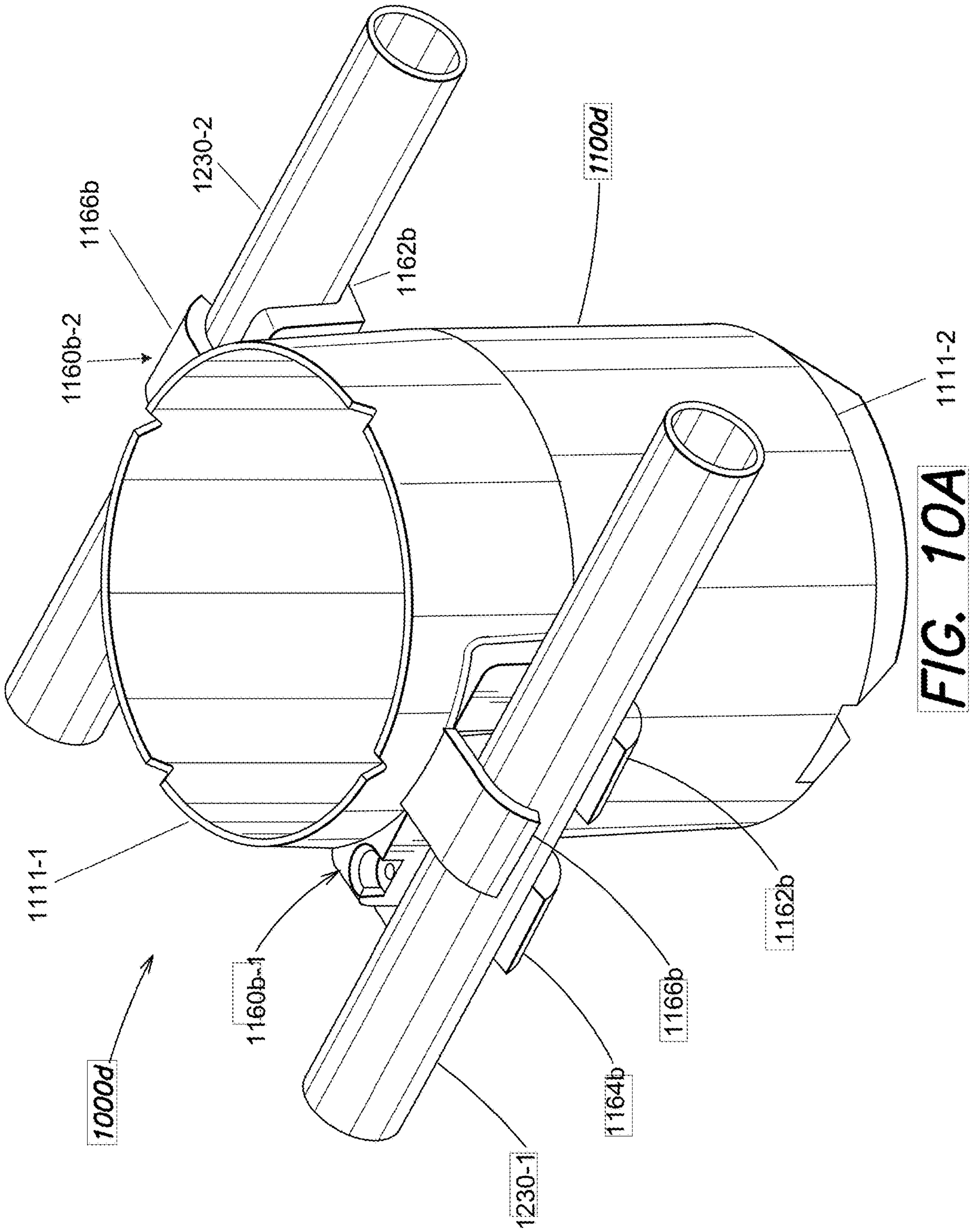
FIG. 10A shows a bottom, right, rear perspective view of another housing assembly where the housing is supported by at least one pipe or electric metallic tube (EMT).
Figure 10B:
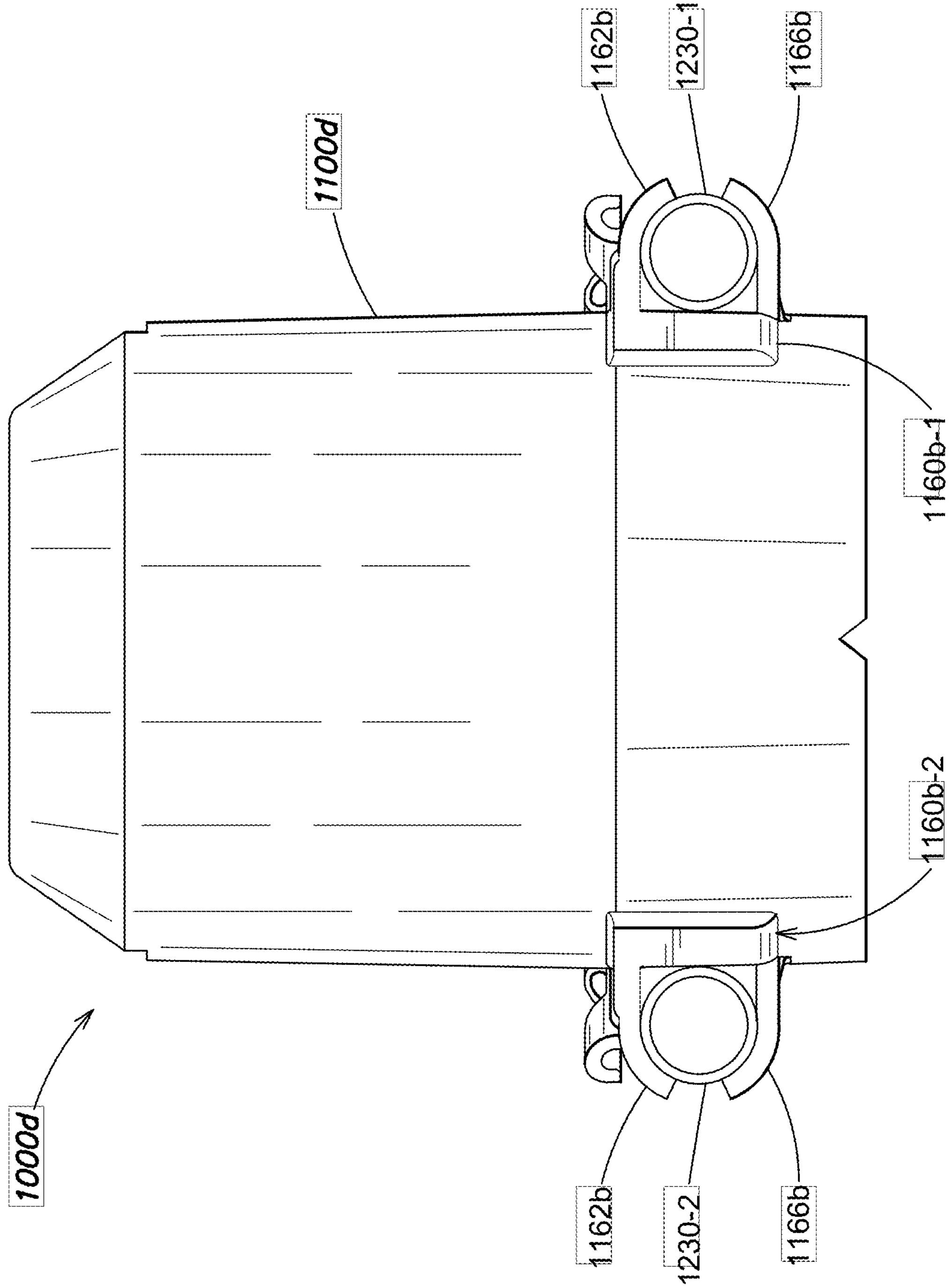
FIG. 10B shows a right-side view of the housing assembly of FIG. 10A.

For example, FIGS. 10A and 10B show one example of a housing assembly 1000*d* with a pair of pipes 1230-1 and 1230-2 (collectively referred to herein as a "pipe 1230") to support the housing 1100*d*. As shown, the housing 1100*d* may include respective pipe holders 1160*b*-1 and 1160*b*-2 (collectively referred to herein as a "pipe holder 1160*b*") that each include a first tab 1162*b*, a second tab 1164*b*, and a third tab 1166*b* that together define a passageway to guide and support the pipes 1230. As before, the housing 1100*d* may be adjusted with respect to the pipes 1230 along a longitudinal axis defined by the passageway. The housing 1100*d* may be further secured to the pipes 1230 in a similar manner to the housing 1100*a*. For example, a locking fastener (not shown) may be inserted into an opening in the pipe holder 1160 to press the pipe 1230 against at least one portion of one of the tabs 1162, 1164, and 1166 to impart a frictional force, thus preventing relative movement between the housing 1100*d* and the pipe 1230.

Similar to the bar hanger holder 1160*a*, the pipe holder 1160*b* may also be shaped to conform with the shape of the pipe 1230. For example, FIG. 10B shows the tabs 1162*b*, 1164*b*, and 1166*b* may each have a semi-circular section that conforms with the circular cross-sectional shape of the pipe 1230. However, it should be appreciated the pipe 1230 may have other cross-sectional shapes including, but not limited to, an ellipse, a square, a rectangle, a polygon, and any combination of the foregoing. The shape of the tabs 1162*b*, 1164*b*, and 1166*b* may be shaped to conform to the particular cross-sectional shape of the pipe 1230.

In some implementations, the pipes 1230 may be installed together with the housing 1100*d*. For example, the pipes 1230 may be mounted to a surface of a ceiling using one or more clamps (e.g., a pipe clamp). The pipes 1230 may be mounted to a variety of support structures including, but not limited to, a wood joist or stud, a metal joist or stud, and a T-bar. In some implementations, the housing assembly 1100*d* may be installed directly onto a flat surface (e.g., a concrete slab) via one or more clamps.

In some implementations, the pipes 1230 may be part of the ceiling space. Thus, the pipes 1230 may be considered to be support structures that form part of the environment. For example, the pipe 1230 may each be an EMT to form part of an electric conduit for wiring in the ceiling space. In some implementations, the wiring in the pipes 1230 may form part of a circuit that includes wiring routed into the housing 1100*d* to supply electrical power to, for example, a lighting module disposed therein.

The pipe 1230 may be formed from various metals and polymers including, but not limited to, aluminum, aluminum alloys, steel, copper, polyvinyl chloride (PVC), acrylonitrile butadiene styrene (ABS), polycarbonate (PC), polyurethane (PU), polyethylene, polyethylene terephthalate, polypropylene, and polystyrene.

A Stackable Housing for a New Construction Installation

FIGS. 11A-11I show another exemplary housing 1100*e* for a new construction installation of a 3-inch trade size lighting system. The housing 1100*e* may generally include several of the same or similar features as the housings 1100*a*-1100*d*. For example, the housing 1100*e* may define a cavity 1104 with an opening 1102 into the cavity 1104. Specifically, the housing 1100*e* may include a sidewall 1110*b* with a first end 1111-1 having an edge 1112 defining the opening 1102 and a second end 1111-2. The first end 1111-1 may include one or more notches 1114 for alignment. The housing 1100*e* may further include a cover 1120*a* with a base end 1121 and a tapered wall 1130 joined to the sidewall 1110*b*. The sidewall 1110*b* and the cover 1120*a* together define the cavity 1104.

The housing 1100*e* may include a pair of knockouts 1122 disposed on the cover 1120*a* and a pair of feedthrough tabs 1132 disposed within corresponding feedthrough openings 1136 formed on the tapered wall 1130. The housing 1100*e* may further include integrated bar hanger holders 1160*c*-1 and 1160*c*-2 (collectively referred to herein as a "bar hanger holder 1160*c*") to support bar hanger assemblies (e.g., bar hanger assemblies 1200) when installing the housing 1100*e* between support structures in the ceiling space. The housing 1100*e* may also include a pair of nail-in features 1150*b*-1 and 1150*b*-2 (collectively referred to herein as a "nail-in feature 1150*b*") to directly couple the housing 1100*e* to a wood joist. The nail-in features 1150*b*-1 and 1150*b*-2 may be coupled to the sidewall 1110*b* via mounting platforms 1140*b*-1 and 1140*b*-2 (collectively referred to herein as "a mounting platform 1140*b*" or "a support platform 1140*b*"). Similar to the housings 1100*a*-1100*d*, the housing 1100*e* may be formed as a single polymer component using, for example, an injection molding process.

The shape and dimensions of the housing 1100*e* may generally be similar to the housings 1100*a*-1100*d*. For example, the sidewall 1110*b* may have a round shape (e.g., at least a portion of the sidewall 1110*b* may have a cross-section that is shaped as an annulus). The housing 1100*e* may also be dimensioned to provide a cavity 1104 that is sufficiently large to contain a lighting module and/or a trim. In some implementations, the housing 1100*e* may also be dimensioned such that the space remaining within the cavity 1104 after the lighting module and the trim are installed is sufficient to contain (1) three 12 AWG wires, cables, and/or conductors (e.g., a load wire, a neutral wire, a ground wire) that are routed into the housing 1100*e* and (2) three 12 AWG wires, cables, and/or conductors that are routed out of the housing 1100*e* for connection with another lighting system or an electrical switch. More generally, the remaining portion of the cavity 1104 may provide a volume allowance of 1.5 cubic inches for each 18 AWG conductor disposed within the cavity 1104 and/or a volume allowance of 5.0 cubic inches for each 6 AWG conductor disposed within the cavity 1104. It should be appreciated that wires, cables, and/or conductors of different size (e.g., 14 AWG, 18 AWG, 22 AWG) may also be routed into or out of the housing 1100*e* as well. The housing 1100*e* may contain a larger or smaller number wires depending on the size of the wire to ensure the housing 1100*e* complies with 2020 NEC 314.16.

Figure 11A:
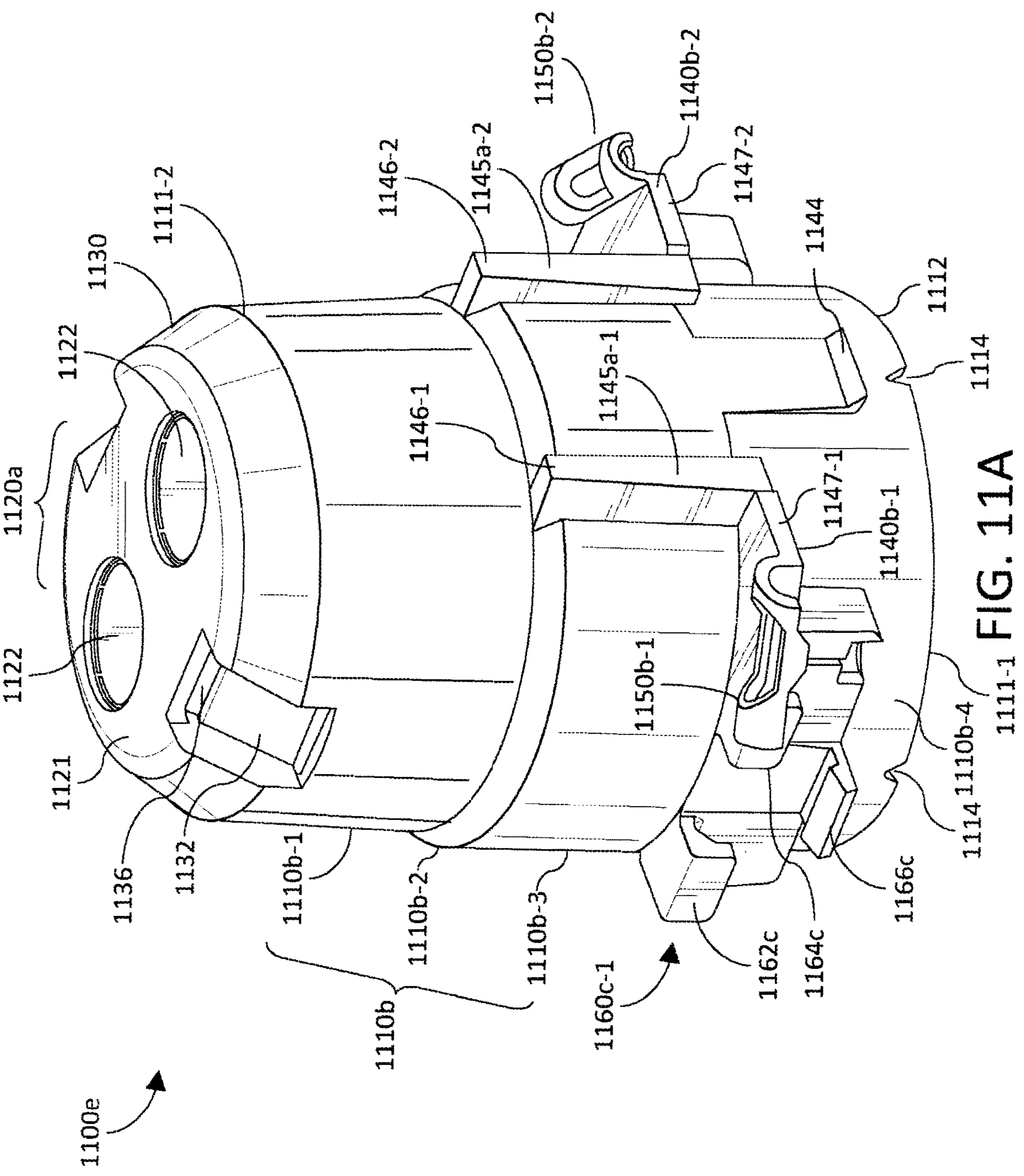
FIG. 11A shows a top, left, rear perspective view of another exemplary housing for a new construction installation of a 3-inch trade size lighting system.
Figure 11B:
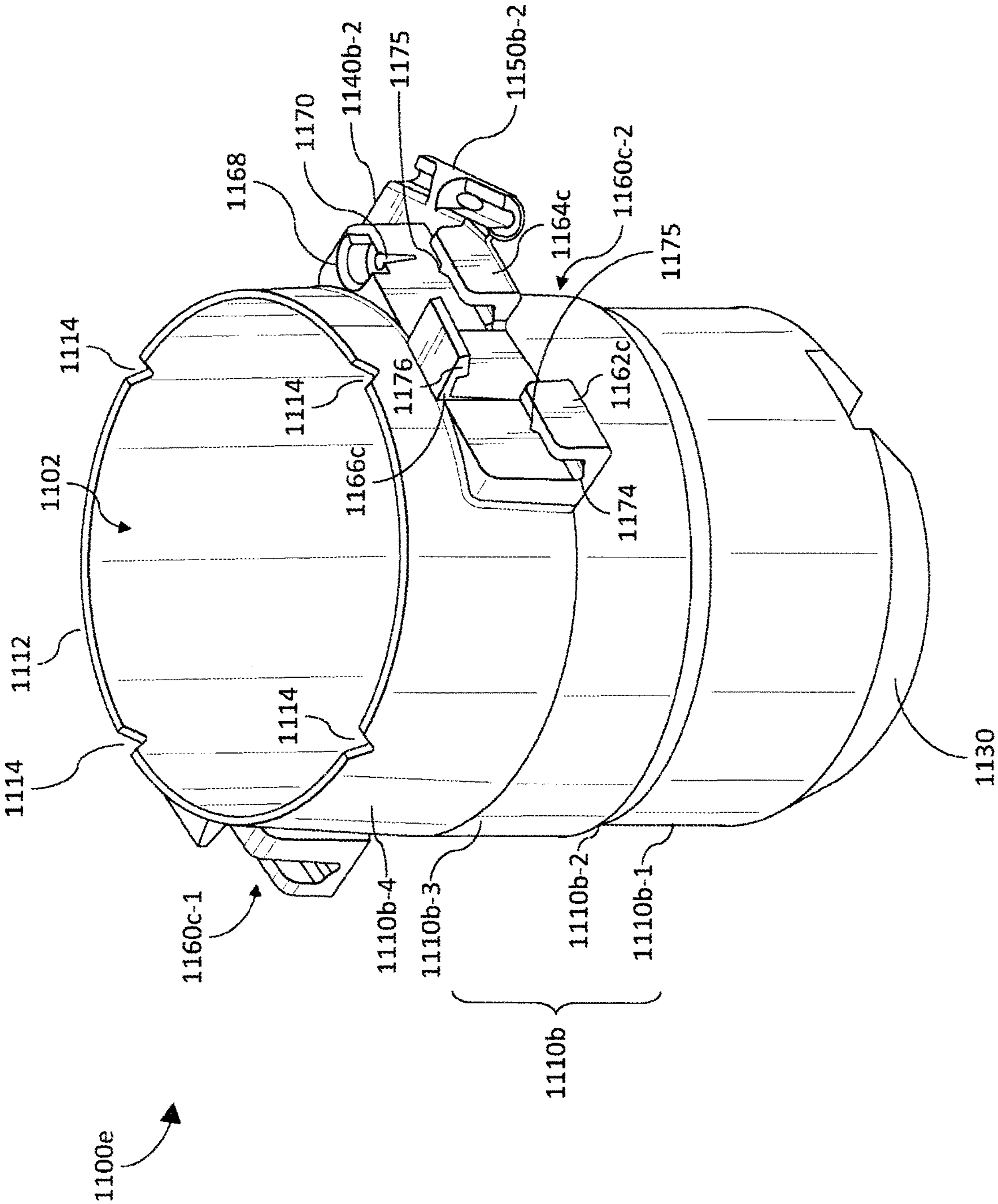
FIG. 11B shows a bottom, right, front perspective view of the housing of FIG. 11A.
Figure 11C:
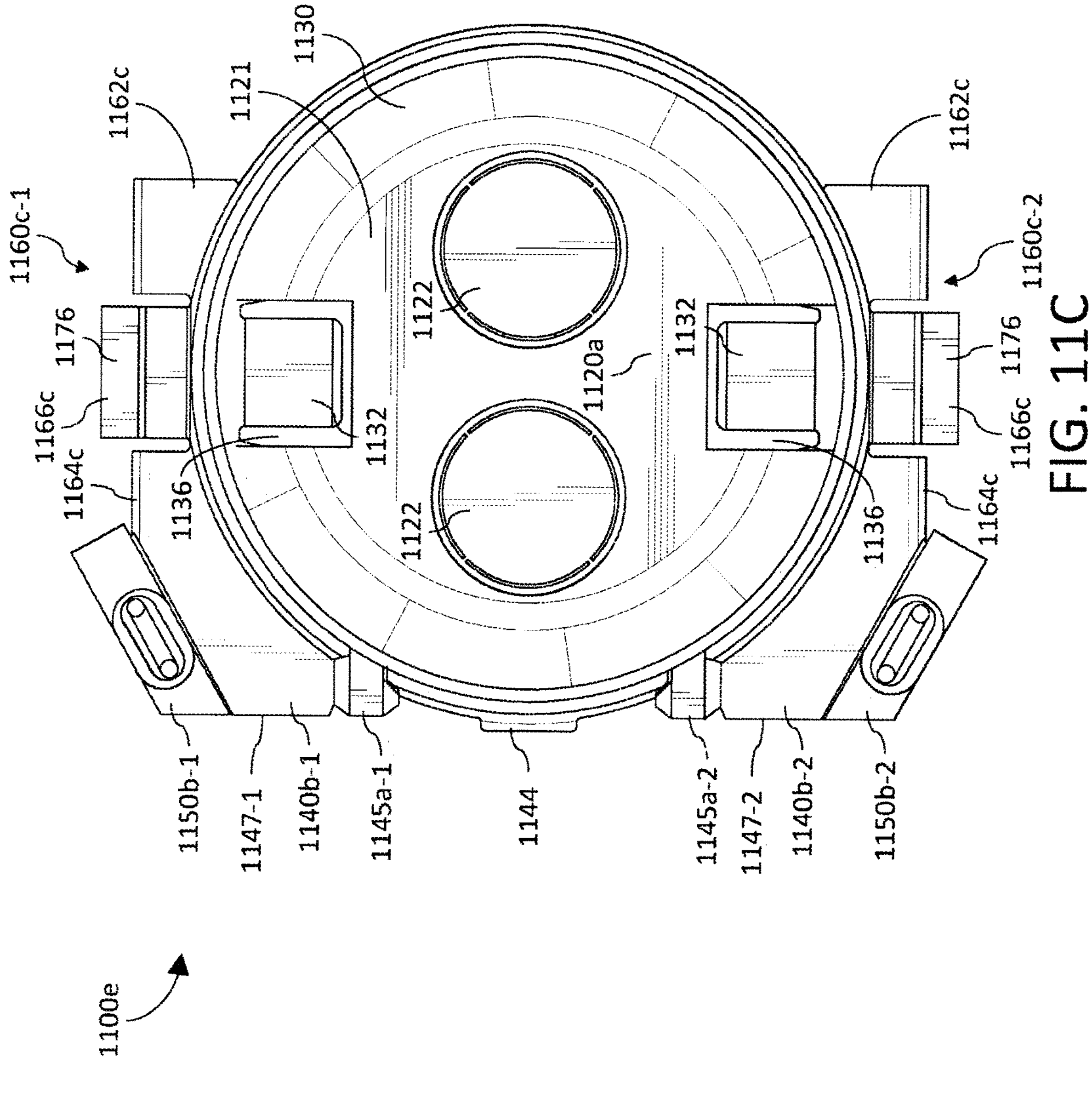
FIG. 11C shows a top view of the housing of FIG. 11A.
Figure 11D:
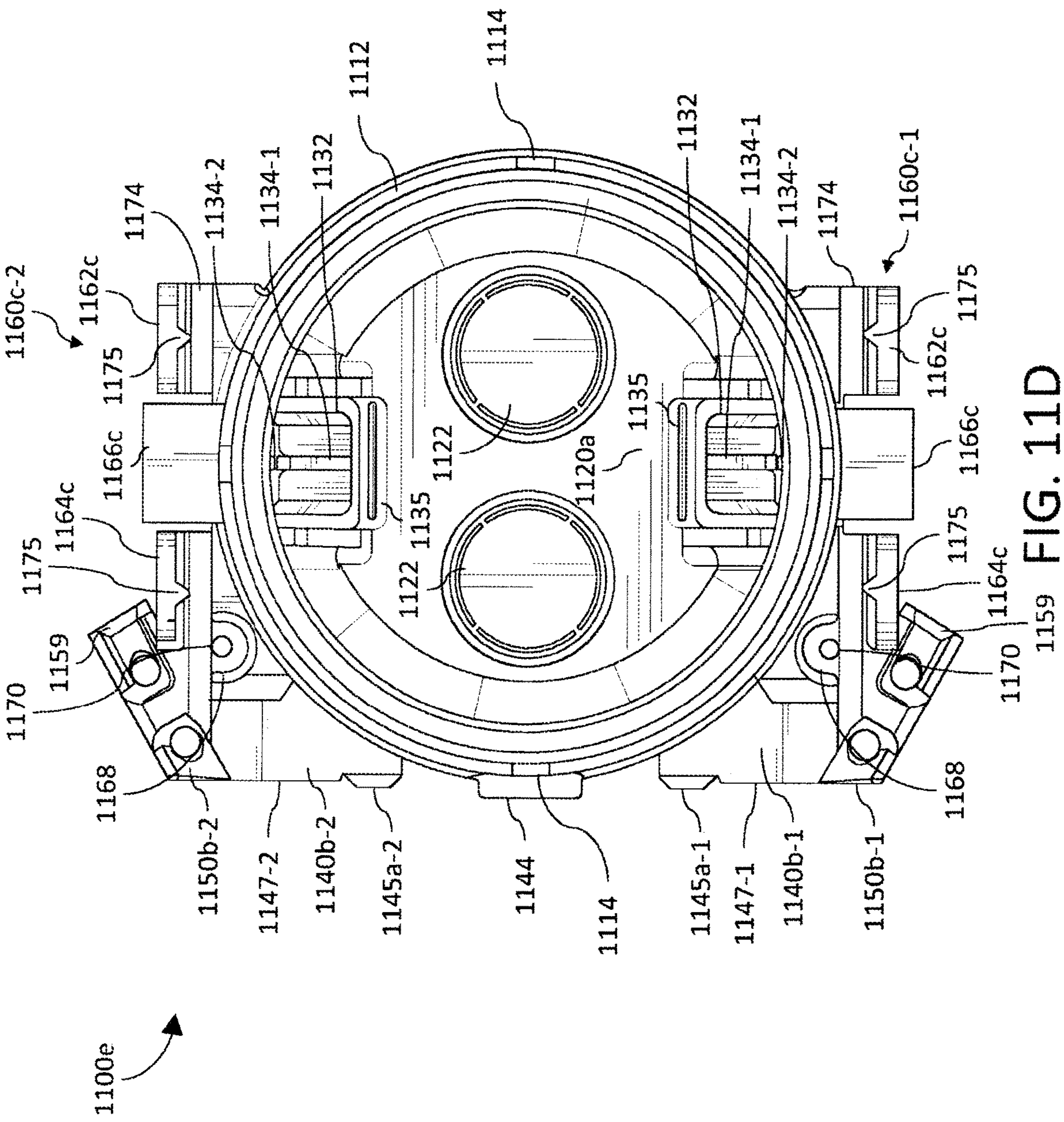
FIG. 11D shows a bottom view of the housing of FIG. 11A.
Figure 11E:
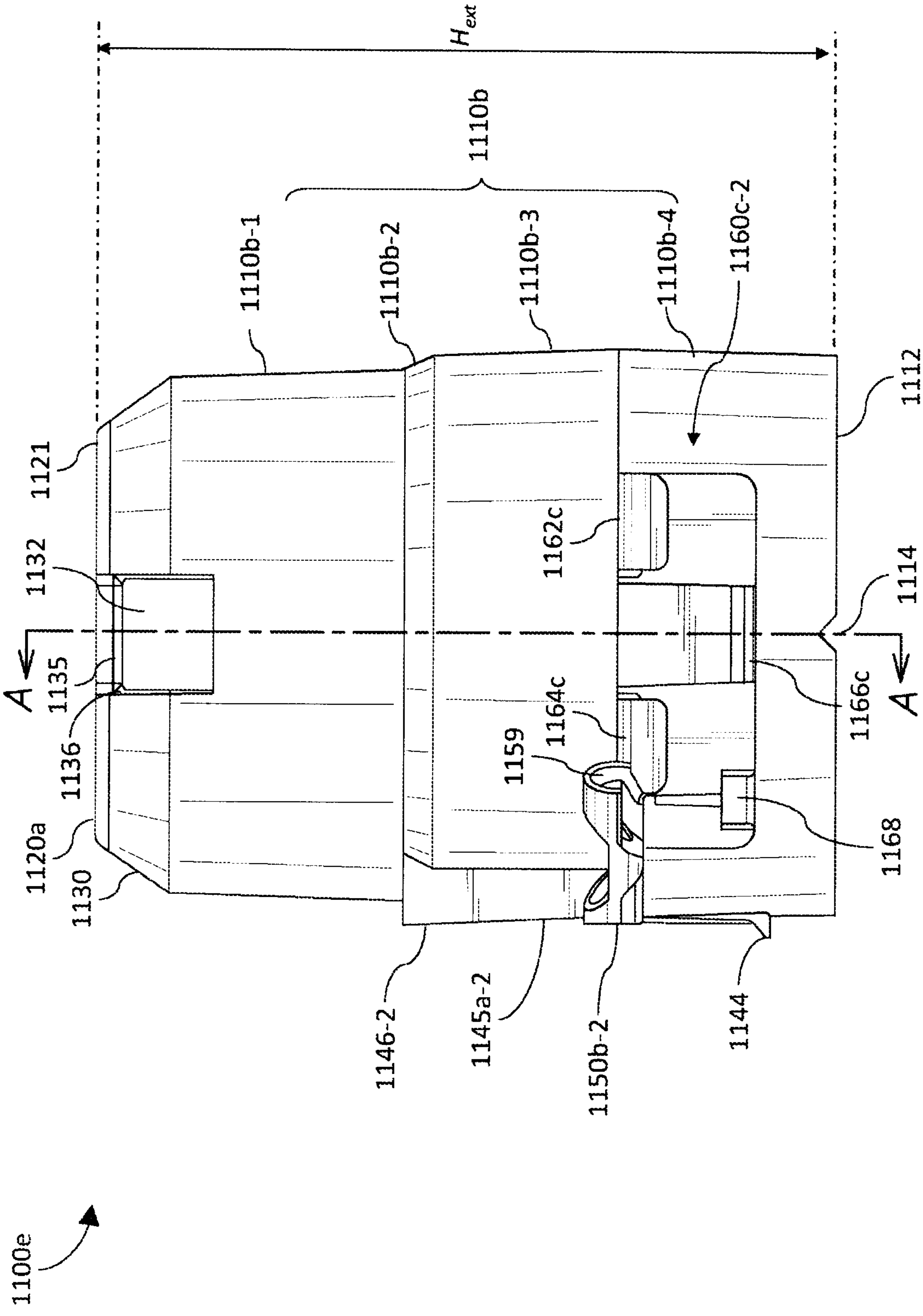
FIG. 11E shows a front-side view of the housing of FIG. 11A.
Figure 11F:
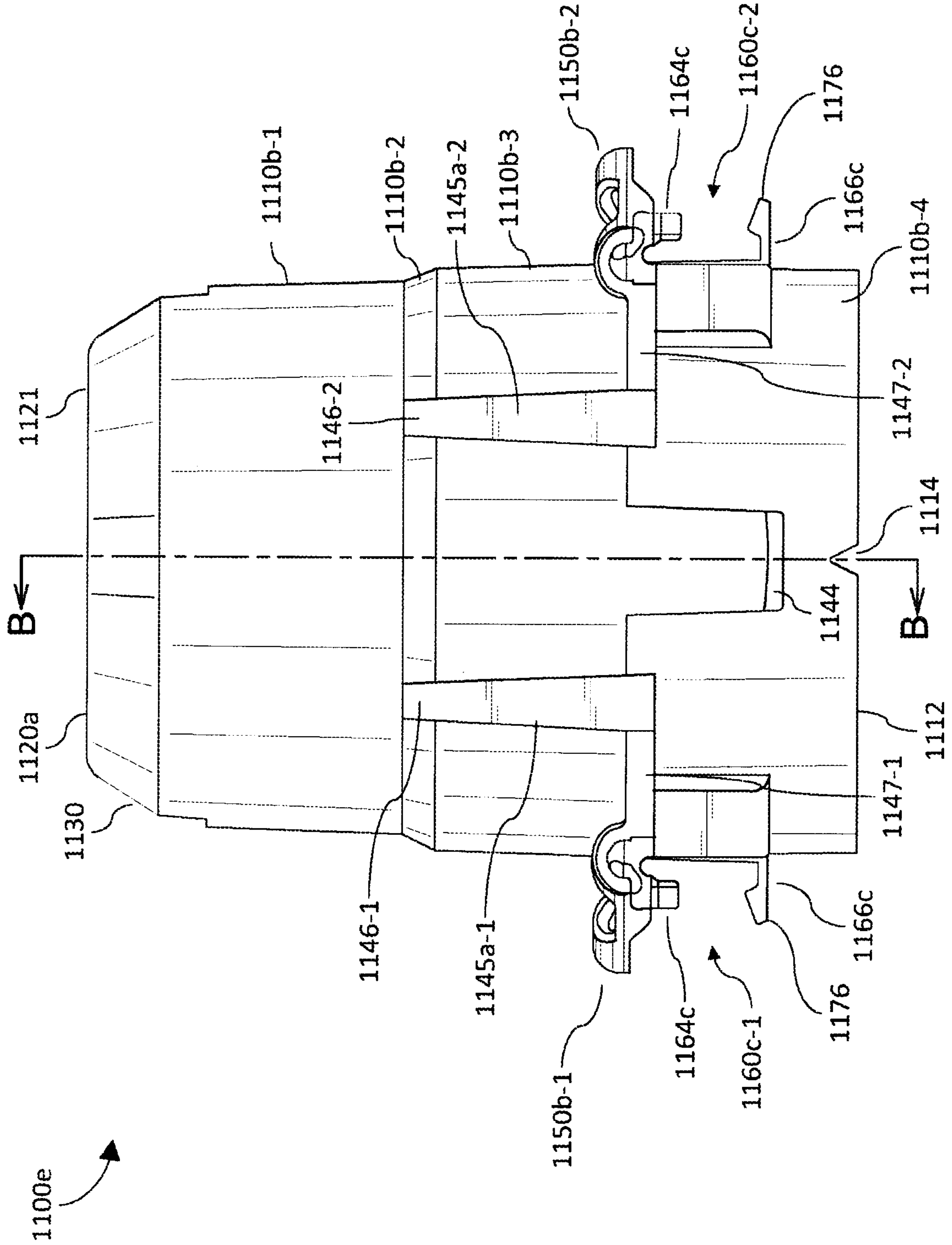
FIG. 11F shows a left-side view of the housing of FIG. 11A.
Figure 11G:
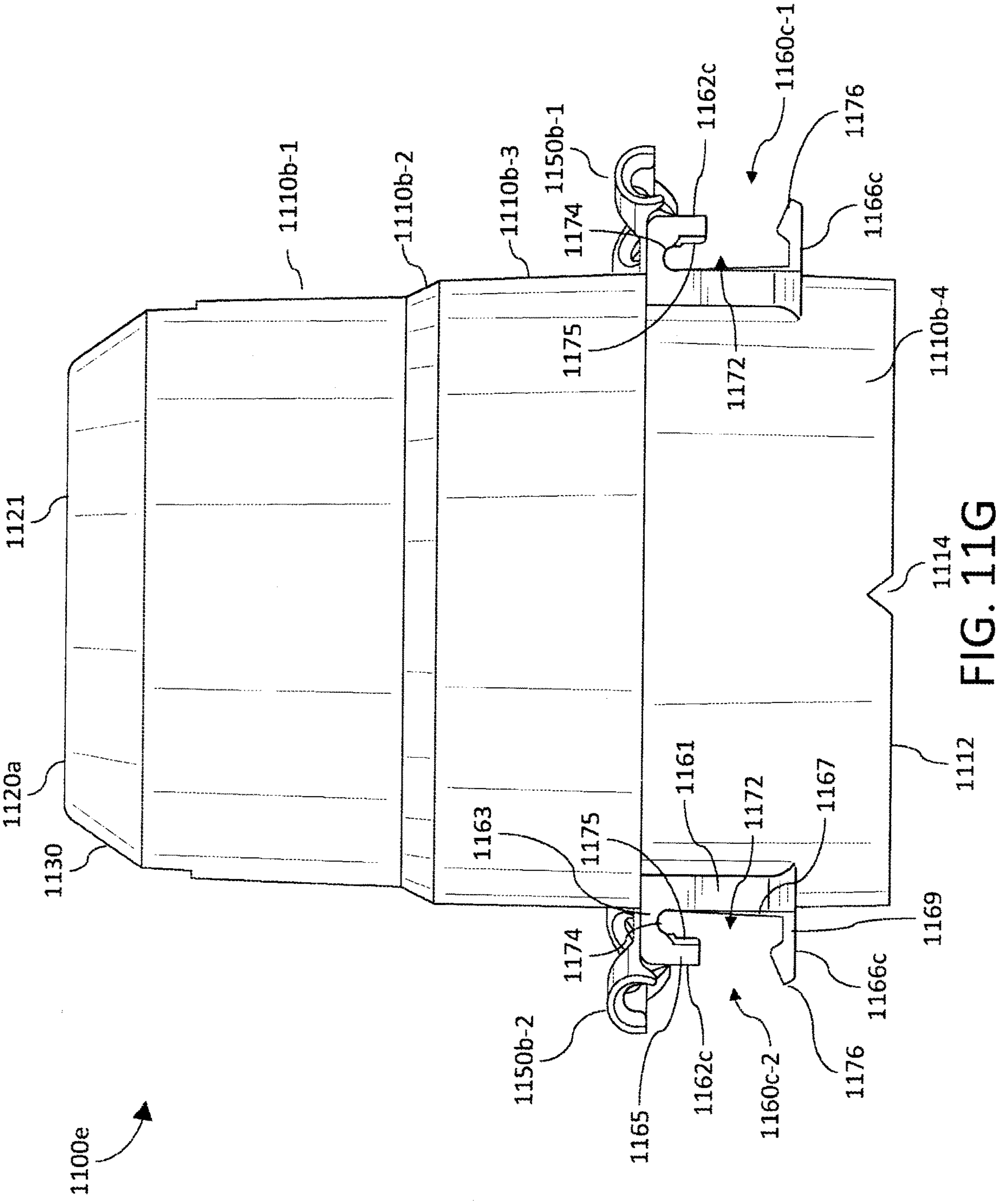
FIG. 11G shows a right-side view of the housing of FIG. 11A.
Figure 11H:
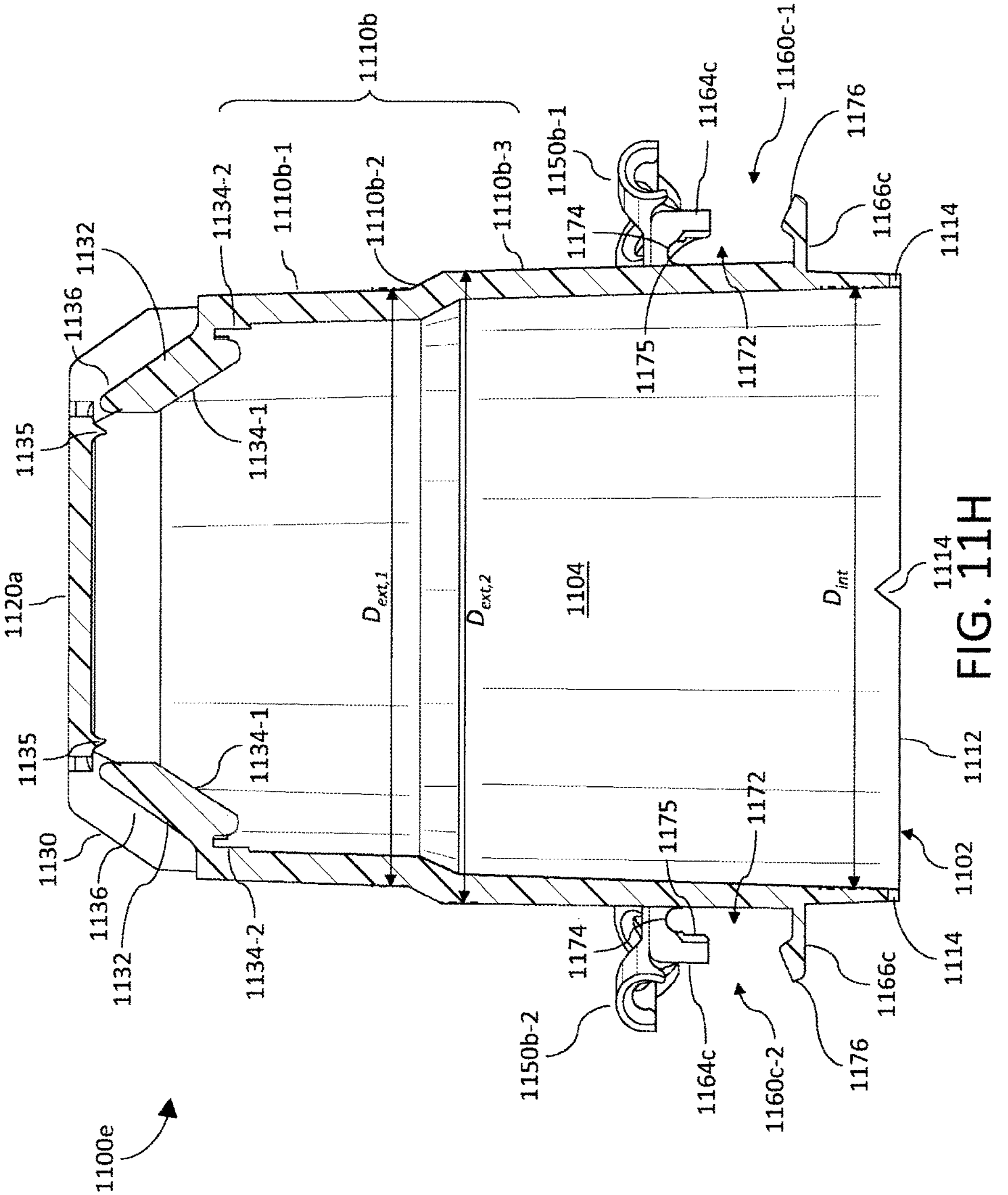
FIG. 11H shows a cross-sectional right-side view of the housing corresponding to the plane A-A of FIG. 11E.
Figure 11I:
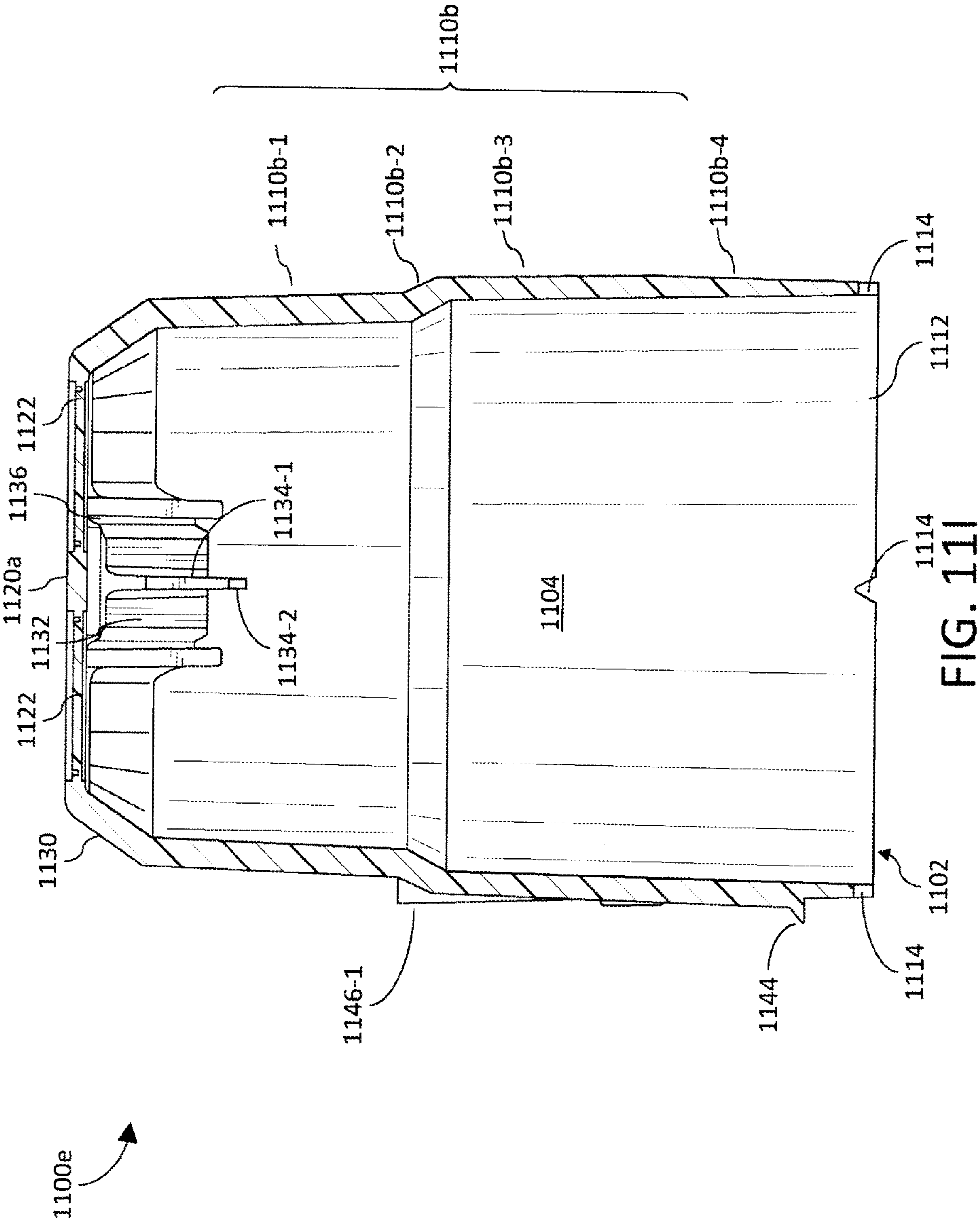
FIG. 11I shows a cross-sectional front-side view of the housing corresponding to the plane B-B of FIG. 11G.

In some implementations, the sidewall 1110*b* of the housing 1100*e* may have a stepped profile to facilitate, in part, stacking of multiple housings 1100*e* onto one another to increase the packing density during shipment of several housings 1100*e*. Said in another way, a greater number of housings 1100*e* may be packaged together within a fixed volume for shipment or storage. For example, FIGS. 11E and 11H show the sidewall 1110*b* may include a first sidewall section 1110*b*-1 joined to the tapered wall 1130 of the cover 1120*a*, a second sidewall section 1110*b*-2 joined to the first sidewall section 1110*b*-1, a third sidewall section 1110*b*-3 joined to the second sidewall section 1110*b*-2, and a fourth sidewall section 1110*b*-4 joined to the third sidewall section 1110*b*-3 and including the first end 1111-1.

As shown, the first sidewall section 1110*b*-1 may generally have an exterior width that is smaller than an interior width of the third and fourth sidewall sections 1110*b*-3 and 1110*b*-4 so that the cover 1120*a* and the first sidewall section 1110*b*-1 of one housing 1100*e* may be disposed within the portion of the cavity 1104 defined by the third and fourth sidewall sections 1110*b*-3 and 1110*b*-4 of another housing 1100*e* (see, for example, the housings 1100*f* in FIG. 15). For example, FIG. 11H shows the first sidewall section 1110*b*-1 may have a tapered profile with an exterior diameter ($D_{ext,1}$) is largest at the second sidewall section 1110*b*-2 and the fourth sidewall section 1110*b*-4 may have an interior width ($D_{int}$) at the first end 1111-1 that is larger than the exterior diameter $D_{ext,1}$. The interior sides of the third and fourth sidewall sections 1110*b*-3 and 1110*b*-4 may also have a tapered profile that is substantially similar or the same as the tapered profile of the first sidewall section 1110*b*-1. By shaping the sidewall 1110*b* in this manner, the cover 1120*a* and the first sidewall section 1110*b*-1 of one housing 1100*b* may readily fit within the cavity 1104 of another housing 1100*b*.

The second sidewall section 1110*b*-2 may also form a step between the first and third sidewall sections 1110*b*-1 and 1110*b*-3. When two housings 1100*e* are stacked on top of one another, the first end 1111-1 of one housing 1100*e* may rest on the step formed by the second sidewall section 1110*b*-2 of the other housing 1100*e*. In this manner, the shape of the second sidewall section 1110*b*-2 may limit how much one housing 1100*e* is disposed within the cavity 1104 of another housing 1100*e*. For example, FIG. 11H shows third sidewall section 1110*b*-3 has an exterior width ($D_{ext,2}$) where the third sidewall section 1110*b*-3 joins the second sidewalls section 1110*b*-2. As shown, the exterior depth $D_{ext,2}$ may be larger than the interior depth $D_{int}$ at the first end 1111-1.

The sidewalls sections 1110*b*-1 through 1110*b*-4 may each have a tapered profile to improve ease of manufacture of the housing 1100*b*. For example, the exterior width of the first, second, and third sidewall sections 1110*b*-1 through 1110*b*-3 may increase from the cover 1120*a* to the first end 1111-1. The draft angle (i.e., the angle of the surface relative to a vertical axis) of the second sidewall section 1110*b*-2 may be larger than the first and third sidewall sections 1110*b*-1 and 1110*b*-3 to form the step. The fourth sidewall section 1110*b*-4 may have a different tapered profile along the exterior surface where the exterior width of the fourth sidewall section 1110*b*-4 decreases from the third sidewall section 1110*b*-3 to the first end 1111-1. Again, the different tapers may facilitate removal of the housing 1100*b* from different molds (e.g., an upper mold and a lower mold as described above with respect to the housing 1100*a*). In some implementations, the interior surface of the fourth sidewall section 1110*b*-4 may have the same or similar tapered profile as the third sidewall section 1110*b*-3. FIG. 11H further shows the thickness of the sidewall sections 1110*b*-1 through 1110*b*-3 may be substantially constant or constant. The thickness of the sidewall section 1110*b*-4, however, may decrease towards the first end 1111-1 due to the different tapered profiles.

The bar hanger holders 1160*c* may be similar to the bar hanger holders 1160*a* in the housing 1100*a*. As before, each bar hanger holder 1160*c* may include a first tab 1162*c*, a second tab 1164*c*, and a third tab 1166*c* that collectively define a passageway 1172 to support and guide the bar hanger assembly 1200. The first and second tabs 1162*c* and 1164*c* may each form a U-shaped structure with a first section 1161 joined to the sidewall 1110*b*, a second section 1163 joined to the first section 1161 and protruding away from the sidewall 1110*b*, and a third section 1165 joined to the second section 1163. The third section 1166*c* may also form a L-shaped structure that include a first section 1167 joined to the sidewall 1110*b* and a second section 1169 joined to the first section 1167 and protruding away from the sidewall 1110*b*. The bar hanger holders 1160*c* may also include a fastener opening 1170 disposed within a recess 1168 to receive a locking fastener (e.g., the locking fastener 1020) to lock the position of the housing 1100*e* to the bar hangers.

In this implementation, the interior side of the third section 1165 in each of the first and second tabs 1162*c* and 1164*c* may not directly contact the bar hangers. Instead, the first and second tabs 1162*c* and 1164*c* may each have a rib 1175 (also referred to as a "bump 1175") joined at least to the third section 1165 and protruding into the passageway 1172 to physically contact one of the bar hangers. The ribs 1175 may reduce the contact area between the bar hangers and the bar hanger holder 1160*c*, thus allowing the housing 1100*e* to slide more smoothly along the bar hangers during installation. In some implementations, the first sections 1161 of the first and second tabs 1162*c* and 1164*c* or the first section 1167 of the third tab 1166*c* may also include ribs (not shown) that protrude into the passageway 1172 as well.

The third tab 1166*c* may also include an integrally formed snap-fit hook 1176 to facilitate assembly of bar hangers to the housing 1100*e* and to guide the movement of the bar hangers after assembly. Similar to the housing 1100*a*, the bar hanger assembly may be assembled before being mounted to the housing 1100*e* and may thus be inserted into the passageway 1172 from the front (or rear) side of the bar hanger holders 1160*c*. For example, the top half of the bar hangers may be first inserted into the passageway 1172 until contact is made with the interior sides of the first and second tabs 1162*c* and 1164*c*. In some implementations, the first and second tabs 1162*c* and 1164*c* may include grooves 1174 to provide additional clearance for the insertion of the bar hangers. Then, the bottom half of the bar hangers may be inserted into the passageway 1172 by pressing the bar hangers against the leading surface of the snap-fit hook 1176 to deflect the second section 1169 of the third tab 1166*c* downwards until the bar hangers are able to be moved into the passageway 1172. Once the bar hangers are disposed in the passageway 1172, the second section 1169 of the third tab 1166*c* may return to its original position and the third tab 1166 may thereafter limit and/or otherwise constrain the movement of the bar hangers.

The nail-in features 1150*b* may also be similar to the nail-in features 1150*a* in the housings 1100*a*-1100*d*. As before, each nail-in features 1150*b* may have a cylindrical wall 1153 that defines the through hole 1152. The nail-in features 1150*b*-1 and 1150*b*-2 may further be joined to the sidewall 1110*b* via mounting platforms 1140*b*-1 and 1140*b*-2, respectively. In this implementation, the cylindrical wall 1153 may include a lead-in surface 1159 to guide the fastener 1010 into the through hole 1152. The diameter of the through hole 1152 may also be about 0.175 inches. As before, the diameter of the through hole 1152 may generally range between about 0.1 inches and about 0.2 inches.

The housing 1100*e* may also provide multiple alignment features to align the housing 1100*e* to a support structure when installing the housing 1100*e* using the nail-in features 1150*b*. For example, FIG. 11A shows the housing 1100*e* may include the mounting platforms 1140*b*-1 and 1140*b*-2 as before. Additionally, the housing 1100*e* may include tabs 1145*a*-1 and 1145*a*-2 (collectively referred to herein as a "tab 1145*a*" or a "rib 1145*a*") that protrude from the sidewall 1110*b* and extend vertically across the second and third sidewall sections 1110*b*-2 and 1110*b*-3. The ribs 1145 may be not extend above the second sidewall section 1110*b*-2 to ensure the housing 1100*e* remains stackable as described above. The housing 1100*e* may further include a lip 1144 disposed between and below the ribs 1145*a*-1 and 1145*a*-2 to contact an edge or a corner of the support structure.

In this implementation, the mounting platforms 1140*b*-1 and 1140*b*-2 and the ribs 1145*a*-1 and 1145*a*-2 may provide multiple discrete points or regions of contact with the support structure (e.g., a joist) rather than a single continuous surface as in the housing 1100*a*. By providing multiple discrete points or areas of contact, the alignment features of the housing 1100*e* may more readily accommodate support structures with uneven or non-flat surfaces. Generally, the alignment features may provide at least three points of contact to align and constrain the housing 1100*e* to the support structure. For the housing 1100*e*, FIGS. 11A-11I show the mounting platforms 1140*b*-1 and 1140*b*-2, the ribs 1145*a*-1 and 1145*a*-2, and the lip 1144 may collectively provide five points of contact with the support structure. Specifically, the mounting platforms 1140*b*-1 and 1140*b*-2 may have contact regions 1147-1 and 1147-2, respectively. The ribs 1145*a*-1 and 1145*a*-2 may have contact regions 1146-1 and 1146-2, respectively.

FIG. 11A further shows the vertical ribs 1145*a* may be tapered and partially recessed with respect to the mounting platforms 1140*b* and the lip 1144. Said in another way, the ribs 1145*a* may be inclined at an angle such that only the top portions of the rib 1145*a* corresponding to the contact region 1146 contact the support structure. In some implementations, the tapered shape of the ribs 1145*a* may provide a surface of which only a small portion physically contacts the support structure. For example, if the housing 1100*e* is coupled to a single wood joist that is larger in height than the rib 1145*a*, the rib 1145*a* may contact the wood joist such that the contact region 1146 is located near the top of the rib 1145*a*. In some implementations, the tapered shape of the ribs 1145*a* may allow the housing to be manufactured with fewer or, in some instances, no side actions in the injection mold (e.g., portions of the injection mold that move laterally relative to the respective halves of the injection mold to form undercut features).

FIGS. 12A-12I show another exemplary housing 1100*f* for a new construction installation of a 3-inch trade size lighting system. Similar to the housings 1100*a*-1100*e*, the housing 1100*f* may support multiple modes of installation by including one or more nail-in features 1150*b* to facilitate installation onto a single support structure (see, for example, the housing assembly 1000*f* in FIGS. 15A-15C) and one or more bar hanger holders 1160*d* to facilitate installation onto two or more support structures (see, for example, the housing assembly 1000*e* in FIGS. 14A-14D).

As shown, the housing 1100*f* may include the sidewall 1110*b* and the cover 1120*a*, which together define the cavity 1104 to contain a lighting module, at least a portion of a trim, one or more electrical wires and/or cables from an external power supply system, and one or more wire splices. The sidewall 1110*b* includes the first end 1111-1 with multiple alignment notches 1114 and the interior edge 1112 defining the bottom opening 1102 to provide access to the cavity 1104. The sidewall 1110*b* may further include the second end 1111-2, which is joined to the cover 1120*a*. The cover 1120*a* includes the base end 1121 supporting multiple knockouts 1122 and the tapered wall 1130, which joins the base end 1121 to the sidewall 1110*b*, supporting multiple feedthrough tabs 1132 disposed within corresponding feedthrough openings 1136. FIG. 12H shows the cover 1120*a* may also include multiple catches 1135 disposed on a bottom side of the base end 1121 and arranged in parallel alignment with one another for each feedthrough tab 1132. The inclusion of multiple catches 1135 may provide multiple points of contact with a wire or cable inserted through the feedthrough opening 1136 and clamped by the feedthrough tab 1132.

The sidewall 1110*b* may also have a stepped profile to facilitate stacking of multiple housings 1100*f* onto one another similar to the housing 1100*e*. Specifically, the sidewall 1110*b* includes from top to bottom, the first sidewall section 1110*b*-1 adjoining the tapered wall 1130 of the cover 1120*a*, the second sidewall section 1110*b*-2 adjoining the first sidewall section 1110*b*-1, the third sidewall section 1110*b*-3 adjoining the second sidewall section 1110*b*-2, and the fourth sidewall section 1110*b*-4 adjoining the third sidewall section 1110*b*-3 and including the first end 1111-1. FIG. 12H shows the exterior diameter ($D_{ext,2}$) where the third sidewall section 1110*b*-3 joins the second sidewall section 1110*b*-2 may be larger than the exterior diameter ($D_{ext,1}$) where the first sidewall section 1110*b*-1 joins the second sidewall section 1110*b*-2. FIG. 12H also shows the second sidewall section 1110*b*-2 may be sloped downwards towards the first end 1111-1 at a shallower angle than the first and third sidewall sections 1110*b*-3 and 1110*b*-4, thus forming a step around the periphery of the sidewall 1110*b*.

Figure 12A:
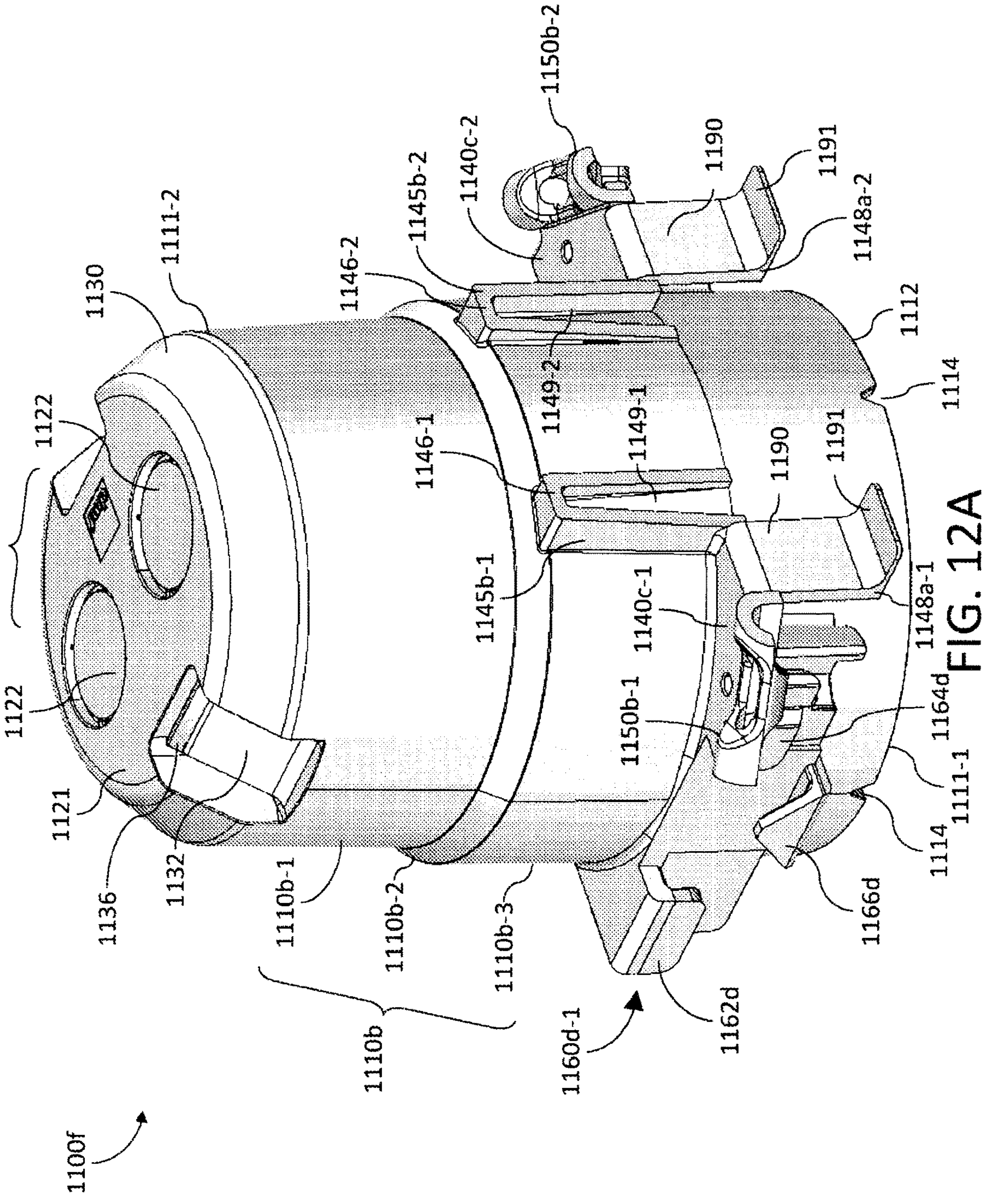
FIG. 12A shows a top, left, rear perspective view of another housing for a new construction installation of a 3-inch trade size lighting system.
Figure 12B:
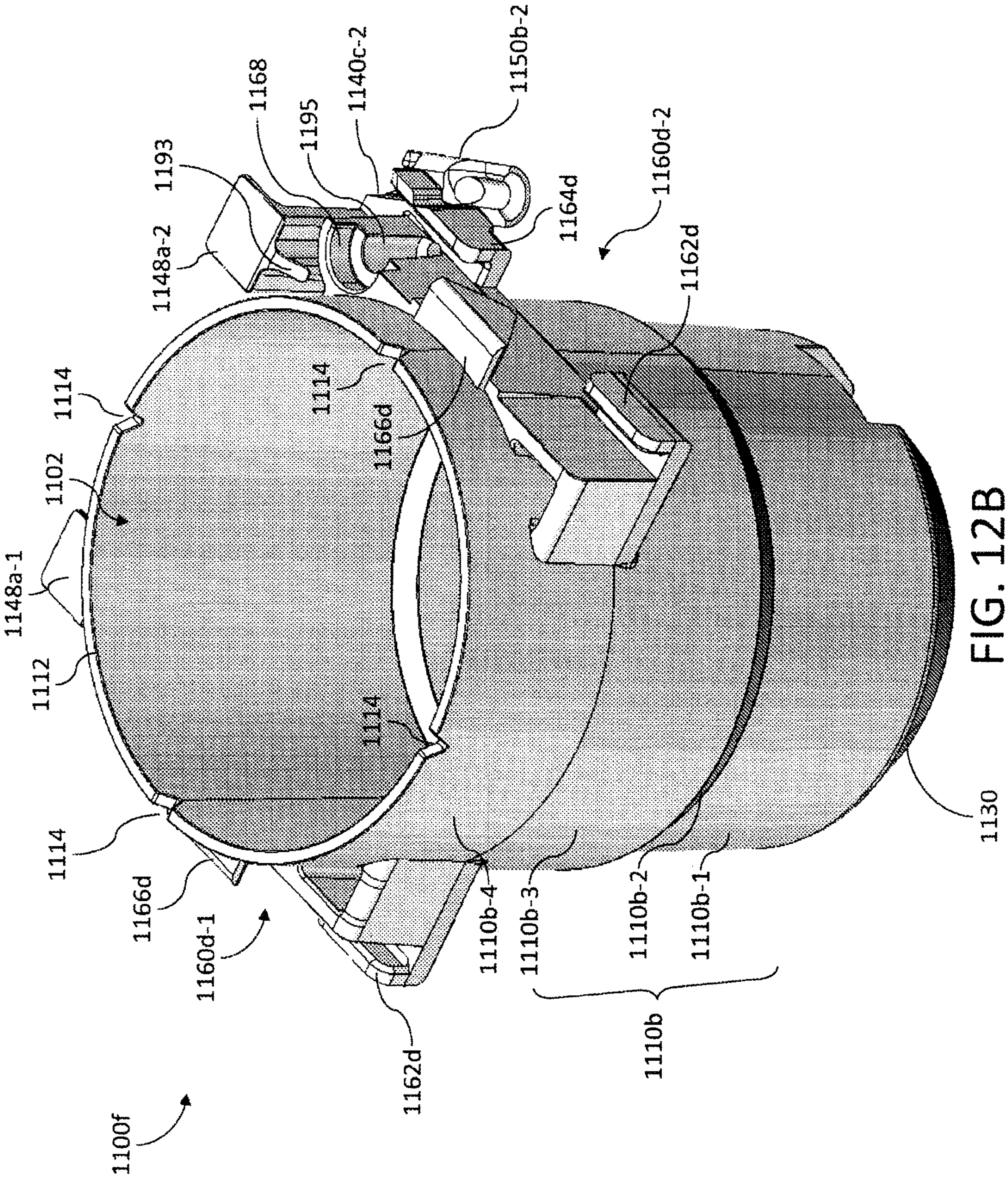
FIG. 12B shows a bottom, right, front perspective view of the housing in FIG. 12A.
Figure 12C:
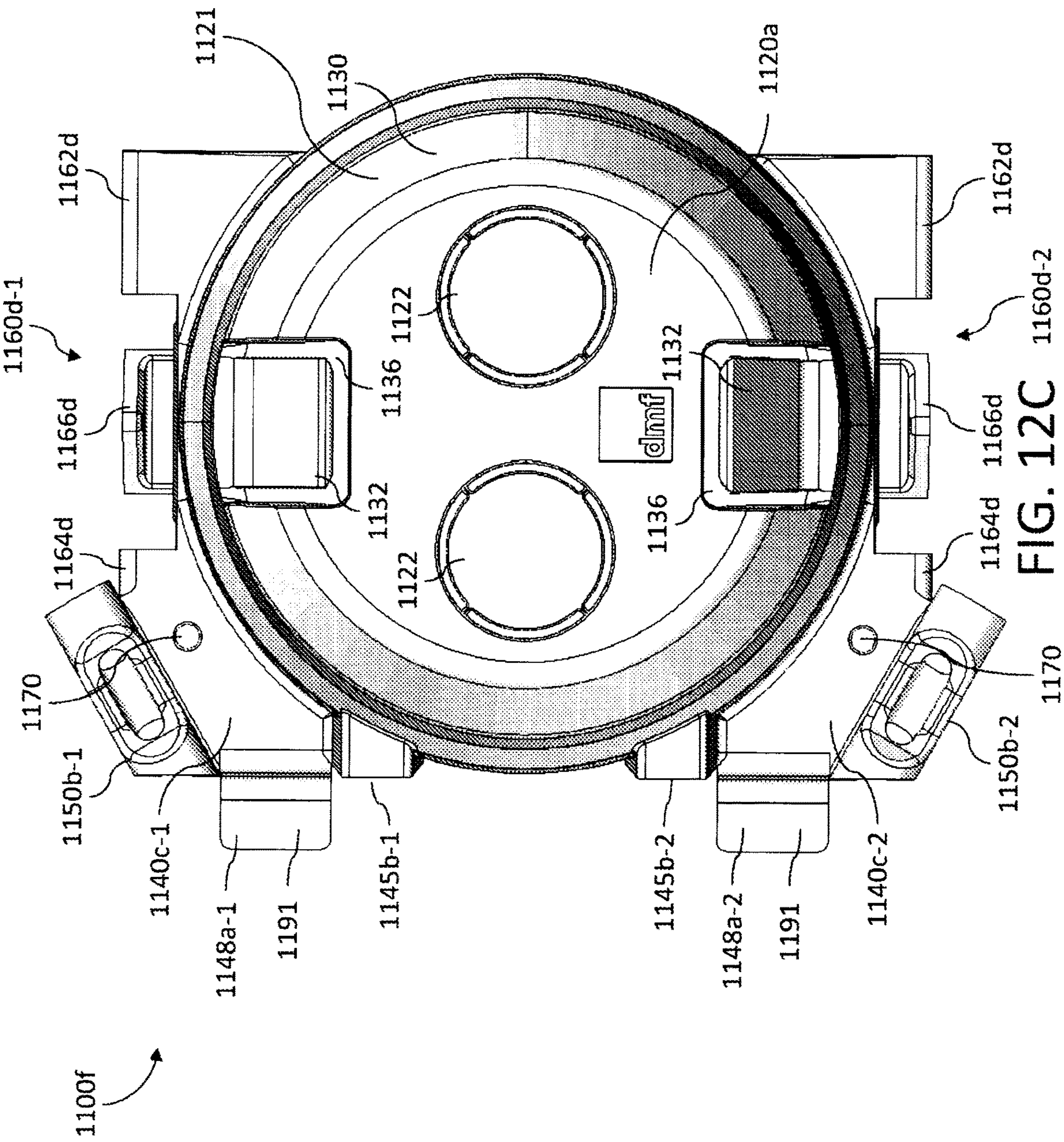
FIG. 12C shows a top view of the housing in FIG. 12A.
Figure 12D:
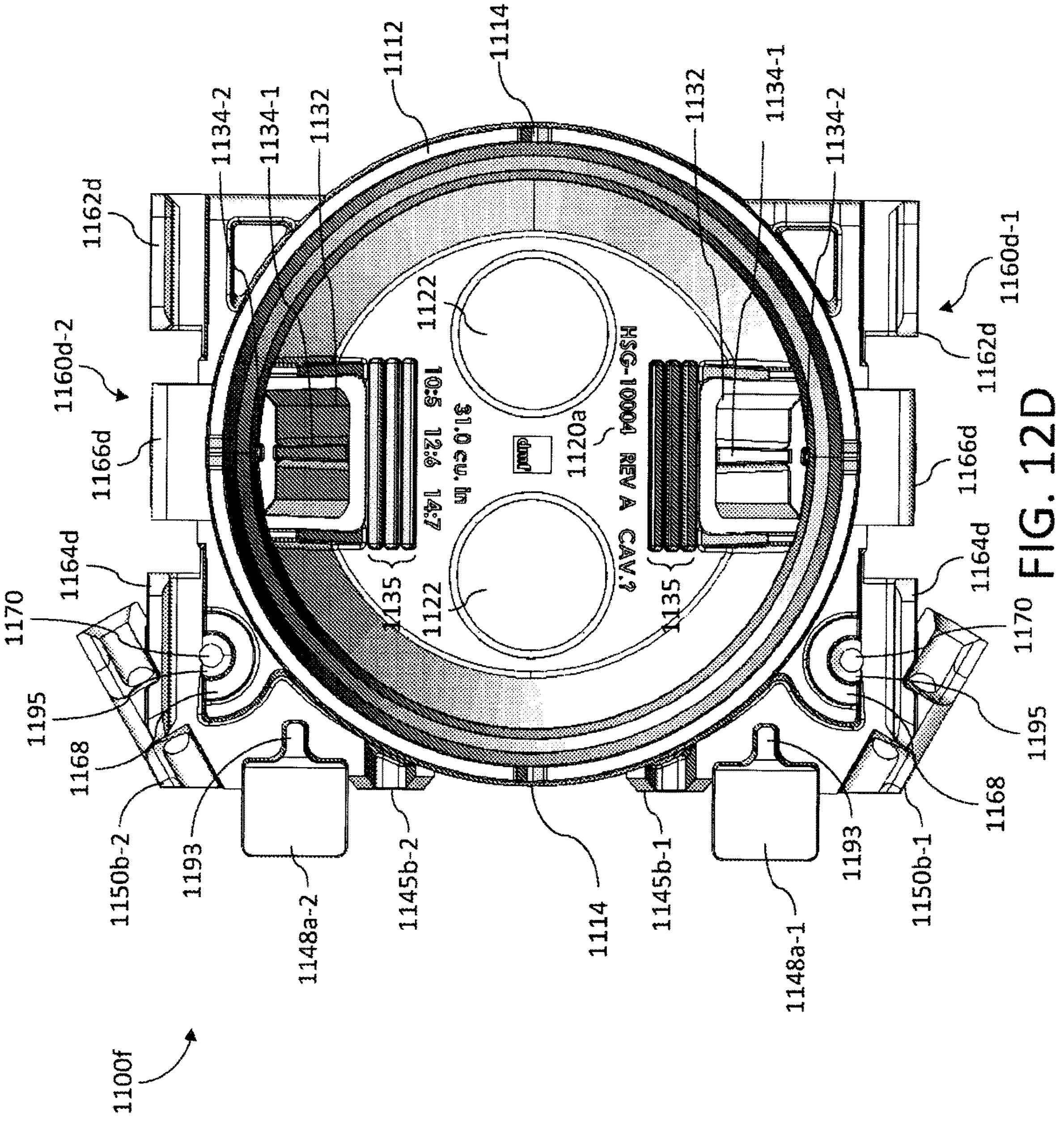
FIG. 12D shows a bottom view of the housing in FIG. 12A.
Figure 12E:
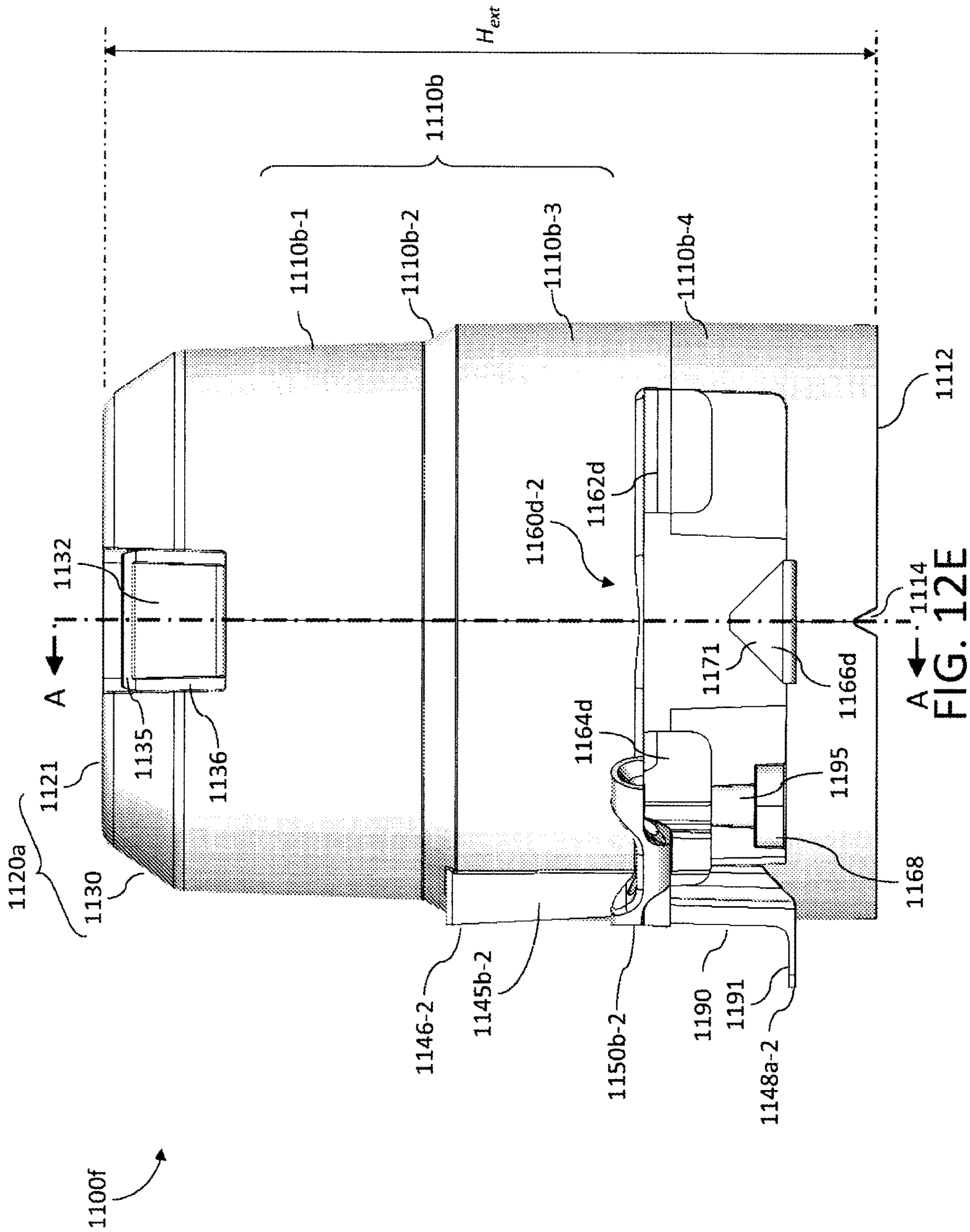
FIG. 12E shows a front view of the housing in FIG. 12A.
Figure 12F:
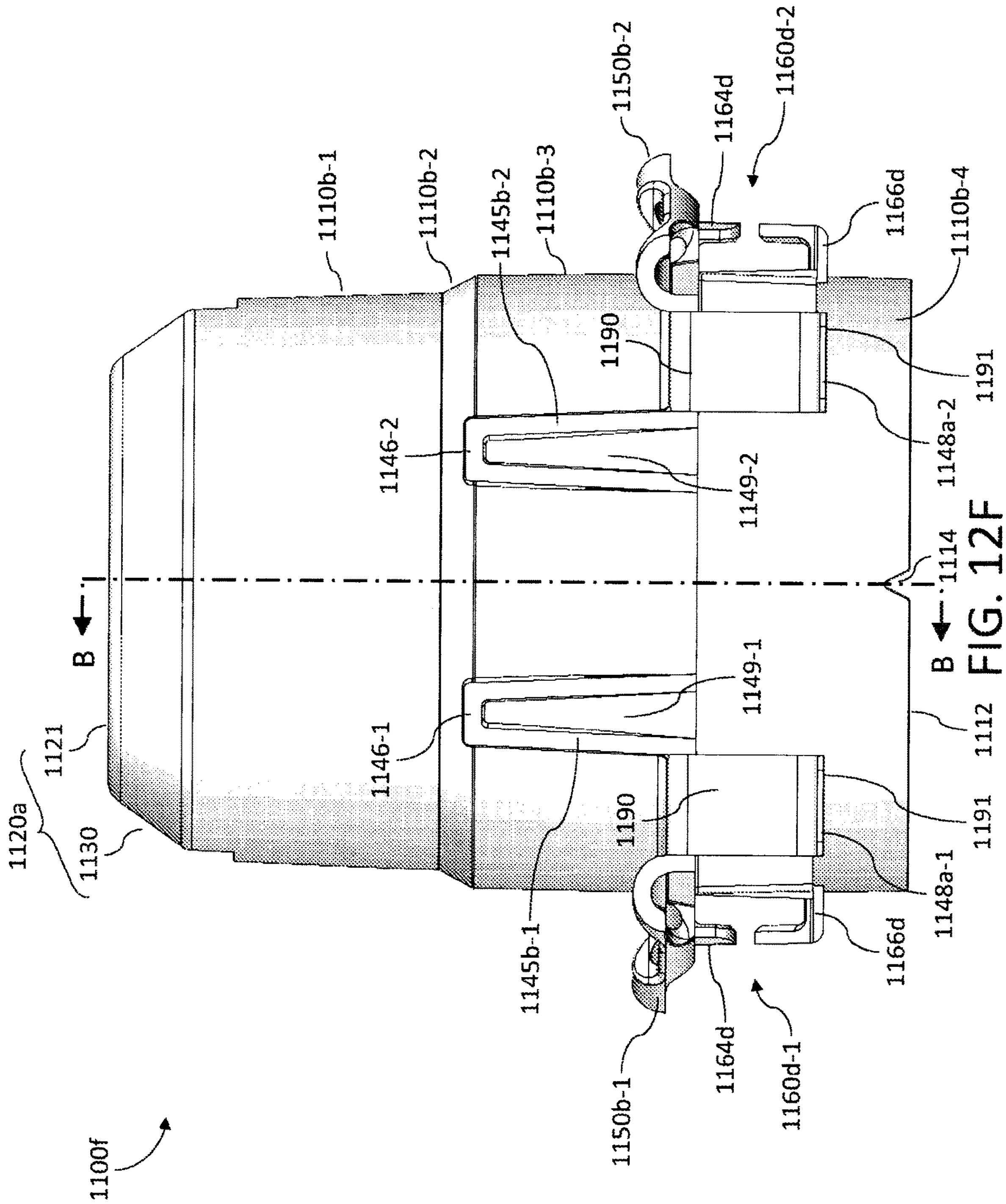
FIG. 12F shows a left-side view of the housing in FIG. 12A.
Figure 12G:
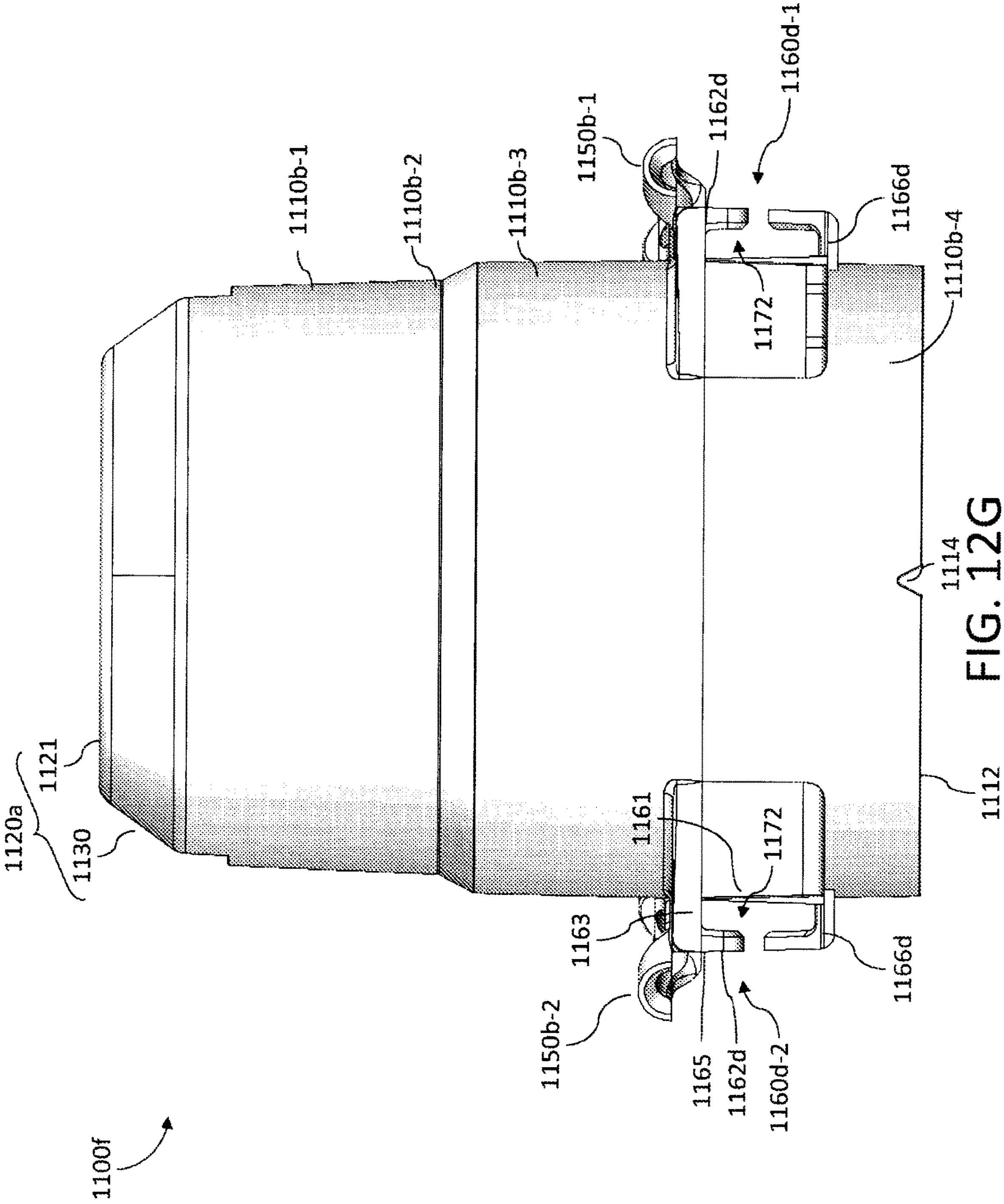
FIG. 12G shows a right-side view of the housing in FIG. 12A.
Figure 12H:
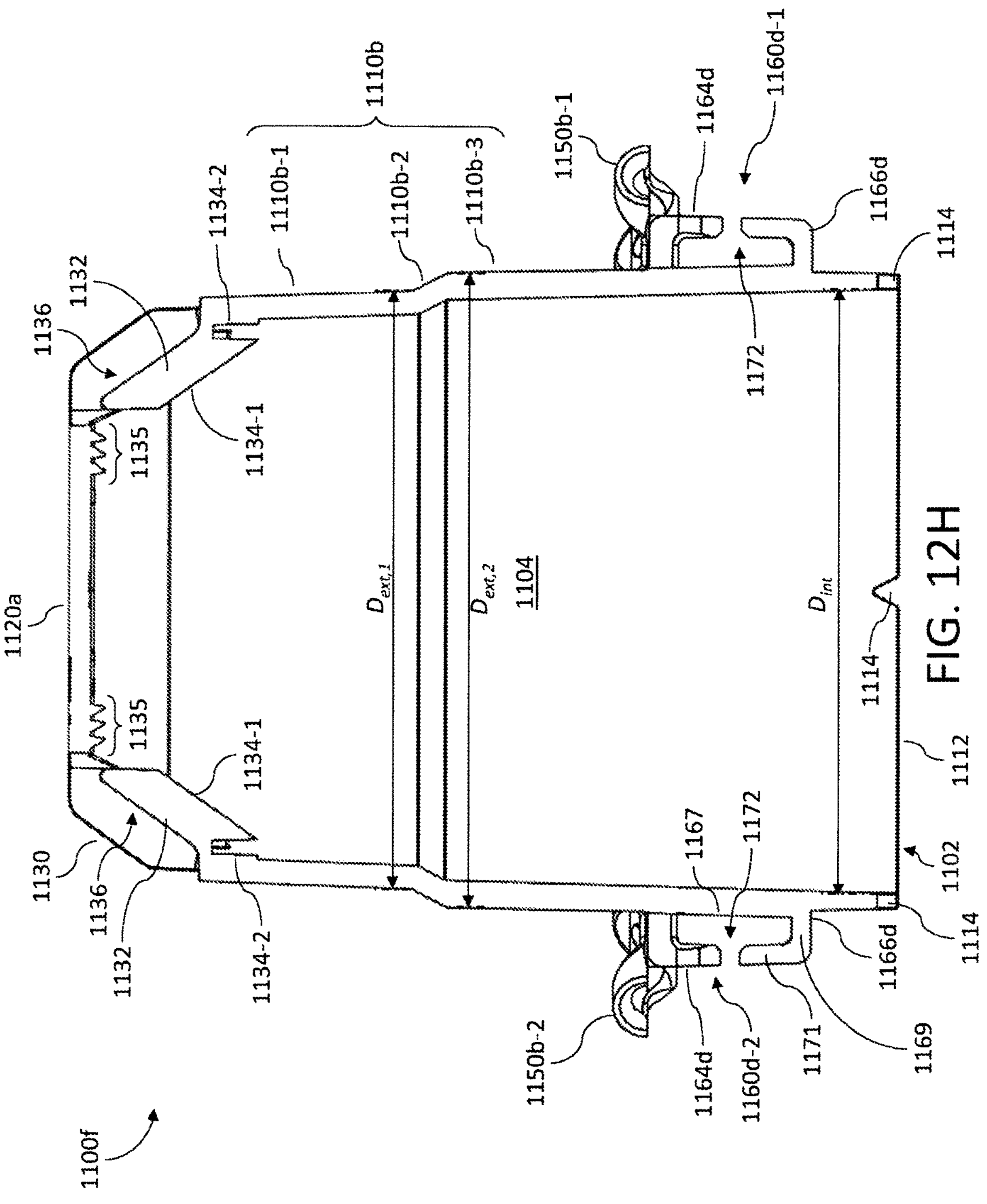
FIG. 12H shows a cross-sectional right-side view of the housing corresponding to the plane A-A of FIG. 12E.
Figure 12I:
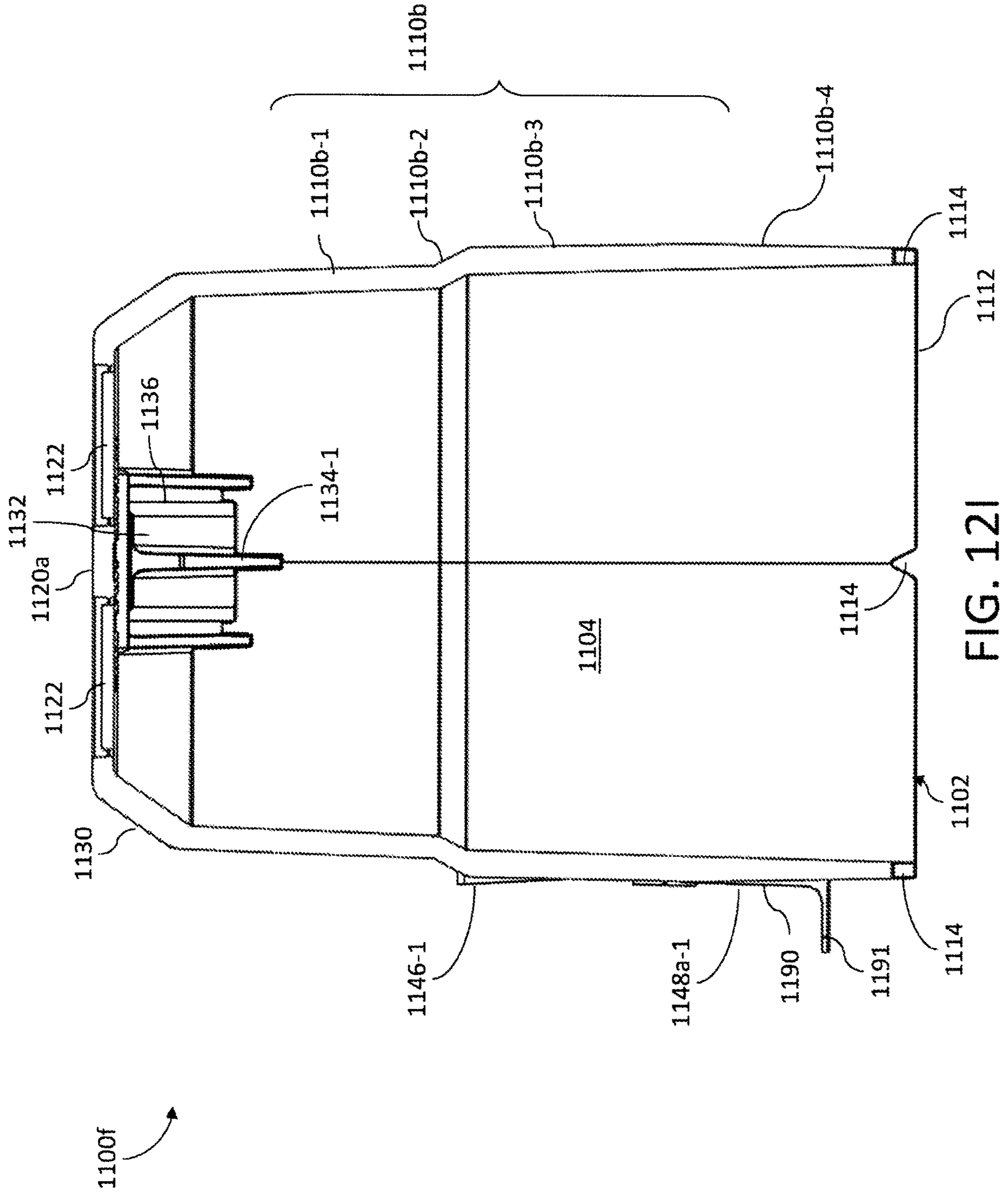
FIG. 12I shows a cross-sectional front-side view of the housing corresponding to the plane B-B of FIG. 12F.
Figure 13:
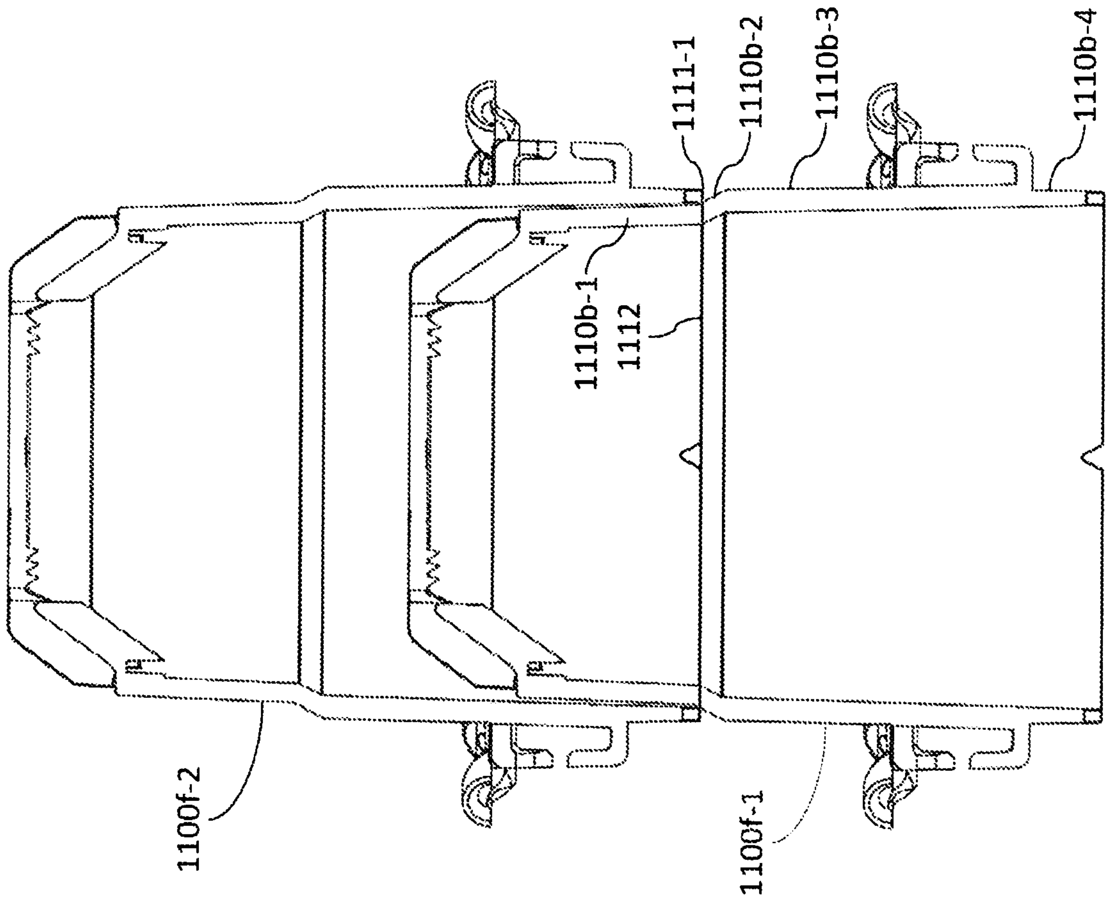
FIG. 13 shows a cross-sectional right-side view of two of the housings of FIG. 12A stacked on top of one another where the cross-section plane corresponds to the plane A-A of FIG. 12E.

FIG. 12H further shows the interior diameter ($D_{int}$) defined by the interior edge 1112 of the first end 1111-1 may be greater than or equal to the exterior diameter $D_{ext,1}$, but smaller than the exterior diameter $D_{ext,2}$. As shown in FIG. 13, the geometry of the sidewall 1110*b* allows the first sidewall section 1110*b*-1 and the cover 1120 of one housing 1100*f*-1 to fit within the portion of the cavity 1104 defined by the third and four sidewall sections 1110*b*-3 and 1110*b*-4 of another housing 1100*f*-2. Specifically, the interior edge 1112 of the housing 1100*f*-2 may be disposed proximate to or, in some instances, in alignment with the exterior edge formed between the sidewall sections 1110*b*-2 and 1110*b*-3 of the housing 1100*f*-1. This, in turn, may allow the first end 1111-1 of the housing 1100f-2 to rest upon the exterior surface of the second sidewall section 1110b-2 of the housing 1100f-1.

Similar to the housings 1100a-1100e, the bar hanger holder 1160d of the housing 1100f may include a first tab 1162d, a second tab 1164d, and a third tab 1166d defining a passageway 1172 to support and guide a pair of bar hangers (e.g., the bar hangers 1210-1 and 1210-2). In some implementations, the passageway 1172 defined by the bar hanger holder 1160d may have a length (e.g., the distance between the left side of the second tab 1164d and the right side of the first tab 1162d of the bar hanger older 1160d-2) of about 3 inches. More generally, the length of the passageway 1172 may range between about 2 inches and about 3 inches.

Specifically, the first and second tabs 1162d and 1164d each form a U-shaped structure that includes a first section 1161 joined to the sidewall 1100b, a second section 1163 adjoining the first section 1161, and a third section 1165 adjoining the second section 1163 to constrain the top, front, and rear sides of the bar hangers 1200-1 and 1200-2. In this implementation, the third tab 1166d may also form a U-shaped structure with a first section 1167 adjoining the sidewall 1100b, the second section 1169 adjoining the first section 1167, and a third section 1171 adjoining the second section 1169 to constraint the bottom, front, and rear sides of the bar hangers 1200-1 and 1200-2. In this manner, the bar hanger holder 1160d may constrain the lateral motion of the bar hangers even if one or both of the bar hangers 1200-1 and 1200-2 are only in contact with two of the first, second, and third tabs 1162d, 1164d, and 1166d.

As shown in FIGS. 12A, 12B, and 12E, the third section 1171 of the third tab 1166d may also have at triangular shape when viewing the housing 1100f from the front or rear sides. The triangular geometry of the third tab 1166d may aid the manufacture of the housing 1100f by providing a tapered surface to facilitate the release of the third tab 1166d from a mold when the housing 1100f is injection molded. FIGS. 12D and 12E show the second tab 1164d may also extend directly below the nail-in feature 1150b such that the second tab 1164d and the cylindrical wall 1153 of the nail-in feature 1150b are merged directly together.

FIGS. 12B, 12D, and 12E also show the bar hanger holder 1160d may include a fastener opening 1170 to receive the locking fastener 1020 to lock the relative position of the housing 1100f and the bar hanger assemblies 1200. As shown, the fastener opening 1170 may extend through the mounting platform 1140c and the second tab 1164d. The bar hanger holder 1160d may further include a recess 1195 formed directly below the fastener opening 1170 and a recess 1168 formed directly below the recess 1195. The recess 1195 may be shaped and/or dimensioned to contain at least a portion of the shank of the fastener 1020 and the recess 1168, which is larger than the recess 1195, may be shaped and/or dimensioned to contain at least a portion of the head of the fastener 1020 and/or a washer 1021.

Figure 14A:
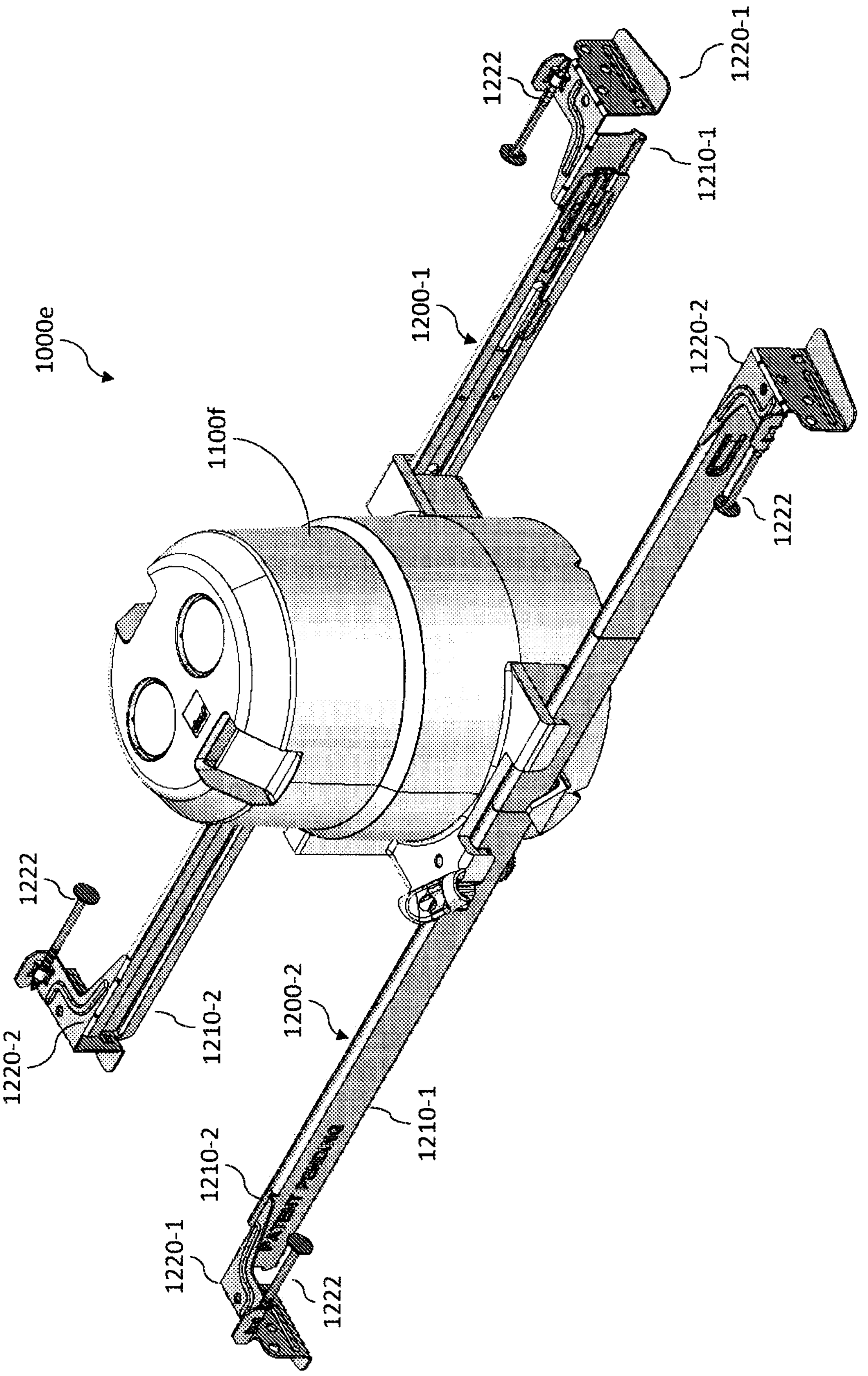
FIG. 14A shows a top, right, front perspective view of an exemplary housing assembly that includes the housing of FIG. 12A and bar hangers to couple to two or more support structures.
Figure 14B:
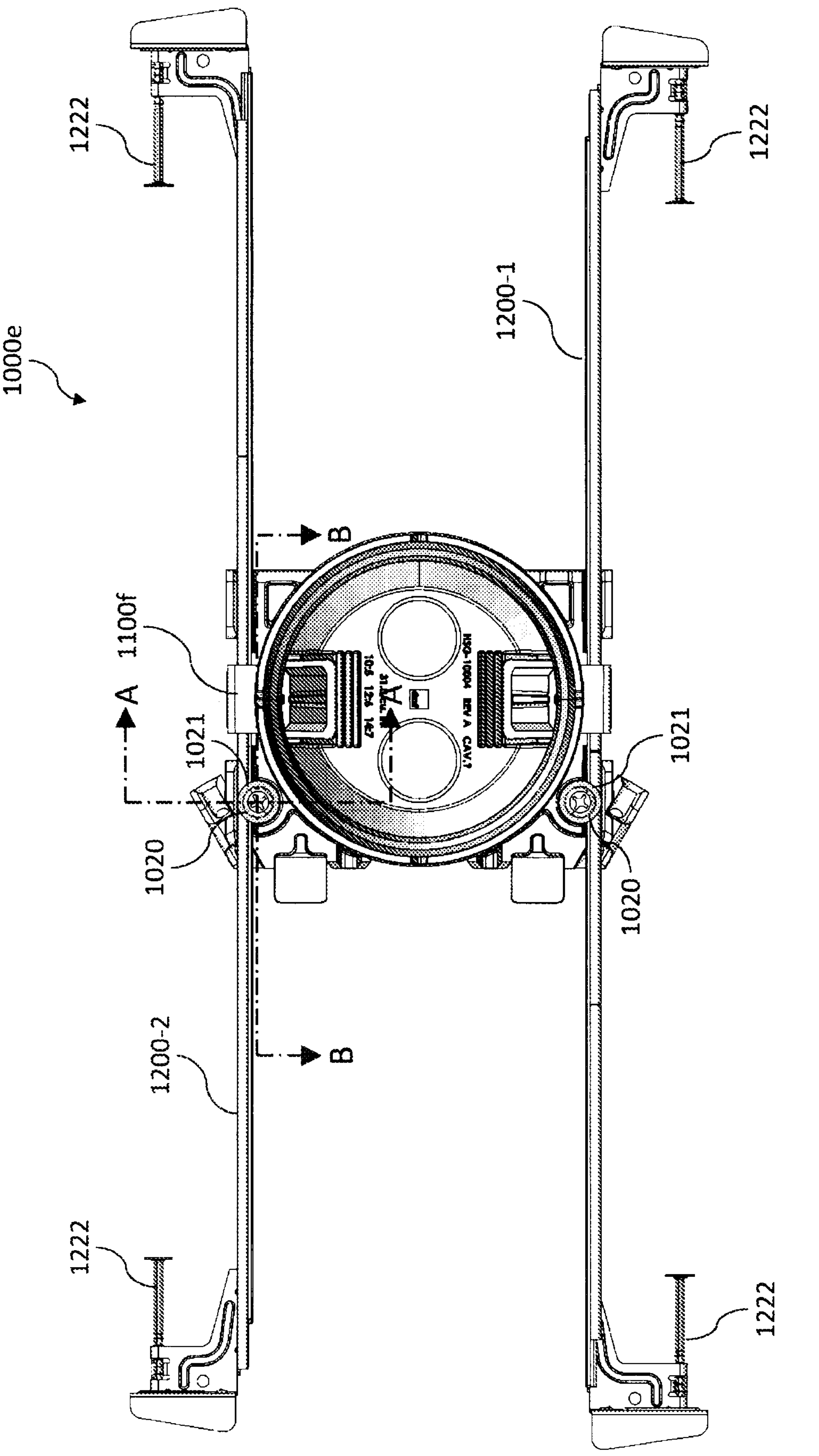
FIG. 14B shows a bottom view of the housing assembly of FIG. 14A.
Figure 14C:
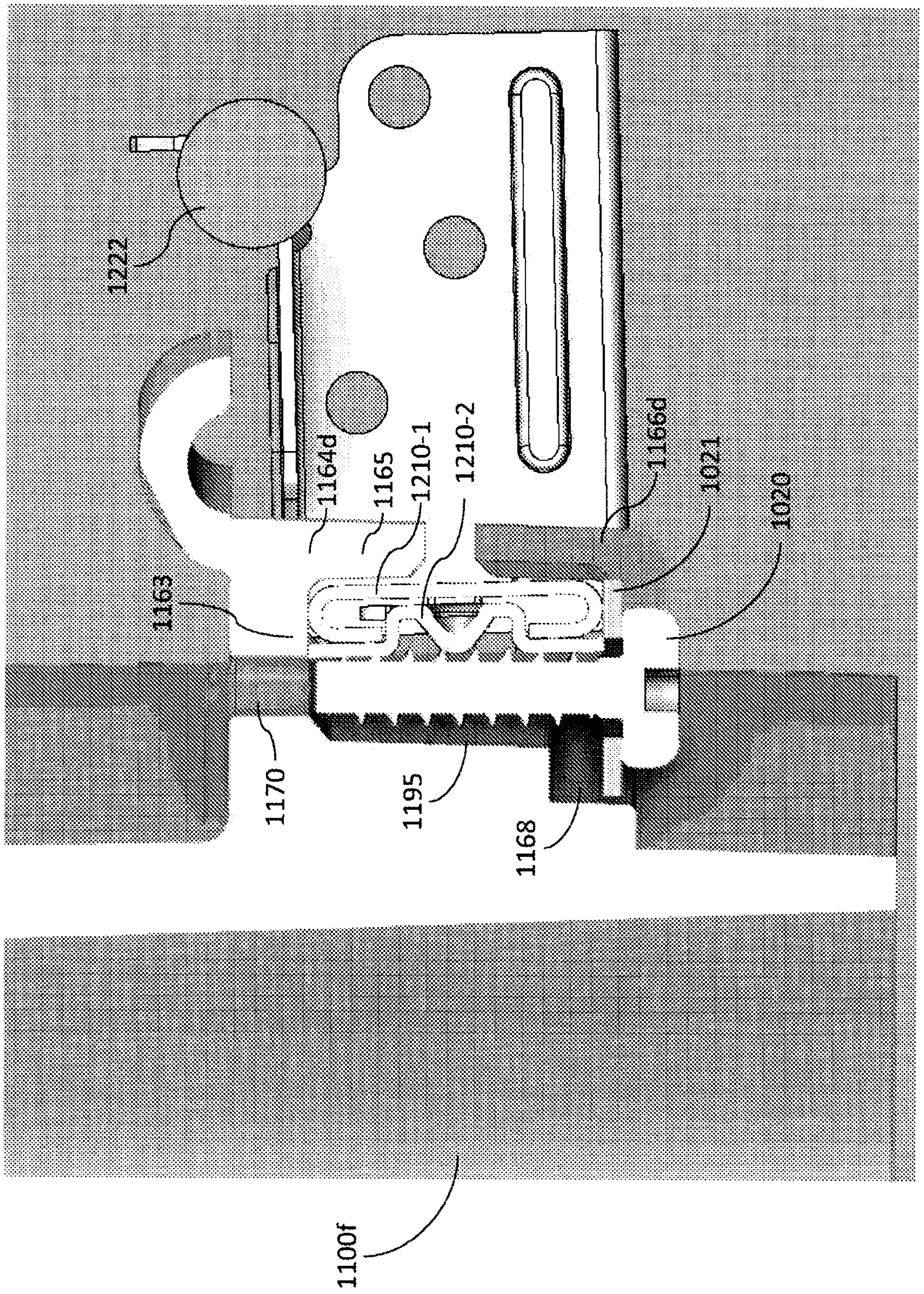
FIG. 14C shows a cross-sectional left-side view of the housing assembly of FIG. 14A corresponding to the plane A-A of FIG. 14B.
Figure 14D:
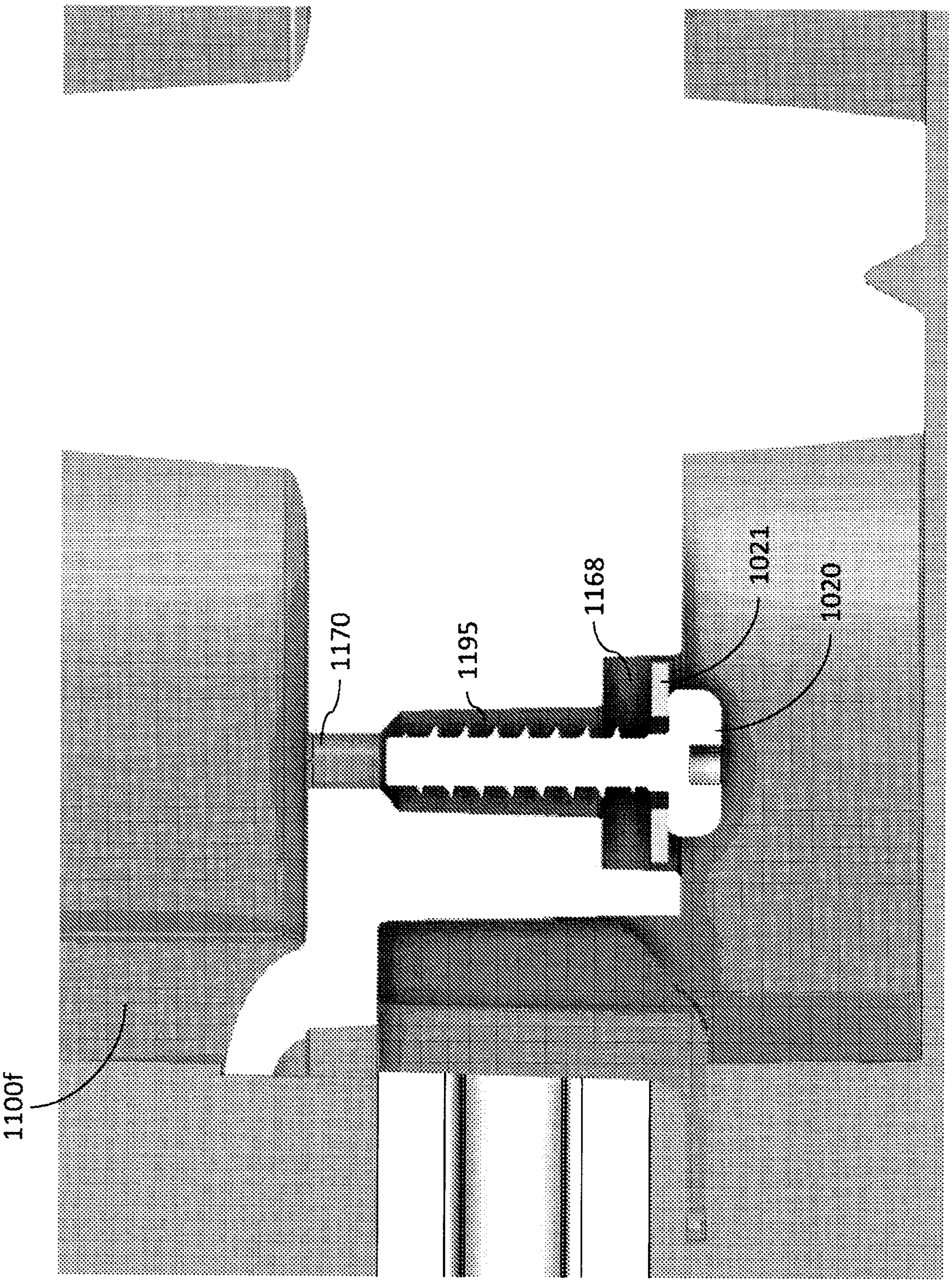
FIG. 14D shows a cross-sectional front view of the housing assembly of FIG. 14A corresponding to the plane B-B of FIG. 14B.

As shown in FIGS. 14C and 14D, the housing assembly 1000e may also include the washer 1021 for each locking fastener 1020 to provide a larger contact area to physically contact the bar hangers 1200-1 and 1200-2. As shown in FIG. 14C, the washer 1021 may be disposed above and support by the head of the locking fastener 1020. When the fastener 1020 is tightened, the washer 1020 may press the bar hangers 1200-1 and 1200-2 against the second sections 1163 of the first and second tabs 1162d and 1164d, thus imparting a clamping force that restricts movement of the housing 1100f relative to the bar hangers 1200-1 and 1200-2.

The housing 1100f may also include multiple alignment features to align the housing 1100f to a support structure (e.g., a wood joist) when using the nail-in features 1150b for installation. For example, FIG. 12A shows the housing 1100f may include a pair of ribs 1145b-1 and 1145b-2 (collectively referred to herein as a "rib 1145b") to provide respective contact regions 1146-1 and 1146-2 to physically contact one side of the support structure. Similar to the ribs 1145a, the ribs 1145b may provide a tapered surface a portion of which contacts the support structure. As shown in FIG. 12F, the ribs 1145b may extend vertically along the second sidewall section 1110b-2 and the third sidewall section 1110b-3. Additionally, the ribs 1145b-1 and 1145b-2 may include recesses 1149-1 and 1149-2, respectively, which may reduce the thickness of the sidewall 1110b and the amount of material used for manufacture.

The housing 1100f may also include tabs 1148a-1 and 1148a-2 (collectively referred to herein as a "tab 1148a") that extend from the support platforms 1140c-1 and 1140c-2, respectively. In some implementations, each tab 1148a may be disposed between a nail-in feature 1150b and a rib 1145b. As shown in FIG. 12A, the housing 1100f may include multiple tabs 1148a to provide greater more mechanical stability when aligning the housing 1100f to a support structure.

Figure 15A:
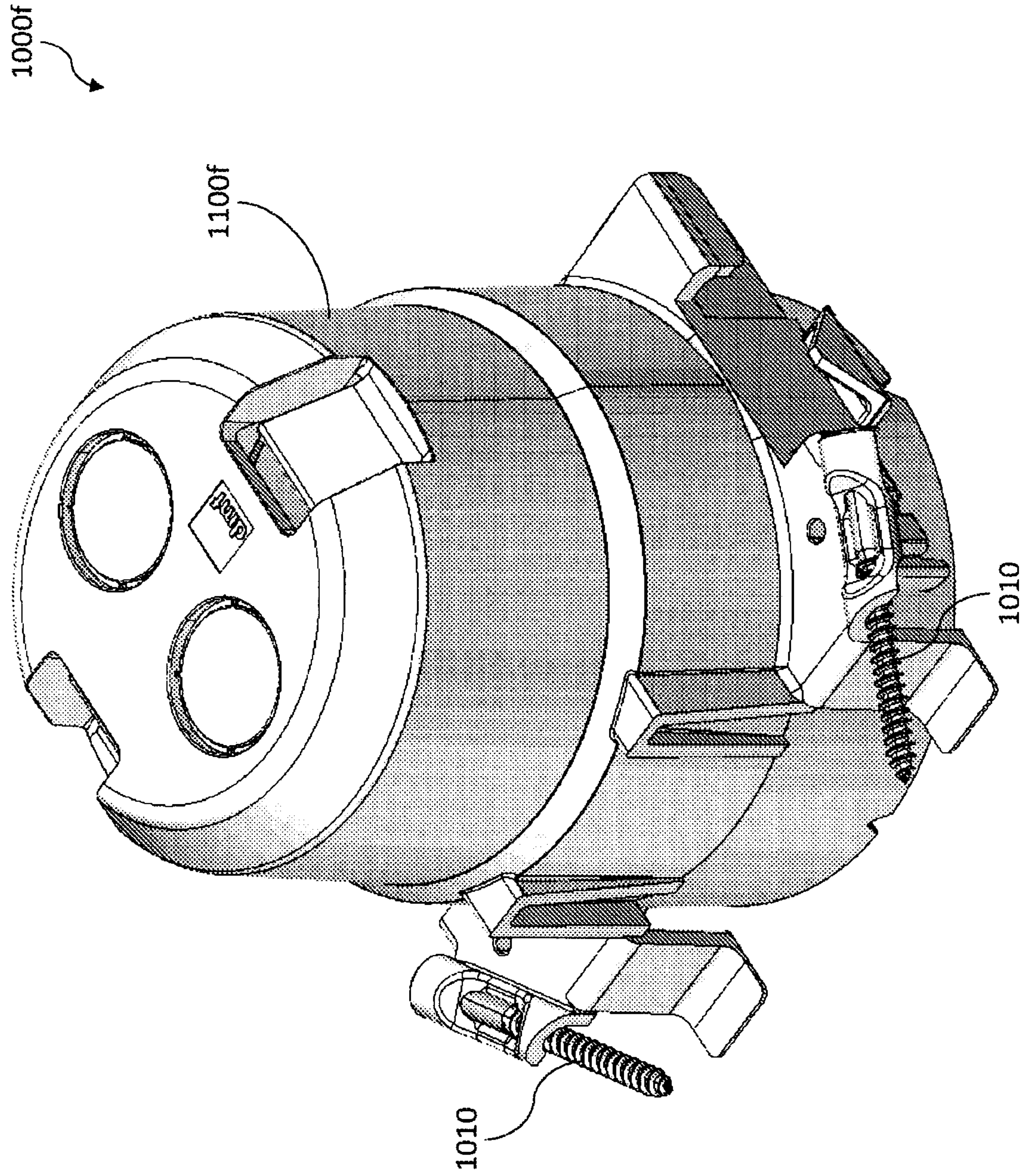
FIG. 15A shows a top, front, left perspective view of an exemplary housing assembly that includes the housing of FIG. 12A and fasteners to couple to one support structure.
Figure 15B:
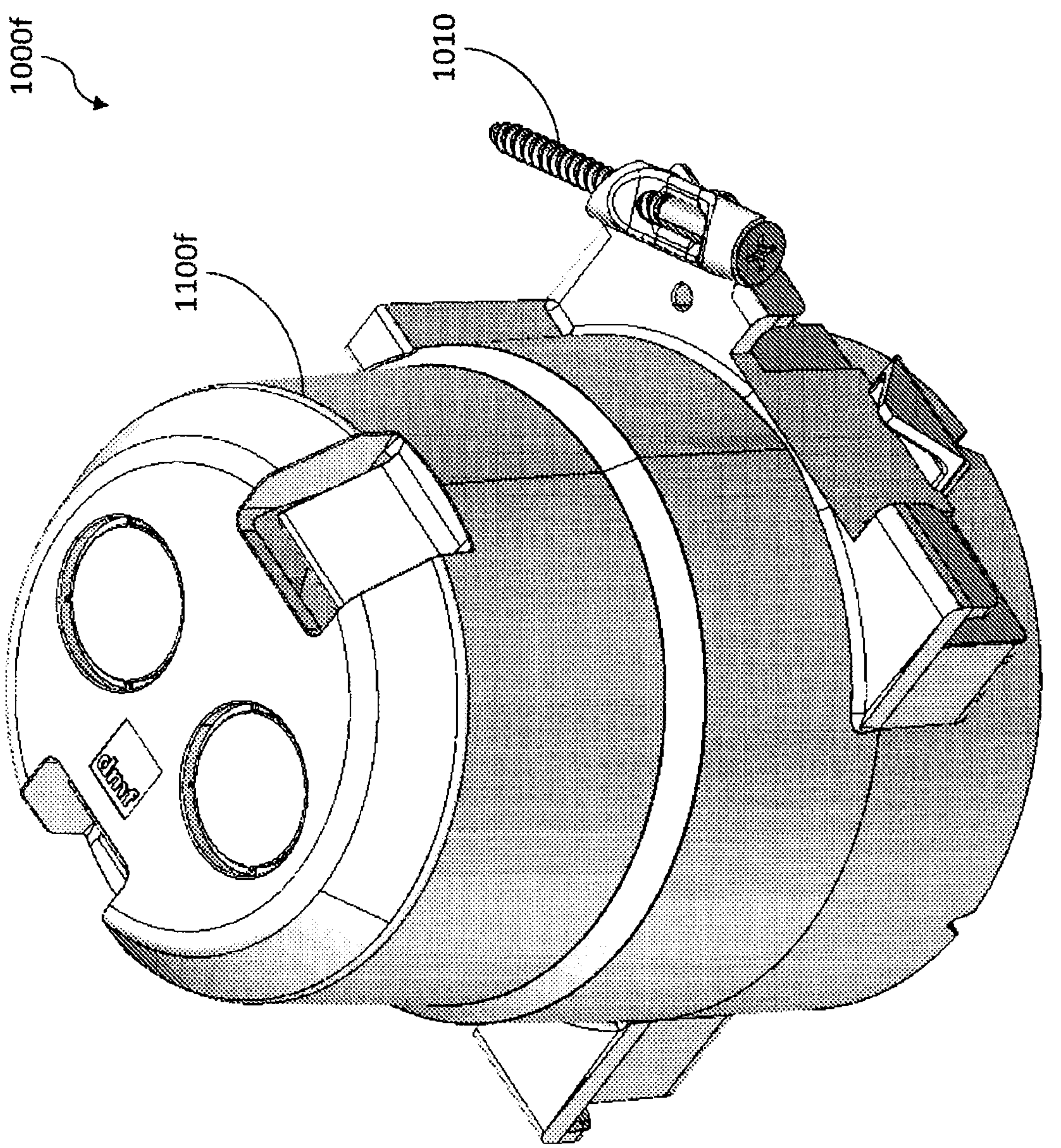
FIG. 15B shows a top, rear, right perspective view of the housing assembly of FIG. 15A.
Figure 15C:
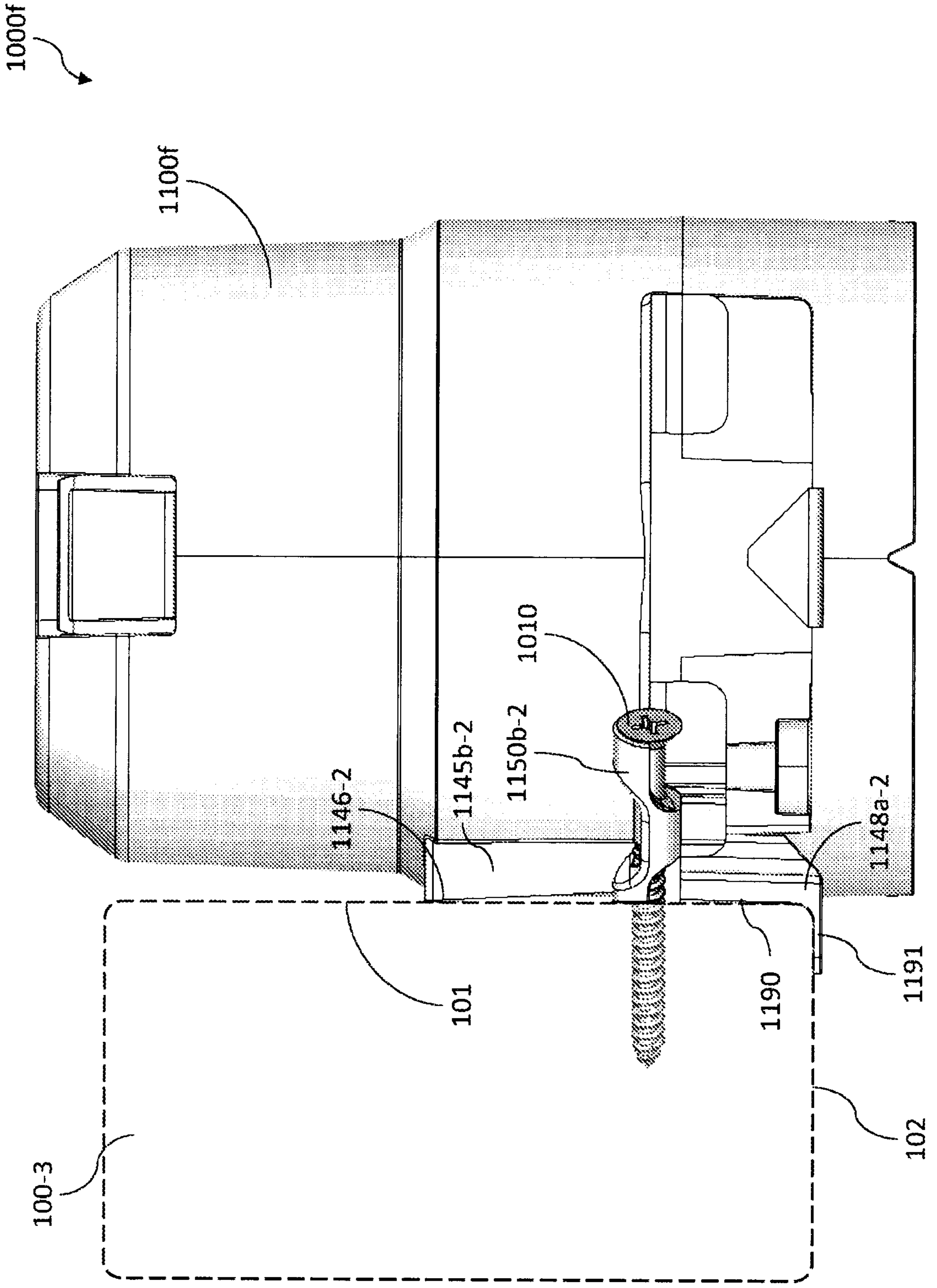
FIG. 15C shows a front view of the housing assembly of FIG. 15A where the housing assembly is mounted to the support structure.

The tab 1148a may have an L-shaped structure that includes contact regions 1190 and 1191 oriented at different angles to physically contact two different sides of the support structure (e.g., a bottom side and a left/right side of the support structure). In some implementations, the contact regions 1190 and 1191 may be oriented at a substantially right angle or a right angle with respect to one another. For example, FIG. 12E shows the contact region 1191 may be oriented substantially horizontal or horizontal to abut a bottom surface 102 of a joist 100-3 and the contact region 1190 may be oriented substantially vertical or vertical to abut a side 101 of the joist 100-3 as shown in FIG. 15C. In some implementations, the contact region 1190 may be tapered such that only a portion of the contact region 1190 physically contacts the joist 100-3 similar to the ribs 1145b.

In some implementations, the tabs 1148a may be arranged such that the respective contact regions 1190 of the tabs 1148a-1 and 1148a-2 may be in parallel alignment with one another. In some implementations, the respective contact regions 1191 of the tabs 1148a-1 and 1148a-2 may be in parallel alignment with one another. FIGS. 12E and 12F further show the tabs 1148a may be shaped and/or dimensioned such that the contact regions 1190 extend downwards from the mounting platform 1140c towards the first end 1111-1 of the housing 1100f. In some implementations, the height of the contact regions 1190 may be chosen such that the bottom surface of the contact regions 1191 are positioned along the same plane as the bottom surface of the third tabs 1166d. In other words, the tabs 1148a may be offset from the first end 1111-1 to provide clearance for the housing 1100f to be disposed within an opening formed in a ceiling.

FIGS. 12B and 12D also show each tab 1148a may include a rib 1193 formed along an interior side of the contact region 1190 to increase the mechanical rigidity of the tab 1148a. Said in another way, the rib 1193 may prevent unwanted deflection of the tab 1148a when the housing 1100f is placed in physical contact with the support structure. As shown, in some implementations, the rib 1193 may extend from the mounting platform 1140c to the contact region 1191.

Although the housing 1100f may support several modes of installation, it should be appreciated that some of the components affiliated with each mode of installation may be excluded during installation and/or not packaged together with the housing **1100*f* during sale to provide users a kit tailored specifically for one mode of installation. For example, FIGS. 14A-14D show the housing assembly 1000*e* tailored for installation onto two or more support structures by including the housing 1100*f* together with the bar hanger assemblies 1200-1 and 1200-2, the locking fasteners 1020, and the washers 1021. In some implementations, the housing assembly 1000*e* may also include the fasteners 1222 to couple the bar hanger assemblies 1200 to a support structure. In another example, FIGS. 15A-15C show the housing assembly 1000*f* tailored for installation onto one support structure by including the housing 1100*f* together with the fasteners 1010 for each nail-in features 1150*b***.

FIGS. 16A-16I show another exemplary housing **1100*g* for a new construction installation of a 4-inch trade size lighting system (e.g., the housing 1100*g*** may fit into an opening formed in a ceiling having, for example, a diameter of approximately 4 inches).

Despite the larger size, the housing **1100*g* may nevertheless include the same or similar features as the housings 1100*a*-1100*f*. For example, the housing 1100*g* may include a sidewall 1110*c* and a cover 1020*b* that together define a cavity 1104 and an opening 1102 into the cavity 1104. The housing 1100*g* may further include integrated bar hanger holders 1160*e*-1 and 1160*e*-2 (collectively referred to herein as "a bar hanger holder 1160*e*") similar to the bar hanger holders 1160*c* to support bar hanger assemblies (not shown) when installing the housing 1100*g* between two or more structures in the ceiling space. The housing 1100*g* may also include a pair of nail-in features 1150*c*-1 and 1150*c*-2 (collectively referred to herein as "a nail-in feature 1150*c*") similar to the nail-in features 1150*b* to directly couple the housing 1100*g* to a single support structure. The housing 1100*g* may also include multiple alignment features to provide multiple discrete points or regions of contact with the support structure when the nail-in features 1150*c* are used for installation. For example, the housing 1100*g* may include mounting platforms 1140*d*-1 and 1140*d*-2 similar to the mounting platforms 1140*b*, ribs 1145*a*-1 and 1145*a*-2, and a lip 1144. Similar to the housings 1100*a*-1100*f*, the housing 1100*g*** may be formed as a single plastic component using, for example, an injection molding process.

The sidewall **1110*c* may be dimensioned to have a larger width compared to the housings 1100*a*-1100*f*. For example, the interior width ($D_{int}$) of the sidewall 1110*c* at the first end 1111-1 may be about 4.1 inches. The exterior depth ($H_{ext}$) of the housing 1100*g* may be about 4.5 inches, which is the same as the housings 1100*a*-1100*f*. In other words, the 4-inch trade size housing 1100*g* may be enlarged only along its width compared to the 3-inch trade size housing 1100*e* to accommodate a larger lighting module and/or more electrical wires/cables. The dimensions of the bar hanger holder 1160*e*, the nail-in features 1150*c*, the mounting platforms 1140*c* may also be larger to accommodate the larger the housing 1100*e*** while retaining the same or similar set of features.

Figure 16A:
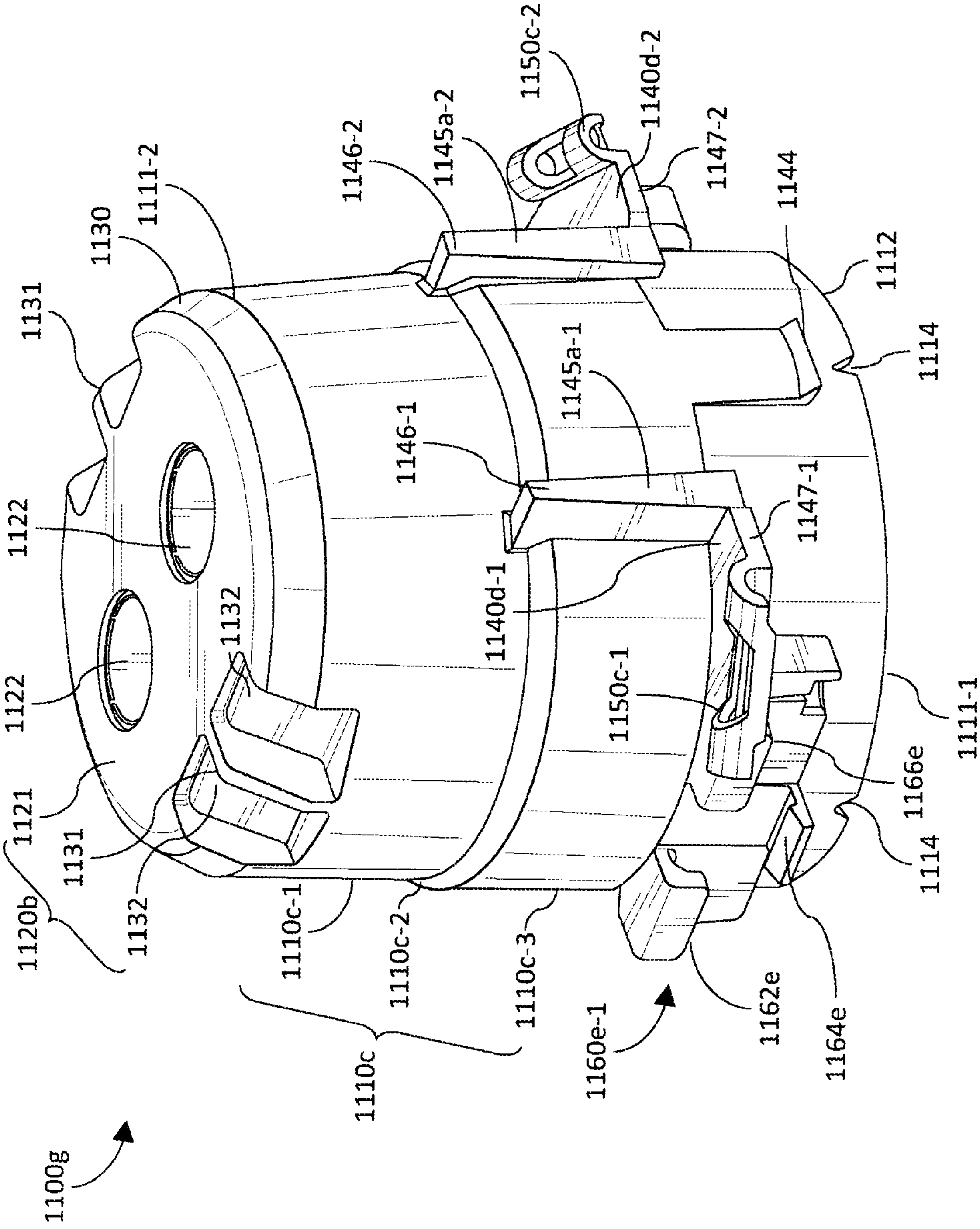
FIG. 16A shows a top, left, rear perspective view of an exemplary housing for a new construction installation of a 4-inch trade size lighting system.
Figure 16B:
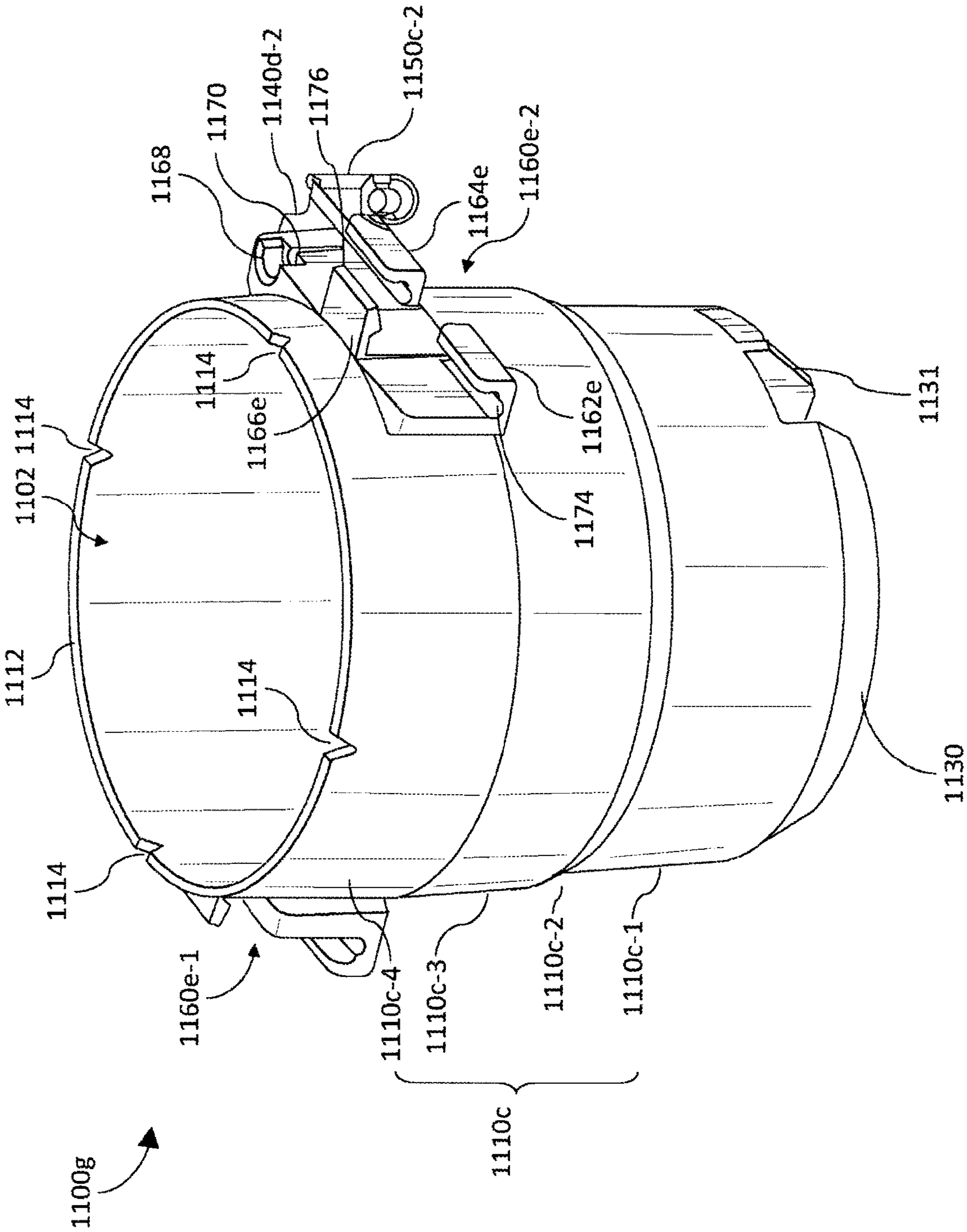
FIG. 16B shows a bottom, right, front perspective view of the housing of FIG. 16A.
Figure 16C:
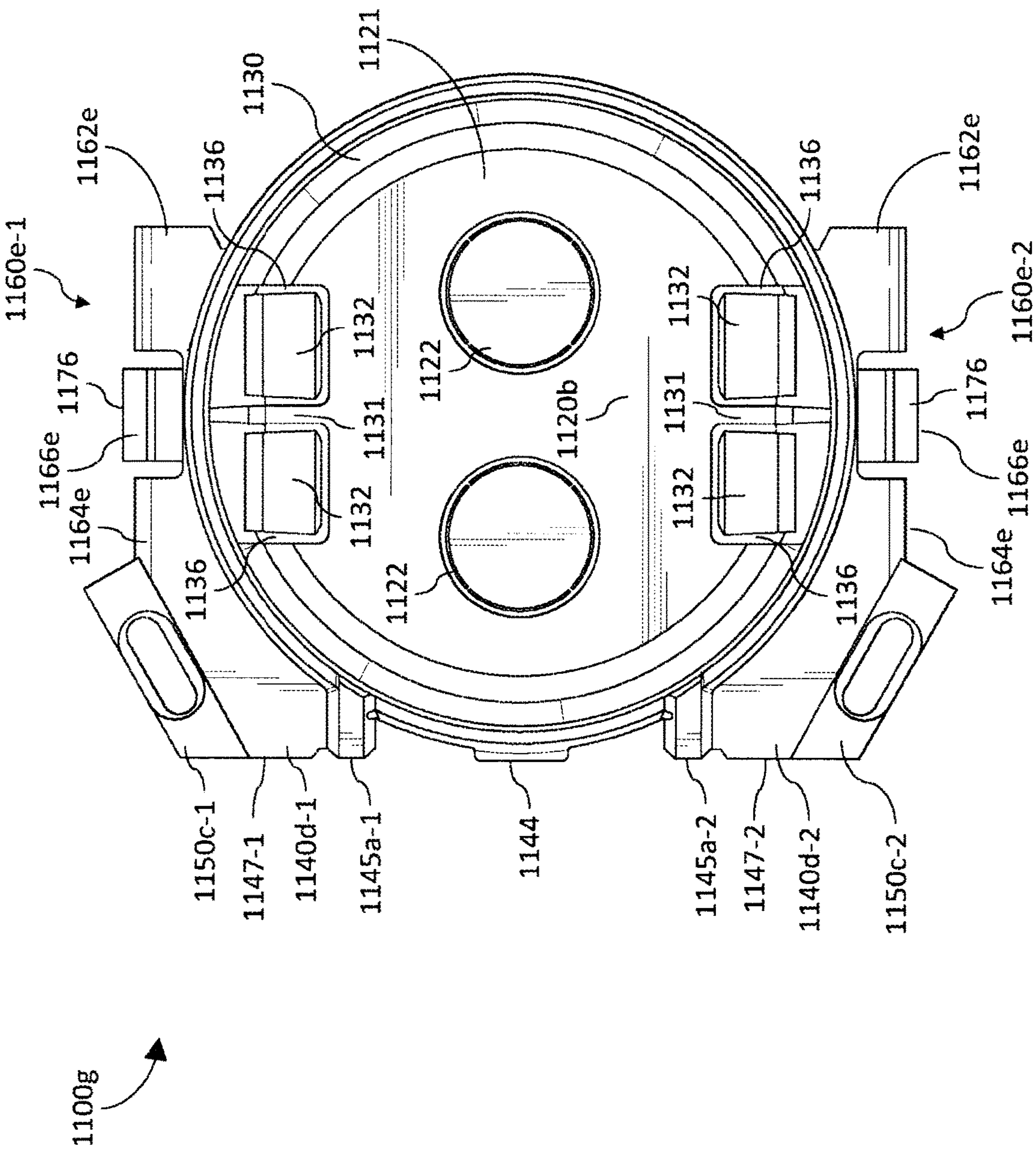
FIG. 16C shows a top view of the housing of FIG. 16A.
Figure 16D:
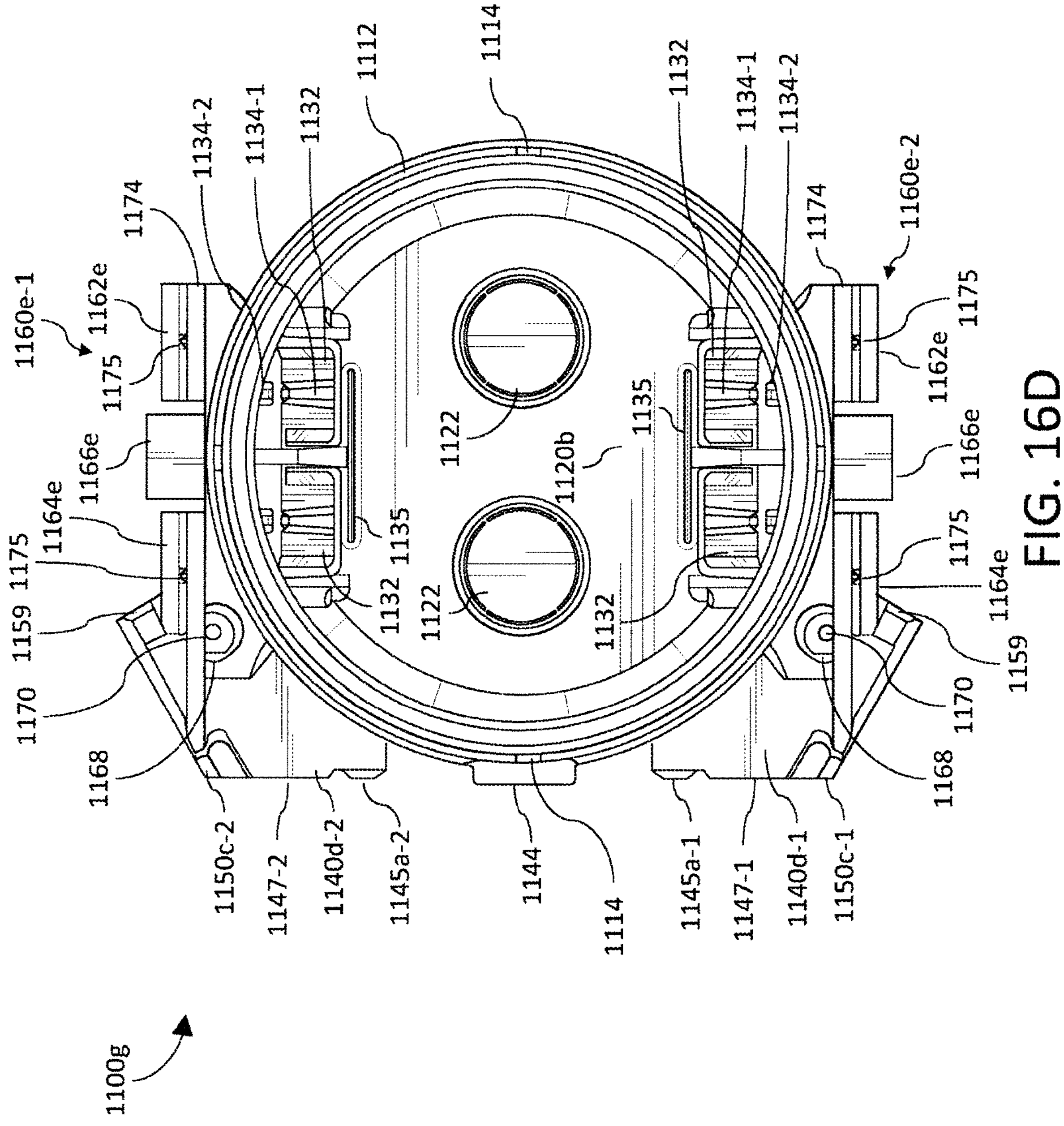
FIG. 16D shows a bottom view of the housing of FIG. 16A.
Figure 16E:
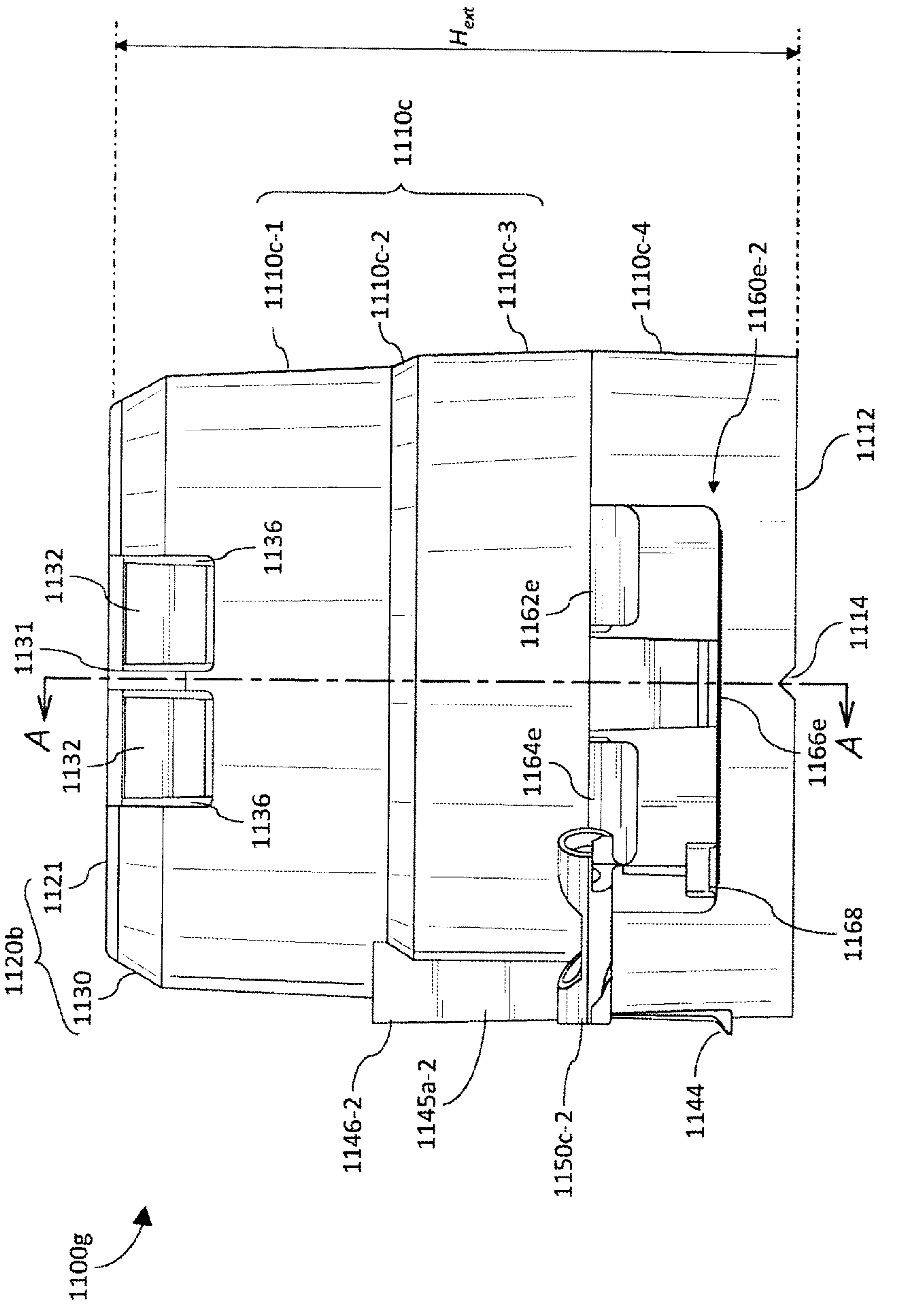
FIG. 16E shows a front-side view of the housing of FIG. 16A.
Figure 16F:
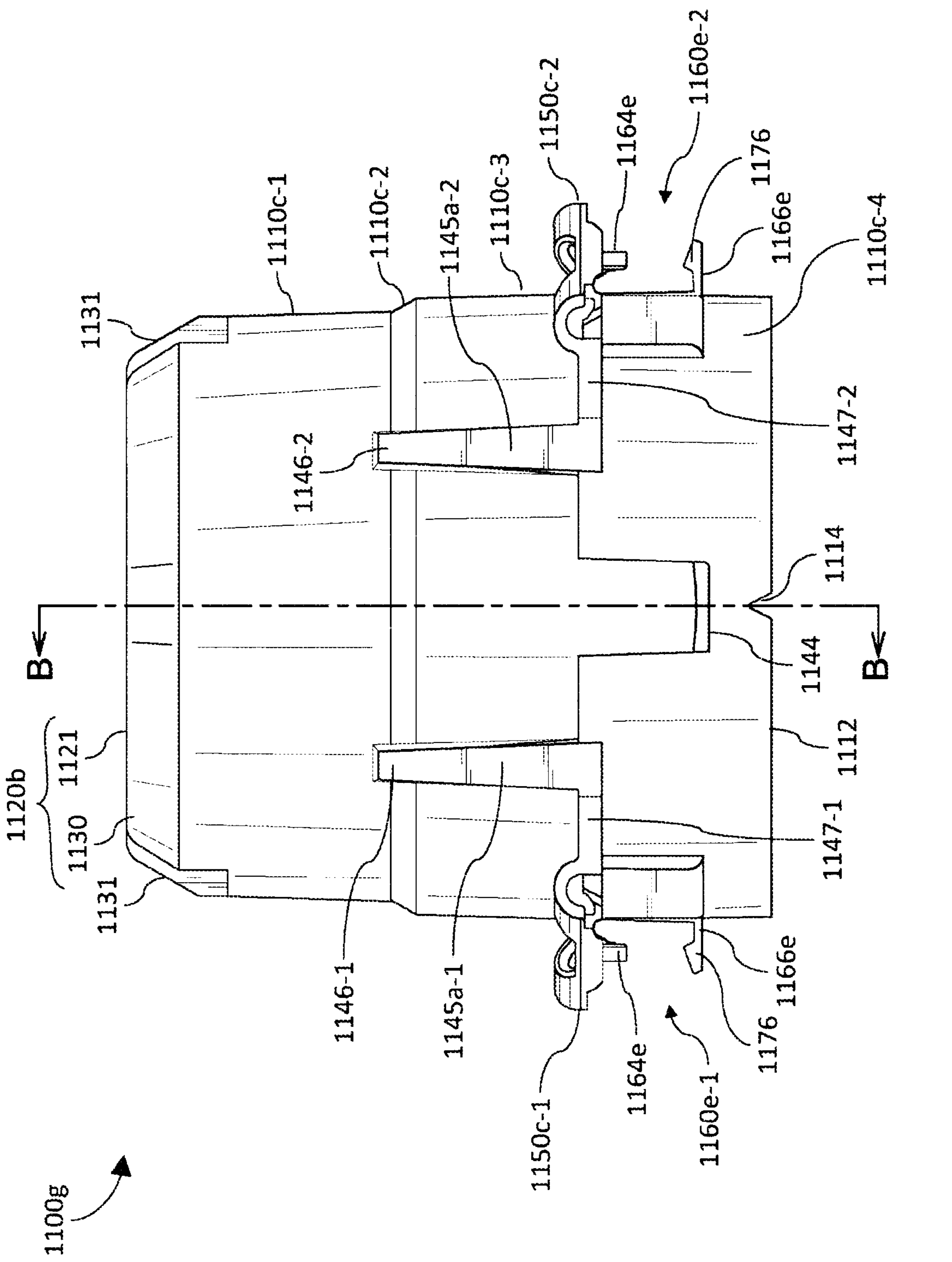
FIG. 16F shows a left-side view of the housing of FIG. 16A.
Figure 16G:
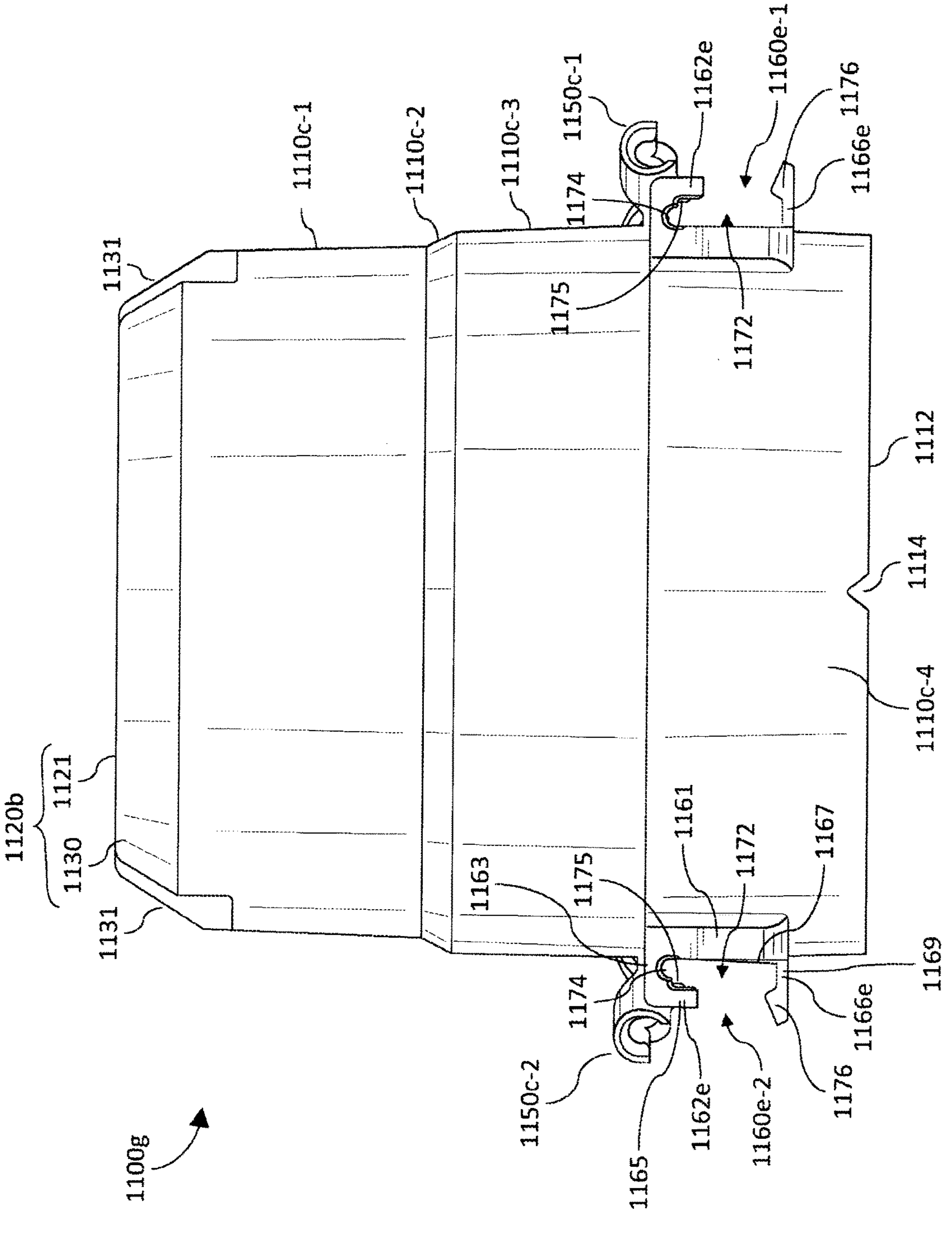
FIG. 16G shows a right-side view of the housing of FIG. 16A.
Figure 16H:
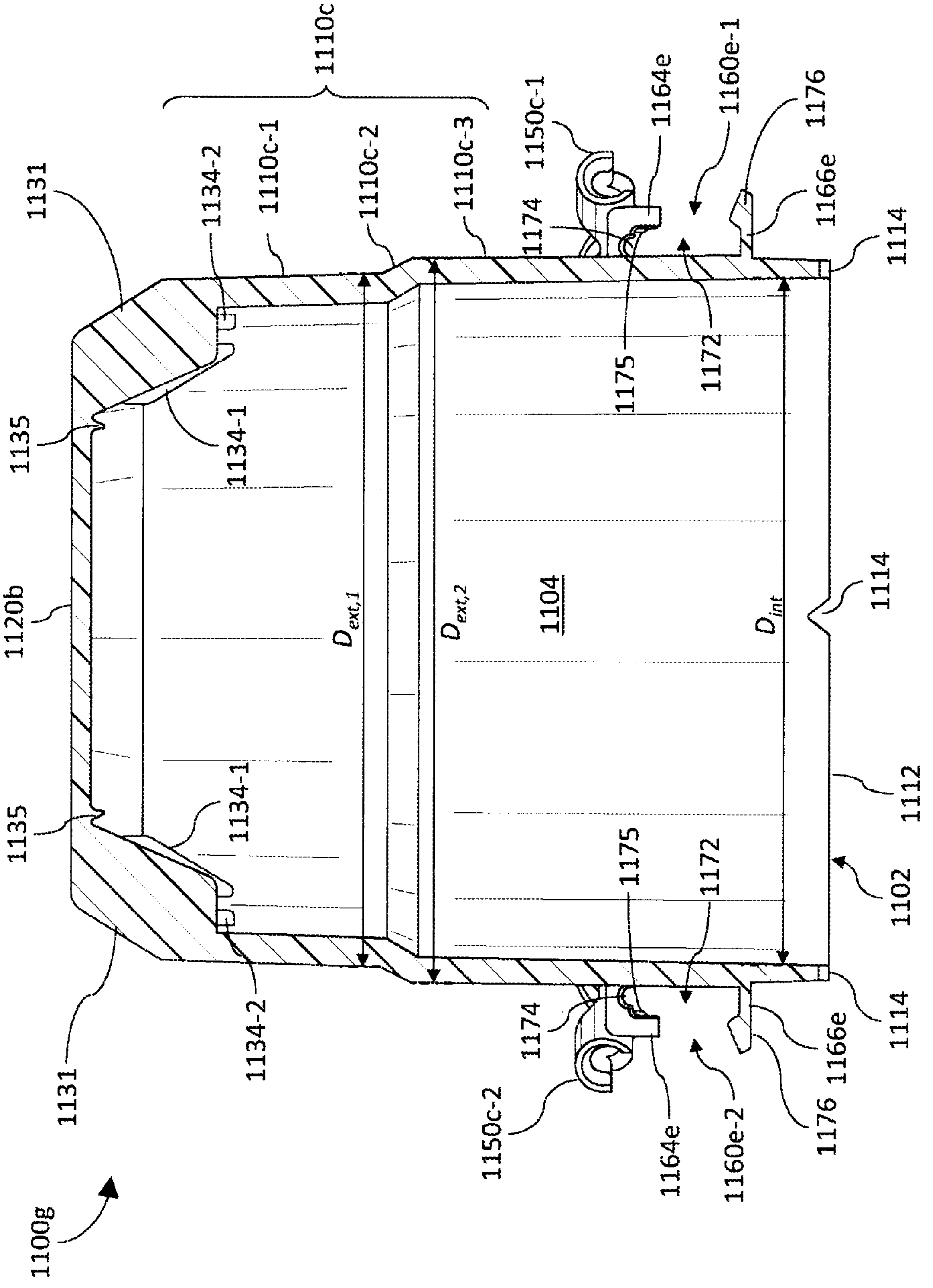
FIG. 16H shows a cross-sectional right-side view of the housing corresponding to the plane A-A of FIG. 16E.
Figure 16I:
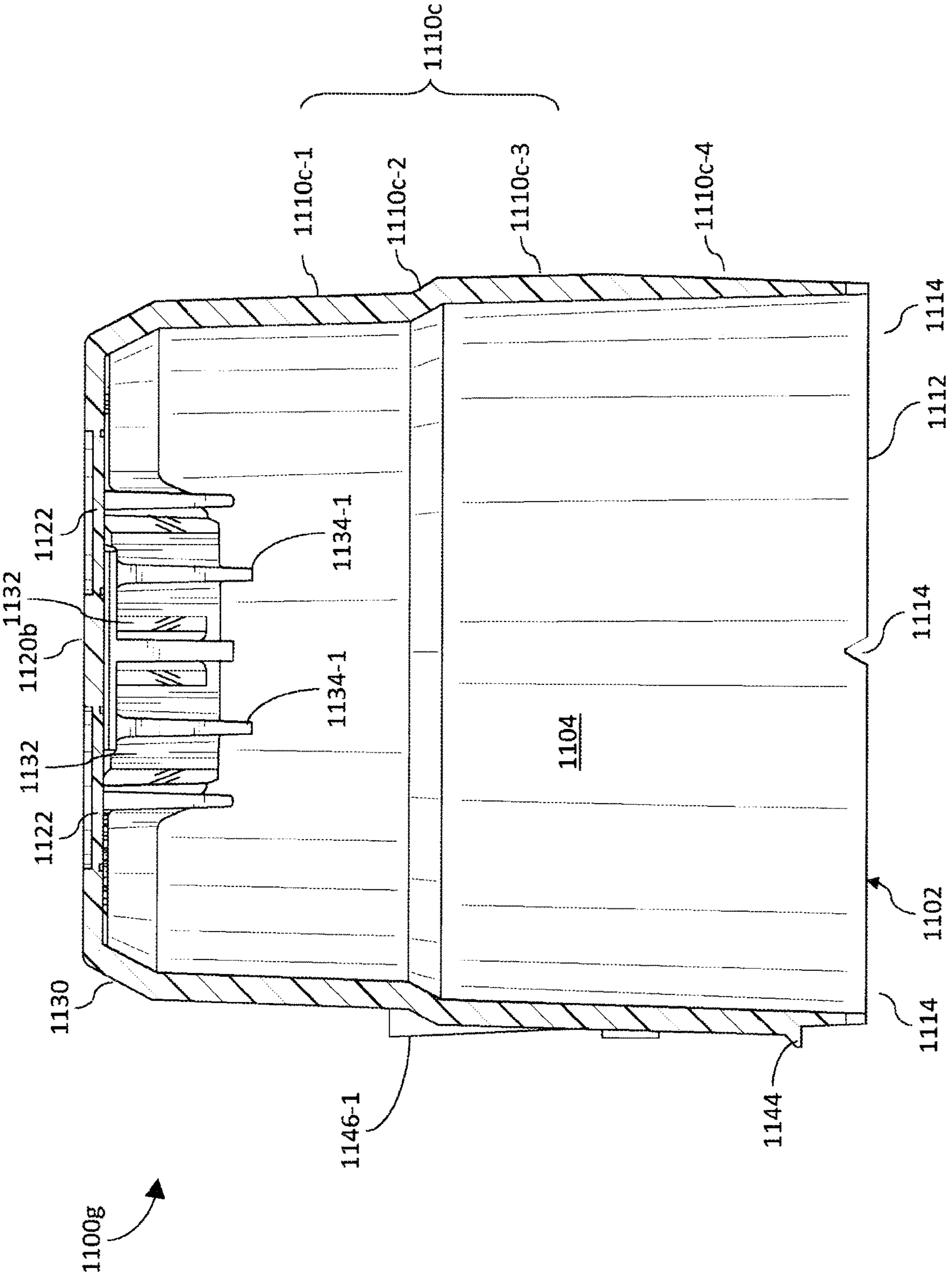
FIG. 16I shows a cross-sectional front-side view of the housing corresponding to the plane B-B of FIG. 16G.

The sidewall **1110*c* may also have a stepped profile similar to the sidewall 1110*b* to facilitate stacking of multiple housings 1100*g* onto one another. Specifically, the sidewall 1110*c* includes from top to bottom, the first sidewall section 1110*c*-1 adjoining the tapered wall 1130 of the cover 1120*a*, the second sidewall section 1110*c*-2 adjoining the first sidewall section 1110*c*-1, the third sidewall section 1110*c*-3 adjoining the second sidewall section 1110*c*-2, and the fourth sidewall section 1110*c*-4 adjoining the third sidewall section 1110*c*-3 and including the first end 1111-1. FIG. 16H shows the exterior diameter ($D_{ext,2}$) where the third sidewall section 1110*c*-3 joins the second sidewall section 1110*c*-2 may be larger than the exterior diameter ($D_{ext,1}$) where the first sidewall section 1110*c*-1 joins the second sidewall section 1110*c*-2. FIG. 16H also shows the second sidewall section 1110*c*-2 may be sloped downwards towards the first end 1111-1 at a shallower angle than the first and third sidewall sections 1110*c*-3 and 1110*c*-4, thus forming a step around the periphery of the sidewall 1110*c***.

Similar to the housings **1100*a*-1100*f*, a lighting module and/or a trim may also be inserted into the housing 1100*g* as part of a lighting system. In some implementations, the housing 1100*g* may be dimensioned such that the remaining space within the cavity 1104 after the lighting module and the trim are installed is sufficient to contain (1) three 12 AWG wires, cables, and/or conductors (e.g., a load wire, a neutral wire, a ground wire) that are routed into the housing 1100*g* and (2) six 12 AWG wires, cables, and/or conductors that are routed out of the housing 1100*g* or connection with another lighting system or an electrical switch. It should be appreciated that wires, cables, and/or conductors of different size (e.g., 14 AWG, 18 AWG, 22 AWG) may also be routed into or out of the housing 1100*g* as well. The housing 1100*g* may contain a larger or smaller number wires depending on the size of the wire to ensure the housing 1100*g*** complies with 2020 NEC 314.16.

As before, the housing **1100*g* may include a pair of knockouts 1122 disposed on the cover 1120*b*. The cover 1120*b*, however, may include additional feedthrough tabs 1132 disposed on the tapered wall 1130 compared to the housing 1100*e*. For example, FIG. 13A shows the cover 1120*b* may include two pairs of feedthrough tabs 1132 disposed diametrically opposite of one another along the tapered wall 1130. Each pair of feedthrough tabs 1132 may be separated by a rib 1131. The rib 1131 may also be tapered to conform with the sidewall 1110*c*, the tapered wall 1130, and the base end 1121**.

The bar hanger holder **1160*e* may also include a first tab 1162*e*, a second tab 1164*e*, and a third tab 1166*e*, which together define a passageway to support and guide the bar hangers 1210-1 and 1210-2. The first and second tabs 1162*e* and 1164*e* may each form a U-shaped structure that includes a first section 1161 joined to the sidewall 1100*b*, a second section 1163 adjoining the first section 1161, and a third section 1165 adjoining the second section 1163 to constrain the top, front, and rear sides of the bar hangers 1200-1 and 1200-2. The third tab 1166*e* may form a L-shaped structure that includes a first section 1167 joined to the sidewall 1110*b* and a second section 1169 joined to the first section 1167 and protruding away from the sidewall 1110*b*. The third tab 1166*e* may further include a snap-fit hook 1176. Thus, the third tab 1166*e* may constrain the bottom, front, and rear sides of the bar hangers 1200-1 and 1200-2. The first and second tabs 1162*e* and 1164*e* may further include a groove 1175 to facilitate installation of the bar hangers 1200-1 and 1200-2 from the front or rear sides of the housing 1100*g* depending on the bar hanger holder 1160*e*-1 or 1160*e*-2**.

Figure 19A:
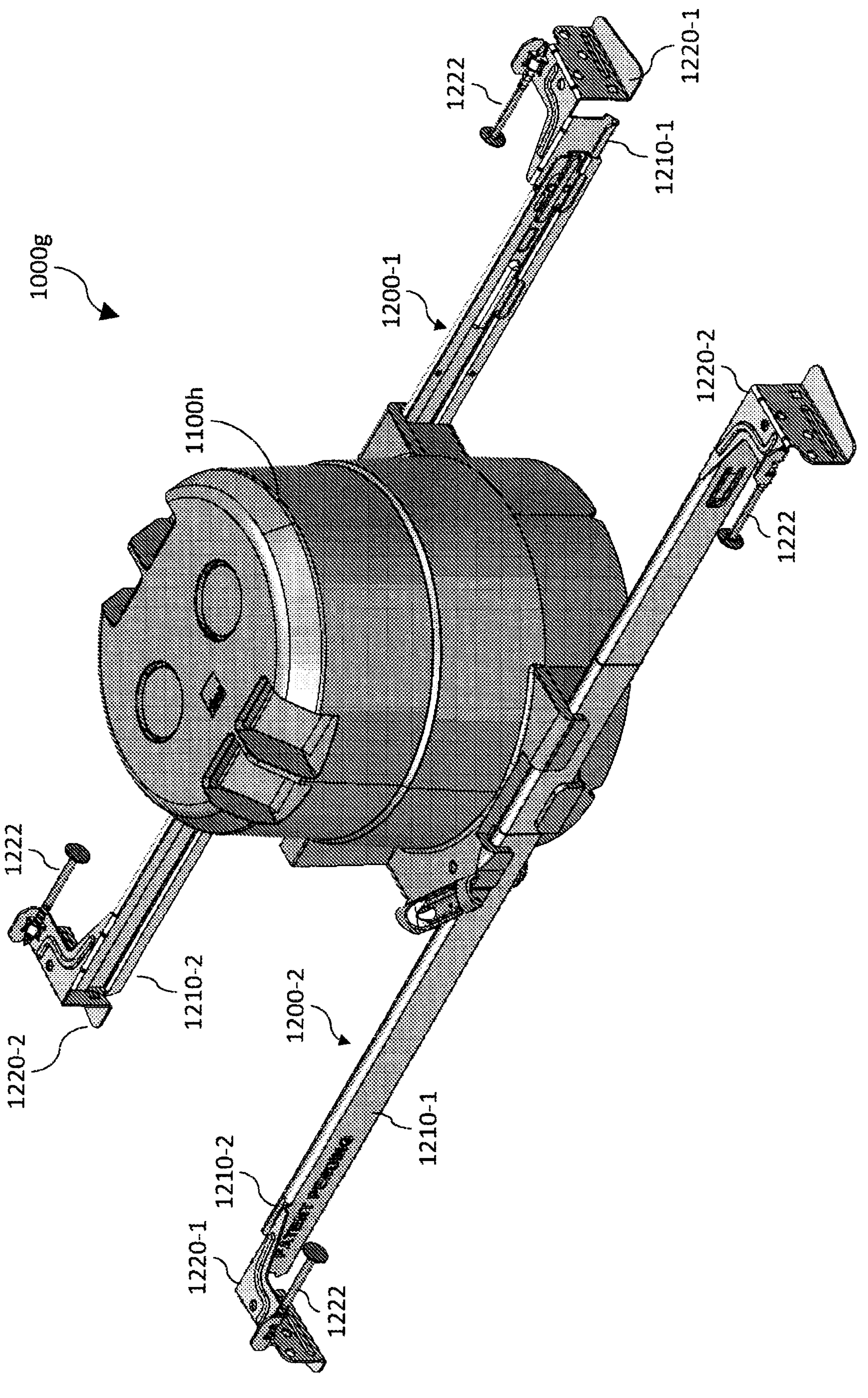
FIG. 19A shows a top, right, front perspective view of an exemplary housing assembly that includes the housing of FIG. 17A and bar hangers to couple to two or more support structures.
Figure 19B:
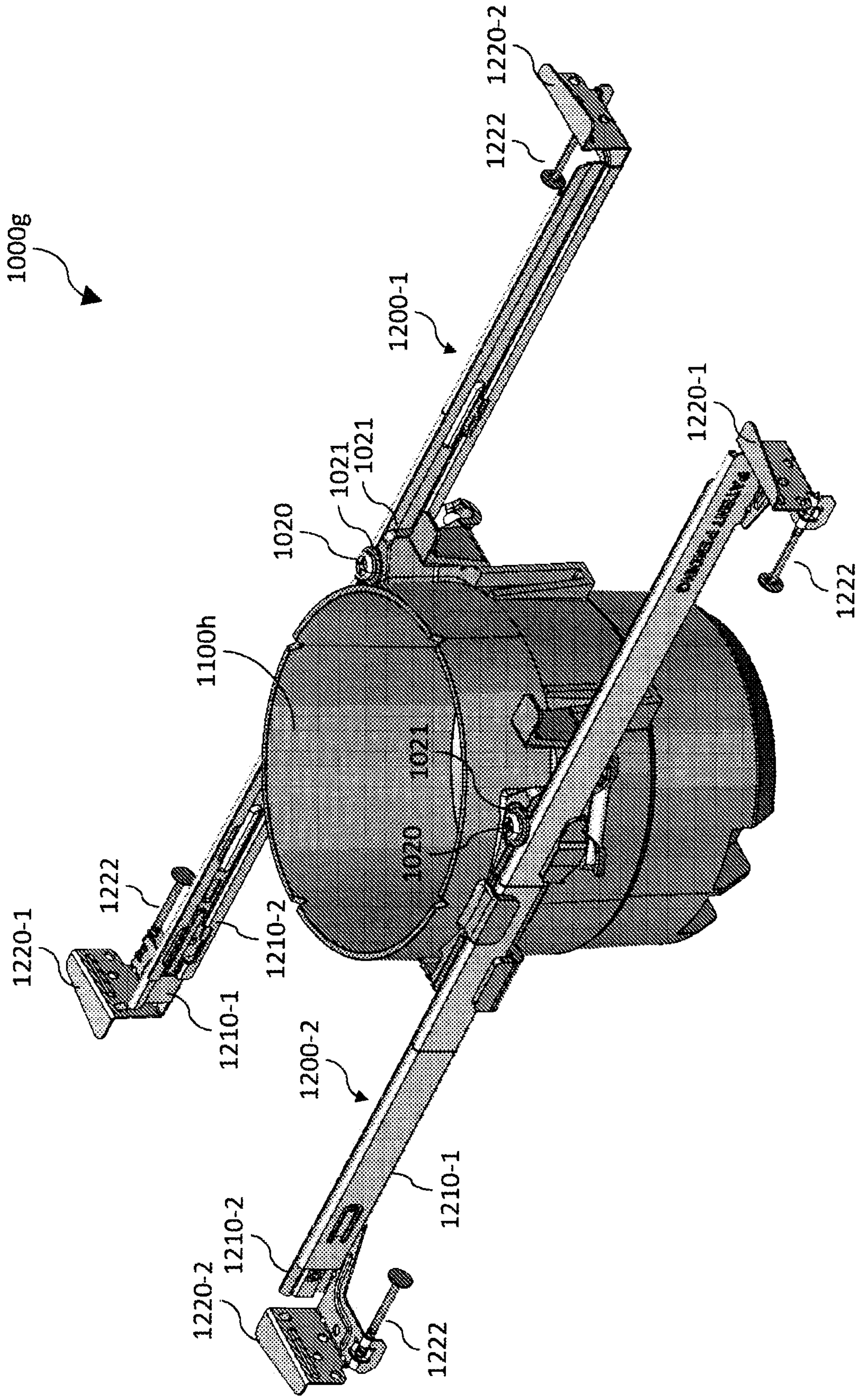
FIG. 19B shows a bottom, left, front perspective view of the housing assembly of FIG.

FIGS. 19A-191 show another exemplary housing **1100*h* for a new construction installation of a 4-inch trade size lighting system. The housing 1100*h* may once again support multiple modes of installation by including one or more nail-in features 1150*c* to facilitate installation onto a single support structure (see, for example, the housing assembly 1000*h* in FIGS. 20A and 20B) and one or more bar hanger holders 1160*f* to facilitate installation onto two or more support structures (see, for example, the housing assembly 1000***g* in FIGS. 19A and 19B).

As shown, the housing 1100*h* may include the sidewall 1110*c* and the cover 1120*b* defining a cavity 1104 and a bottom opening 1102. The cover 1120*b* may include a base section 1121 with multiple knockouts 1122 and a tapered wall 11130 with multiple pairs of feedthrough tabs 1132 disposed within corresponding feedthrough openings 1136 and separated by a rib 1131.

The sidewall 1110*c* may have a stepped profile to facilitate stacking of multiple housings 1100*h* onto one another. Specifically, the sidewall 1110*c* includes from top to bottom, the first sidewall section 1110*c*-1 adjoining the tapered wall 1130 of the cover 1120*b*, the second sidewall section 1110*c*-2 adjoining the first sidewall section 1110*c*-1, the third sidewall section 1110*c*-3 adjoining the second sidewall section 1110*c*-2, and the fourth sidewall section 1110*c*-4 adjoining the third sidewall section 1110*c*-3 and including the first end 1111-1. FIG. 17H shows the exterior diameter ($D_{ext,2}$) where the third sidewall section 1110*c*-3 joins the second sidewall section 1110*c*-2 may be larger than the exterior diameter ($D_{ext,1}$) where the first sidewall section 1110*c*-1 joins the second sidewall section 1110*c*-2. FIG. 17H also shows the second sidewall section 1110*c*-2 may form a step around the periphery of the sidewall 1110*c*.

FIG. 17H also shows the interior diameter ($D_{int}$) defined by the interior edge 1112 of the first end 1111-1 may be greater than or equal to the exterior diameter $D_{ext,1}$, but smaller than the exterior diameter $D_{ext,2}$. As shown in FIG. 18, the geometry of the sidewall 1110*b* allows the first sidewall section 1110*b*-1 and the cover 1120 of one housing 1100*f*-1 to fit within the portion of the cavity 1104 defined by the third and four sidewall sections 1110*b*-3 and 1110*b*-4 of another housing 1100*f*-2.

Figure 17A:
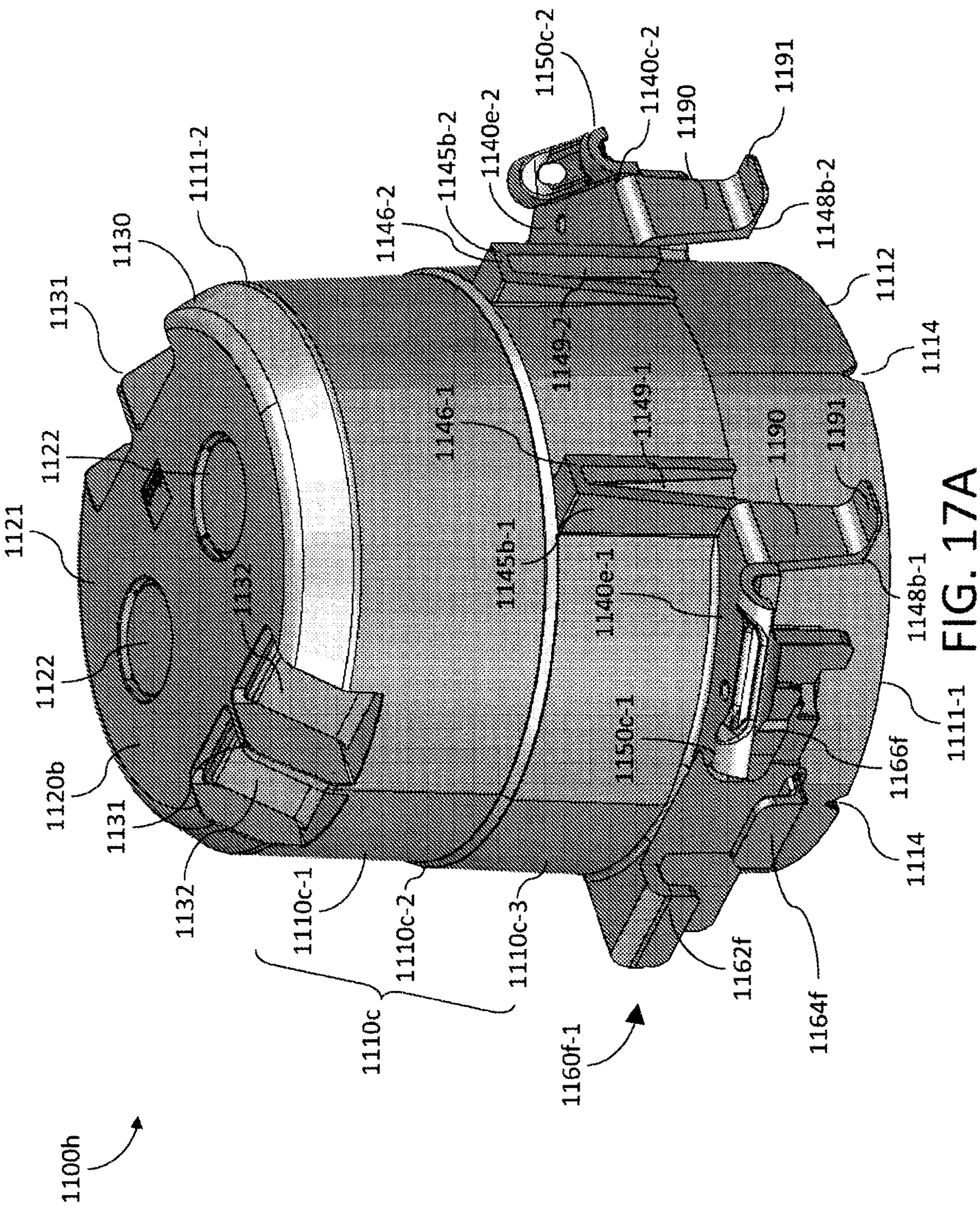
FIG. 17A shows a top, left, rear perspective view of another housing for a new construction installation of a 4-inch trade size lighting system.
Figure 17B:
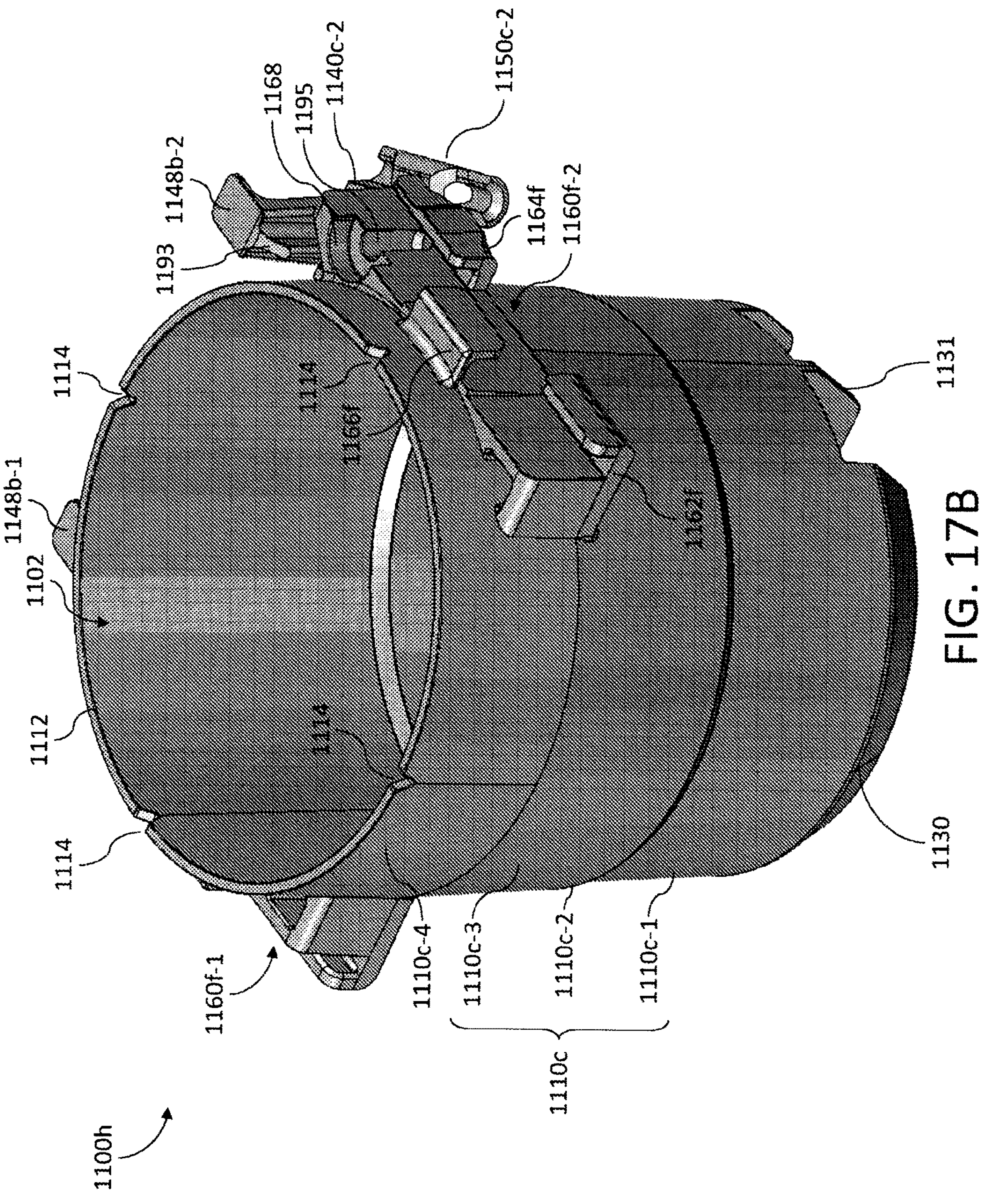
FIG. 17B shows a bottom, right, front perspective view of the housing in FIG. 17A.
Figure 17C:
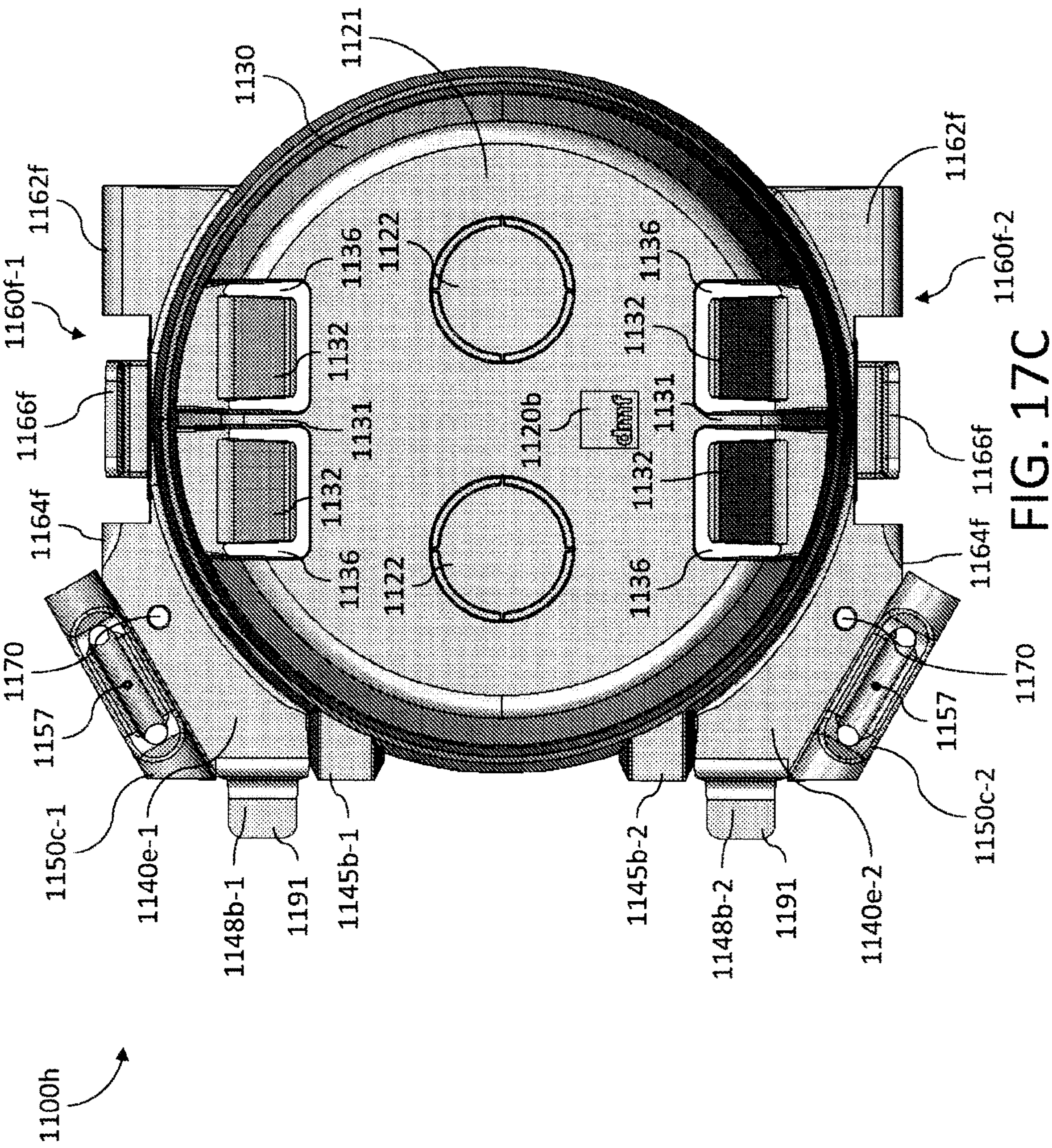
FIG. 17C shows a top view of the housing in FIG. 17A.
Figure 17D:
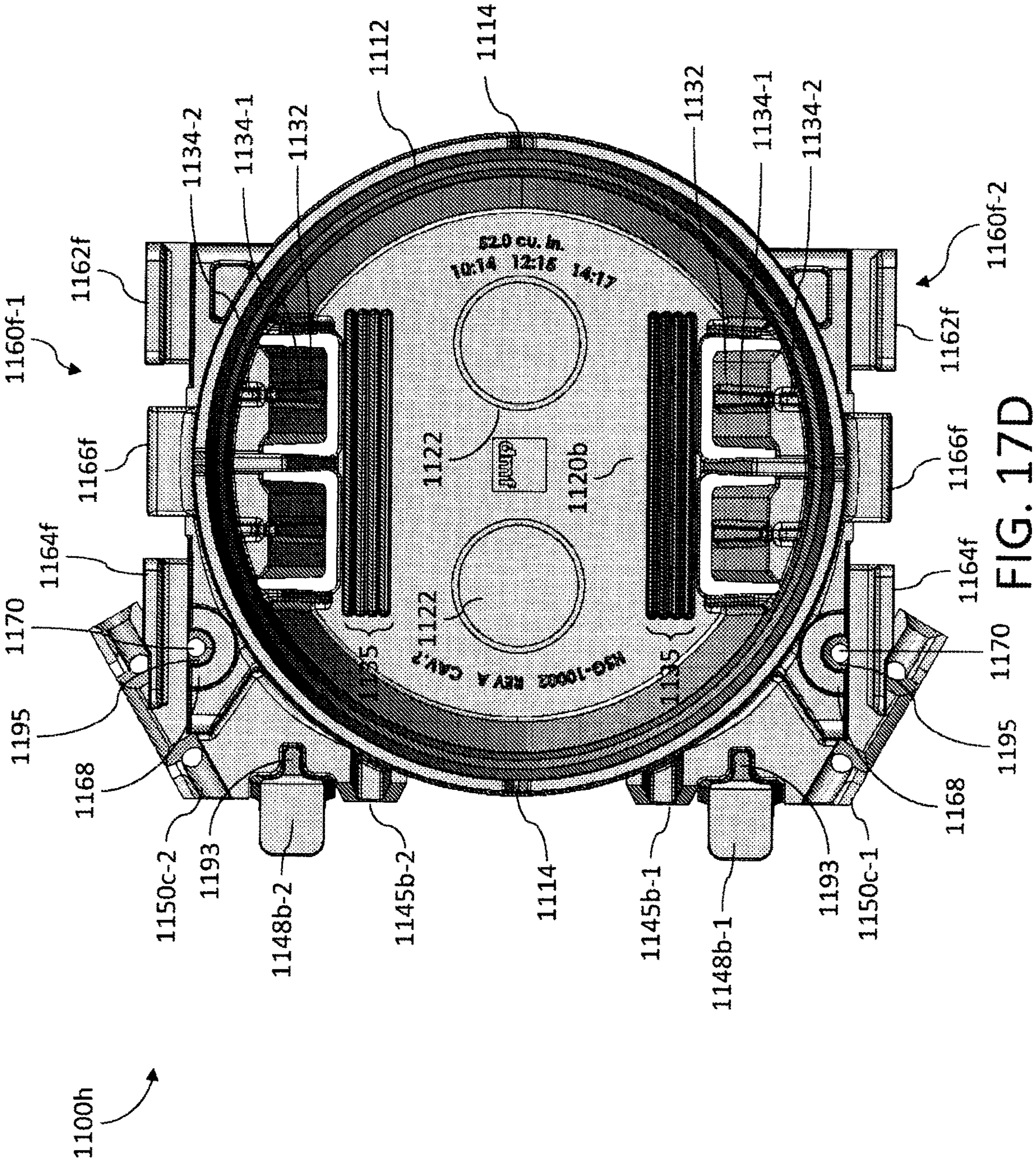
FIG. 17D shows a bottom view of the housing in FIG. 17A.
Figure 17E:
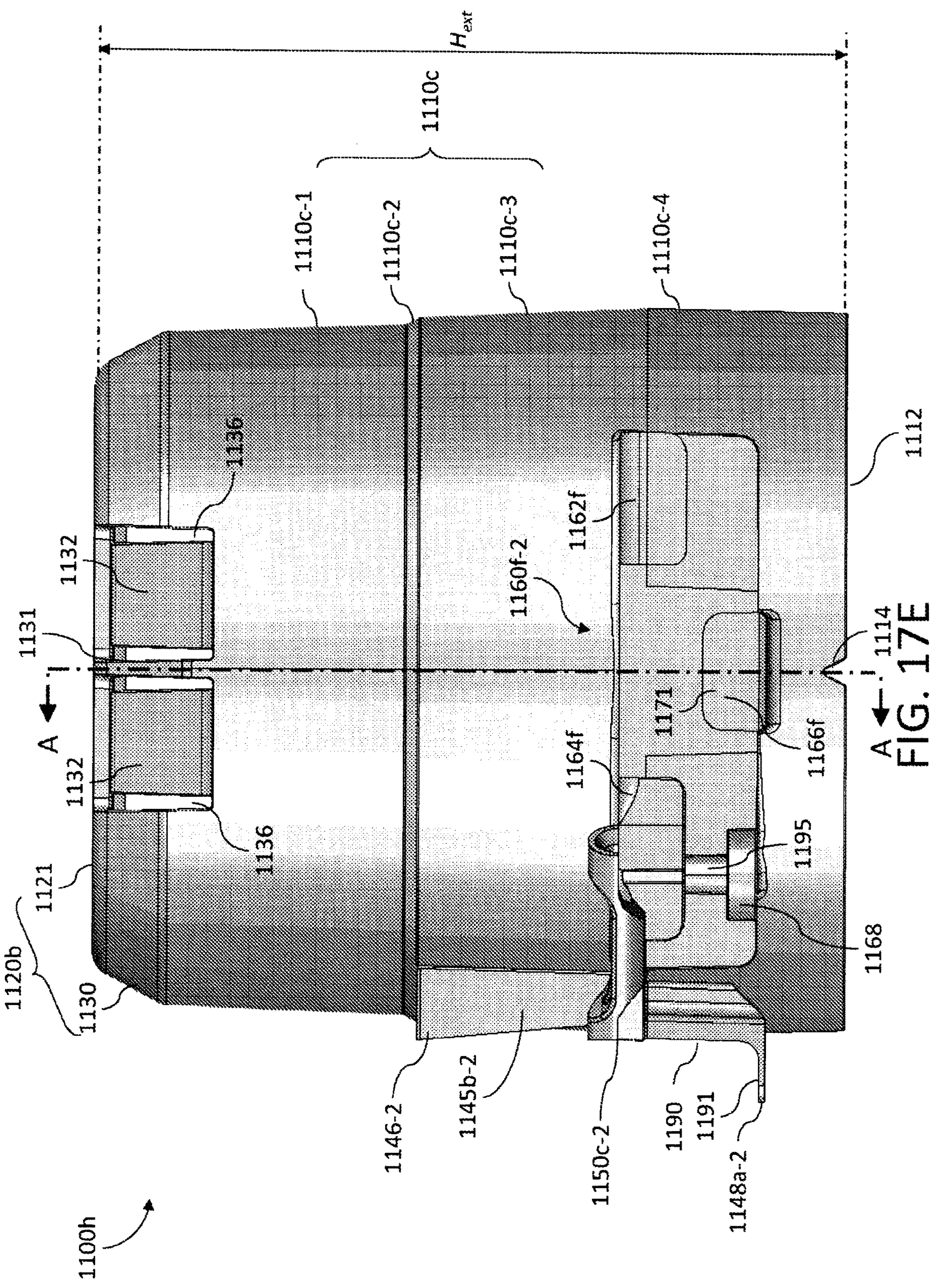
FIG. 17E shows a front view of the housing in FIG. 17A.
Figure 17F:
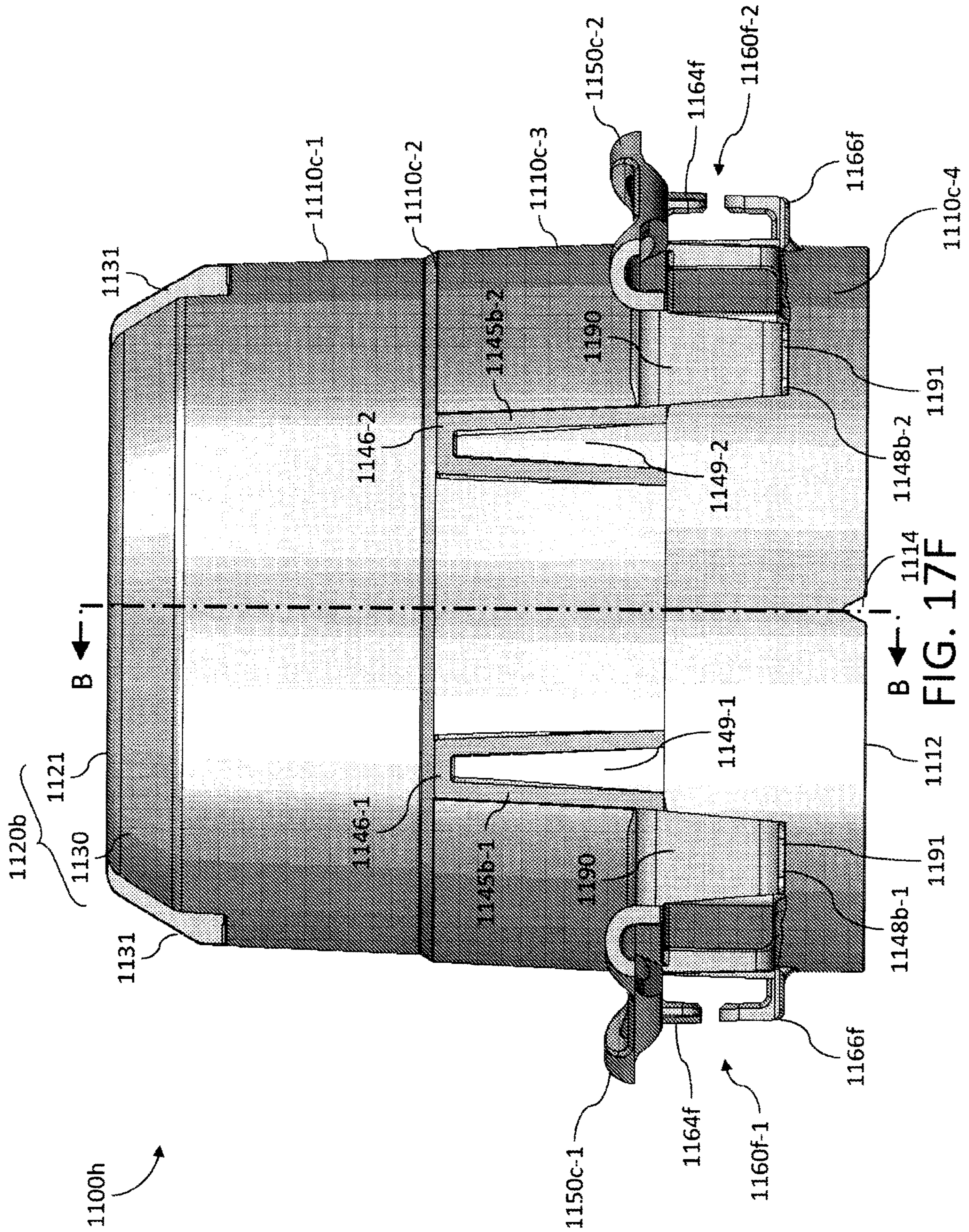
FIG. 17F shows a left-side view of the housing in FIG. 17A.
Figure 17G:
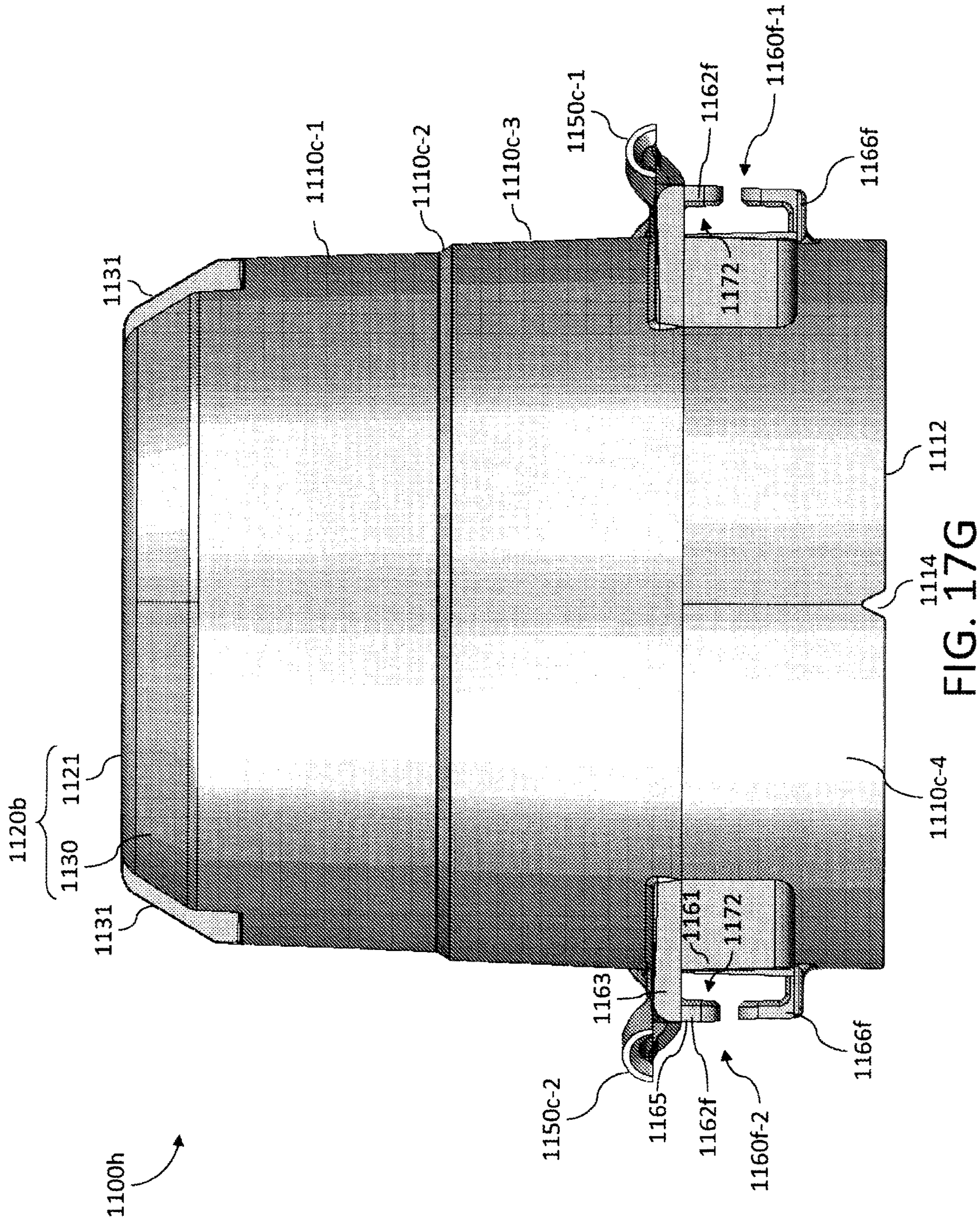
FIG. 17G shows a right-side view of the housing in FIG. 17A.
Figure 17H:
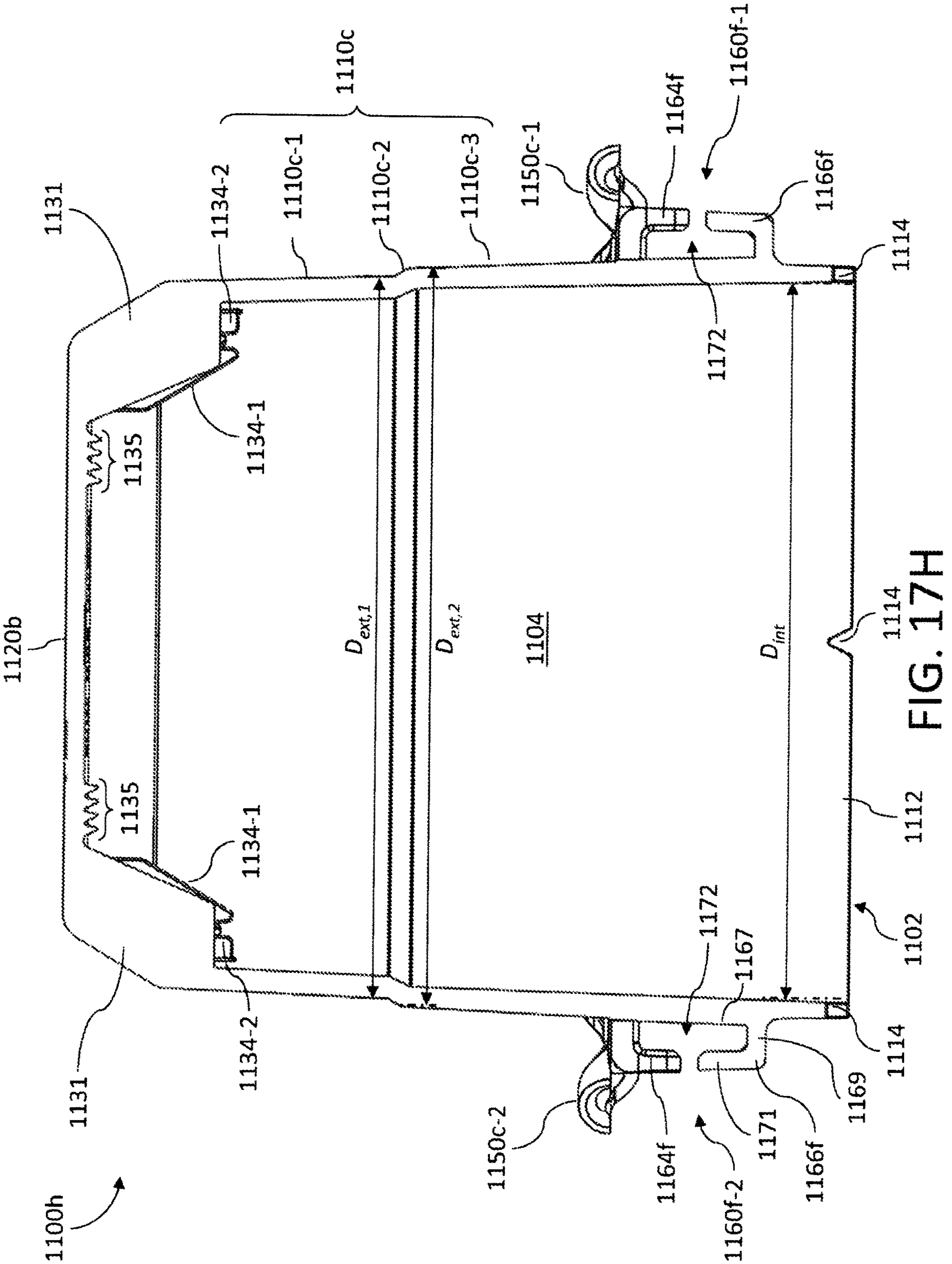
FIG. 17H shows a cross-sectional right-side view of the housing corresponding to the plane A-A of FIG. 17E.
Figure 17I:
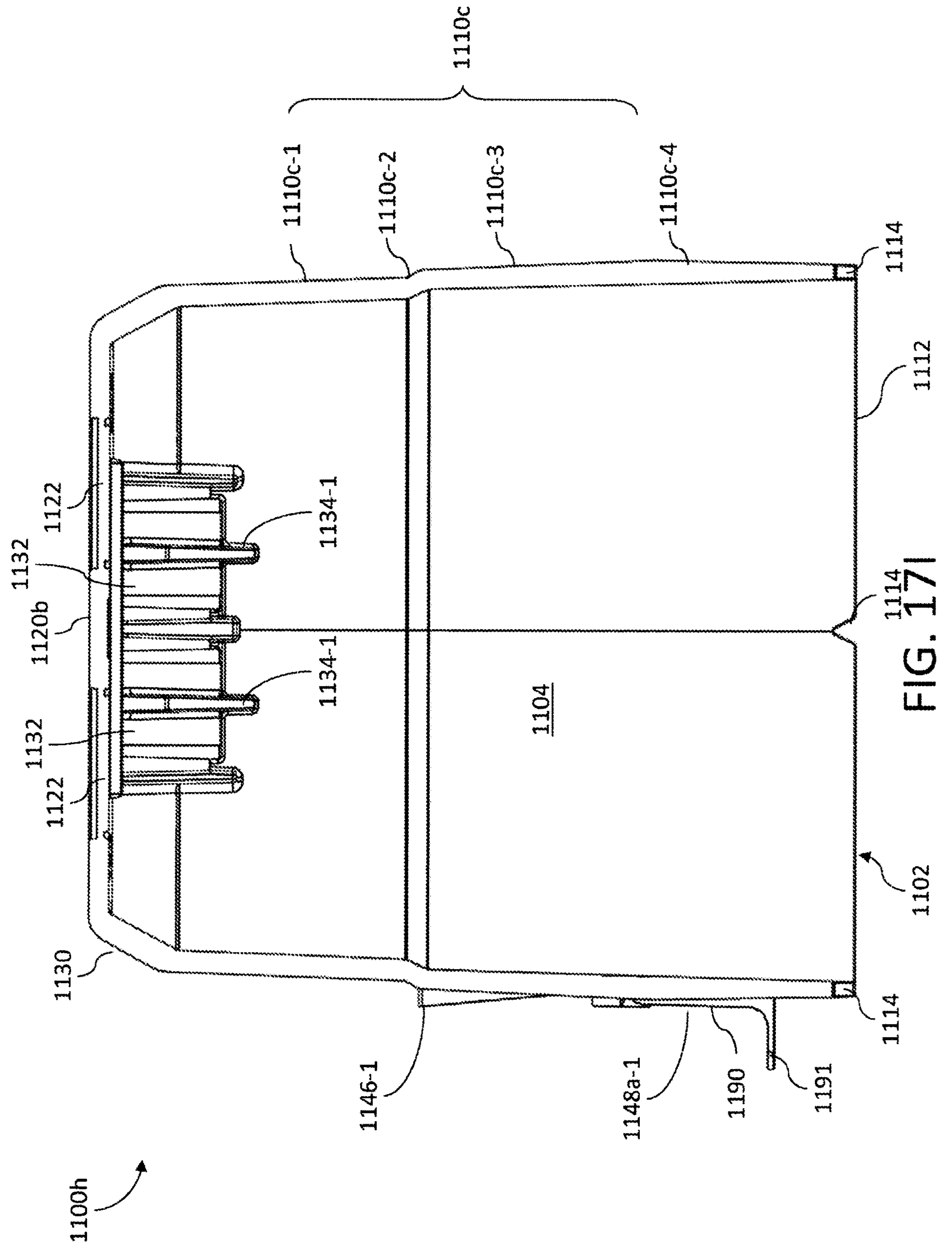
FIG. 17I shows a cross-sectional front-side view of the housing corresponding to the plane B-B of FIG. 17F.
Figure 18:
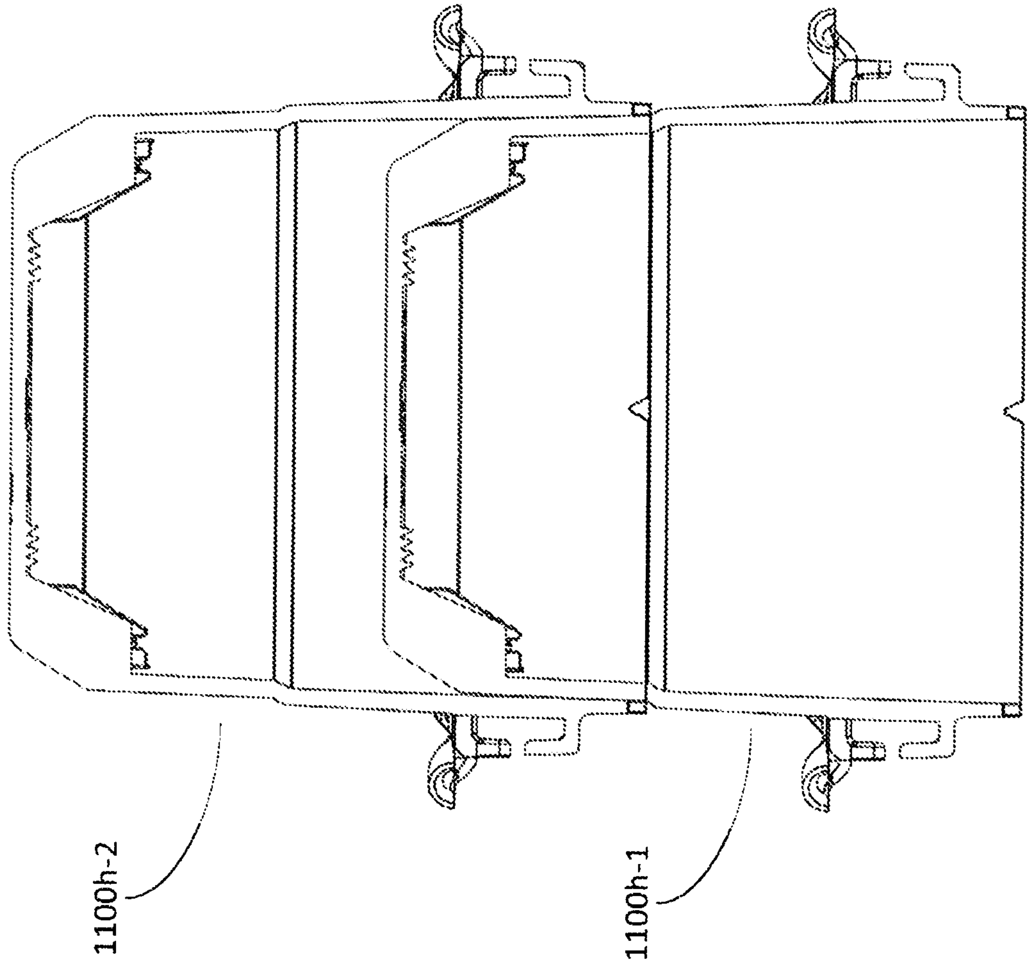
FIG. 18 shows a cross-sectional right-side view of two of the housings of FIG. 17A stacked on top of one another where the cross-section plane corresponds to the plane A-A of FIG. 17E.

FIGS. 17A, 17F, and 17H show each bar hanger holder 1160*f* may include a first tab 1162*f*, a second tab 1164*f*, and a third tab 1166*f* defining a passageway 1172 to support and guide a pair of bar hangers (e.g., the bar hangers 1210-1 and 1210-2). In some implementations, the passageway 1172 defined by the bar hanger holder 1160*d* may have a length (e.g., the distance between the left side of the second tab 1164*f* and the right side of the first tab 1162*f* of the bar hanger older 1160*f*-2) of about 3 inches. More generally, the length of the passageway 1172 may range between about 2 inches and about 3.5 inches.

The first, second, and third tabs 1162*f*, 1164*f*, and 1166*f* may each form a U-shaped structure. Specifically, the first and second tabs 1162*f* and 1164*f* may have a first section 1161, a second section 1163, and a third section 1165 that constrain the top, front, and rear sides of the bar hangers 1200-1 and 1200-2. The third tab 1166*f* may have a first section 1167, a second section 1169, and a third section 1171 that constrain the bottom, front, and rear sides of the bar hangers 1200-1 and 1200-2. In this implementation, the third section 1171 may have a rounded square shape when viewing the housing 1100*f* from the front or rear sides.

The bar hanger holder 1160*f* may further include a fastener opening 1170 formed as a through hole to receive the fastener 1020. The bar hanger holder 1160*d* may further include a recess 1195 formed directly below the fastener opening 1170 to contain at least a portion of the shank of the fastener 1020 and a recess 1168 formed directly below the recess 1195 to contain at least a portion of the head of the fastener 1020 and/or the washer 1021.

The nail-in features 1150*c* may be joined to the sidewall 1110*c* of the housing 1100*h* via mounting platforms 1140*e*-1 and 1140*e*-2. Each nail-in feature 1150*c* may have a cylindrical wall 1153 defining a through hole 1152 to receive the fastener 1010. In some implementations, the interior surface of the cylindrical wall 1153 may include a bump 1157 or, more generally, a protrusion 1157 shaped and/or dimensioned to engage the threads of the fastener 1010 (see, for example, FIG. 17C). The protrusion 1157 may prevent the fastener 1010 from sliding through the through hole 1152. Instead, the fastener 1010 should be rotated such that the protrusion 1157 rides along the grooves formed by the thread of the fastener 1010. In some implementations, the housing 1100*f* may be packaged together with the fasteners 1010. Thus, the protrusion 1157 may reduce the likelihood or, in some instances, prevent accidental loss of the fastener 1010 during shipment and handling.

The housing 1100*h* may also include multiple alignment features to align the housing 1100*h* to a support structure (e.g., a wood joist) when using the nail-in features 1150*c* for installation. For example, FIGS. 17A and 17F show the housing 1100*h* may include a pair of ribs 1145*b*-1 and 1145*b*-2 with respective contact regions 1146-1 and 1146-2 and recesses 1149-1 and 1149-2. In some implementations, the ribs 1145*b* may be disposed only along the third sidewall section 1110*c*-3. The housing 1100*h* may also include a pair of tabs 1148*b*-1 and 1148*b*-2 (collectively referred to herein as a "tab 1148*b*") with respective contact regions 1190 and 1191 to physically contact and abut two different sides of a support structure (e.g., a bottom side and a left/right side of a wood joist). As shown, the tabs 1148*b* may extend from the mounting platform 1140*e* and may be disposed between the nail-in feature 1150*c* and the rib 1145*b*. FIGS. 17B and 17D also show the tab 1148*b* may include a rib 1193 disposed along an interior side of the contact region 1190 to increase the mechanical rigidity of the tab 1148*b*. FIG. 17 shows that, in some implementations, the contact region 1190 may have a tapered shape where the width of the tab 1148*b* decreases towards the first end 1111-1 of the housing 1100*h*.

Figure 20A:
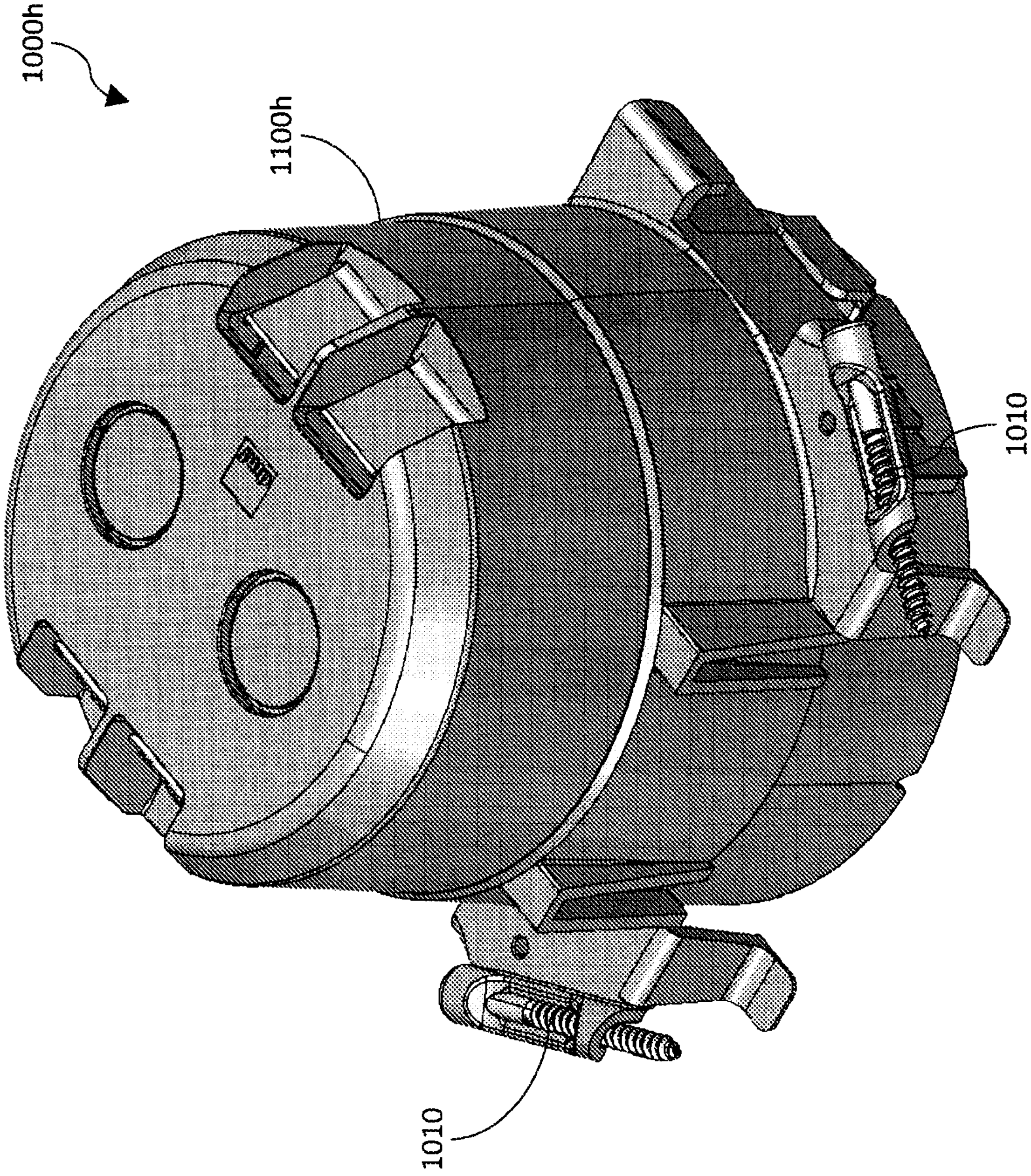
FIG. 20A shows a top, front, left perspective view of an exemplary housing assembly that includes the housing of FIG. 17A and fasteners to couple to one support structure.
Figure 20B:
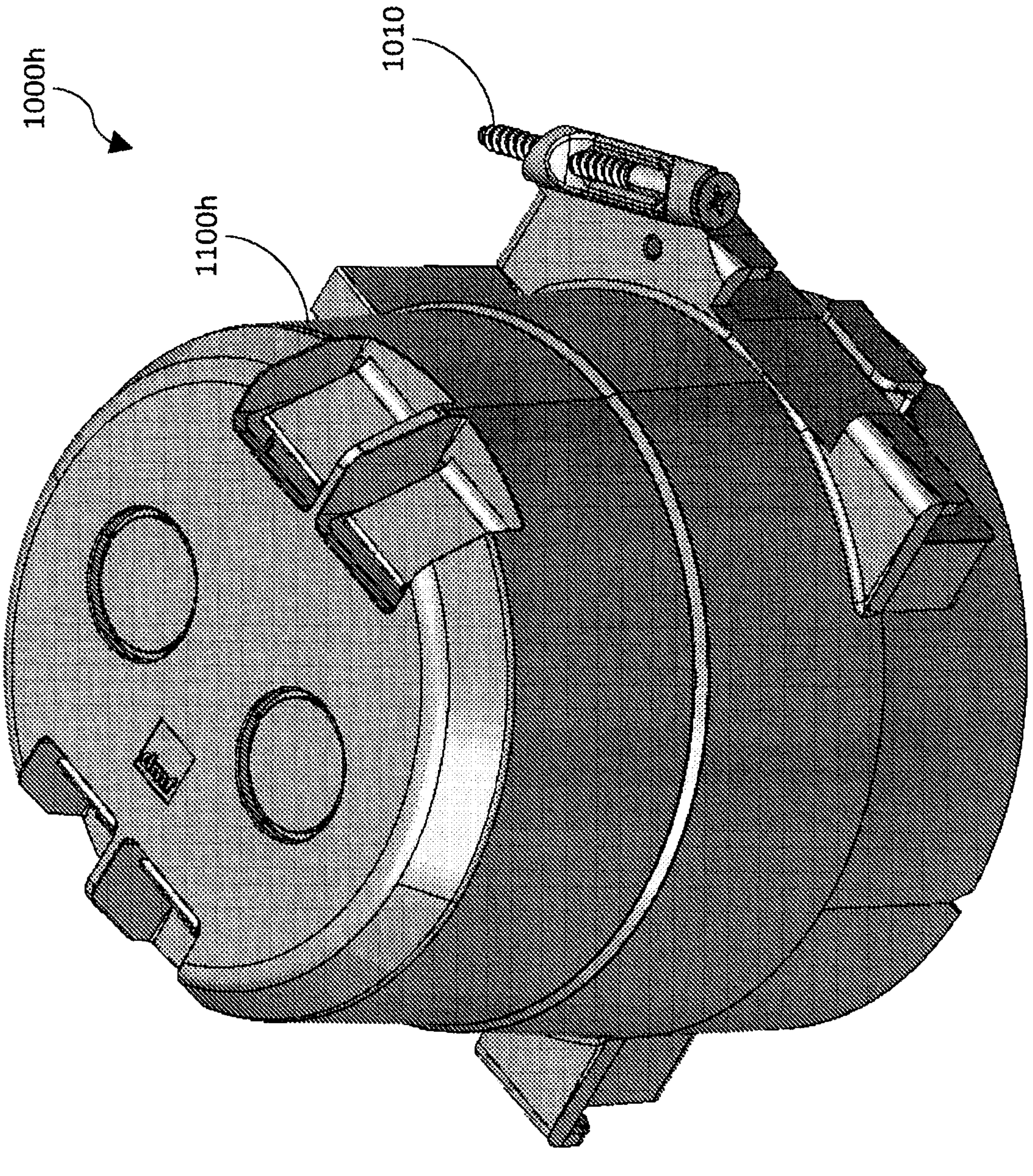
FIG. 20B shows a top, rear, right perspective view of the housing assembly of FIG. 20A.
Figure 21A:
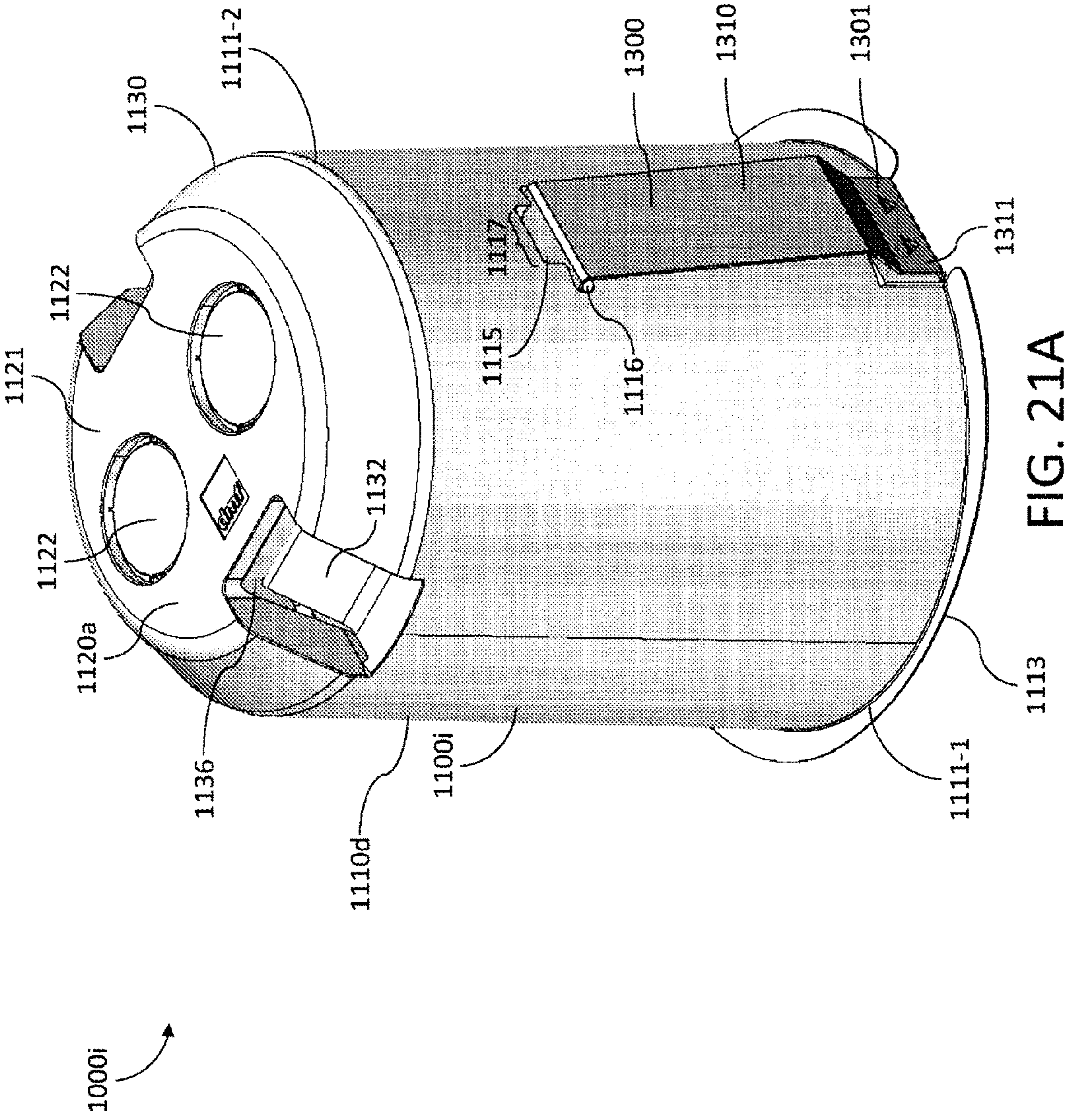
FIG. 21A shows a top, left, rear perspective view of an exemplary housing assembly for a remodel installation of a 3-inch trade size lighting system.
Figure 21B:
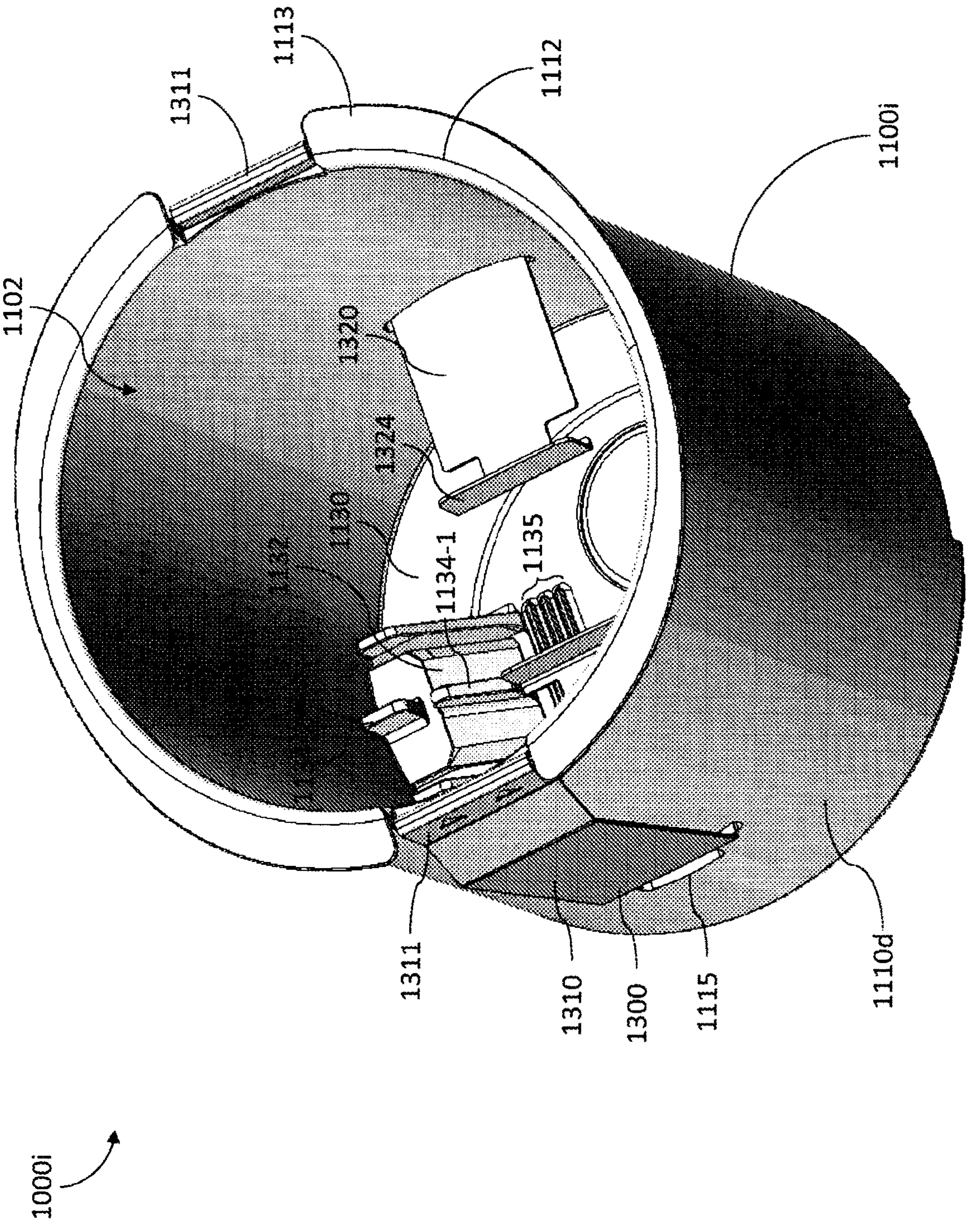
FIG. 21B shows a bottom, right, front perspective view of the housing assembly of FIG. 21A.

Similar to the housings 1100*a*-1100*g*, the housing 1100*h* may support several modes of installation, but some of the components affiliated with each mode of installation may be excluded during installation and/or not packaged together with the housing 1100*f* during sale. For example, FIGS. 20A and 20B show the housing assembly 1000*g* tailored for installation onto two or more support structures by including the housing 1100*h* together with the bar hanger assemblies 1200-1 and 1200-2, the locking fasteners 1020, and the washers 1021. In some implementations, the housing assembly 1000*g* may also include the fasteners 1222 to couple the bar hanger assemblies 1200 to a support structure. In another example, FIGS. 21A and 21B show the housing assembly 1000*h* tailored for installation onto one support structure by including the housing 1100*h* together with the fasteners 1010 for each nail-in features 1150*c*.

A Housing Assembly for a Remodel Installation

In some implementations, the plastic housings and housing assemblies disclosed herein may be tailored to support a remodel installation of a lighting system. In a typical remodel installation, a built environment is modified to facilitate installation of the lighting assembly. For example, the environment may include a previously installed drywall panel on the ceiling. To install the lighting system, the housing assembly is inserted through an opening on the drywall panel, which may have been formed for a previous installation or may be newly formed for the new installation. The housing assembly may then be secured directly to the drywall panel. In this manner, the housing assembly may be installed without removing the drywall panel and/or accessing the ceiling space above the drywall panel. Once the housing assembly is installed, a lighting module and a trim may then be inserted into the housing.

FIGS. 21A-21I show several views of a housing assembly 1000*i* tailored for remodel installations. As shown, the housing assembly 1000*i* may include a housing 1100*i* with a sidewall 1110*d* and a cover 1120*a* that together defines a cavity 1104 and a bottom opening 1102 to provide access to the cavity 1104. The cavity 1104 may contain a lighting module, at least a portion of a trim, and various electrical wire and wiring connections with an external power supply system. The sidewall 1110*d* may further include an integrally formed flange 1113 that extends radially outward from the sidewall 1110*d*. The housing assembly 1000*i* may further include multiple spring clips 1300 mounted directly to the housing 1100*i* to provide an attachment mechanism to couple the housing 1100*i* to a drywall panel of a ceiling. Specifically, the spring clips 1300 and the flange 1113 may together form a clamping mechanism to mount the housing 1100*i* onto the bottom and top surfaces of the drywall panel as discussed in more detail below.

Figure 21C:
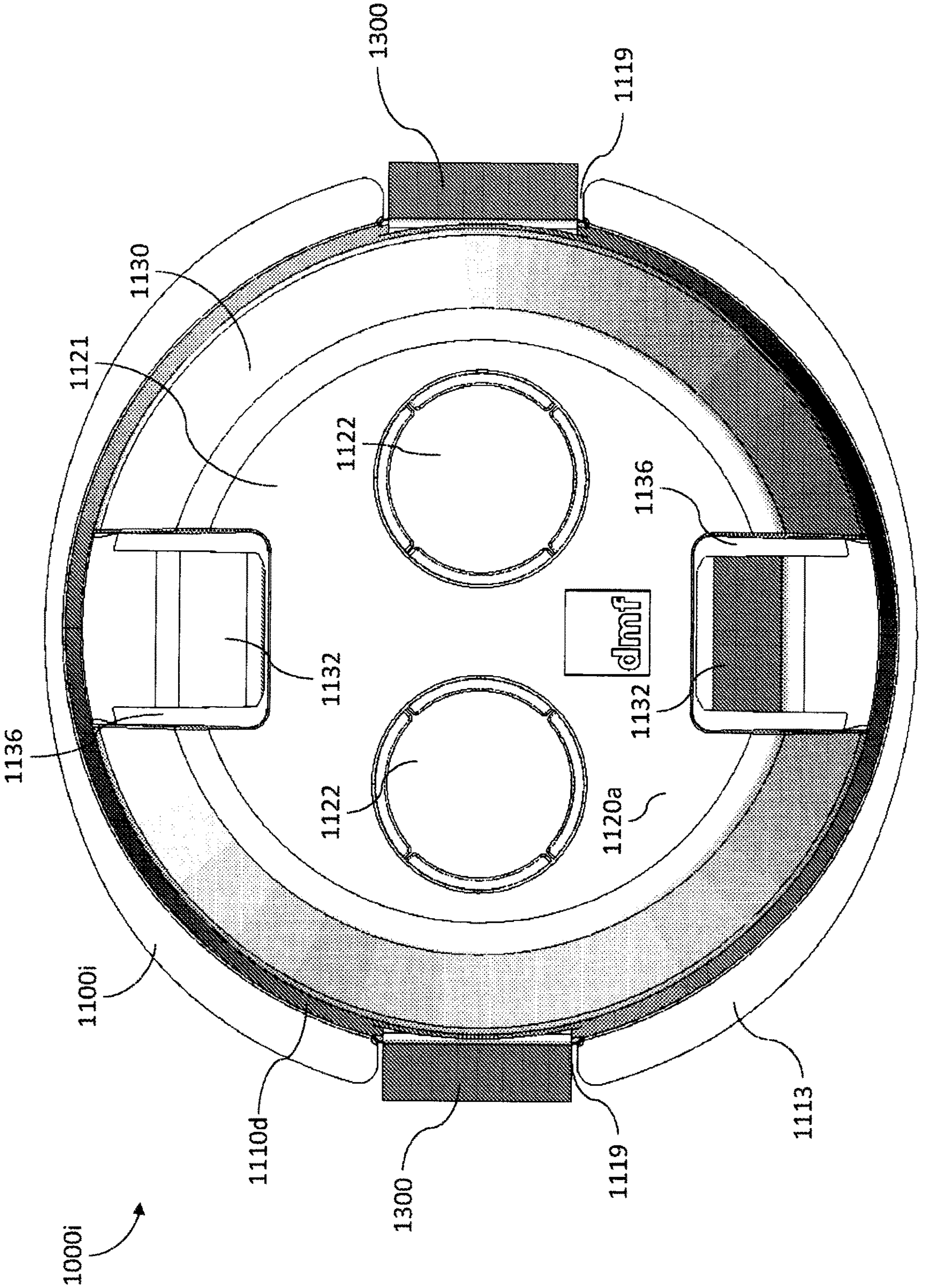
FIG. 21C shows a top view of the housing assembly of FIG. 21A.
Figure 21D:
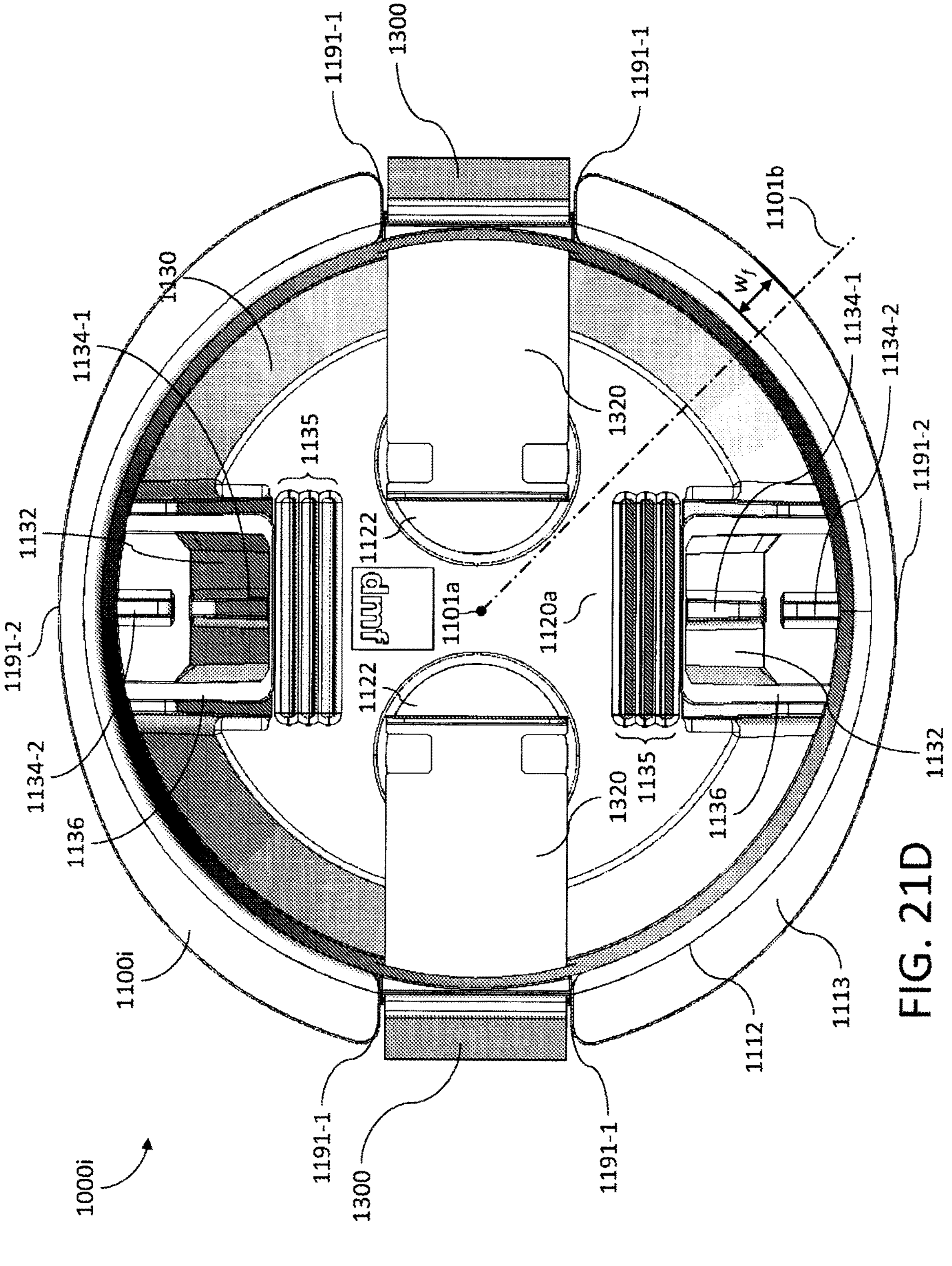
FIG. 21D shows a bottom view of the housing assembly of FIG. 21A.
Figure 21E:
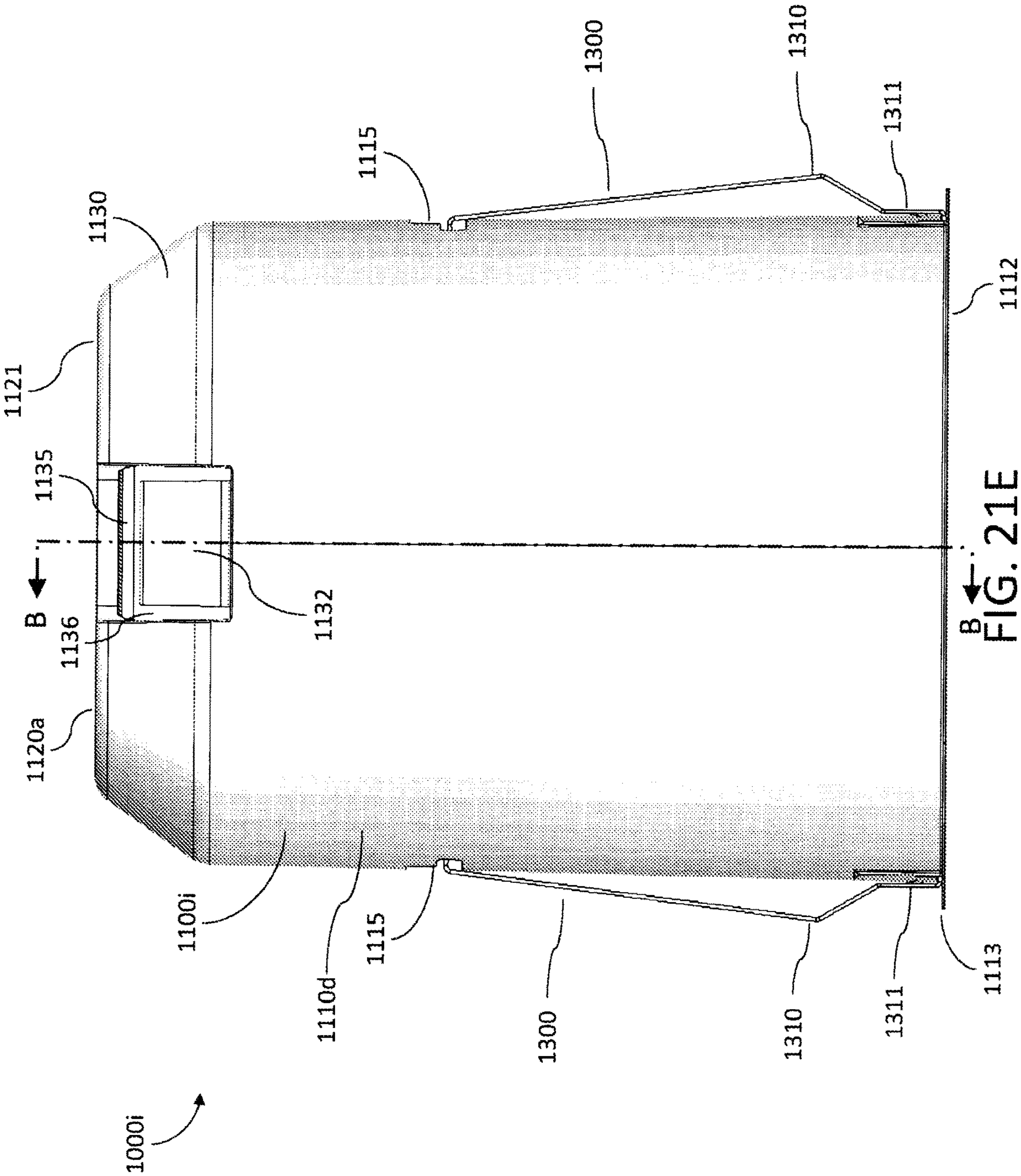
FIG. 21E shows a front view of the housing assembly of FIG. 21A.
Figure 21F:
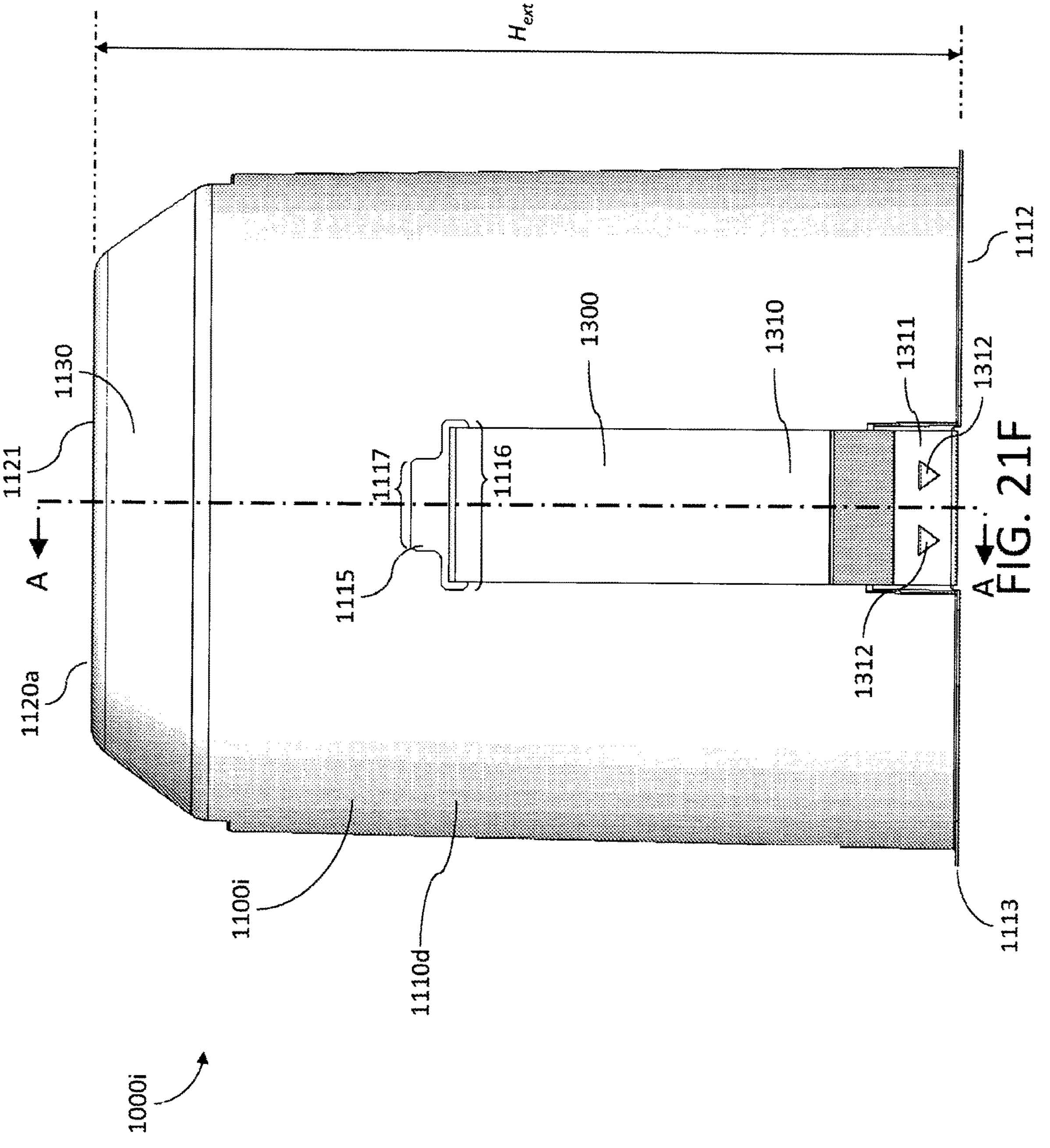
FIG. 21F shows a right-side view of the housing assembly of FIG. 21A.
Figure 21G:
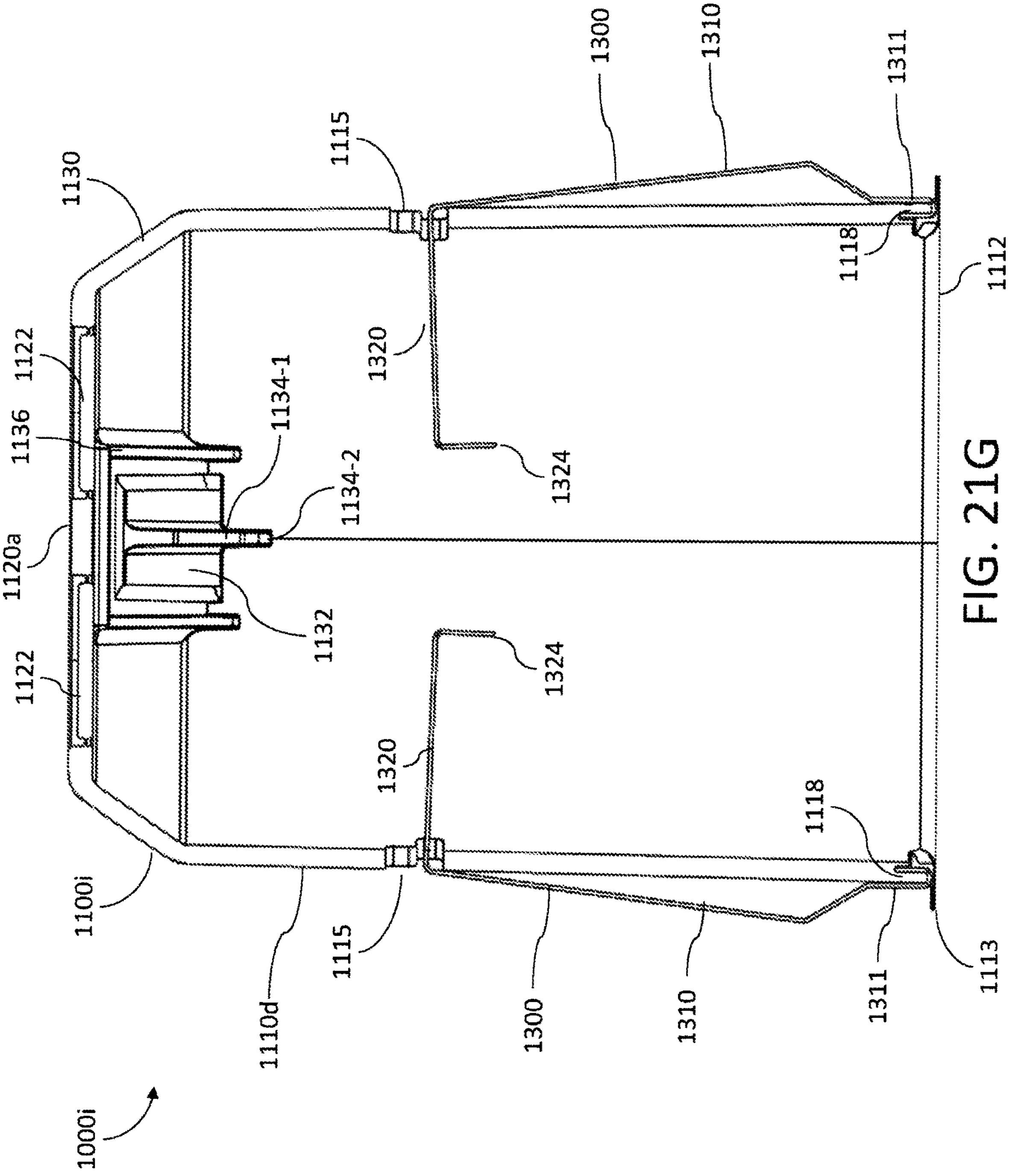
FIG. 21G shows a cross-sectional front-side view of the housing of FIG. 21A corresponding to the plane A-A of FIG. 21F.
Figure 21H:
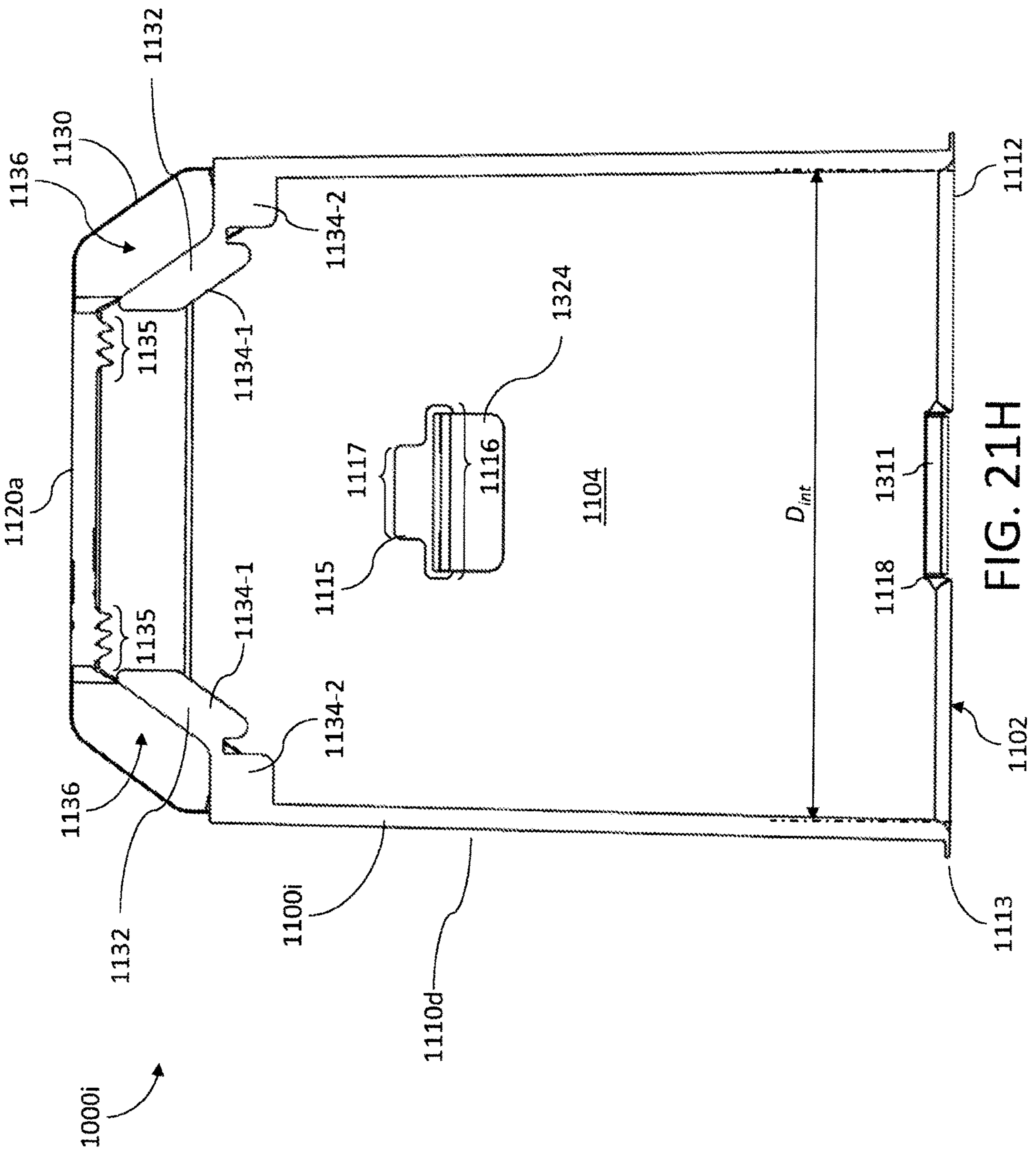
FIG. 21H shows a cross-sectional right-side view of the housing of FIG. 21A corresponding to the plane B-B of FIG. 21E.

As shown, the sidewall 1110*d* may include a first end 1111-1 with an interior edge 1112 defining the opening 1102 into the cavity 1104. The sidewall 1110*d* may also include a second end 1111-2 where the sidewall 1110*d* is joined to the cover 1120*a*. The cover 1120*a* includes the base end 1121 supporting multiple knockouts 1122 and the tapered wall 1130, which joins the base end 1121 to the sidewall 1110*b*, supporting multiple feedthrough tabs 1132 disposed within corresponding feedthrough openings 1136. The cover 1120*a* may further include multiple catches 1135 disposed on a bottom side of the base end 1121 as shown in FIG. 21H.

In some implementations, the sidewall 1110*d* may have a round shape. For example, FIGS. 21A, 21C, and 21D show the sidewall 1110*d* may generally have a substantially circular or circular cross-sectional shape. The base end 1121 and the tapered wall 1130 may similarly have a circular shape to conform with the sidewall 1110*d*. It should be appreciated, however, that the housing 1100*a* may have other shapes. Generally, the sidewall 1110*d* may have a cross-section that has various shapes including, but not limited to, a circle, an ellipse, a square hexagon, a regular polygon (e.g., a polygon where the sides are equal in length), an irregular polygon (e.g., a polygon where the sides are not equal in length), or any combinations of the foregoing. In some implementations, the at least a portion of the sidewall 1110*d* may have a cross-section shaped as an annulus (i.e., concentric circles) corresponding to the interior and exterior sides of the sidewall 1110*d*.

In some implementations, the sidewall 1110*d* may have a tapered profile where the interior diameter and/or the exterior diameter of the sidewall 1110*d* may increase monotonically from the second 1111-2 to the first end 1111-1 as shown in FIGS. 21E-21H. In some implementations, the interior and exterior sides of the sidewall 1110*d* may be tapered in the same manner such that the thickness of the sidewall 1110*d* is substantially constant or constant between and including the first end 1111-1 and the second end 1111-2.

In order to provide sufficient clearance for the lighting module and the trim, the cavity 1104 may have an interior width ($D_{int}$) that is about 3.25 inches. More generally, the interior width ($D_{int}$) of the cavity 1104 may range between about 3 inches to about 6 inches. The housing 1100*i* may also have an exterior depth ($H_{ext}$) chosen in part, to accommodate smaller, more confined spaces in the ceiling while providing a sufficiently deep cavity 1104 for the desired trade size of the installation. For example, the housing 1100*i* may have an exterior depth ($H_{ext}$) of about 4.5 inches to accommodate the 3-inch trade size lighting installation. More generally, the exterior depth ($H_{ext}$) of the housing 1100*i* may range between about 4 inches and about 5 inches. In some implementations, the dimensions of the housing 1100*i* may be tailored such that the cavity 1104 provides sufficient volume allowance after a lighting module and/or a trim is installed to support a specific number of wires and/or cables of a particular gauge in accordance with 2020 NEC 314.16.

The housing assembly 1000*i* may generally include multiple spring clips 1300 disposed, in part, around the sidewall 1110*d* to provide multiple attachment points to couple the housing 1100*i* to a drywall panel. The spring clips 1300 may generally be arranged on opposing sides of the housing 1000*i* so that the housing 1100*i* is mechanically supported on different sides. In other words, the spring clips 1300 may be arranged so that the housing 1100*i* is not mounted only on one side when coupled to the drywall panel. In some implementations, the spring clips 1300 may be distributed uniformly about a centerline axis 1101*a* corresponding to a vertical axis intersecting the center of the base end 1121. For example, the housing assembly 1000*i* may include two spring clips 1300 rotationally offset by 180 degrees with respect to one another. This results in the spring clips 1300 being disposed diametrically opposite of one another as shown in FIGS. 21C and 21D. In another example, the housing assembly 1000*i* may include three spring clips 1300 that are rotationally offset by 120 degrees about the centerline axis 1101*a*. In yet another example, the housing assembly 1000*i* may include four spring clips 1300 that are rotationally offset by 90 degrees about the centerline axis 1101*a*.

Figure 21I:
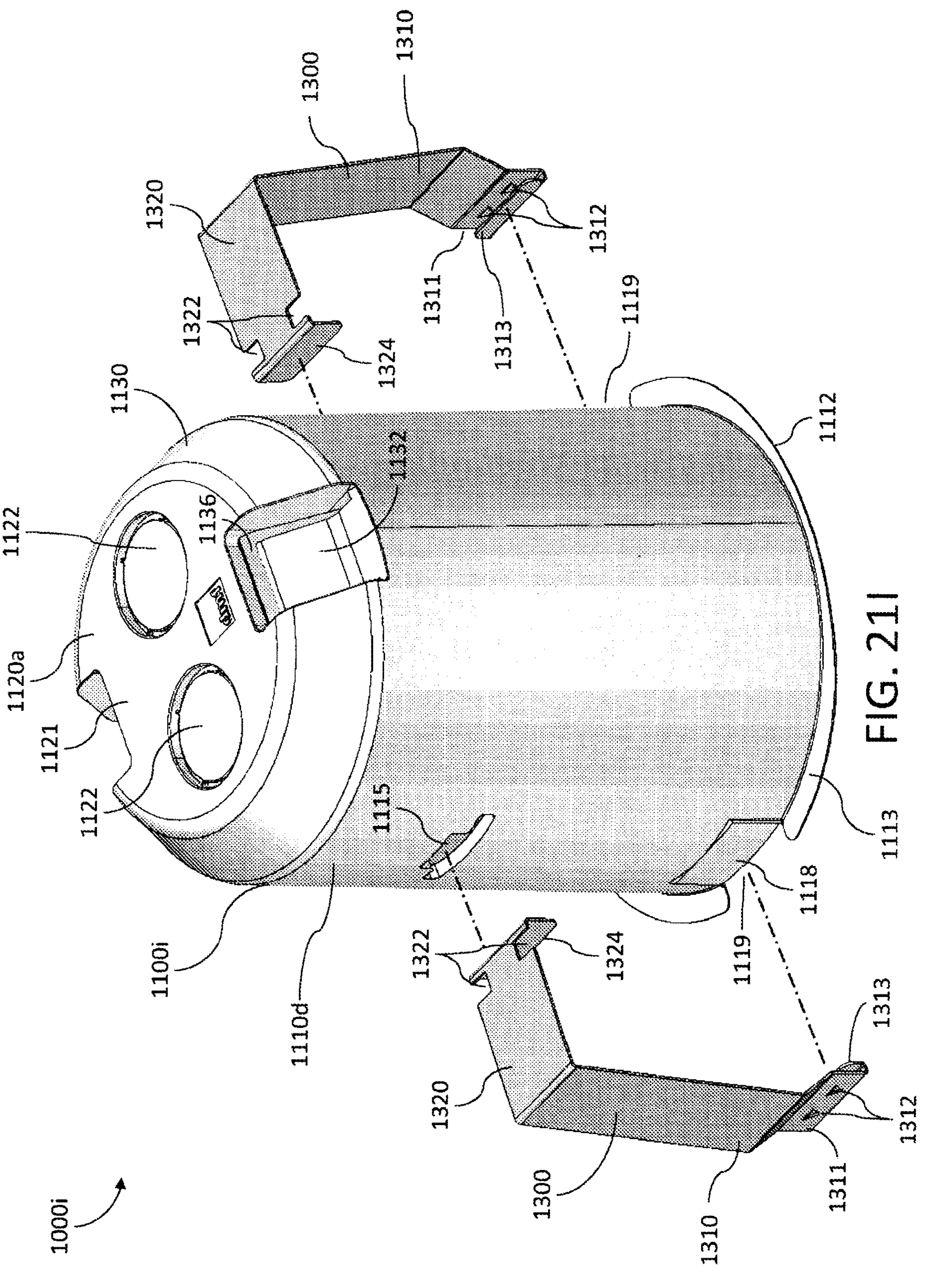
FIG. 21I shows an exploded top, right, front perspective view of the housing assembly of FIG. 21A.

The sidewall 1110*d* may generally include connection sections 1118 for each spring clip 1300 to facilitate attachment of the spring clip 1300 to the housing 1100*i*. As shown in FIGS. 21G, 21H, and 21I, each connection section 1118 may be formed as a flat wall adjoining the first end 1111-1 and merged with the curved portions of the sidewall 1110*d*. In some implementations, the exterior surface of the connection section 1118 may protrude outwards from the exterior surface of the curved portion of the sidewall 1110*d*. However, it should be appreciated that, in some implementations, the exterior surface of the connection section 1118 may be recessed with respect to the exterior surface of the curved portion of the sidewall 1110*d*.

The connection section 1118 may generally be shaped and/or dimensioned such that a base section 1311 of the spring clip 1300, which includes a hook 1313, may wrap around the interior and exterior surfaces of the connection section 1118 and the portion of the first end 1111-1 subtended by the connection section 1118. In some implementations, the exterior and interior surfaces of connection section 1118 may be tapered in a similar manner as the curved portions of the sidewall 1110*d*. However, it should be appreciated that, in some implementations, the exterior and interior surfaces of connection section 1118 may be oriented substantially vertically or vertically.

The thickness of the connection section 1118 and/or the dimensions of the hook 1313 may be chosen to provide a tight fit between the hook 1313 and the connection section 1118. In some implementations, the hook 1313 and the connection section 1118 may form an interference fit. In some implementations, the thickness of the connection section 1118 may be less than the thickness of the curved portions of the sidewall 1110*d* as shown in FIG. 21G. In some implementations, the spring clip 1300 may further include one or more teeth 1312, which are disposed within the channel formed by the hook 1313, to dig into the connection section 1118 of the housing 1100*i* to securely couple the spring clip 1300 to the housing 1100*i*. Thus, the thickness of the connection section 1118 may be chosen to be sufficiently large to allow the teeth 1312 to dig into the connection section 1118 without piercing the connection section 1118. Said in another way, the teeth 1312 may not extend through the connection 1118 and into the cavity 1104 of the housing 1100*i*.

The sidewall 1110*d* may further include an opening 1115 for each spring clip 1300 as well. As shown in FIG. 21F, the opening 1115 may generally be disposed directly above the connection section 1118 along the curved portion of the sidewall 1110*d*. In some implementations, each opening 1115 may be a T-shaped opening. Specifically, each T-shaped opening 1115 may include a wide portion 1116 and a narrow portion 1117 disposed directly above and adjoining the wide portion 1116. The narrow and wide portions 1117 and 1116 may be centered about a vertical plane intersecting the centerline axis 1101*a* of the housing 1100*i*. The wide portion 1116 may be shaped and/or dimensioned to receive a wide section 1325 of a push flange 1320 on the spring clip 1300 while the narrow portion 1117 may be shaped and/or dimensioned to receive a narrow section 1326 of the push flange 1320.

During installation, the spring clip 1300 may be deflected outwards by pushing the wide section 1325 through the wide portion 1116 of the opening 1115. The narrow section 1326 may engage the narrow portion 1117 of the opening 1115 to lock the spring clip 1300 in place once engaged with the drywall panel as will be discussed in more detail below.

The sidewall 1110*d* may also include the flange 1113 formed along and around the first end 1111-1. The flange 1113 may generally provide a top surface to abut the bottom surface of a drywall panel (see, for example, FIGS. 23A-23C). In this manner, the flange 1113 may limit the extent the housing 1100*i* can be inserted into a ceiling space. In some implementations, the flange 1113 may shaped such that the bottom surface of the flange 1113 is coplanar with the first end 1111-1 of the sidewall 1110*d*. The flange 1300 may not extend fully around the first end 1111-1. Instead, one or more notches 1119 may be formed along the flange 1300 corresponding to the location of the connection sections 1118 on the sidewall 1110*d*. The notches 1119 may provide space to attach the spring clip 1300 to the connection section 1118. For example, FIGS. 21C and 21D show the housing 1100*i* may include two notches 1119 corresponding to the two connection sections 1118.

FIG. 21D shows the flange 1113 may generally have a width ($w_f$), which is defined as the distance between an outer edge of the flange 1113 and an inner edge of the flange 1113 joining the first end 1111-1 along a radial axis 1101*b* intersecting the centerline axis 1110*a*. As shown in FIGS. 21C and 21D, the width $w_f$ of the flange 1113 may vary in magnitude around the first end 1111-1. For example, the width $w_f$ of the flange 1113 may be larger near the spring clips 1300 and smaller further away from the spring clips 1300. Specifically, FIG. 21D shows the width $w_f$ of the flange 1113 is largest at points 1191-1 proximate to and/or abutting the spring clips 1300 and smallest at points 1191-2 located further from the pair of spring clips 1300.

The width $w_f$ of the flange 1113 may vary, in part, to compensate for potential distortions in the housing 1100*i* during installation. Specifically, the spring clips 1300, when engaged to the drywall, may each impart a force onto the drywall panel. The force may include a force component oriented radially outwards from the centerline axis 1101*a* of the housing 1100*i*, which is applied onto the interior surfaces and/or edges defining the opening in the drywall panel. The drywall panel, in turn, may impart a reaction force oriented radially inwards towards the centerline axis 1101*a* of the housing 1100*i*. The drywall panel is mechanically rigid and thus does not appreciably deform when the housing assembly 1000*i* is installed. However, the housing 1100*i* may be more mechanically compliant than the drywall panel. Thus, the reaction forces applied to the spring clips 1300, which are transferred directly to the housing 1300, may cause the housing 1100*i* to distort in shape.

For example, the two spring clips 1300 of the housing assembly 1000*i* may give rise to two reaction forces when the housing assembly 1000*i* is mounted to the drywall panel. Since the two spring clips 1300 are disposed on opposing sides of the housing 1100*i*, one reaction force is applied on the left side of the housing 1100*i* while the other reaction force is applied on the right side of the housing 1100*i*. The reaction forces may thus squeeze the housing 1100*i*, which, in turn, may cause the portions of the sidewall 1110*d* located near the spring clips 1300 to move inwards towards the centerline axis 1101*a* and the portions of the sidewall 1110*d* located further away from the spring clips 1300 to move outwards away from the centerline axis 1101*a*. In other words, the cross-section of the sidewall 1110*d* may change from a circle to an oval.

The distortions in the sidewall 1110*d*, in turn, may cause distortions in the flange 1113 as well. Specifically, the portions of the flange 1113 located near the points 1191-1 may be displaced inwards towards the centerline axis 1101*a* while the portions of the flange 1113 located near the points 1191-2 may be displaced outwards away from the centerline axis 1101*a*. If the width $w_f$ of the flange 1113 remained constant around the sidewall 1110*d*, the portions of the flange 1113 located near the points 1191-2 may be displaced to such an extent the outer edges of the flange 1113 would interfere with the installation of a trim onto the housing 1100*i*. Thus, to compensate for this displacement, the width $w_f$ of the flange 1113 near the points 1191-2 may be smaller than the width $w_f$ of the flange 1113 near the points 1191-1. In some implementations, the outer edges of the flange 1113 may become substantially circular or circular when the sidewall 1110*d* is distorted.

It should be appreciated that, in some implementations, the housing 1110*d* may be made more mechanically rigid to reduce or, in some instances, mitigate distortions to the sidewall 1110*d* and/or the flange 1113. For example, the thickness of sidewall 1110*d* may be increased to increase the mechanical stiffness of the sidewall 1110*d*. In another example, one or more ribs may be formed along the sidewall 1110*d* to increase the mechanical stiffness of the sidewall 1110*d*. In yet another example, the spring clip 1300 may be shaped such that the radial force component applied to the drywall panel is reduced. Said in another way, the force applied by the spring clip 1300 onto the drywall panel may be oriented substantially vertical or vertical.

Figure 22B:
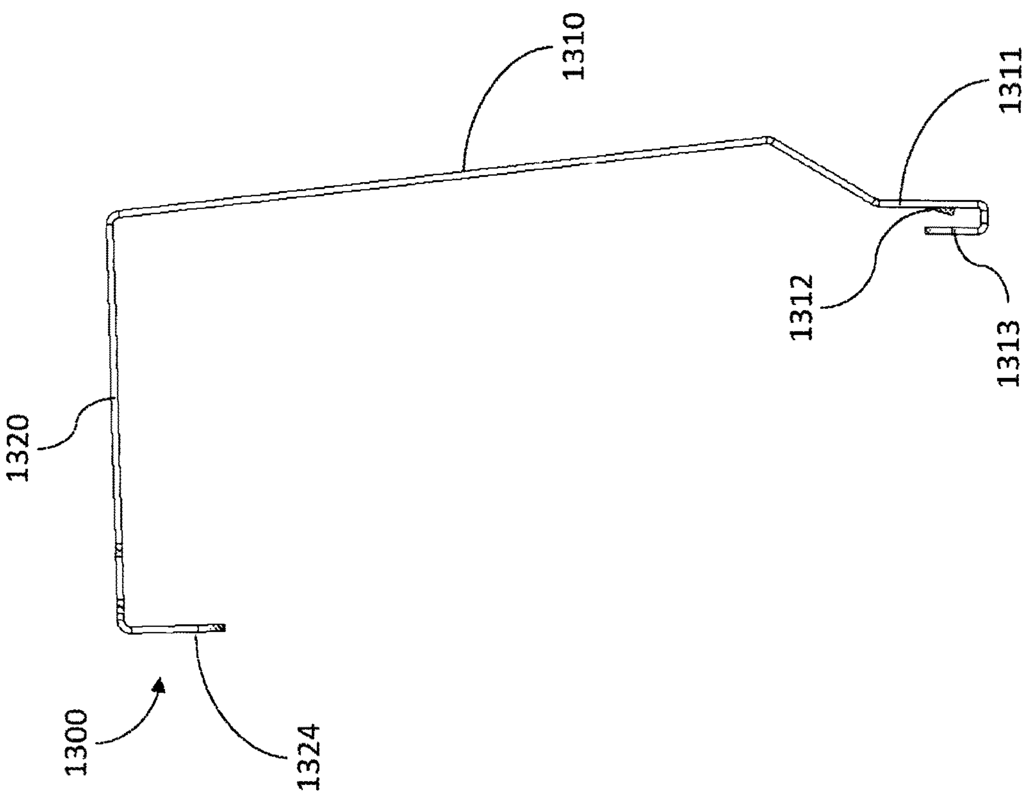
FIG. 22B shows a front view of the spring clip of FIG. 22A.
Figure 22A:
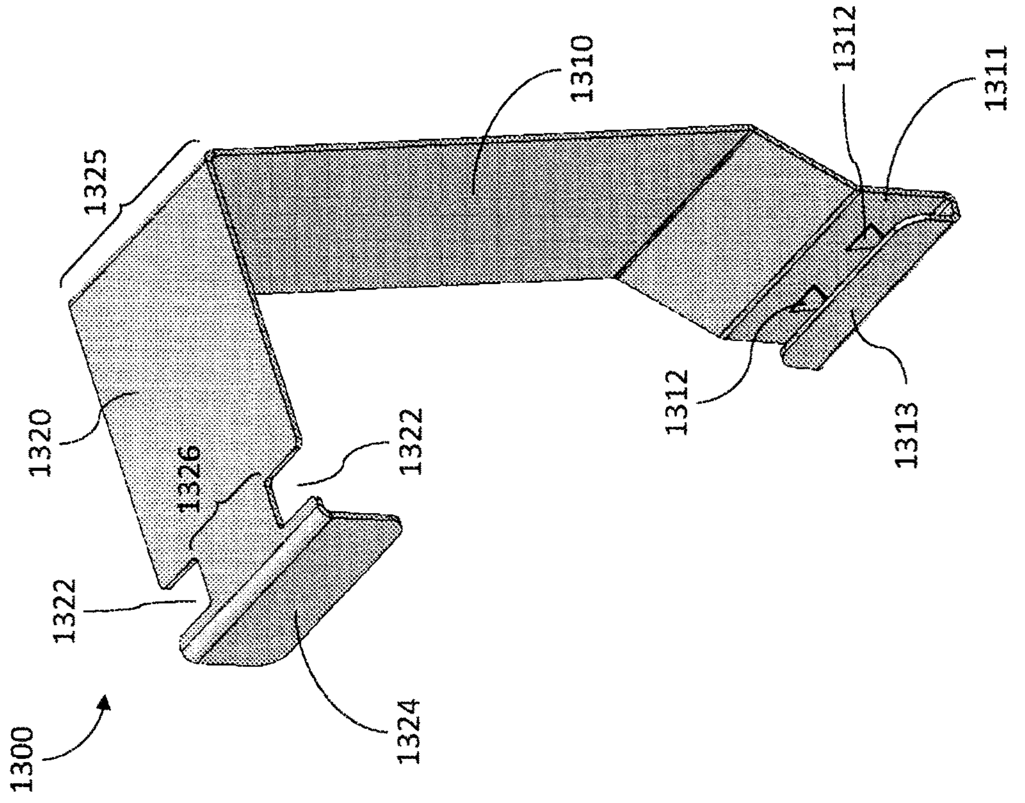
FIG. 22A shows a top, front, left perspective view of a spring clip in the housing assembly of FIG. 21A.

FIGS. 22A and 22B show several additional views of the spring clip 1300. As shown, the spring clip 1300 may include the base section 1311, which includes the hook 1313 and the teeth 1312 to couple the spring clip 1300 to the housing 1100*i*. In some implementations, the base section 1311 may include multiple teeth 1312 shaped as triangular protrusions that extend into the channel formed by the hook 1313. The teeth 1312 may further be oriented such that when the spring clip 1300 is pressed onto the connection section 1118 of the housing 1100*i*, the teeth 1312 may dig into the housing 1100*i*, thus limiting or, in some instances, preventing the removal of the spring clip 1300 from the housing 1100*i*.

The spring clip 1300 may further include a bent section 1310 joined to the base section 1311. The bent section 1310 may protrude outwards from the sidewall 1110*d* to engage a top surface of a drywall panel for installation. As shown, the bent section 1310 may extend up to the push flange 1320, which is disposed within the opening 1115 of the sidewall 1110*d* as described above. The bent section 1310 may be tapered in shape such that the bent section 1310 includes flat sections that are not oriented vertically. This geometry may provide more leverage to deflect the bent section 1310 about the portion of the spring clip 1300 where the base section 1311 joins the bent section 1310. More generally, the bent section 1310 may have various shapes including, but not limited to, a V-shaped bend, a round-shaped bend, an arc where the spring clip 1300 bends outwards to clasp the drywall panel.

The push flange 1320, in turn, may be adjoined to the bent section 1310. The push flange 1320 may pass through the opening 1115 as described above. In some implementations, the push flange 1320 may be oriented horizontally. In some implementations, the push flange 1320 may be oriented at an angle relative to a horizontal plane. The spring clip 1300 may further include a handle 1324 joined to the push flange 1320 to provide a surface the user may press on to push the push flange 1320 through the opening 1115 and deflect the bent section 1310 outwards. The push flange 1320 may include a wide section 1325 and a narrow section 1326 disposed near the handle 1324. The narrow section 1326 may be formed by a pair of notches 1322 disposed on opposing sides of the push flange 1320 as shown in FIG. 22A. The spring clip 1300 may be generally formed of a metal. For example, the spring clip 1300 may be formed of galvanized steel in the form of sheet metal.

The following describes an exemplary remodel installation of the housing assembly 1000*i* for a ceiling 90. It should be appreciated that the same or similar steps may be used to install the housing assembly 1000*i* in a wall or a floor.

Figure 23A:
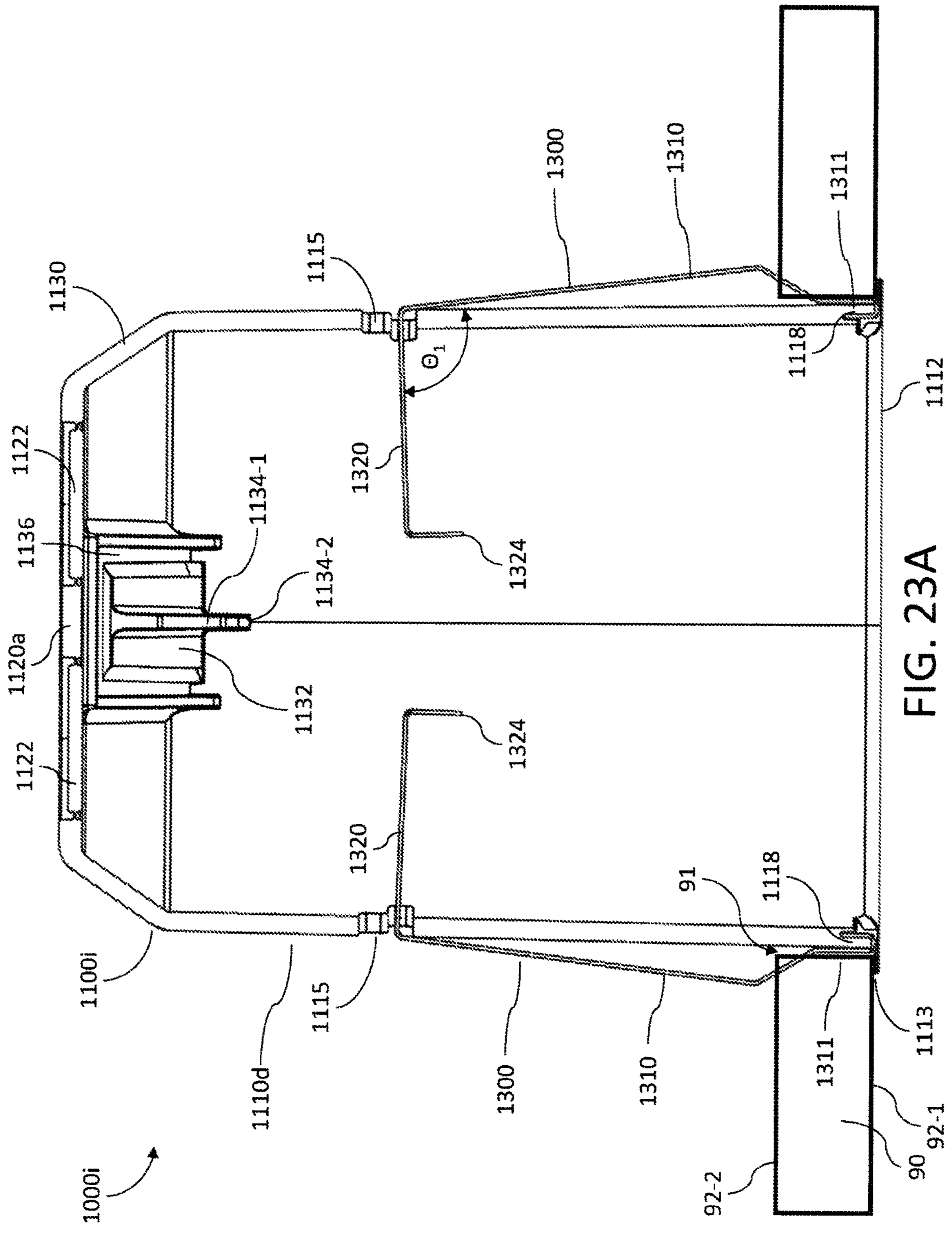
FIG. 23A shows a cross-sectional view of the housing assembly of FIG. 21A corresponding to the plane A-A of FIG. 21F where the housing is inserted into an opening of a ceiling.

The installation of the housing assembly 1000*i* may first begin with the removal of one or more of the knockouts 1122 on the housing 1100*i* to provide an opening for one or more electrical wires and/or cables to be inserted into the cavity 1104 of the housing 1100*i*. As before, once the external electrical wire connections are inserted into the housing 1100*i*, FIG. 23A shows the housing 1100*i* may then be inserted through the opening 91 formed on the ceiling drywall panel 90 until the top surface of the flange 1113 abuts the bottom surface 92 of the drywall panel 90. Once the housing assembly 1000*i* is disposed within the ceiling space, the installer may then press the handle 1324 of each spring clip 1300 to deflect the bent section 1310 of the spring clip 1300 outwards.

Figure 23B:
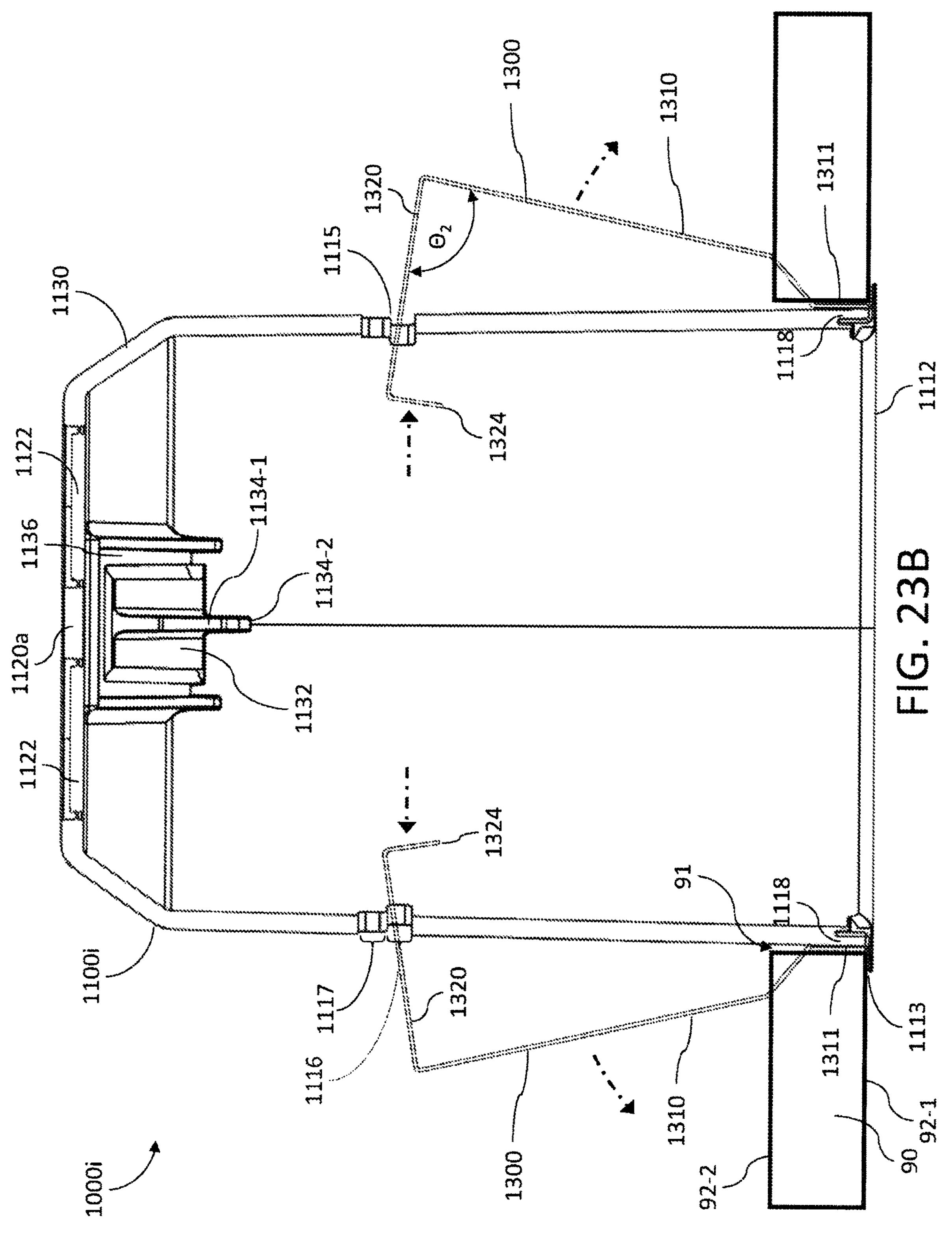
FIG. 23B shows the cross-sectional view of 23A where the spring clips are pushed outwards to engage a top surface of the ceiling.

FIG. 23B shows that as the user presses the handle 1324, the wide section 1325 of the push flange 1320 passes through the wide portion 1116 of the opening 1115 and the bent section 1310 rotates about the portion of the spring clip 1300 where the base section 1311 joins the bent section 1310 towards the top surface 93 of the drywall panel 90. As the bent section 1310 is deflected closer towards the top surface 93, the rotational motion of the bent section 1310 causes the push flange 1320 to displace upwards towards the base end 1121 of the housing 1100*i*. However, the upward displacement of the push flange 1320 is limited due to physical contact between the top surface of the wide section 1325 and the edge of the opening 1115 forming the wide portion 1116. The constraints imposed by the wide portion 1116 may cause the push flange 1320 to bend towards the bent section 1310 as the bent section 1310 is deflected further outwards. Said in another way, the angle between the push flange 1320 and the bent section 1310 may decrease from $\Theta_1$ to $\Theta_2$ as shown in FIGS. 23A and 23B.

Figure 23C:
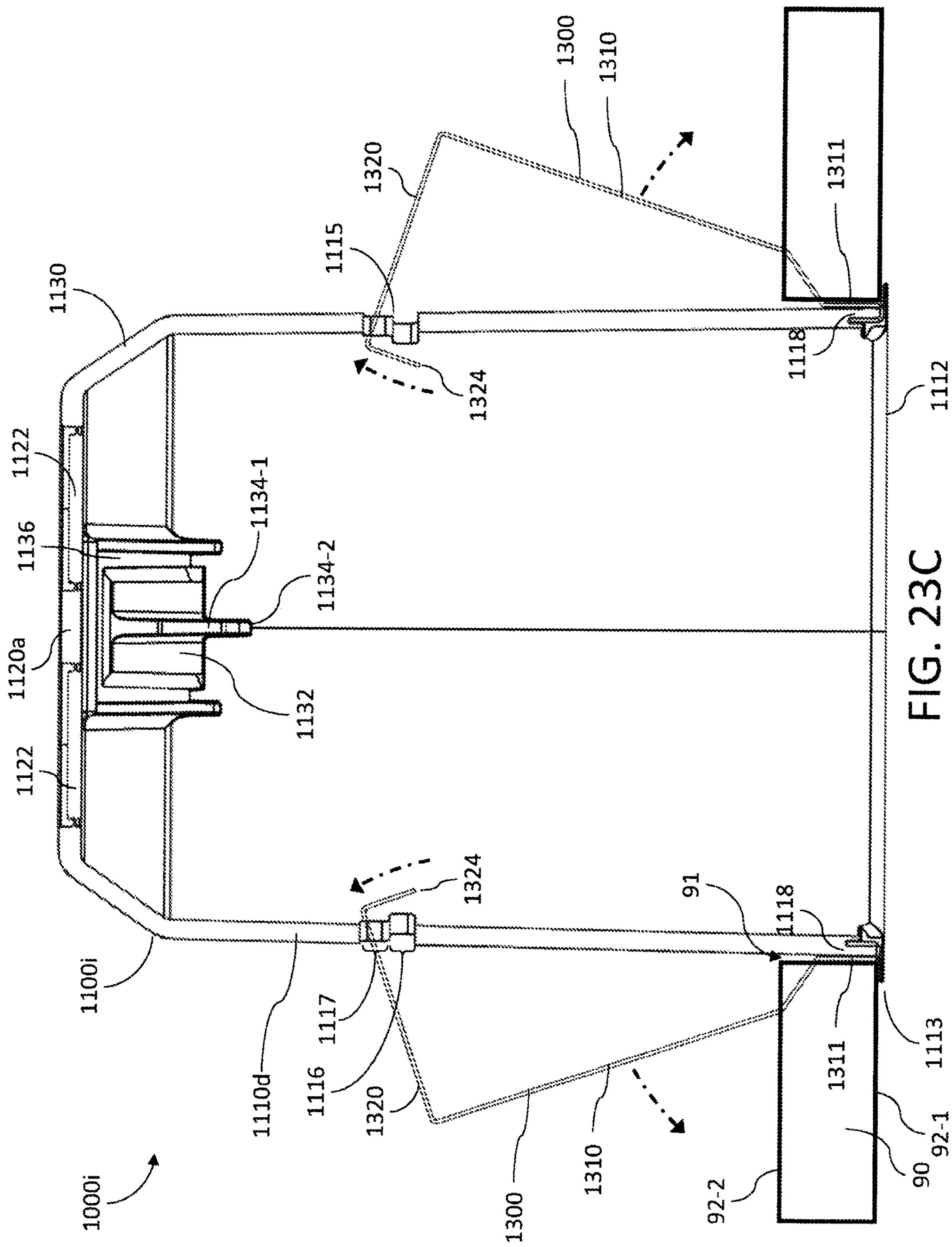
FIG. 23C shows the cross-sectional view of 23B where the spring clips are locked in place onto the housing after engagement with the ceiling.

When the push flange 1320 is sufficiently displaced through the opening 1115 such that the narrow section 1326 is disposed within the wide portion 1116 of the opening 1115, the edges of the opening 1115 may no longer constrain the push flange 1320. Once this occurs, the internal restoring force generated within the spring clip 1300 by the deflection of the push flange 1320 relative to the bent section 1310 may cause the push flange 1320 to move upwards such that the narrow section 1326 is disposed within the narrow portion 1117 of the opening 1115 as shown in FIG. 23C. Once this occurs, the edges of the push flange 1320 defining the notches 1322 may prevent the push flange 1320 from moving in or out through the opening 1115, thus locking the bent section 1310 in place. In this manner, the spring clip 1300 and the flange 1113 of the housing 1100*i* may clamp onto the drywall panel 90.

During installation, the installer may actuate both spring clips 1300 by pressing on the corresponding handles 1324, thus providing multiple points of attachment between the housing assembly 1000*i* and the drywall panel 90. As described above, the pair of spring clips 1300 may be disposed diametrically opposite to one another, thus providing two attachment points on opposite sides of the housing assembly 1000*i*. To uninstall and remove the housing assembly 1000*i*, the handle 1324 of each spring clip 1300 may be pulled downwards, causing the push flange 1320 to move downwards into the wide portion 1116 of the opening 1115. Once this occurs, the handle 1324 may then be pulled inwards into the cavity 1104 to disengage the bent section 1310 from the drywall panel 90.

FIGS. 24A-24I show another exemplary housing assembly 1000*j* tailored for a remodel installation of a 4-inch trade size lighting system. As shown the housing assembly 1000*j* includes a housing 1100*j* with a sidewall 1110*e* and a cover 1120*b*. The housing assembly 1000*j* further includes a pair of spring clips 1300.

The cover 1120*b* may include a base section 1121 supporting multiple knockouts 1122 and a tapered wall 1130 supporting multiple pairs of feedthrough tabs 1132 disposed in corresponding feedthrough openings 1136 and separated by a rib 1131. The sidewall 1110*e* may be round in shape and include a first end 1111-1 with an interior edge 1112 defining a bottom opening 1102 into a cavity 1104. In this implementation, the interior diameter ($D_{int}$) of the cavity 1104 may be about 4 inches. More generally, the interior width ($D_{int}$) of the cavity 1104 may range between about 3 inches to about 6 inches. The exterior height ($H_{ext}$) of the housing 1100*j* may be about 4.6 inches. More generally, the exterior depth ($H_{ext}$) of the housing 1100*j* may range between about 4 inches and about 5 inches.

Figure 24A:
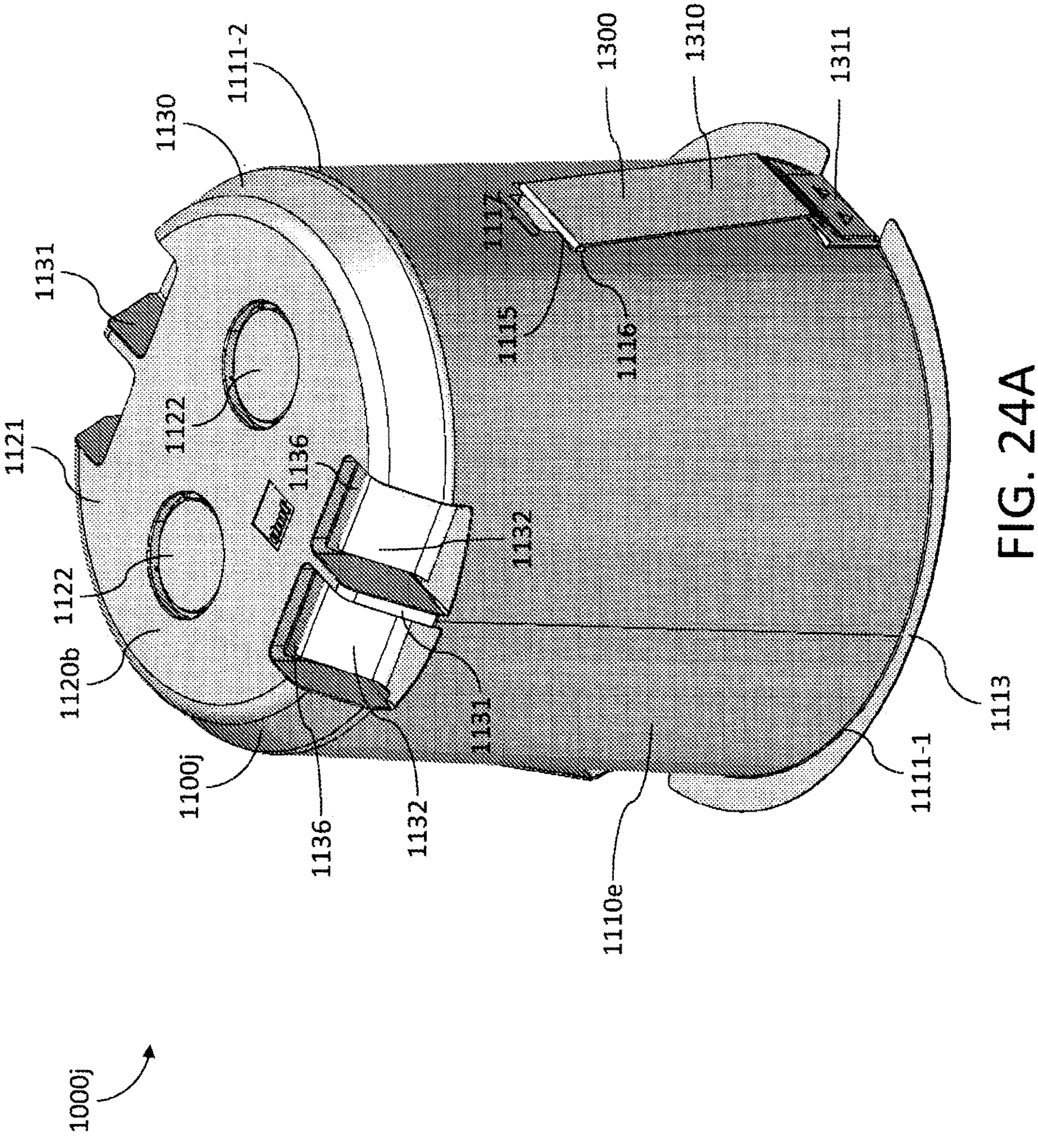
FIG. 24A shows a top, left, rear perspective view of an exemplary housing assembly for a remodel installation of a 4-inch trade size lighting system.
Figure 24B:
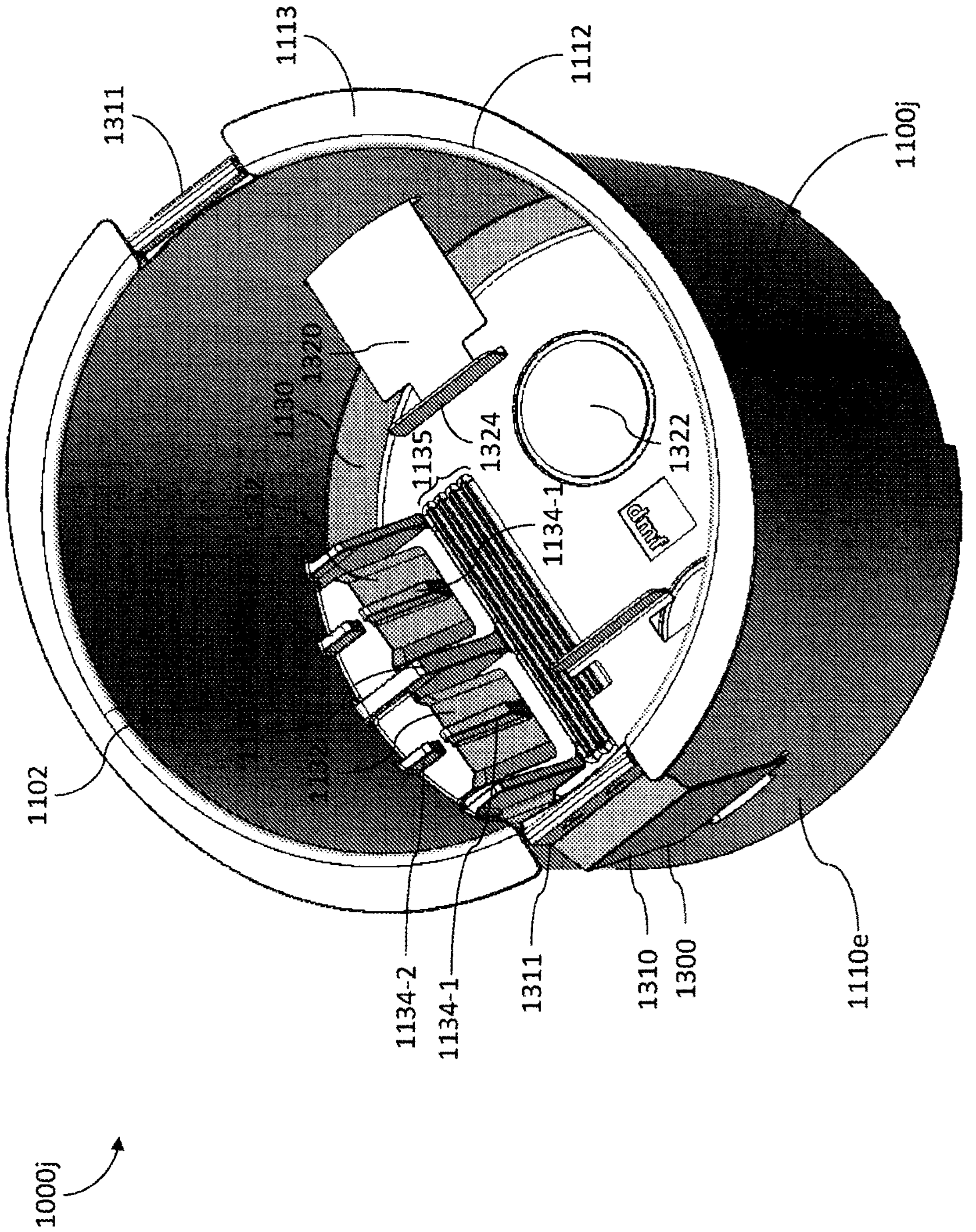
FIG. 24B shows a bottom, right, front perspective view of the housing assembly of FIG. 24A.
Figure 24C:
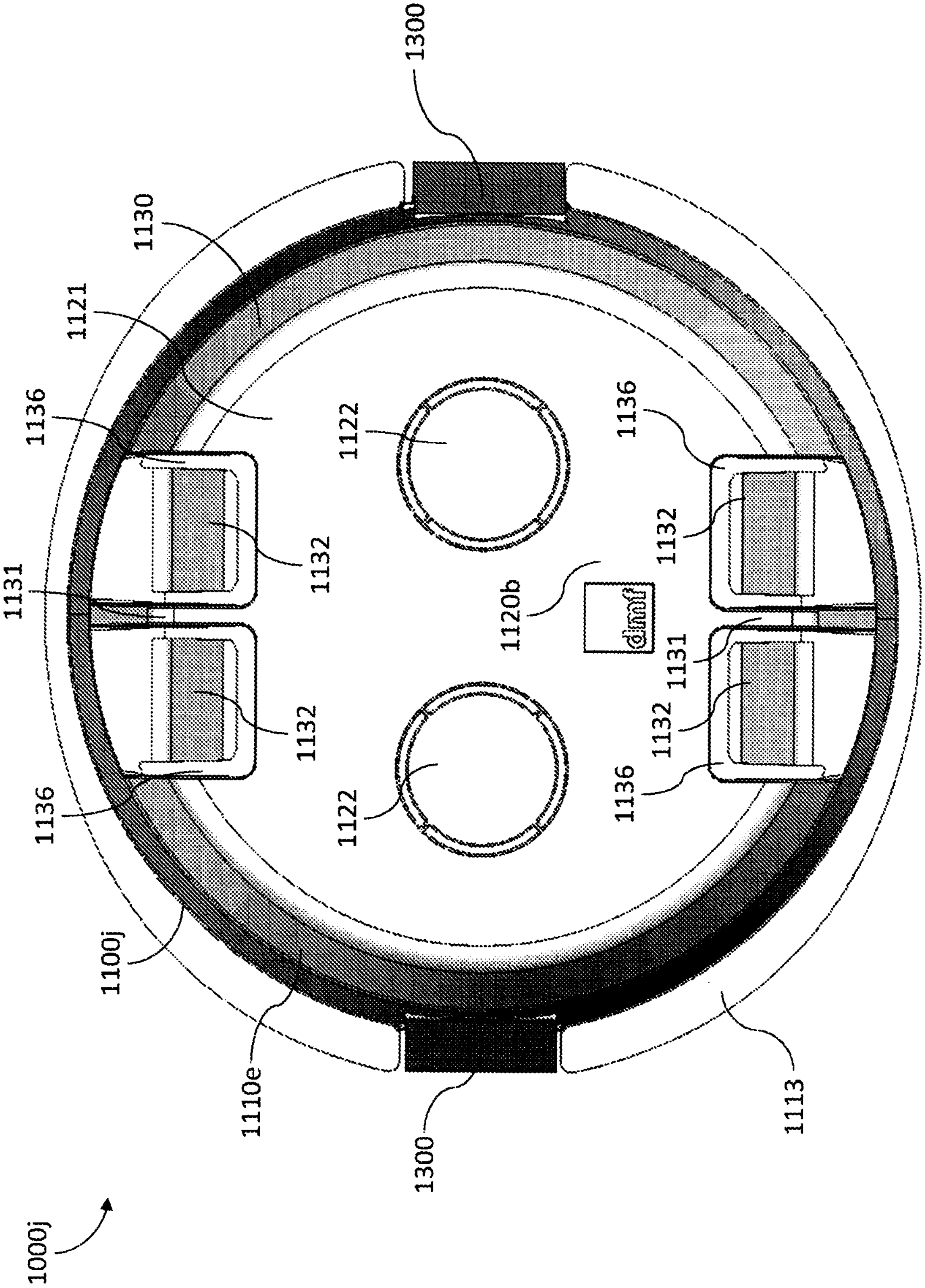
FIG. 24C shows a top view of the housing assembly of FIG. 24A.
Figure 24D:
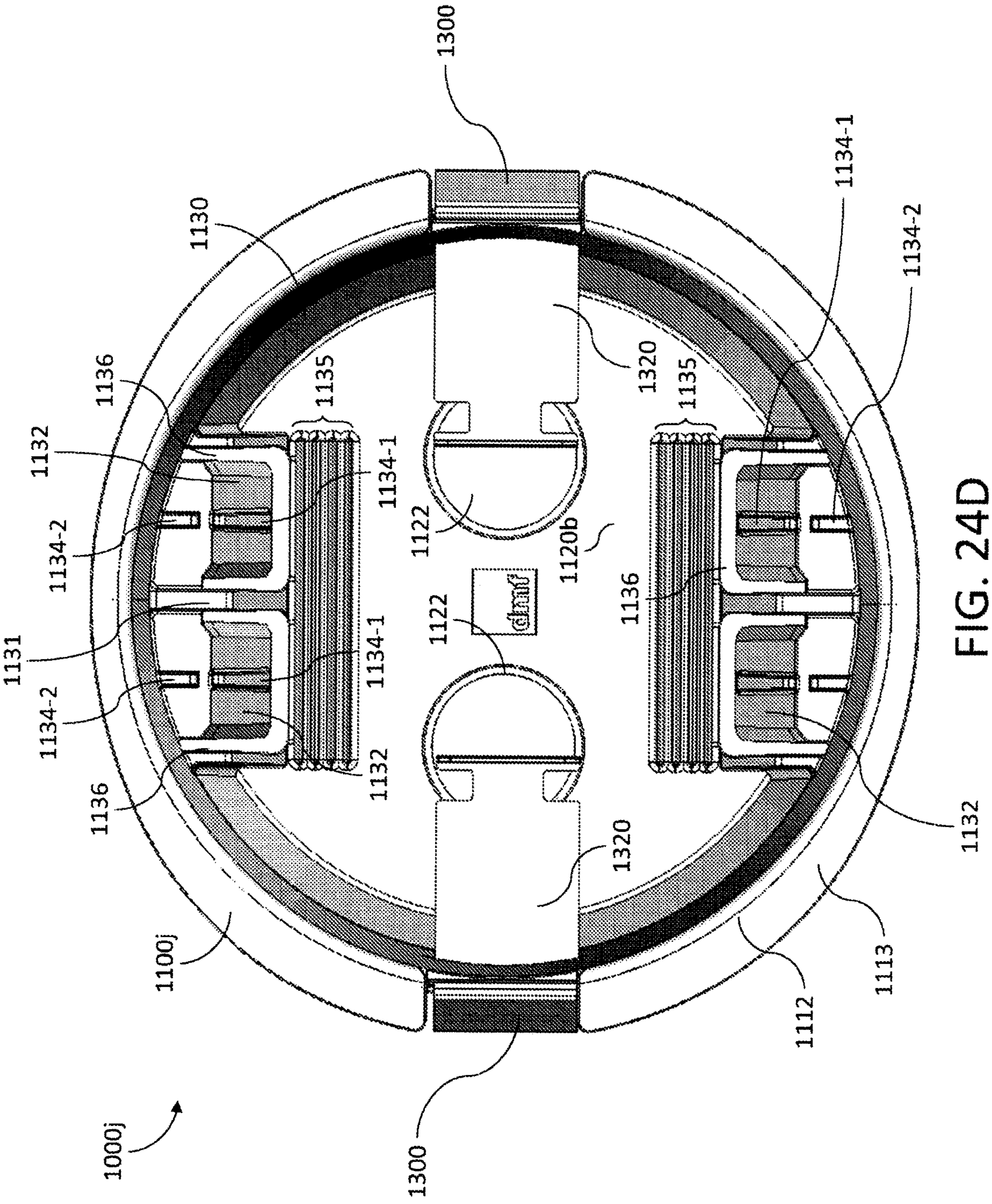
FIG. 24D shows a bottom view of the housing assembly of FIG. 24A.
Figure 24E:
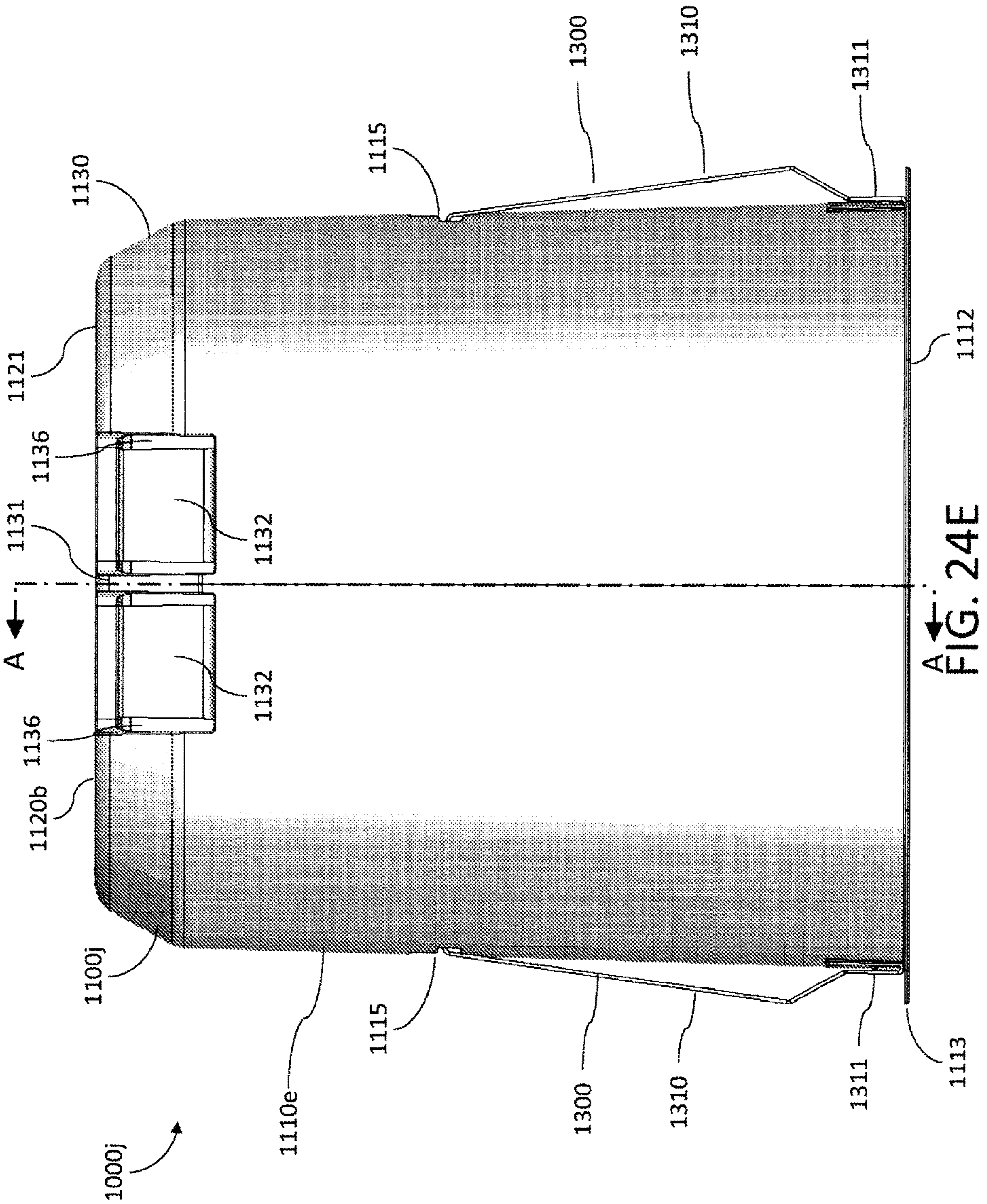
FIG. 24E shows a front view of the housing assembly of FIG. 24A.
Figure 24F:
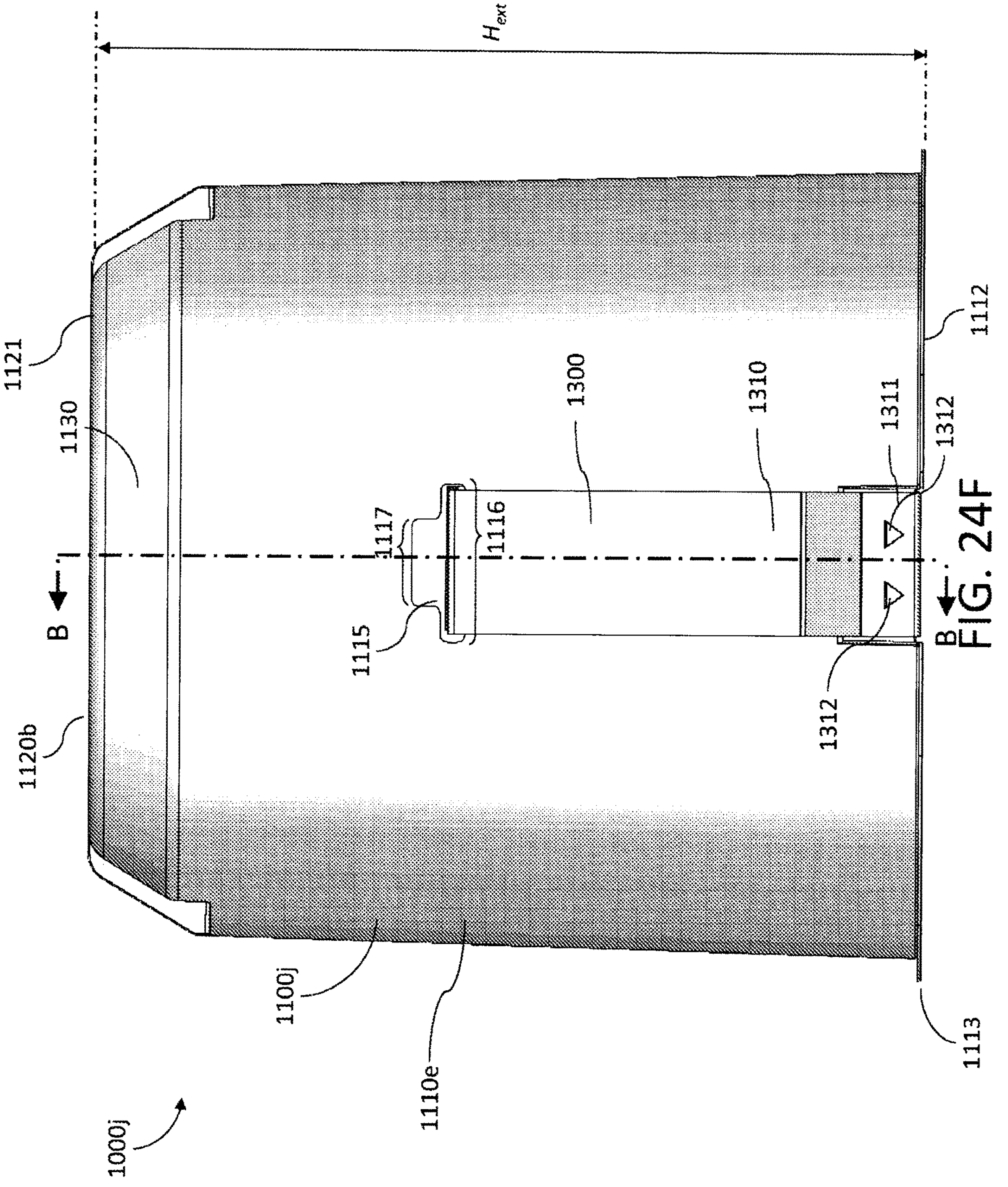
FIG. 24F shows a right-side view of the housing assembly of FIG. 24A.
Figure 24G:
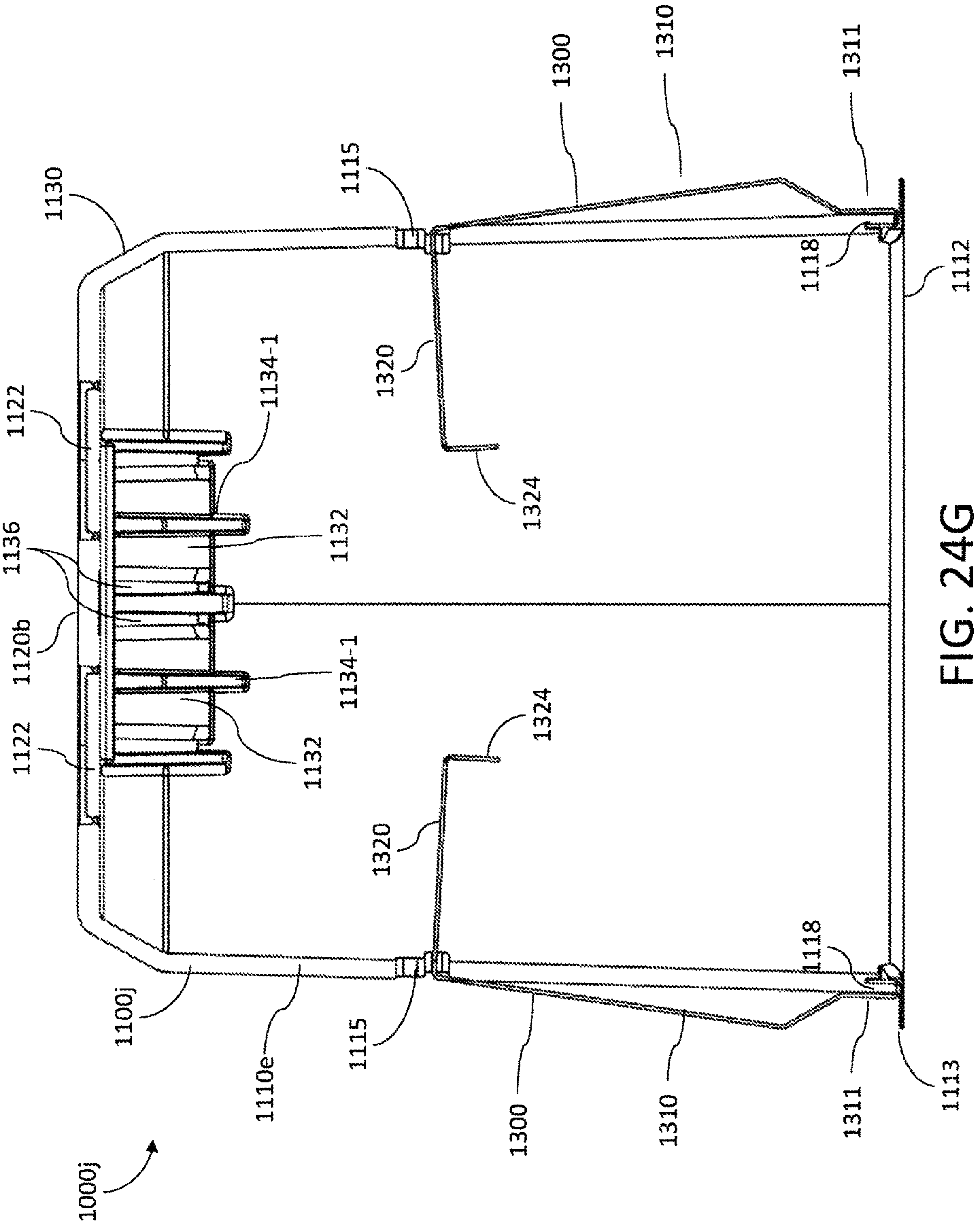
FIG. 24G shows a cross-sectional front-side view of the housing of FIG. 24A corresponding to the plane A-A of FIG. 24F.
Figure 24H:
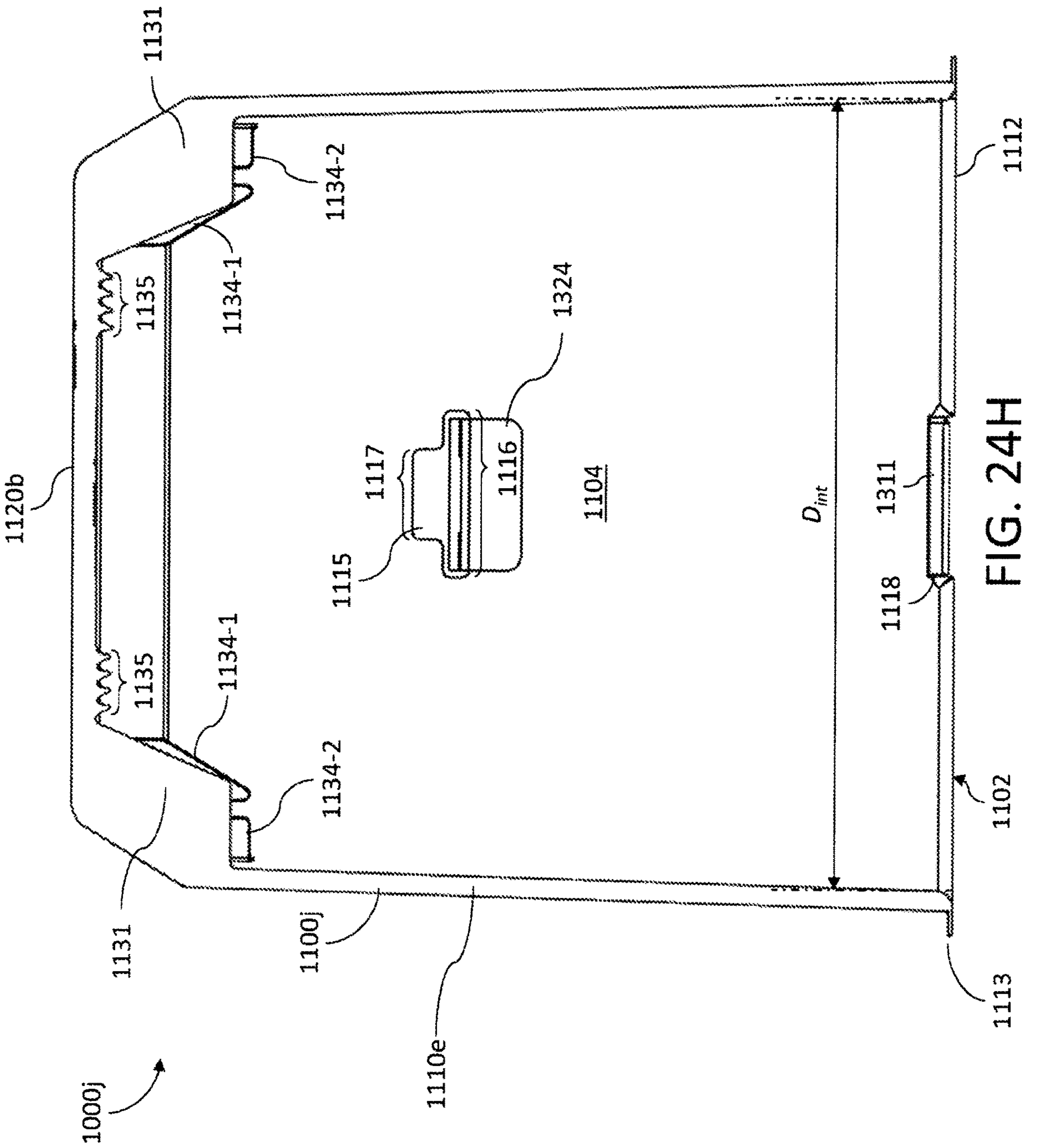
FIG. 24H shows a cross-sectional right-side view of the housing of FIG. 24A corresponding to the plane B-B of FIG. 24E.
Figure 24I:
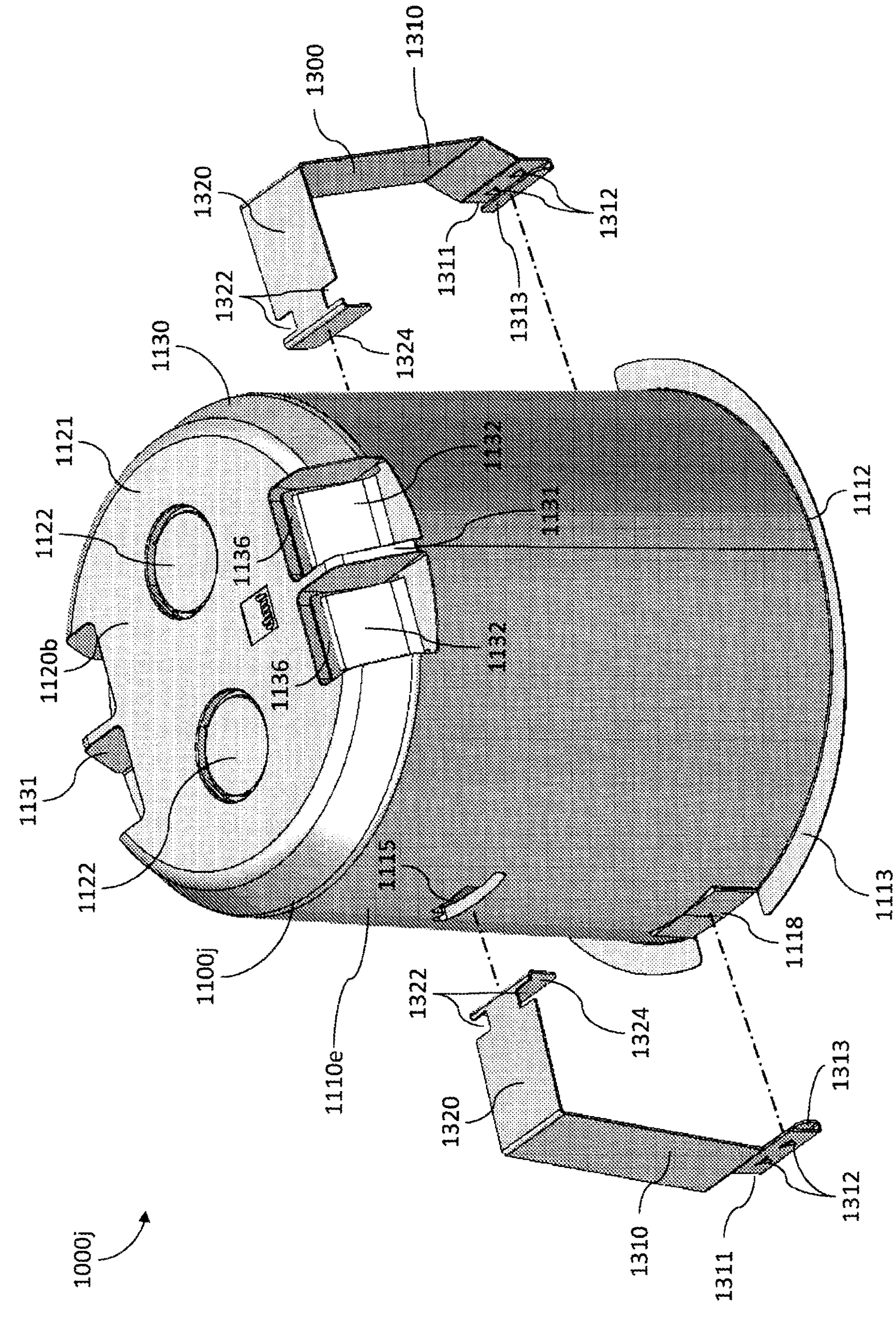

The housing 1100*j* may include several of the same or similar feature as the housing 1100*i* to facilitate installation. For example, the housing 1100*j* may include a flange 1113 joined to and surrounding the first end 1111-1. As shown in FIGS. 24C and 24D, the flange 1113 may have a non-uniform width, similar to the housing 1100*i*, to compensate for distortions to the housing 1100*j* during installation. The housing 1100*j* may further include a pair of connection sections 1118 formed along the bottom portion of the sidewall 1110*e* and adjoining the first end 1111-1 to provide a mounting surface for the spring clips 1300. The housing

**1100*j* may also include a pair of T-shaped openings 1115 to receive the push flange 1320 of the spring clips 1300. The housing assembly 1000*j* may be installed and/or uninstalled onto a drywall panel of a ceiling in a similar manner as the housing assembly 1000*i*** described above.

CONCLUSION

All parameters, dimensions, materials, and configurations described herein are meant to be exemplary and the actual parameters, dimensions, materials, and/or configurations will depend upon the specific application or applications for which the inventive teachings is/are used. It is to be understood that the foregoing embodiments are presented primarily by way of example and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein.

In addition, any combination of two or more such features, systems, articles, materials, kits, and/or methods, if such features, systems, articles, materials, kits, and/or methods are not mutually inconsistent, is included within the inventive scope of the present disclosure. Other substitutions, modifications, changes, and omissions may be made in the design, operating conditions and arrangement of respective elements of the exemplary implementations without departing from the scope of the present disclosure. The use of a numerical range does not preclude equivalents that fall outside the range that fulfill the same function, in the same way, to produce the same result.

Also, various inventive concepts may be embodied as one or more methods, of which at least one example has been provided. The acts performed as part of the method may in some instances be ordered in different ways. Accordingly, in some inventive implementations, respective acts of a given method may be performed in an order different than specifically illustrated, which may include performing some acts simultaneously (even if such acts are shown as sequential acts in illustrative embodiments).

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of" when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A housing, comprising:

a sidewall defining a cavity and having a first end and a second end, the first end defining an opening into the cavity;

a cover, integrally formed with the sidewall, enclosing the second end of the sidewall; and an integrally formed bar hanger holder configured to slidably support one or more bar hangers, wherein the housing is formed of a polymer.

2. A housing assembly, comprising:
the housing of claim 1; and
the one or more bar hangers, slidably coupled to the integrally formed bar hanger holder, to couple the housing to one or more support structures during installation of the housing.

3. The housing of claim 1, wherein:
the integrally formed bar hanger holder is a first integrally formed bar hanger holder, disposed on a first portion of the sidewall, configured to slidably support one or more first bar hangers; and
the housing further comprises:
a second integrally formed bar hanger holder, disposed on a second portion of the sidewall opposite the first portion, configured to slidably support one or more second bar hangers.

4. A housing assembly, comprising:
the housing of claim 3;
the one or more first bar hangers slidably coupled to the first integrally formed bar hanger holder; and
the one or more second bar hangers slidably coupled to the second integrally formed bar hanger holder.

5. The housing of claim 1, wherein the integrally formed bar hanger holder includes a fastener opening configured to receive a fastener that, when tightened, securely couples the housing to the one or more bar hangers thereby locking a position of the housing along a length of the one or more bar hangers.

6. The housing of claim 1, wherein at least a portion of the sidewall has a cross-section shape that is at least one of a circle, an ellipse, a regular polygon, or an irregular polygon.

7. The housing of claim 1, wherein a portion of the sidewall is tapered such that at least one of an interior width or an exterior width of the portion of the sidewall one of increases or decreases monotonically along a centerline axis of the housing.

8. The housing of claim 1, wherein the sidewall comprises:
a first sidewall section adjoining the second end;
a second sidewall section adjoining the first sidewall section; and
a third sidewall section adjoining the second sidewall section,
wherein the second sidewall section forms a step between the first and third sidewall sections such that when the housing is a first housing and a second housing identical to the first housing is stacked onto the first housing:
the first sidewall section of the first housing is disposed within the cavity of the second housing; and
the first end of the second housing rests on the step of the first housing.

9. The housing of claim 1, wherein the housing has an exterior depth that ranges between about 3 inches and about 6 inches.

10. The housing of claim 1, wherein the housing has an interior width that ranges between about 3 inches and about 6 inches.

11. The housing of claim 1, wherein the cavity is configured to contain:
at least a portion of an electrical wire; and
a wire splice.

12. An assembly, comprising:
the housing of claim 11;
the portion of the electrical wire disposed in the cavity; and
the wire splice disposed in the cavity.

13. The housing of claim 1, wherein the cavity is configured to contain:
a light source; and
a driver.

14. A recessed lighting system, comprising:
the housing of claim 13;
a light source, disposed in the cavity of the housing, to emit light; and
a driver, disposed in the cavity of the housing, to supply electrical power to the light source.

15. The recessed lighting system of claim 14, further comprising:
at least one electrical wire, partially disposed in the cavity, to supply the electrical power from an external electrical power supply system; and
at least one wire splice to facilitate connection of the at least one electrical wire to the driver.

16. The housing of claim 1, wherein:
a portion of the housing forms a feedthrough opening; and
the housing further comprises:
a feedthrough tab, disposed in the feedthrough opening, configured to be bent into the cavity such that one of a wire or a cable is insertable into the cavity through the feedthrough opening.

17. The housing of claim 1, further comprising:
a knockout configured to be removable to provide a feedthrough opening such that one of a wire or a cable is insertable into the cavity through the feedthrough opening.

18. The housing of claim 1, wherein the first end includes one or more notches to facilitate alignment of the housing to a support structure during installation of the housing.

19. A housing, comprising:
a sidewall defining a cavity and having a first end and a second end, the first end defining an opening into the cavity, the cavity being configured to contain at least a portion of an electrical wire from an external power supply system and a wire splice;
a cover, integrally formed with the sidewall, enclosing the second end of the sidewall; and
an integrally formed bar hanger holder configured to slidably support one or more bar hangers,
wherein:
the housing is formed of a polymer;
the housing has an interior width that ranges between about 3 inches and about 6 inches; and
the housing has an exterior depth that ranges between about 3 inches and about 6 inches.

20. A housing, comprising:
a sidewall defining a cavity and having a first end and a second end, the first end defining an opening into the cavity, the cavity being configured to contain at least a portion of an electrical wire from an external power supply system and a wire splice;
a cover, integrally formed with the sidewall, enclosing the second end of the sidewall; and
a bar hanger holder, integrally formed on the sidewall, configured to slidably support one or more bar hangers,
wherein the housing is formed of a polymer.

* * * * *